US012779833B2

(12) United States Patent
Suzuki et al.

(10) Patent No.: US 12,779,833 B2
(45) Date of Patent: Nov. 3, 2026

(54) GAS BARRIER LAMINATE

(71) Applicant: RM TOHCELLO CO., LTD., Tokyo (JP)

(72) Inventors: Shingo Suzuki, Koga (JP); Takaaki Iio, Koga (JP); Tomoyoshi Hakamata, Koga (JP); Kenji Odagawa, Sodegaura (JP)

(73) Assignee: RM TOHCELLO CO., LTD., Tokyo (JP)

( * ) Notice: Subject to any disclaimer, the term of this patent is extended or adjusted under 35 U.S.C. 154(b) by 197 days.

(21) Appl. No.: 18/856,206

(22) PCT Filed: Apr. 12, 2022

(86) PCT No.: PCT/JP2022/017560
§ 371 (c)(1),
(2) Date: Oct. 11, 2024

(87) PCT Pub. No.: WO2023/199396
PCT Pub. Date: Oct. 19, 2023

(65) Prior Publication Data
US 2025/0242578 A1 Jul. 31, 2025

(51) Int. Cl.
*B32B 3/10* (2006.01)
*B32B 7/12* (2006.01)
(Continued)

(52) U.S. Cl.
CPC ................ *B32B 37/24* (2013.01); *B32B 7/12* (2013.01); *B32B 27/16* (2013.01); *B32B 27/30* (2013.01);
(Continued)

(58) Field of Classification Search
None
See application file for complete search history.

(56) References Cited

U.S. PATENT DOCUMENTS 6,428,887 B1 8/2002 Vargo et al.
6,790,526 B2 9/2004 Vargo et al.
(Continued)

FOREIGN PATENT DOCUMENTS

JP 2002206031 A 7/2002
JP 2004323592 A * 11/2004
(Continued)

OTHER PUBLICATIONS

Office Action (Notice of Reasons for Refusal) issued on May 19, 2026, by the Japanese Patent Office in corresponding Japanese Patent Application No. 2024-515206, and an English Translation of the Office Action (8 pages).
(Continued)

*Primary Examiner* — Christopher M Polley
(74) *Attorney, Agent, or Firm* — BUCHANAN INGERSOLL & ROONEY PC

(57) ABSTRACT

A gas barrier laminate including: a base material layer; a gas barrier layer that is provided over at least one surface of the base material layer; and an inorganic material layer that is provided between the base material layer and the gas barrier layer, in which a composition ratio of Zn measured by X-ray photoelectron spectroscopy analysis of the gas barrier layer is 1 to 10 atomic %, when a mass peak intensity of 64ZnPO4H— is denoted by I(64ZnPO4H—), and a mass peak intensity of C3H3O2- is denoted by I(C3H3O2-), the mass peak intensities being measured by time-of-flight secondary ion mass spectrometry analysis of the gas barrier layer, a value of I(64ZnPO4H—)/I(C3H3O2-) is equal to or more than 6×10-4 and equal to or less than 5×10-2.

9 Claims, 7 Drawing Sheets

(51) Int. Cl.

| | |
|---|---|
| ***B32B 27/16*** | (2006.01) |
| ***B32B 27/30*** | (2006.01) |
| ***B32B 27/32*** | (2006.01) |
| ***B32B 27/36*** | (2006.01) |
| ***B32B 37/24*** | (2006.01) |

(52) U.S. Cl.
CPC .............. *B32B 27/32* (2013.01); *B32B 27/36* (2013.01); *B32B 2037/243* (2013.01); *B32B 2037/246* (2013.01); *B32B 2250/02* (2013.01); *B32B 2255/10* (2013.01); *B32B 2255/205* (2013.01); *B32B 2255/26* (2013.01); *B32B 2264/105* (2013.01); *B32B 2307/7244* (2013.01); *B32B 2307/7246* (2013.01); *B32B 2323/10* (2013.01); *B32B 2367/00* (2013.01); *B32B 2439/70* (2013.01)

(56) References Cited

U.S. PATENT DOCUMENTS

| | | | |
|---|---|---|---|
| 7,476,712 | B2 | 1/2009 | Tanaka et al. |
| 9,132,613 | B2 | 9/2015 | Kawai et al. |
| 9,260,622 | B2 | 2/2016 | Yoshida et al. |
| 9,327,475 | B2 | 5/2016 | Hirose et al. |
| 10,155,365 | B2 | 12/2018 | Omori et al. |
| 10,814,350 | B2 | 10/2020 | Yoshida et al. |
| 10,995,224 | B2 | 5/2021 | Kidokoro et al. |
| 11,427,715 | B2 | 8/2022 | Kidokoro et al. |
| 11,746,201 | B2 | 9/2023 | Odagawa et al. |
| 12,018,137 | B2 | 6/2024 | Suzuki et al. |
| 2003/0152766 | A1 | 8/2003 | Vargo et al. |
| 2005/0131162 | A1 | 6/2005 | Tanaka et al. |
| 2011/0027581 | A1 | 2/2011 | Hirose et al. |
| 2013/0034674 | A1 | 2/2013 | Yoshida et al. |
| 2013/0273374 | A1 | 10/2013 | Kawai et al. |
| 2016/0096194 | A1 | 4/2016 | Yoshida et al. |
| 2017/0036833 | A1 | 2/2017 | Takeuchi et al. |
| 2017/0057209 | A1 | 3/2017 | Haruka et al. |
| 2017/0088324 | A1 | 3/2017 | Sasaki et al. |
| 2017/0096538 | A1 | 4/2017 | Sasaki et al. |
| 2017/0210909 | A1 | 7/2017 | Kidokoro et al. |
| 2017/0341352 | A1 | 11/2017 | Kidokoro et al. |
| 2018/0126696 | A1 | 5/2018 | Suzuki et al. |
| 2021/0206981 | A1 | 7/2021 | Kidokoro et al. |
| 2022/0089825 | A1 | 3/2022 | Odagawa et al. |
| 2023/0036471 | A1 | 2/2023 | Suzuki et al. |

FOREIGN PATENT DOCUMENTS

| | | | | |
|---|---|---|---|---|
| JP | 2005225940 | A | | 8/2005 |
| JP | 2009018473 | A | | 1/2009 |
| JP | 2010143591 | A | | 7/2010 |
| JP | 2012136236 | A | | 7/2012 |
| JP | 2013010857 | A | | 1/2013 |
| JP | 2015217558 | A | | 12/2015 |
| JP | 2016193509 | A | | 11/2016 |
| JP | 2018058280 | A | * | 4/2018 |
| JP | 2018126971 | A | | 8/2018 |
| JP | 6478736 | B2 | | 3/2019 |
| JP | 2020124857 | A | | 8/2020 |
| JP | 2020185672 | A | | 11/2020 |
| JP | 2021107472 | A | | 7/2021 |
| JP | 2022090977 | A | | 6/2022 |
| JP | 2022090978 | A | | 6/2022 |
| JP | 2022090979 | A | * | 6/2022 |
| JP | 2022090980 | A | | 6/2022 |
| JP | 7461863 | B2 | | 4/2024 |
| JP | 7470628 | B2 | | 4/2024 |
| JP | 7541911 | B2 | | 8/2024 |
| JP | 7606864 | B2 | | 12/2024 |
| WO | 03091317 | A1 | | 11/2003 |
| WO | 2004012937 | A1 | | 2/2004 |
| WO | 2009125801 | A1 | | 10/2009 |
| WO | 2011122036 | A1 | | 10/2011 |
| WO | 2015163413 | A1 | | 10/2015 |
| WO | 2016017544 | A1 | | 2/2016 |
| WO | 2016088534 | A1 | | 6/2016 |
| WO | 2016186074 | A1 | | 11/2016 |
| WO | 2017104695 | A1 | | 6/2017 |
| WO | 2020137982 | A1 | | 7/2020 |
| WO | 2023199396 | A1 | | 10/2023 |

OTHER PUBLICATIONS

International Search Report (PCT/ISA/210) with translation and Written Opinion (PCT/ISA/237) mailed on Jul. 19, 2022, by the Japanese Patent Office as the International Searching Authority for International Application No. PCT/JP2022/017560. (18 pages).

* cited by examiner

[Fig. 1]
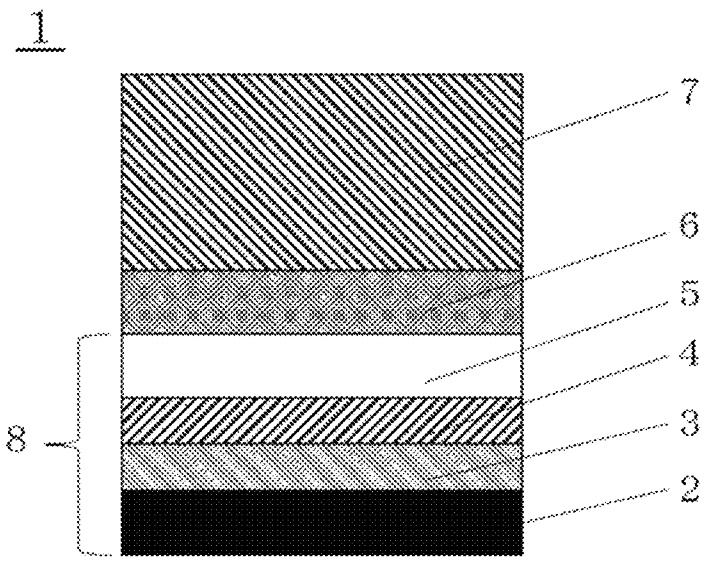
[Fig. 2]
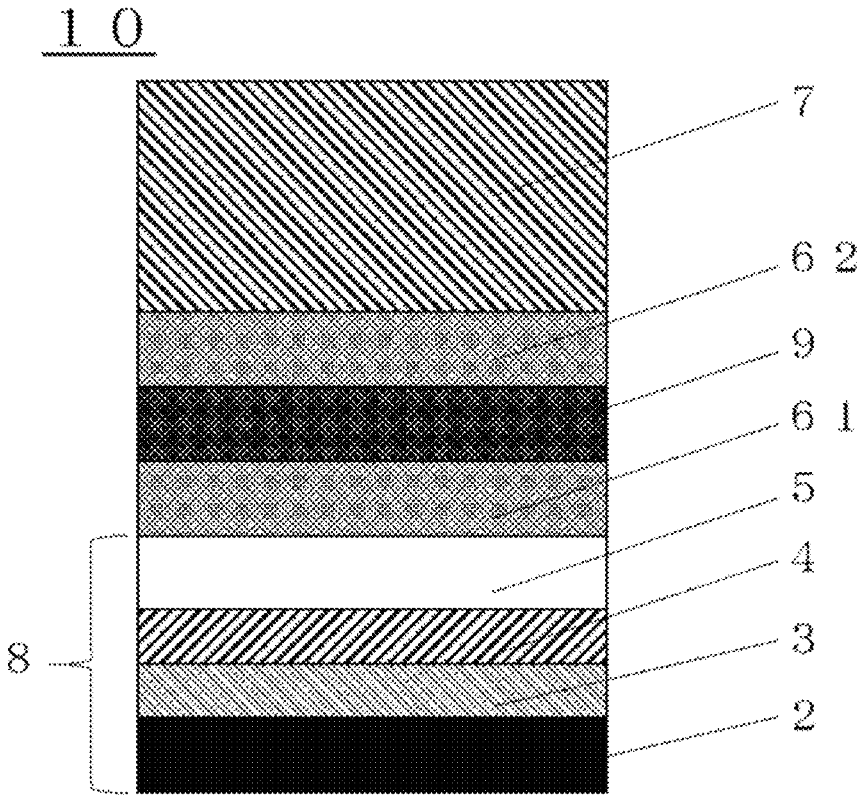

[Fig. 3]
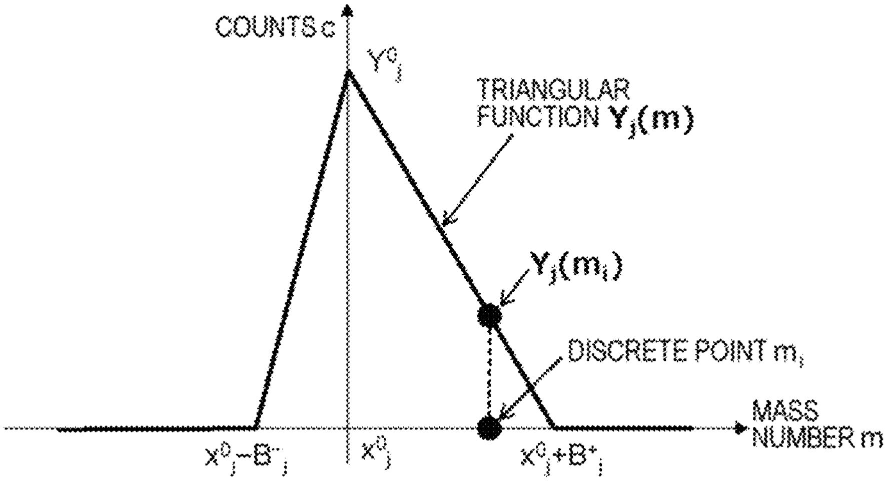
[Fig. 4]
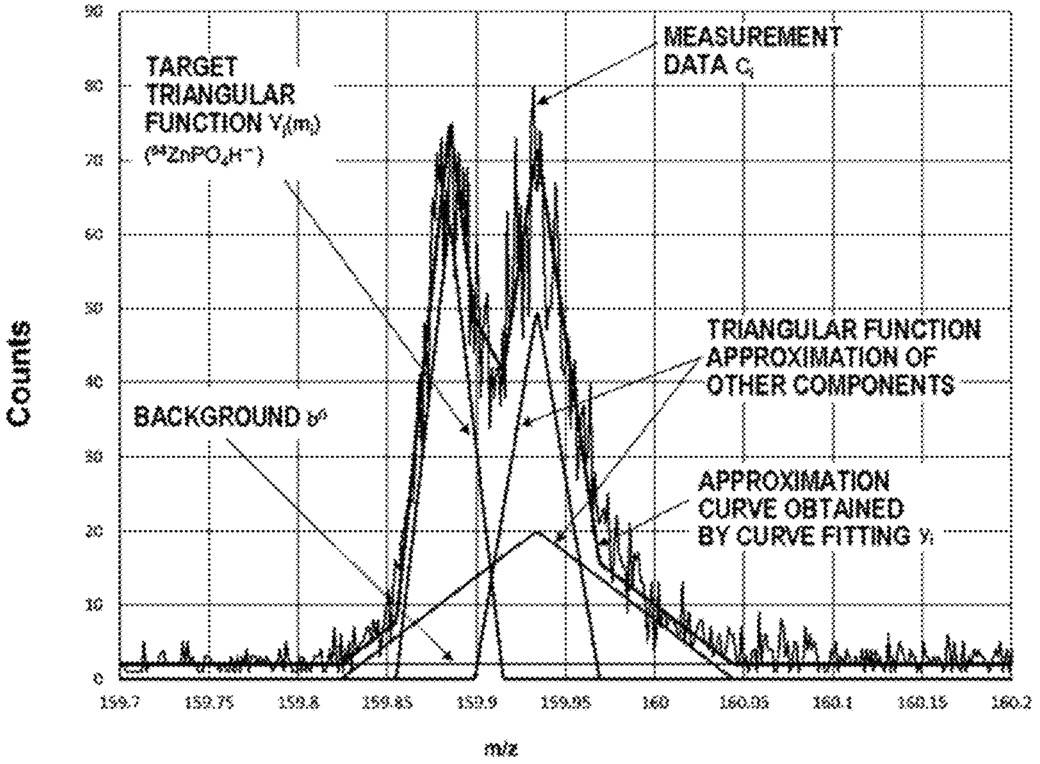
EXAMPLE OF CURVE FITTING OF TOF-SIMS RAW DATA

[Fig. 5]
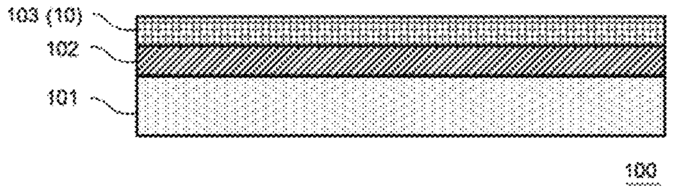
[Fig. 6]
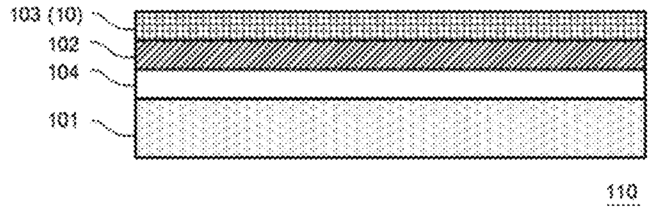
[Fig. 7]
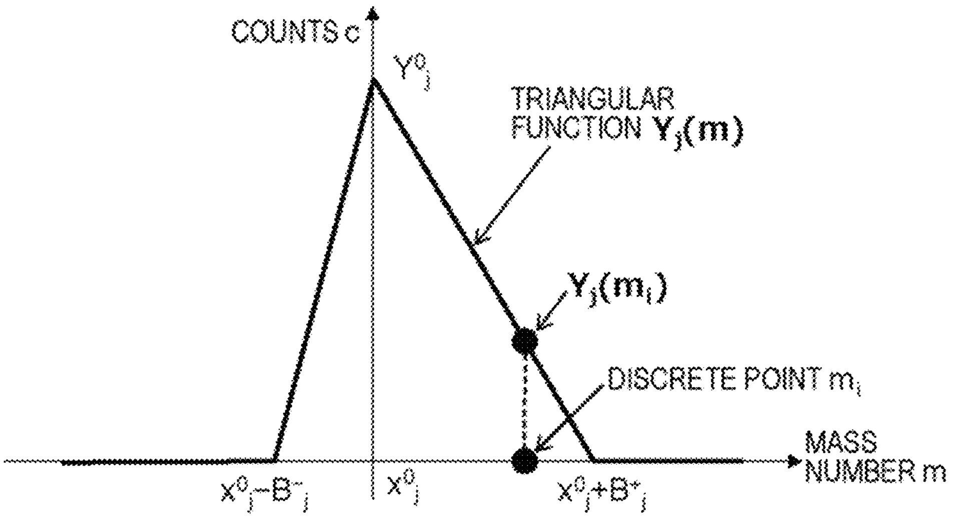

[Fig. 8]
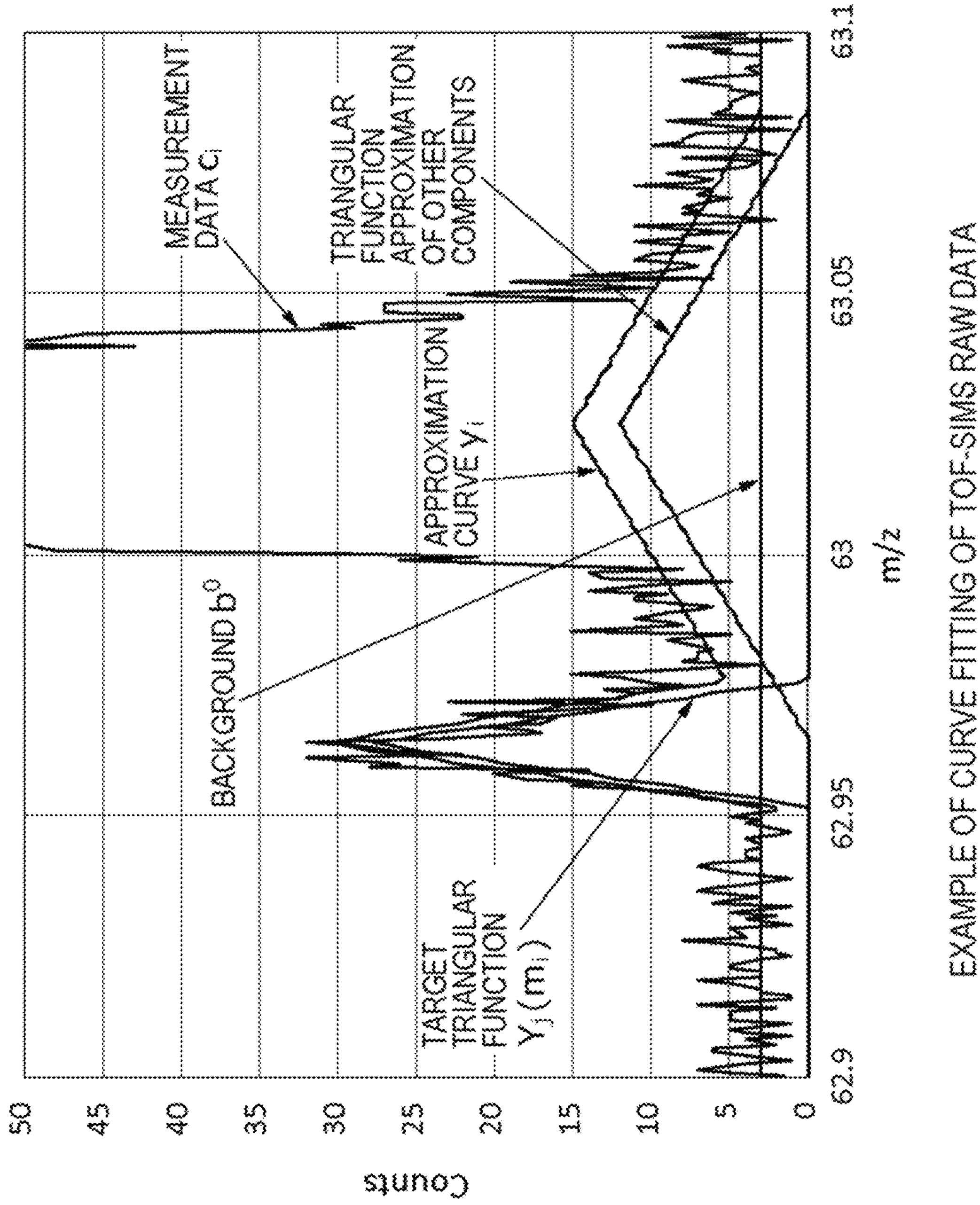
EXAMPLE OF CURVE FITTING OF TOF-SIMS RAW DATA

[Fig. 9]
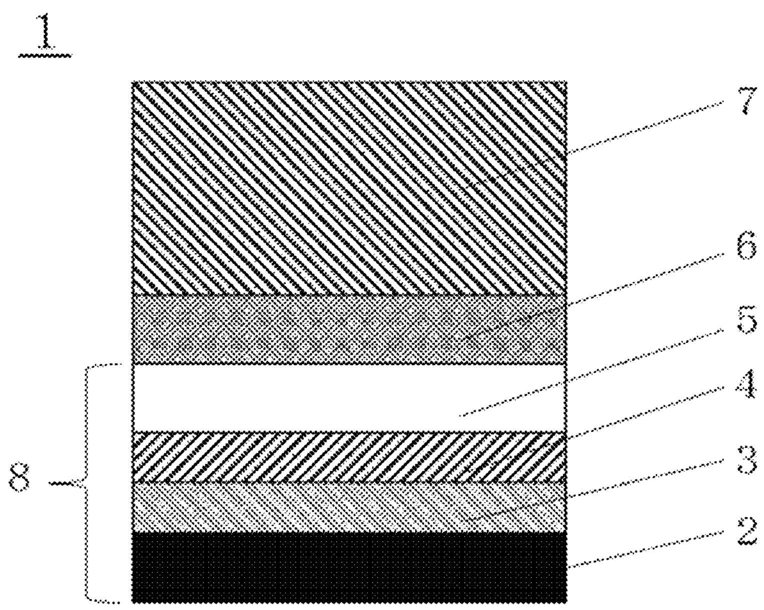
[Fig. 10]
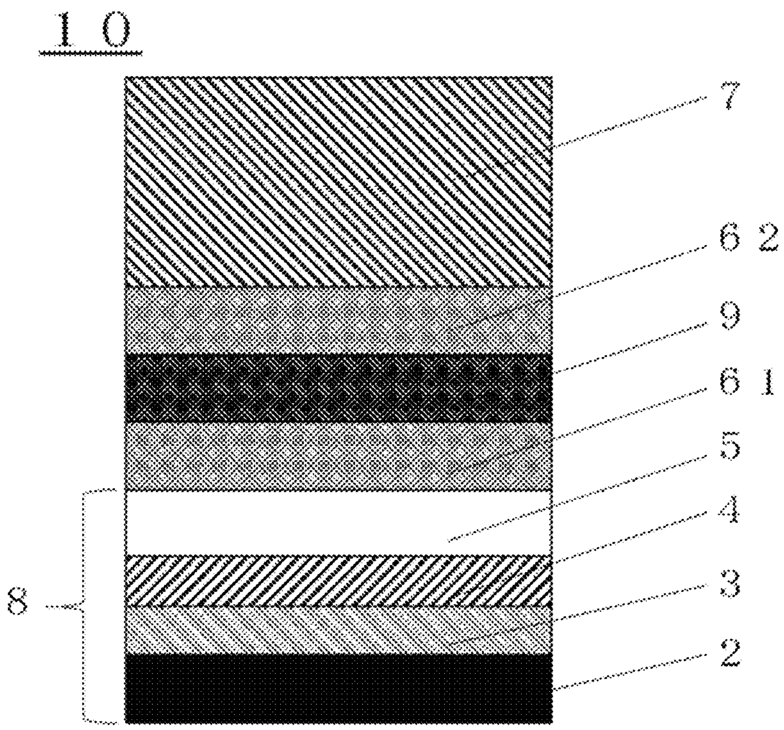

[Fig. 11]
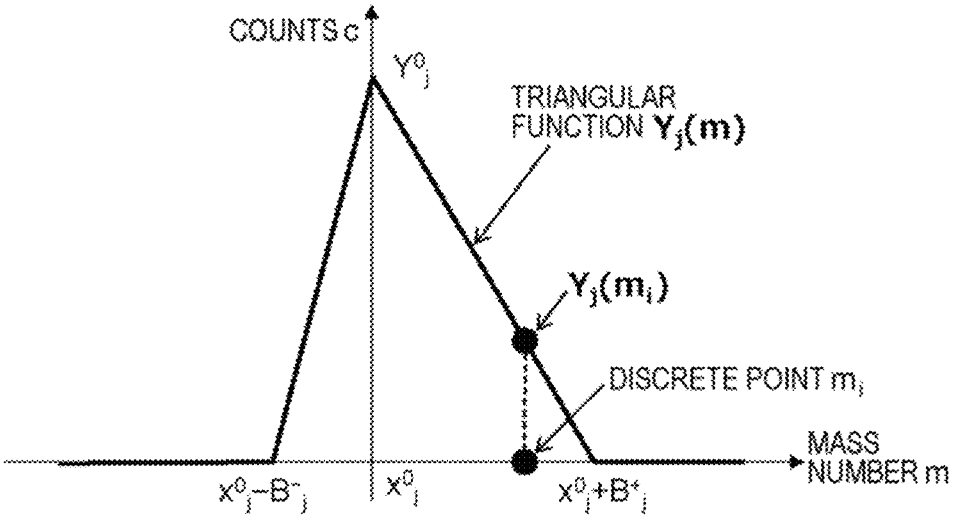
[Fig. 12]
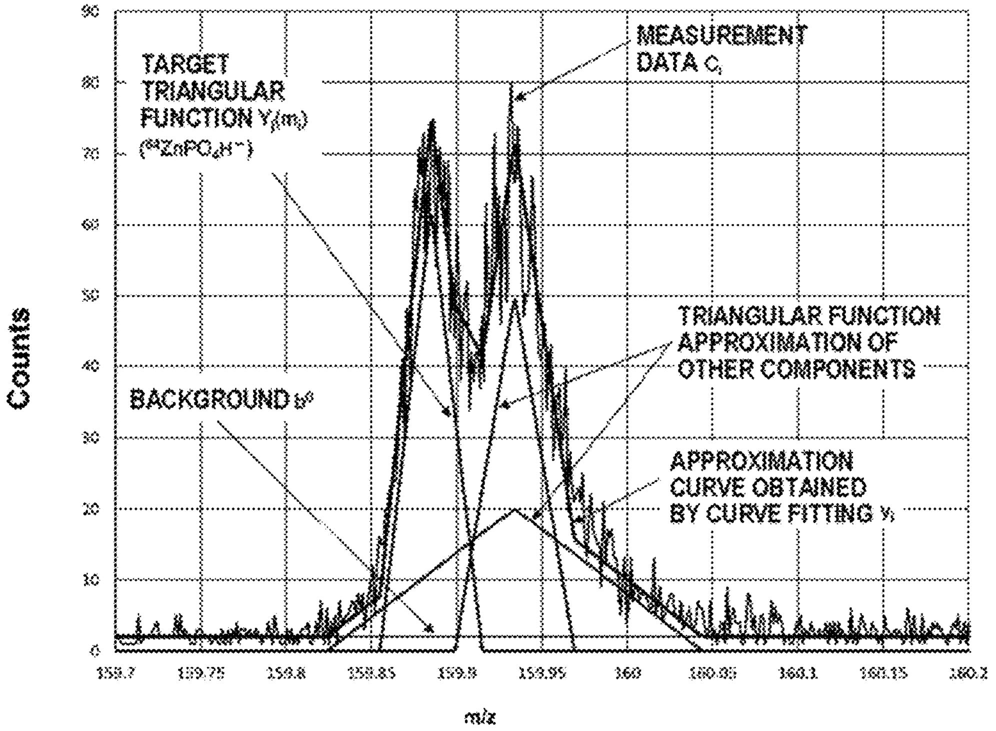
EXAMPLE OF CURVE FITTING OF TOF-SIMS RAW DATA

[Fig. 13]
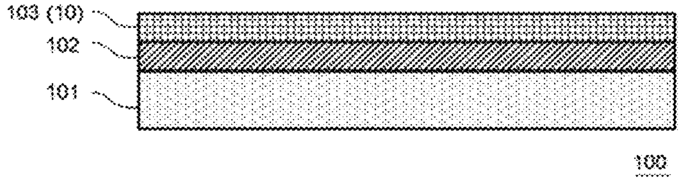
[Fig. 14]
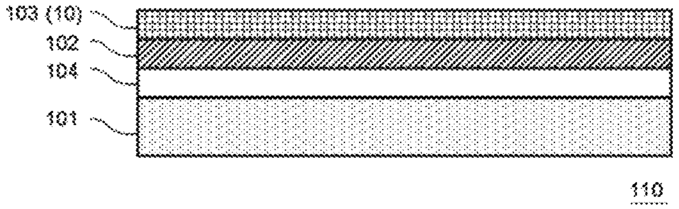
[Fig. 15]
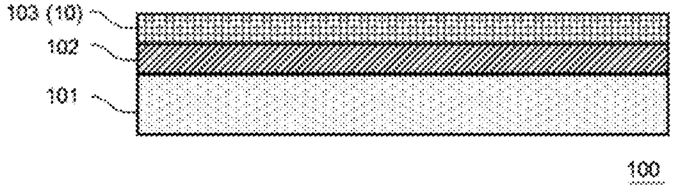
[Fig. 16]
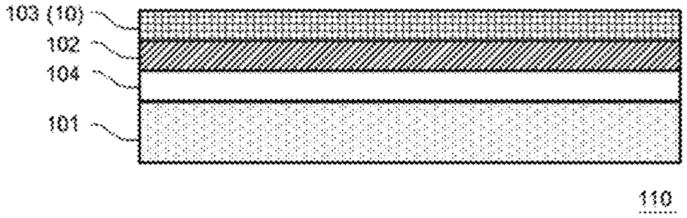

GAS BARRIER LAMINATE

TECHNICAL FIELD

The present invention relates to a gas barrier laminate and a related technique thereof.

BACKGROUND ART

In general, as a gas barrier material against water vapor or oxygen, a laminate in which an inorganic material layer having gas barrier properties is provided over a base material layer is used.

However, this inorganic material layer is weak against friction and the like, and in such a gas barrier laminate, cracks are formed in the inorganic material layer due to rubbing or elongation at the time of post-processing printing, laminating, or content filling, and the gas barrier properties may be decreased.

Therefore, as a gas barrier layer, for example, Patent Document 1 (Pamphlet of International Publication No. WO 2016/017544) discloses a gas barrier coating material including a polycarboxylic acid, a polyamine compound, a polyvalent metal compound, and a base, in which (number of moles of —COO— groups included in the polycarboxylic acid)/(number of moles of amino groups included in the polyamine compound)=100/20 to 100/90.

In Patent Document 1, it is described that when such a gas barrier coating material is used, a gas barrier film having good gas barrier properties, particularly, good oxygen barrier properties, under conditions of both low humidity and high humidity, and a laminate thereof can be provided.

In addition, Patent Document 2 (Pamphlet of International Publication No. 03/091317) discloses a film including a polycarboxylic acid polymer (A) and a polyvalent metal compound (B) as raw materials, in which a peak ratio ($A_{1560}/A_{1700}$) in an infrared absorption spectrum of the film is 0.25 or more.

Patent Document 2 discloses that such a film which has excellent gas barrier properties against oxygen or the like even in a high humidity atmosphere, has water resistance such that the appearance, shape, and gas barrier properties are not impaired by the effects of neutral water, high temperature water vapor, and hot water, and is easily dissolved in an acid and/or an alkali can be obtained.

In addition, Patent Document 3 (Pamphlet of International Publication No. 2016/088534) discloses a gas barrier polymer which is formed by heating a mixture including a polycarboxylic acid and a polyamine compound, in which, in an infrared absorption spectrum of the gas barrier polymer, when a total peak area in a range of an absorption band of equal to or more than 1493 $cm^{-1}$ and equal to or less than 1780 $cm^{-1}$ is denoted by A, and a total peak area in a range of an absorption band of equal to or more than 1598 $cm^{-1}$ and equal to or less than 1690 $cm^{-1}$ is denoted by B, an area ratio of an amide bond indicated by B/A is 0.370 or more.

Patent Document 3 discloses that such a gas barrier polymer is capable of realizing a gas barrier film and a gas barrier laminate having an excellent balance between appearance, dimensional stability, and productivity while having excellent gas barrier performance under conditions of both high humidity and after a boil and retort treatment.

Further, the following Patent Documents 4 to 6 can also be mentioned as techniques related to gas barrier materials.

RELATED DOCUMENT

Patent Document

Patent Document 1: Pamphlet of International Publication No. WO 2016/017544
Patent Document 2: Pamphlet of International Publication No. WO 03/091317
Patent Document 3: Pamphlet of International Publication No. WO 2016/088534
Patent Document 4: Japanese Unexamined Patent Publication No. 2005-225940
Patent Document 5: Japanese Unexamined Patent Publication No. 2013-10857
Patent Document 6: Pamphlet of International Publication No. WO 2011/122036

SUMMARY OF THE INVENTION

Technical Problem

The technical levels required for the various characteristics of gas barrier materials are becoming higher and higher.

According to the findings and preliminary studies of the present inventors, for example, the gas barrier materials in the related art described in Patent Documents 1 to 3 have the following problems.

The gas barrier material formed of a system including a polycarboxylic acid and a polyvalent metal compound as described in Patent Document 1 or 2 has a problem that the barrier performance after a retort treatment is deteriorated in a two-layer laminate structure.

In addition, the gas barrier material formed of a system including a polycarboxylic acid and a polyamine compound as described in Patent Document 3 has a problem that the barrier performance after a retort treatment is deteriorated in a three-layer laminate structure.

As described above, the present inventors have found that the gas barrier materials in the related art described in Patent Documents 1 to 3 have a problem that the barrier performance after a retort treatment is deteriorated in a laminate structure.

That is, the present inventors have found that the gas barrier materials in the related art have room for improvement in terms of barrier performance after a retort treatment.

The present invention has been made in view of the above circumstances. One of the objects of the present invention is to provide a barrier laminate which can be used for a barrier film having good barrier performance after a retort treatment, for example, a good water vapor permeability in a two-layer laminate structure.

The Object of the Present Invention is Particularly Related to a First Invention Described Later In gas barrier materials, it is required to further improve the barrier properties against gas such as water vapor. For example, in the production of retort food, a retort treatment, that is, a heat treatment is performed after the food is packaged with a gas barrier material, but it is required that good barrier properties are maintained even after the retort treatment.

One of the objects of the present invention is to provide a gas barrier material with improved barrier properties against gas such as water vapor.

The Object of the Present Invention is Particularly Related to a Second Invention Described Later According to the findings of the present inventors, the gas barrier materials in the related art as described in Patent Documents 1 to 3 have a problem that the barrier performance after a retort treatment is deteriorated depending on the laminate structure.

One of the objects of the present invention is to provide a barrier laminate which can be used for a barrier film having good barrier performance after a retort treatment, regardless of the laminate structure.

The Object of the Present Invention is Particularly Related to a Third Invention Described Later According to the findings of the present inventors, there is still room for improvement in gas barrier materials from the viewpoint of improving productivity and barrier properties in a well-balanced manner. Although there have been many techniques that focus on improving barrier performance, a technique for improving barrier properties and productivity in a well-balanced manner has not been reported so far.

One of the objects of the present invention is to provide a gas barrier material which has an excellent balance between productivity and barrier properties and exhibits preferable barrier properties in various layer structures.

The Object of the Present Invention is Particularly Related to a Fourth Invention Described Later The technical levels required for the various characteristics of gas barrier materials are becoming higher and higher. According to the findings of the present inventors, since the gas barrier materials described in Patent Documents 4 and 5 require heating at a high temperature for a long period of time in order to crosslink the polycarboxylic acid and the polyamine, the productivity may be decreased.

In addition, when the heat treatment time for crosslinking the polycarboxylic acid and the polyamine is shortened in order to improve the productivity of such a gas barrier material, the ratio of the amide bond formed by the crosslinking of the polycarboxylic acid and the polyamine may be decreased, and the barrier properties may be deteriorated.

From these findings, the present inventors have found that there is room for improvement in the gas barrier materials in the related art from the viewpoint of improving productivity and barrier properties in a well-balanced manner. Although there have been many techniques that focus on improving barrier performance, a technique for improving barrier properties and productivity in a well-balanced manner has not been reported so far.

One of the objects of the present invention is to provide a gas barrier material having an excellent balance between productivity and barrier properties.

The Object of the Present Invention is Particularly Related to a Fifth Invention Described Later Solution to Problem In order to achieve at least one of the above-described objects, the present inventors have conducted intensive studies. As a result, it has been found that a gas barrier laminate including a gas barrier layer in which a composition ratio of Zn as determined by, for example, X-ray photoelectron spectroscopy (XPS) analysis is within a specific range and a specific peak intensity ratio derived from Zn observed by time-of-flight secondary ion mass spectrometry (TOF-SIMS) analysis is within a certain range, and in which a composition ratio of N as determined by XPS analysis is within a specific range and a specific peak intensity ratio derived from N observed by TOF-SIMS analysis is within a certain range has good barrier performance after a retort treatment. The inventors have then completed the following first invention.

In addition, the present inventors have completed the following second invention, third invention, fourth invention, and fifth invention.

First Invention

1.

A gas barrier laminate including:

a base material layer;

a gas barrier layer that is provided over at least one surface of the base material layer; and an inorganic material layer that is provided between the base material layer and the gas barrier layer, in which a composition ratio of Zn measured by X-ray photoelectron spectroscopy analysis of the gas barrier layer is 1 to 10 atomic %, when a mass peak intensity of $^{64}ZnPO_4H^-$ is denoted by $I(^{64}ZnPO_4H^-)$, and a mass peak intensity of $C_3H_3O_2^-$ is denoted by $I(C_3H_3O_2^-)$, the mass peak intensities being measured by time-of-flight secondary ion mass spectrometry analysis of the gas barrier layer, a value of $I(^{64}ZnPO_4H^-)/I(C_3H_3O_2^-)$ is equal to or more than $6\times10^{-4}$ and equal to or less than $5\times10^{-2}$, a composition ratio of N measured by X-ray photoelectron spectroscopy analysis of the gas barrier layer is more than 0 atomic % and equal to or less than 12 atomic %, and when a mass peak intensity of $CN^-$ measured by time-of-flight secondary ion mass spectrometry analysis of the gas barrier layer is denoted by $I(CN^-)$, a value of $I(CN^-)/I(C_3H_3O_2^-)$ is more than 0 and equal to or less than 2.

2.

The gas barrier laminate according to 1., in which when a mass peak intensity of $PO_2^-$ is denoted by $I(PO_2^-)$, and a mass peak intensity of $PO_3^-$ is denoted by $I(PO_3^-)$, the mass peak intensities being measured by the time-of-flight secondary ion mass spectrometry analysis of the gas barrier layer, a value of $(I(PO_2^-)+I(PO_3^-))/I(C_3H_3O_2^-)$ is equal to or more than 0.02 and equal to or less than 5.

3.

The gas barrier laminate according to 1, or 2., in which a value of $I(PO_2^-)/I(PO_3^-)$, which is an intensity ratio between the $I(PO_2^-)$ and the $I(PO_3^-)$, is equal to or more than 0.05 and equal to or less than 1.

4.

The gas barrier laminate according to any one of 1. to 3., in which the gas barrier layer is formed of a cured product of a mixture including at least a polycarboxylic acid, Zn, and a phosphorus compound including one or more —P—OH groups or a salt thereof.

5.

The gas barrier laminate according to 4., in which a concentration of P atoms of the phosphorus compound or the salt thereof in the mixture is equal to or more than $5\times10^{-4}$ mol and equal to or less than 0.3 mol with respect to 1 mol of the polycarboxylic acid.

6.

The gas barrier laminate according to 4, or 5., in which the mixture further includes a polyamine.

7.

The gas barrier laminate according to 6., in which the polyamine is polyethylenimine.

8.

The gas barrier laminate according to any one of 4. to 7., in which the polycarboxylic acid includes one or two or more polymers selected from the group consisting of polyacrylic acid, polymethacrylic acid, and a copolymer of acrylic acid and methacrylic acid.

9.

The gas barrier laminate according to any one of 1. to 8., in which a thickness of the gas barrier layer is equal to or more than 0.05 μm and equal to or less than 10 μm.

Second Invention

1.

A gas barrier laminate including:

a base material layer;

a gas barrier layer that is provided over at least one surface of the base material layer; and an inorganic material layer that is provided between the base material layer and the gas barrier layer, in which in a case where the gas barrier layer is subjected to time-of-flight secondary ion mass spectrometry analysis, when a mass peak intensity of $PO_2^-$ is denoted by $I(PO_2^-)$, a mass peak intensity of $PO_3^-$ is denoted by $I(PO_3^-)$, and a mass peak intensity of $C_3H_3O_2^-$ is denoted by $I(C_3H_3O_2^-)$, a value of $\{I(PO_2^-)+I(PO_3^-)\}/I(C_3H_3O_2^-)$ is 0.02 to 5, and the gas barrier layer includes one or two or more metal elements selected from the group consisting of Zn, Ca, Mg, Ba, and Al, and a composition ratio of the metal element in the gas barrier layer, which is obtained by X-ray photoelectron spectroscopy analysis of the gas barrier layer, is 1 to 15 atomic %.

2.

The gas barrier laminate according to 1., in which in a case where the gas barrier layer is subjected to time-of-flight secondary ion mass spectrometry analysis, when a mass peak intensity of $CN^-$ is denoted by $I(CN^-)$, and a mass peak intensity of $C_3H_3O_2^-$ is denoted by $I(C_3H_3O_2^-)$, a value of $I(CN^-)/I(C_3H_3O_2^-)$ is 2 or less.

3.

The gas barrier laminate according to 1, or 2., in which in an absorption spectrum obtained by infrared spectroscopic measurement of the gas barrier layer by a total reflection measurement method, when a total peak area in a range of an absorption band of equal to or more than 1493 $cm^{-1}$ and equal to or less than 1780 $cm^{-1}$ is denoted by A, and a total peak area in a range of an absorption band of equal to or more than 1493 $cm^{-1}$ and equal to or less than 1598 $cm^{-1}$ is denoted by D, an area ratio D/A is 0.5 or more.

4.

The gas barrier laminate according to any one of 1. to 3., in which the inorganic material layer is in contact with the base material layer, or an undercoat layer is provided between the inorganic material layer and the base material layer.

5.

The gas barrier laminate according to any one of 1. to 4., in which the inorganic material layer includes one or two or more inorganic materials selected from the group consisting of silicon oxide, aluminum oxide, and aluminum.

6.

The gas barrier laminate according to any one of 1. to 5., in which a thickness of the gas barrier layer is 0.01 to 15 μm.

7.

The gas barrier laminate according to any one of 1. to 6., in which a sealant layer is further provided over a surface of the gas barrier layer opposite to the inorganic material layer.

8.

The gas barrier laminate according to 7., in which the sealant layer is in contact with the gas barrier layer, or the gas barrier layer and the sealant layer are bonded to each other by an adhesive layer.

9.

The gas barrier laminate according to 7., in which a polyamide-containing layer is provided between the gas barrier layer and the sealant layer.

10.

The gas barrier laminate according to any one of 1. to 9., in which the gas barrier laminate is used for food packaging.

11.

The gas barrier laminate according to any one of 1. to 10., in which the gas barrier laminate is used in production of retort food.

12.

A packaging bag formed of the gas barrier laminate according to any one of 1. to 11.

13.

A food packaged with the gas barrier laminate according to any one of 1. to 12.

Third Invention

1.

A gas barrier laminate including:

a base material layer;

a gas barrier layer that is provided over at least one surface of the base material layer; and an inorganic material layer that is provided between the base material layer and the gas barrier layer, in which a composition ratio of Zn measured by X-ray photoelectron spectroscopy analysis of the gas barrier layer is 1 to 10 atomic %, and when a mass peak intensity of $^{64}ZnPO_4^-$ is denoted by $I(^{64}ZnPO_4H^-)$, and a mass peak intensity of $C_3H_3O_2^-$ is denoted by $I(C_3H_3O_2^-)$, the mass peak intensities being measured by time-of-flight secondary ion mass spectrometry analysis of the gas barrier layer, a value of $I(^{64}ZnPO_4H^-)/I(C_3H_3O_2^-)$ is equal to or more than $7\times10^{-4}$ and equal to or less than $5\times10^{-2}$.

2.

The gas barrier laminate according to 1., in which when a mass peak intensity of $PO_2^-$ is denoted by $I(PO_2^-)$, and a mass peak intensity of $PO_3^-$ is denoted by $I(PO_3^-)$, the mass peak intensities being measured by the time-of-flight secondary ion mass spectrometry analysis of the gas barrier layer, a value of $(I(PO_2^-)+I(PO_3^-))/I(C_3H_3O_2^-)$ is equal to or more than 0.02 and equal to or less than 5.

3.

The gas barrier laminate according to 1, or 2., in which a value of $I(PO_2^-)/I(PO_3^-)$, which is an intensity ratio between the $I(PO_2^-)$ and the $I(PO_3^-)$, is equal to or more than 0.05 and equal to or less than 1.

4.

The gas barrier laminate according to any one of 1. to 3., in which the gas barrier layer is formed of a cured product of a mixture including at least a polycarboxylic acid, Zn, and a phosphorus compound including one or more —P—OH groups or a salt thereof.

5.

The gas barrier laminate according to 4., in which a concentration of the phosphorus compound including one or more —P—OH groups or the salt thereof in the mixture is equal to more than $5\times10^{-4}$ mol and equal to or less than 0.3 mol with respect to 1 mol of carboxyl groups in the polycarboxylic acid.

6.

The gas barrier laminate according to 4, or 5., in which the polycarboxylic acid includes one or two or more polymers selected from the group consisting of polyacrylic acid, polymethacrylic acid, and a copolymer of acrylic acid and methacrylic acid.

7.

The gas barrier laminate according to any one of 1. to 6., in which a thickness of the gas barrier layer is equal to or more than 0.05 μm and equal to or less than 10 μm.

Fourth Invention

[1]

A gas barrier laminate including:

a base material layer;

a gas barrier layer that is provided over at least one surface of the base material layer; and an inorganic material layer that is provided between the base material layer and the gas barrier layer, in which the gas barrier layer is formed of a cured product of a mixture including a polycarboxylic acid, a polyamine compound, a polyvalent metal compound, and a phosphorus compound including one or more —P—OH groups or a salt thereof.

[2]

The gas barrier laminate according to [1], further including:

an undercoat layer that is provided between the base material layer and the inorganic material layer.

[3]

The gas barrier laminate according to [1] or [2], in which the inorganic material layer is a vapor deposition film provided over the base material layer or, in a case where an interlayer is provided between the base material layer and the inorganic material layer, over the interlayer, and is formed of one or two or more inorganic materials selected from the group consisting of silicon oxide, aluminum oxide, and aluminum.

[4]

The gas barrier laminate according to any one of [1] to [3], in which in an infrared absorption spectrum of the gas barrier layer, when a maximum peak height of an absorbance in a range of equal to or more than 1300 $cm^{-1}$ and equal to or less than 1490 $cm^{-1}$ is denoted by a, and a maximum peak height of an absorbance in a range of equal to or more than 1690 $cm^{-1}$ and equal to or less than 1780 $cm^{-1}$ is denoted by γ, a ratio of free carboxy groups with respect to a $NH_3$ complex, which is represented by γ/α, is equal to or more than 0.00 and equal to or less than 1.00.

[5]

The gas barrier laminate according to any one of [1] to [4], in which in an infrared absorption spectrum of the gas barrier layer, when a total peak area in a range of an absorption band of equal to or more than 1493 $cm^{-1}$ and equal to or less than 1780 $cm^{-1}$ is denoted by A, a total peak area in a range of an absorption band of equal to or more than 1598 $cm^{-1}$ and equal to or less than 1690 $cm^{-1}$ is denoted by B, a total peak area in a range of an absorption band of equal to or more than 1690 $cm^{-1}$ and equal to or less than 1780 $cm^{-1}$ is denoted by C, and a total peak area in a range of an absorption band of equal to or more than 1493 $cm^{-1}$ and equal to or less than 1598 $cm^{-1}$ is denoted by D, an area ratio of an amide bond indicated by B/A is equal to or more than 0.200 and equal to or less than 0.370, an area ratio of a carboxylic acid indicated by C/A is 0.150 or less, and an area ratio of carboxylate indicated by D/A is equal to or more than 0.580 and equal to or less than 0.800.

[6]

The gas barrier laminate according to any one of [1] to [5], in which a thickness of the gas barrier layer is equal to or more than 0.01 μm and equal to or less than 15 μm.

[7]

The gas barrier laminate according to any one of [1] to [6], in which the polyvalent metal compound is a compound of one or two or more divalent or higher valent metals selected from the group consisting of Zn, Ca, Mg, Ba, and Al.

[8]

The gas barrier laminate according to any one of [1] to [7], in which (number of moles of P atoms derived from the phosphorus compound or the salt thereof in the mixture)/(number of moles of —COO— groups derived from the polycarboxylic acid in the mixture) is equal to or more than 0.001 and equal to or less than 0.3.

[9]

The gas barrier laminate according to any one of [1] to [8], in which the phosphorus compound is one or two or more selected from the group consisting of phosphoric acid, phosphorous acid, hypophosphorous acid, polyphosphoric acid, phosphonic acid, and salts thereof.

[10]

The gas barrier laminate according to any one of [1] to [9], in which (number of moles of polyvalent metal derived from the polyvalent metal compound in the mixture)/(number of moles of —COO— groups derived from the polycarboxylic acid in the mixture) is equal to or more than 0.10 and equal to or less than 0.80.

[11]

The gas barrier laminate according to any one of [1] to [10], in which (number of moles of polyvalent metal derived from the polyvalent metal compound in the mixture)/(number of moles of amino groups derived from the polyamine compound in the mixture) is equal to or more than 0.25 and equal to or less than 0.65.

[12]

The gas barrier laminate according to any one of [1] to [11], in which the polycarboxylic acid includes one or two or more polymers selected from the group consisting of polyacrylic acid, polymethacrylic acid, and a copolymer of acrylic acid and methacrylic acid.

[13]

The gas barrier laminate according to any one of [1] to [12], in which the polyamine compound includes polyethylenimine.

[14]

The gas barrier laminate according to any one of [1] to [13], in which the base material layer includes one or two or more resins selected from the group consisting of polyamide, polyethylene terephthalate, and polybutylene terephthalate.

Fifth Invention

[1]

A gas barrier laminate including:

a base material layer;

a gas barrier layer that is provided over at least one surface of the base material layer; and an inorganic material layer that is provided between the base material layer and the gas barrier layer, in which the gas barrier layer is formed of a cured product of a mixture including a polycarboxylic acid, a polyamine compound, and a polyvalent metal compound.

[2]

The gas barrier laminate according to [1], further including:

an undercoat layer that is provided between the base material layer and the inorganic material layer.

[3]

The gas barrier laminate according to [1] or [2], in which the inorganic material layer is a vapor deposition film provided over the base material layer or, in a case where an interlayer is provided between the base material layer and the inorganic material layer, over the interlayer, and is formed of one or two or more inorganic materials selected from the group consisting of silicon oxide, aluminum oxide, and aluminum.

[4]

The gas barrier laminate according to any one of [1] to [3], in which the inorganic material layer includes an aluminum oxide layer formed of aluminum oxide.

[5]

The gas barrier laminate according to any one of [1] to [4], in which in an infrared absorption spectrum of the gas barrier layer, when a maximum peak height of an absorbance in a range of equal to or more than 1300 $cm^{-1}$ and equal to or less than 1490 $cm^{-1}$ is denoted by $\alpha$, and a maximum peak height of an absorbance in a range of equal to or more than 1690 $cm^{-1}$ and equal to or less than 1780 $cm^{-1}$ is denoted by $\gamma$, a ratio of free carboxy groups with respect to a $NH_3$ complex, which is represented by $\gamma/\alpha$, is equal to or more than 0.00 and equal to or less than 1.00.

[6]

The gas barrier laminate according to any one of [1] to [5], in which in an infrared absorption spectrum of the gas barrier layer, when a total peak area in a range of an absorption band of equal to or more than 1493 $cm^{-1}$ and equal to or less than 1780 $cm^{-1}$ is denoted by A, a total peak area in a range of an absorption band of equal to or more than 1598 $cm^{-1}$ and equal to or less than 1690 $cm^{-1}$ is denoted by B, a total peak area in a range of an absorption band of equal to or more than 1690 $cm^{-1}$ and equal to or less than 1780 $cm^{-1}$ is denoted by C, and a total peak area in a range of an absorption band of equal to or more than 1493 $cm^{-1}$ and equal to or less than 1598 $cm^{-1}$ is denoted by D, an area ratio of an amide bond indicated by B/A is equal to or more than 0.200 and equal to or less than 0.370, an area ratio of a carboxylic acid indicated by C/A is 0.150 or less, and an area ratio of carboxylate indicated by D/A is equal to or more than 0.580 and equal to or less than 0.800.

[7]

The gas barrier laminate according to any one of [1] to [6], in which a thickness of the gas barrier layer is equal to or more than 0.01 μm and equal to or less than 15 μm.

[8]

The gas barrier laminate according to any one of [1] to [7], in which the polyvalent metal compound is a compound of one or two or more divalent or higher valent metals selected from the group consisting of Zn, Ca, Mg, Ba, and Al.

[9]

The gas barrier laminate according to any one of [1] to [8], in which (number of moles of polyvalent metal derived from the polyvalent metal compound in the mixture)/(number of moles of —COO— groups derived from the polycarboxylic acid in the mixture) is equal to or more than 0.10 and equal to or less than 0.80.

[10]

The gas barrier laminate according to any one of [1] to [9], in which (number of moles of polyvalent metal derived from the polyvalent metal compound in the mixture)/(number of moles of amino groups derived from the polyamine compound in the mixture) is equal to or more than 0.25 and equal to or less than 0.75.

[11]

The gas barrier laminate according to any one of [1] to [10], in which the polycarboxylic acid includes one or two or more polymers selected from the group consisting of polyacrylic acid, polymethacrylic acid, and a copolymer of acrylic acid and methacrylic acid.

[12]

The gas barrier laminate according to any one of [1] to [11], in which the polyamine compound includes polyethylenimine.

[13]

The gas barrier laminate according to any one of [1] to [12], in which the base material layer is a layer including one or two or more resins selected from the group consisting of polyamide, polyethylene terephthalate, and polybutylene terephthalate.

Advantageous Effects of Invention

According to the present invention, for example, it is possible to provide a gas barrier laminate having good barrier performance after retorting.

According to the present invention, for example, a gas barrier material with improved gas barrier properties is provided.

According to the present invention, for example, it is possible to provide a gas barrier laminate having good barrier performance after retorting regardless of the laminate structure.

According to the present invention, for example, it is possible to provide a gas barrier material which has an excellent balance between productivity and barrier properties and exhibits preferable barrier properties in various layer structures.

According to the present invention, for example, it is possible to provide a gas barrier material having an excellent balance between productivity and barrier properties.

BRIEF DESCRIPTION OF THE DRAWINGS

FIG. 1 is a cross-sectional view schematically showing an example of a structure of a two-layer laminate structure gas barrier laminate in a first embodiment.

FIG. 2 is a cross-sectional view schematically showing an example of a structure of a three-layer laminate structure gas barrier laminate in the first embodiment.

FIG. 3 is a diagram (graph) for explaining a triangular function $Y_j(m)$ used for data analysis of mass spectrometry analysis in the first embodiment.

FIG. 4 is a diagram (graph) showing an example of curve fitting of mass spectrometry analysis data in the first embodiment.

FIG. 5 is a cross-sectional view schematically showing an example of a structure of a gas barrier laminate in a second embodiment.

FIG. 6 is a cross-sectional view schematically showing an example of the structure of the gas barrier laminate in the second embodiment.

FIG. 7 is a diagram (graph) for explaining a triangular shape function $Y_j(m)$ used for data analysis of mass spectrometry analysis in the second embodiment.

FIG. 8 is a diagram (graph) showing an example of curve fitting of data of mass spectrometry analysis in the second embodiment.

FIG. 9 is a cross-sectional view schematically showing an example of a structure of a two-layer laminate structure gas barrier laminate in a third embodiment.

FIG. 10 is a cross-sectional view schematically showing an example of a structure of a three-layer laminate structure gas barrier laminate in the third embodiment.

FIG. 11 is a diagram (graph) for explaining a triangular function $Y_j(m)$ used for data analysis of mass spectrometry analysis in the third embodiment.

FIG. 12 is a diagram (graph) showing an example of curve fitting of data of mass spectrometry analysis in the third embodiment.

FIG. 13 is a cross-sectional view schematically showing an example of a structure of a gas barrier laminate in a fourth embodiment.

FIG. 14 is a cross-sectional view schematically showing an example of the structure of the gas barrier laminate in the fourth embodiment.

FIG. 15 is a cross-sectional view schematically showing an example of a structure of a gas barrier laminate in a fifth embodiment.

FIG. 16 is a cross-sectional view schematically showing an example of the structure of the gas barrier laminate in the fifth embodiment.

DESCRIPTION OF EMBODIMENTS

Hereinafter, embodiments of first to fifth inventions will be described with reference to the drawings.

An embodiment of the first invention will be described as a first embodiment, an embodiment of the second invention will be described as a second embodiment, an embodiment of the third invention will be described as a third embodiment, an embodiment of the fourth invention will be described as a fourth embodiment, and an embodiment of the fifth invention will be described as a fifth embodiment, respectively.

All the drawings are schematic views for description and do not necessarily match the actual dimensional ratios.

In the drawings, the same reference signs may represent different elements between different embodiments. For example, in FIG. 2 which is a view for illustrating the first embodiment, reference numeral 10 represents a "three-layer laminate structure barrier film", while in FIG. 13 which is a view for illustrating the fourth embodiment, reference numeral 10 represents a "gas barrier film".

Unless otherwise specified, "to" between numerical values in the sentences represents "equal to or more than first number and equal to or less than second number".

In a case where substitution or non-substitution is not explicitly indicated in the description of a group (atomic group) in the present specification, the group (atomic group) is intended to include both a group (atomic group) having no substituent and a group (atomic group) having a substituent. For example, the concept of an "alkyl group" includes not only an alkyl group not having a substituent (unsubstituted alkyl group) but also an alkyl group having a substituent (substituted alkyl group).

The expression "(meth)acryl" in the present specification represents a concept including both acryl and methacryl. The same applies to similar expressions such as "(meth)acrylate".

First Embodiment

A gas barrier laminate according to the first embodiment includes

- a base material layer, a gas barrier layer that is provided on at least one surface of the base material layer, and an inorganic material layer that is provided between the base material layer and the gas barrier layer,
- in which a composition ratio of Zn measured by X-ray photoelectron spectroscopy analysis of the gas barrier layer is 1 to 10 atomic %, and
- when a peak intensity of $^{64}ZnPO_4H^-$ is denoted by $I(^{64}ZnPO_4H^-)$ and a peak intensity of $C_3H_3O_2^-$ is denoted by $I(C_3H_3O_2^-)$, the peak intensities being measured by time-of-flight secondary ion mass spectrometry analysis of the gas barrier layer,
- a value of $I(^{64}ZnPO_4H^-)/I(C_3H_3O_2^-)$
- is equal to or more than $6\times10^{-4}$ and equal to or less than $5\times10^{-2}$,
- a composition ratio of N measured by X-ray photoelectron spectroscopy analysis of the gas barrier layer is more than 0 atomic % and equal to or less than 12 atomic %, and
- when a peak intensity of $CN^-$ measured by time-of-flight secondary ion mass spectrometry analysis of the gas barrier layer is denoted by $I(CN^-)$,
- a value of $I(CN^-)/I(C_3H_3O_2^-)$
- is more than 0 and equal to or less than 2.

The fact that the composition ratio of Zn measured by X-ray photoelectron spectroscopy is 1 to 10 atomic % means that Zn is contained in the gas barrier layer at a certain concentration.

In addition, the detection of $C_3H_3O_2^-$ from the gas barrier layer by mass spectrometry analysis means that the gas barrier layer includes polyacrylic acid or a derivative/similar compound thereof (polyacrylic acid or the like). In addition, it is considered that the value of $I(C_3H_3O_2^-)$ is a value correlated with the amount (concentration) of the carboxyl group in the gas barrier layer.

Since the gas barrier layer contains Zn at a certain concentration and a polycarboxylic acid having a carboxyl group is present in the gas barrier layer, it is considered that the polycarboxylic acid in the gas barrier layer forms a crosslinked body with Zn, and the gas barrier layer in which the Zn crosslinked body is formed carries the gas barrier properties of the gas barrier laminate together with the inorganic material layer that is provided between the base material layer and the gas barrier layer.

Further, the fact that $^{64}ZnPO_4H^-$ is detected from the gas barrier layer by mass spectrometry analysis means that a bond between a phosphorus compound represented by phosphoric acid and Zn is present in the gas barrier layer, and it is considered that the value of $I(^{64}ZnPO_4H^-)$ is a value correlated with the amount (concentration) of the bond between the phosphorus compound and Zn. From this, it is presumed that Zn is not only bonded to the carboxyl group of the polycarboxylic acid, but also some Zn atoms are chemically bonded to each other through a polyvalent phosphoric acid compound.

In addition, it is considered that the value of $I(^{64}ZnPO_4H^-)/I(C_3H_3O_2^-)$ is a value correlated with the amount (concentration) of the bond between the phosphorus compound and Zn with respect to the carboxyl group of the polycarboxylic acid.

Incidentally, zinc phosphate is known as a water-insoluble compound, and the bond between the phosphorus compound and Zn is a bond that is difficult to be cleaved by hydration due to a retort treatment or the like. Therefore, it is considered that the presence of the bond between the phosphorus compound and Zn in the gas barrier layer suppresses a significant decrease in gas barrier properties caused by damage in the adjacent inorganic material layer due to excessive expansion and contraction of the gas barrier layer in a retort treatment or the like.

On the other hand, the detection of $CN^-$ from the gas barrier layer by mass spectrometry analysis means that the gas barrier layer includes a polyamine. It is considered that the fact that the composition ratio of N measured by X-ray photoelectron spectroscopy analysis is more than 0 atomic % and equal to or less than 12 atomic % and the fact that the value of $I(CN^-)/I(C_3H_3O_2^-)$ is more than 0 and equal to or less than 2 mean that polyamine is present in the gas barrier layer including polycarboxylic acid and these values are correlated with the amount (concentration) of the amino group derived from the polyamine.

Since the polyamine and the polycarboxylic acid are present in the gas barrier layer at a certain concentration, the carboxyl group derived from the polycarboxylic acid can be bonded not only to Zn but also to the amino group. Further, amide crosslinking can be formed by a dehydration condensation reaction between the carboxyl group and the amino group. It is considered that the polycarboxylic acid forms a crosslinked body by ion crosslinking or amide crosslinking with Zn or polyamine in a well-balanced manner, and the gas barrier layer in which a metal crosslinked body is formed carries the gas barrier properties of the gas barrier laminate together with the inorganic material layer provided between the base material layer and the gas barrier layer.

That is, the barrier performance after retorting is favorably maintained due to the fact that the composition ratio of Zn is 1 to 10 atomic %, the fact that the value of $I(^{64}ZnPO_4H^-)/I(C_3H_3O_2^-)$ is equal to or more than $6\times10^{-4}$ and equal to or less than $5\times10^{-2}$, the fact that the composition ratio of N is more than 0 atomic % and equal to or less than 12 atomic %, and the fact that the value of $I(CN^-)/I(C_3H_3O_2^-)$ is more than 0 and equal to or less than 2.

FIG. 1 shows a schematic cross-sectional view of an example of a two-layer laminate structure barrier film including the gas barrier laminate according to the first embodiment. A two-layer laminate structure barrier film 1 includes a gas barrier laminate 8. The gas barrier laminate 8 includes a base material layer 2, a gas barrier layer 5 that is provided on at least one surface of the base material layer 2, and an inorganic material layer 4 that is provided between the base material layer 2 and the gas barrier layer 5. In addition, an undercoat layer (UC layer) 3 may be provided under the inorganic material layer 4, that is, on the base material layer 2. In the two-layer laminate structure barrier film 1, for example, the gas barrier laminate 8 can be bonded to an unstretched polypropylene film (CPP) 7 through an adhesive layer 6.

In addition, FIG. 2 shows a schematic cross-sectional view of an example of a three-layer laminate structure barrier film including the gas barrier laminate according to the first embodiment. In the three-layer laminate structure barrier film 10, for example, a nylon film 9 can be bonded onto a first adhesive layer 61 of the barrier laminate 8 in which the first adhesive layer 61 is provided, and the nylon film 9 and the unstretched polypropylene film 7 can be bonded to each other through a second adhesive layer 62.

The gas barrier layer 5 of the gas barrier laminate 8 according to the first embodiment is a layer in which at least zinc (Zn) and nitrogen (N) are detected by X-ray photoelectron spectroscopy (XPS) analysis. In addition, by time-of-flight secondary ion mass spectrometry analysis (TOF-SIMS), a peak of $^{64}ZnPO_4H^-$, a peak of $C_3H_3O_2^-$, and a peak of $CN^-$ are detected.

In the gas barrier layer of the gas barrier laminate according to the first embodiment, the peak of $^{64}ZnPO_4H^-$ having high water resistance is detected, and thus a gas barrier laminate having good barrier performance after retorting is obtained.

[XPS Analysis]

The composition of Zn contained in the gas barrier layer is 1 atomic % or more, preferably 1.5 atomic % or more, and more preferably 2 atomic % or more in the XPS analysis. In addition, the composition of Zn contained in the gas barrier layer is 10 atomic % or less, preferably 8 atomic % or less, and more preferably 7 atomic % or less. This corresponds to the peak intensity of Zn with respect to the peak intensity of carbon, that is, Zn/C is equal to or more than 0.01 and equal to or less than 0.2 (atomic/atomic %).

In this manner, in a case where Zn is present in a certain amount in the gas barrier layer, the barrier performance after retorting is improved.

In addition, the composition of N in the gas barrier layer is more than 0%, preferably 2 atomic % or more, and more preferably 3 atomic % in the XPS analysis. In addition, the composition of N is 12 atomic % or less, preferably 10 atomic % or less, and more preferably 9 atomic % or less. This corresponds to the peak intensity of N with respect to the peak intensity of carbon, that is, N/C is equal to or more than 0 and equal to or less than 0.2 (atomic/atomic %).

As described above, in a case where the composition ratio of N in the gas barrier layer is more than 0 atomic % and equal to or less than 12 atomic %, the barrier performance after retorting is improved.

An example of specific conditions of the XPS analysis applicable to the first embodiment is shown below.

Analyzing device: AXIS-NOVA manufactured by KRATOS Analytical Limited

X-ray source: monochromatized Al-Kα

X-ray source output: 15 kV, 10 mA

Analysis region: 300×700 μm

During analysis: neutralization gun for charge correction used

In the XPS analysis, a measurement sample of 1×1 cm cut out from the gas barrier layer can be used. In addition, in order to analyze the inside of the gas barrier layer, it is preferable to perform sputter etching on the surface of the gas barrier layer before the analysis. In order to reduce damage to the gas barrier layer, it is desirable to use an Ar-gas cluster ion beam (Ar-GCIB) source for the sputtering etching. Ar-gas cluster ion beam is known as a method of etching without breaking the chemical structure of a sample.

In the XPS analysis, the detected elements are specified by wide scanning, and spectra for each element are acquired by narrow scanning. The background is then estimated from the obtained spectrum by the Shirley method, and the background is removed from the spectrum. For each measured element, a spectrum in which the background is removed is acquired, and the atomic composition ratio (atomic %) of the detected element is calculated from the obtained peak area by using a relative sensitivity coefficient method.

In addition, the detection sensitivity of the atomic composition ratio in general XPS analysis is set to about 0.1 atomic %. For example, in a case where a trace amount of a phosphorus compound is added to the gas barrier layer, the XPS analysis may not be able to detect the content of P.

[TOF-SIMS Analysis]

Among the fragments detected in TOF-SIMS analysis of the gas barrier layer, when a peak intensity of $^{64}ZnPO_4H$ is denoted by I($^{64}ZnPO_4H$) and a peak intensity of the fragment of $C_3H_3O_2^-$ is denoted by I($C_3H_3O_2^-$), a value of I($^{64}ZnPO_4H^-$)/I($C_3H_3O_2^-$) is $6\times10^{-4}$ or more, preferably $7\times10^{-4}$ or more, and more preferably $1\times10^{-3}$ or more.

In addition, the value is $5\times10^{-2}$ or less, preferably $3\times10^{-2}$ or less, and more preferably $2\times10^{-2}$ or less.

In this manner, in a case where the mass peak of $^{64}ZnPO_4H^-$, which is derived from a highly water-resistant bond, is detected, and the value of I($^{64}ZnPO_4H^-$)/I($C_3H_3O_2^-$) is within the above range, the gas barrier laminate has good barrier performance after retorting.

In addition, in a case where the value of ($^{64}ZnPO_4H^-$)/I($C_3H_3O_2^-$) is excessively large, fine particles of the zinc phosphate compound grow in the gas barrier layer, which causes non-uniformity in the gas barrier layer and tends to deteriorate the barrier performance after retorting.

In addition, among the fragments detected in the TOF-SIMS analysis of the gas barrier layer, when a mass peak intensity of $CN^-$ is denoted by I($CN^-$), a value of I($CN^-$)/I($C_3H_3O_2^-$) is more than 0, preferably 0.2 or more, and more preferably 0.4 or more.

In addition, the value of I($CN^-$)/I($C_3H_3O_2^-$) is 2 or less, preferably 1.8 or less, and more preferably 1.5 or less.

In a case of such a gas barrier layer, a gas barrier laminate having good barrier performance after retorting is obtained.

An example of specific conditions of the TOF-SIMS analysis applicable to the first embodiment is shown below.

In order to analyze the inside of the gas barrier layer, it is preferable to perform sputter etching on the surface layer of the gas barrier layer with an Ar-gas cluster ion beam (Ar-GCIB) attached to a TOF-SIMS analyzing device before the TOF-SIMS analysis. The use of the Ar-GCIB can reduce damage to the gas barrier layer.

An example of specific conditions of the Ar-GCIB applicable to the first embodiment is shown.

GCIB: 5 kV, 5 μA

GCIB treatment time: time point at which the spectrum pattern of TOF-SIMS no longer changes.

The TOF-SIMS analysis can be performed, for example, as follows.

Analyzing device: PHI nano-TOF II manufactured by ULVAC-PHI, Inc.

Primary ion: $Bi_3^{2+}$

Primary ion source output: 30 kV, 0.5 μA

Analysis region: 300×300 μm (scanning region of primary ion beam)

During the analysis, charge neutralization can be performed by irradiation with low energy electron beams and low energy Ar ions attached to the device. In addition, in the TOF-SIMS analysis, a measurement sample of 1×1 cm cut out from the gas barrier layer can be used as in the XPS analysis.

In this case, when a mass peak intensity of $PO_2^-$ observed by the TOF-SIMS analysis on the gas barrier layer is denoted by I($PO_2^-$) and a mass peak intensity of $PO_3^-$ is denoted by I($PO_3^-$), a value of (I($PO_2^-$)+I($PO_3^-$))/I($C_3H_3O_2^-$) is preferably 0.02 or more, more preferably 0.05 or more, and still more preferably 0.07 or more.

In addition, the value of I($PO_2^-$)+I($PO_3^-$)/I($C_3H_3O_2^-$) is preferably 5 or less, more preferably 3 or less, and still more preferably 2.5 or less.

The detection of the mass peaks of $PO_2^-$ and $PO_3^-$ means that the gas barrier layer includes a phosphorus compound including one or more P—OH groups represented by phosphoric acid. It is considered that the value of (I($PO_2^-$)+I($PO_3^-$))/I($C_3H_3O_2^-$) is a value correlated with the amount (concentration) of the phosphorus compound with respect to the carboxyl group of the polycarboxylic acid in the gas barrier layer.

In this case, a value of I($PO_2^-$)/I($PO_3^-$), which is an intensity ratio of I($PO_2^-$) to I($PO_3^-$), is preferably 0.05 or more, more preferably 0.08 or more, and still more preferably 0.1. In addition, the value of I($PO_2^-$)/I($PO_3^-$) is 1 or less, preferably 0.9 or less, and more preferably 0.8 or less.

In the TOF-SIMS analysis, the detection of the mass peaks of $PO_2^-$ and $PO_3^-$ means that the phosphorus compound containing one or more P—OH groups represented by phosphoric acid ($H_3PO_4$) or the like is contained, and I($PO_2^-$)/I($PO_3$), which is a ratio thereof, is a value reflecting the type of phosphorus-based compound.

I($^{64}ZnPO_4H^-$)/I($C_3H_3O_2^-$) reflecting the amount (concentration) of the zinc phosphate bond in the gas barrier layer affects the type of phosphorus compound. That is, the value of I($PO_2^-$)/I($PO_3^-$) is also related. The fact that the value of I($PO_2^-$)/I($PO_3^-$) is equal to or more than 0.05 and equal to or less than 1 means that the value of I($^{64}ZnPO_4H^-$)/I($C_3H_3O_2^-$) is set in an appropriate range, and the barrier performance of the gas barrier laminate according to the first embodiment after retorting can be satisfactorily maintained.

The analysis method of the data obtained by the TOF-SIMS can be performed as follows.

In order to perform detailed spectrum analysis, in the first embodiment, for each of positive and negative secondary ions, a raw data sequence in which mass numbers $m_i$ and the corresponding counts $c_i$ are paired, and Total Ion Counts ($C_T$) are acquired by the analyzing device. Here, it is assumed that i=0, 1, 2, . . . , N, and the raw data sequence is arranged in ascending order with respect to $m_i$. Note that, $C_T$ is the total counts of secondary ions detected by a detector.

A range of mass numbers around the mass spectral peak of interest is set to $i=n_1, n_1+1, \ldots, n_2$. The data $c_i$ of the counts in this range obtained by the analysis is approximated by $y_i$ as shown in the following equation. Specifically, a background level $b^0$ and the $c_i$ are approximated by curve fitting using K triangular functions $Y_j(m_i)$. Here, $b^0$ is a constant.

$$y_i = b^0 + \sum_{j=1}^{K} Y_j(m_i) \quad \text{[Equation 1]}$$

$Y_j(m_i)$ is a function having a peak value $Y^0_j$ at a mass number $x^0_j$ as shown in FIG. 3, and is represented by the following equation.

$$Y_j(m_i) = \begin{cases} 0 & m_i \le x_j^0 - B_j^- \\ \dfrac{Y_j^0}{B_j^-}(m_i - x_j^0) + Y_j^0 & x_j^0 - B_j^- < m_i \le x_j^0 \\ -\dfrac{Y_j^0}{B_j^+}(m_i - x_j^0) + Y_j^0 & x_j^0 < m_i \le x_j^0 + B_j^+ \\ 0 & x_j^0 + B_j^+ < m_i \end{cases} \quad \text{[Equation 2]}$$

Here, $b^0$, $x^0_j$, $Y^0_j$, $B^-_j$, and $B^+_j$ are fitting parameters. In addition, j is j=1, . . . , K. For example, in a case where the background of the spectrum is not a constant value and changes linearly with respect to $m_i$, the background is approximated by combining $b^0$ and the triangular function $Y_j(m_i)$. In a case where the mass spectral peak of interest is a single peak, the background is removed, and approximation is performed with one triangular function. In a case where the mass spectral peak of interest is close to other mass peaks, approximation is performed with a plurality of triangular functions including the other mass peaks. When the approximated mass spectral peak of interest is set to a j=k-th peak among the K triangular functions, the peak intensity I is expressed as a numerical value obtained by normalizing the sum of $Y_k(m_i)$ from $i=n_1, \ldots, n_2$ with the Total Ion Counts ($C_T$), and is obtained from the following equation.

$$I = \frac{\sum_{i=n_1}^{n_2} Y_k(m_i)}{C_T} \quad \text{[Equation 3]}$$

When a tail portion is present in the mass spectral peak, it is difficult to define the range of the mass number to be counted. In the first embodiment, in order to avoid this, the mass spectral peak is approximated by a triangular function. Therefore, the counts in the tail portion of the mass spectral peak are ignored. It is assumed that the central portion of the mass spectral peak is subjected to curve fitting to match the triangular function.

In addition, there is a case where other components (for example, mass peaks of other types of components having the same mass number) that overlap a target peak component is observed. In such a case, the target peak component is obtained by approximating the other components overlapping the target peak component with the triangular function.

The mass number of the fragment of interest in the first embodiment is calculated and shown below. The atomic mass numbers of isotopes are based on http://physics.nist.gov/.

TABLE 1

| Isotope | Atomic mass | Number of atoms | | | | |
|---|---|---|---|---|---|---|
| | | $PO_2$ | $PO_3$ | $C_3H_3O_2$ | CN | $^{64}ZnPO_4H$ |
| $^{1}H$ | 1.007825 | | | 3 | | 1 |
| $^{12}C$ | 12 | | | 3 | 1 | |
| $^{14}N$ | 14.00307 | | | | 1 | |
| $^{16}O$ | 15.99492 | 2 | 3 | 2 | | 4 |
| $^{31}P$ | 30.97376 | 1 | 1 | | | 1 |
| $^{64}Zn$ | 63.92914 | | | | | 1 |
| Mass number | | 62.9636 | 78.9585 | 71.0133 | 26.0031 | 159.89039 |

[Calculation of Mass Peak Intensity of $^{64}ZnPO_4H^-$]

Five isotopes of Zn are known, and in the TOF-SIMS analysis, fragments related to $^{64}Zn$, $^{66}Zn$, and $^{68}Zn$ are mainly detected. In the first embodiment, $^{64}Zn$ having the highest abundance ratio is focused. In the fragment showing the bond between $^{64}Zn$ and the phosphorus compound containing P—OH, $^{64}ZnPO_4H^-$, $^{64}ZnP_2O_6H^-$, $^{64}ZnP_2O_7H^-$, $^{64}ZnP_3O_9^-$, and the like are detected, but $^{64}ZnPO_4H^-$ having a relatively high mass peak intensity is focused.

Focusing on a mass number range of 159.5 to 160.3 in the negative secondary ion spectrum, the sum of the counts is calculated from the triangular function approximating the mass peak in the vicinity of 159.890 corresponding to $^{64}Zn^{31}P^{16}O_4{}^{1}H^-$ and the data of $m_i$, and a value normalized by $C_T$ is defined as the mass peak intensity of $^{64}ZnPO_4H^-$.

An example of curve fitting is shown in FIG. 4, and the calculation results of the parameters used in this case and the total counts are shown in Table 2. In the example shown in FIG. 4, the sum of the counts obtained from the triangular function approximating the mass peak of $^{64}ZnPO_4H^-$ as a target and the data of $m_i$ is 1514. Since the Total Ion Counts ($C_T$) of negative secondary ions at this time is 8571746, the mass peak intensity $I(^{64}ZnPO_4H^-)$ of $^{64}ZnPO_4H^-$ is $$I(^{64}ZnPO_4H^-)=1514/8571746=1.77\times10^{-4}.$$

TABLE 2

| j | $b^0$ | $Y_j$ ($m_i$) | | |
|---|---|---|---|---|
| | | 0 | 1 | 2 (=target) |
| $b^0$ | 2 | | | |
| $x^0$ | | 159.934 | 159.934 | 159.885 |
| $B^+$ | | 0.11 | 0.035 | 0.03 |
| $B^-$ | | 0.11 | 0.035 | 0.03 |
| $Y^0$ | | 20 | 50 | 62 |
| sum | | 1791 | 1424 | 1514 |

A supplementary description will be given with respect to FIG. 4 showing an example of curve fitting.

(i) In order to obtain an approximation curve $y_i$ that reproduces the measurement data $c_i$ in the vicinity of a target peak position, the "background $b^0$", the curve of "triangular function approximation of other components" and the curve of "target triangular function $Y_j(m_i)$" are required.

(ii) In the example of FIG. 4, in order to obtain the "approximation curve y" that reproduces the measurement data $c_i$ at a mass number (m/z) of 159.7 to 160.2, the "background $b^0$", the curve of the "target triangular function $Y_j(m_i)$" (j=2 in Table 2), and two curves of "triangular function approximations of other components" (j=0, 1 in Table 2) are used.

[Calculation of Mass Peak Intensity of $C_3H_3O_2^-$]

Focusing on a mass number range of 70.7 to 71.4 in the negative secondary ion spectrum, the sum of the counts is calculated from the triangular function $Y_k(m_i)$ approximating the mass peak in the vicinity of 71.013 corresponding to ${}^{12}C_{31}H_3{}^{16}O_2^-$ obtained by curve fitting and the data of $m_i$, and a value normalized by $C_T$ is defined as the mass peak intensity $I(C_3H_3O_2^-)$ of $C_3H_3O_2^-$.

[Calculation of Mass Peak Intensity of $PO_2^-$]

Focusing on a mass number range of 62.5 to 63.3 in the negative secondary ion spectrum, the sum of the counts is calculated from the triangular function approximating the mass peak in the vicinity of 62.964 corresponding to ${}^{31}P^{16}O_2^-$ and the data of $m_i$, and a value normalized by $C_T$ is defined as the mass peak intensity $I(PO_2^-)$ of $PO_2^-$.

[Calculation of Mass Peak Intensity of $PO_3^-$]

Focusing on a mass number range of 78.5 to 79.3 in the negative secondary ion spectrum, the sum of the counts is calculated from the triangular function approximating the mass peak in the vicinity of 78.959 corresponding to ${}^{31}P^{16}O_3^-$ and the data of $m_i$, and a value normalized by $C_T$ is defined as the mass peak intensity $I(PO_3^-)$ of $PO_3^-$.

[Calculation of Mass Peak Intensity of $CN^-$]

Focusing on a mass number range of 25.5 to 26.3 in the negative secondary ion spectrum, the sum of the counts is calculated from the triangular function approximating the mass peak in the vicinity of 26.003 corresponding to ${}^{12}C^{14}N^-$ and the data of $m_i$, and a value normalized by $C_T$ is defined as the mass peak intensity $I(CN^-)$ of $CN^-$.

The gas barrier layer is preferably formed of a cured product of a mixture including a polycarboxylic acid, Zn, and a phosphorus compound including one or more —P—OH groups represented by phosphoric acid ($H_3PO_4$) or a salt thereof.

When the gas barrier layer is formed of a cured product of the mixture including these components, the carboxyl group derived from polycarboxylic acid forms metal ion crosslinking through Zn, and Zn also reacts with the phosphorus compound including the P—OH group to form a water-resistant bond. Although the detailed mechanism is unknown, it is considered that due to the presence of an appropriate amount of these metal ion crosslinking through Zn and the bond between Zn and the phosphorus compound uniformly in the gas barrier layer, a dense gas barrier layer is formed, and excessive expansion and contraction of the gas barrier layer is suppressed in a retort treatment or the like.

The composition ratio of Zn in the gas barrier layer according to the first embodiment, the value of $I({}^{64}ZnPO_4H^-)/I(C_3H_3O_2^-)$, the value of $I(PO_2^-)+I(PO_3^-)/I(C_3H_3O_2^-)$, and the value of $I(PO_2^-)/I(PO_3^-)$ in the TOF-SIMS can be controlled by appropriately adjusting the production conditions of the gas barrier layer.

In the first embodiment, for example, the concentration of phosphoric acid with respect to the polycarboxylic acid is mentioned as one of the factors for controlling the composition ratio of Zn and the value of $I({}^{64}ZnPO_4H^-)/I(C_3H_3O_2^-)$.

The polycarboxylic acid, zinc or a compound thereof, the phosphorus compound, and other components that can be added, which can be applied to the first embodiment, will be described in detail below.

(Polycarboxylic Acid)

The polycarboxylic acid has two or more carboxy groups in the molecule. Specific examples thereof include homopolymers of α,β-unsaturated carboxylic acid such as acrylic acid, methacrylic acid, itaconic acid, fumaric acid, crotonic acid, cinnamic acid, 3-hexenoic acid, and 3-hexenedioic acid, or copolymers thereof. In addition, the polycarboxylic acid may be a copolymer of the α,β-unsaturated carboxylic acid described above and esters such as ethyl ester, olefins such as ethylene, or the like.

Among these, a homopolymer of acrylic acid or methacrylic acid, or a copolymer thereof is preferable, one or two or more polymers selected from polyacrylic acid, polymethacrylic acid, and a copolymer of acrylic acid and methacrylic acid is more preferable, at least one polymer selected from polyacrylic acid and polymethacrylic acid is still more preferable, and at least one polymer selected from a homopolymer of acrylic acid or a homopolymer of methacrylic acid is particularly preferable.

Here, in the first embodiment, polyacrylic acid includes both a homopolymer of acrylic acid and a copolymer of acrylic acid and another monomer. In a case of a copolymer of acrylic acid and another monomer, the polyacrylic acid usually includes constituent units which are derived from acrylic acid at 90% by mass or more, preferably 95% by mass or more, and more preferably 99% by mass or more in 100% by mass of the polymer.

In addition, in the first embodiment, polymethacrylic acid includes both a homopolymer of methacrylic acid and a copolymer of methacrylic acid and another monomer. In a case of a copolymer of methacrylic acid and another monomer, the polymethacrylic acid usually includes constituent units which are derived from methacrylic acid at 90% by mass or more, preferably 95% by mass or more, and more preferably 99% by mass or more in 100% by mass of the polymer.

The polycarboxylic acid is a polymer obtained by polymerizing carboxylic acid monomers, and the molecular weight of the polycarboxylic acid is preferably 500 to 2,500,000, more preferably 5,000 to 2,000,000, still more preferably 10,000 to 1,500,000, and even more preferably 100,000 to 1,200,000 from the viewpoint of excellent balance of gas barrier properties and handleability.

Here, the molecular weight of the polycarboxylic acid is the polyethylene oxide conversion weight average molecular weight and is measurable using gel permeation chromatography (GPC).

By neutralizing the polycarboxylic acid with a volatile base, gelation can be suppressed when zinc or a polyamine, which will be described later, is mixed with the polycarboxylic acid. Accordingly, in the polycarboxylic acid, from the viewpoint of prevention of gelation, a volatile base is preferably used for the partially neutralized product or completely neutralized product of the carboxy group. It is possible to obtain the neutralized product by partially or completely neutralizing the carboxy group of the polycarboxylic acid with a volatile base, (that is, the carboxy group of the polycarboxylic acid is partially or completely made into carboxylate). Due to this, gelation can be prevented when polyamine or zinc is added.

A partially neutralized product is prepared by adding a volatile base to an aqueous solution of polycarboxylic acid polymer and it is possible to set a desired neutralization degree by adjusting the ratio of the amounts of the polycarboxylic acid and the volatile base. In the first embodiment, from the viewpoint of sufficiently suppressing gelation caused by the neutralization reaction with the amino group of the polyamine, the neutralization degree of the polycarboxylic acid with a volatile base is preferably 30 to 100 equivalent %, and more preferably 50 to 100 equivalent %.

It is possible to use an arbitrary water-soluble base as a volatile base.

Examples of volatile bases include ammonia, morpholine, alkylamine, 2-dimethyl amino ethanol, N-methyl monopholine, ethylene diamine, and tertiary amines such as triethyl amine, an aqueous solution thereof or a mixture thereof. From the viewpoint of obtaining good gas barrier properties, an ammonia aqueous solution is preferable.

It is preferable that the mixture constituting the gas barrier laminate according to the first embodiment further includes a carbonic acid-based ammonium salt. The carbonic acid-based ammonium salt is added to improve the solubility of zinc by bringing zinc, which will be described later, into a state of a zinc carbonate ammonium complex, and to prepare a uniform solution containing zinc.

Examples of the carbonic acid-based ammonium salt include ammonium carbonate and ammonium hydrogen carbonate. From the viewpoint of volatility and difficulty in remaining in the obtained gas barrier layer, ammonium carbonate is preferable.

(Zinc)

Zinc (Zn) can form a water-resistant Zn phosphate bond with a phosphorus compound, and a mass peak represented by $^{64}ZnPO_4H^-$ can be detected by TOF-SIMS analysis. In addition, in a case where the gas barrier layer contains polycarboxylic acid, a salt is formed with the polycarboxylic acid. Zn may be zinc or a zinc compound which can be added to the mixture forming the gas barrier layer, and for example, metallic zinc, zinc oxide (ZnO), a zinc compound, or the like can be used. The addition amount of zinc can be set to equal to or more than 0.1 mol and equal to or less than 0.5 mol with respect to 1 mol of the carboxyl groups of the above-described polycarboxylic acid.

(Phosphorus Compound)

As described above, when the barrier layer is subjected to mass spectrometry analysis, $PO_2^-$ and/or $PO_3^-$ is preferably detected. In order to provide such a barrier layer, it is preferable that the mixture before curing includes a phosphorus compound or a salt thereof.

The phosphorus compound or the phosphorus compound in a salt thereof includes one or more —P—OH groups in the molecular structure. The phosphorus compound may be blended in the mixture as a salt.

From the viewpoint of further improving water vapor barrier properties after the retort treatment, the phosphorus compound preferably includes two or more —P—OH groups, and more preferably includes three or more —P—OH groups. In addition, from the viewpoint of productivity, the number of —P—OH groups in the phosphorus compound may be, for example, 10 or less.

Specific examples of the phosphorus compound include phosphoric acid, phosphorous acid, phosphonic acid, hypophosphorous acid, polyphosphoric acid, and derivatives thereof.

Specifically, the polyphosphoric acid has a structure in which two or more phosphoric acids are condensed in the molecular structure, and examples thereof include diphosphoric acid (pyrophosphoric acid), triphosphoric acid, and polyphosphoric acid with four or more condensed phosphoric acids.

Specific examples of the derivatives include esters of the above-described phosphorus compounds such as phosphorylated starch and phosphated crosslinked starch; halides such as chlorides; anhydrides such as tetraphosphorus acid decoxide; and compounds having a structure in which a hydrogen atom bonded to a phosphorus atom is substituted with an alkyl group, such as nitrilotris(methylenephosphonic acid) and N,N,N',N'-ethylenediaminetetrakis(methylenephosphonic acid).

From the viewpoint of further improving the balance between barrier properties and productivity, the phosphorus compound is one or two or more selected from the group consisting of phosphoric acid, phosphorous acid, hypophosphorous acid, polyphosphoric acid, phosphonic acid, and salts thereof, and more preferably at least one selected from the group consisting of phosphoric acid, phosphorous acid, phosphonic acid, and salts thereof.

In addition, specific examples of the salt of the phosphorus compound include salts of monovalent metals such as sodium and potassium, and ammonium salts. From the viewpoint of barrier properties, the salt of the phosphorus compound is preferably an ammonium salt.

The concentration of P atoms of the phosphorus compound is typically $5\times10^{-4}$ mol or more, preferably $1\times10^{-3}$ mol or more, and more preferably $3\times10^{-3}$ mol or more with respect to 1 mol of the carboxyl groups of the above-described polycarboxylic acid in the mixture, and is typically 0.3 mol or less, preferably 0.1 mol or less, and more preferably 0.05 mol or less. In a phosphorus compound containing one P atom in the chemical formula, such as phosphoric acid, the number of moles of the P atom and the number of moles of the phosphorus compound have the same meaning.

It is considered that, in a case of a phosphorus compound or a phosphorus compound derived from a salt thereof having such a concentration, excessive expansion and contraction of the gas barrier layer is suppressed in a retort treatment or the like by reliably forming a Zn bond with the phosphorus compound having water resistance, and the gas barrier properties of the gas barrier laminate after the retort treatment can be further improved. The presence of the Zn bond with the phosphorus compound is reflected in the mass peak of $^{64}ZnPO_4H^-$ obtained by the above-described TOF-SIMS analysis.

(Polyamine)

It is preferable that the mixture constituting the gas barrier laminate according to the first embodiment further includes a polyamine. When the mixture includes a polyamine, the barrier properties of the obtained gas barrier laminate can be improved, the interlayer adhesion of the obtained gas barrier laminate can be improved, and the delamination resistance can be improved.

The polyamine is a polymer having two or more amino groups at a main chain, a side chain, or a terminal. Specific examples thereof include aliphatic polyamines such as polyallylamine, polyvinylamine, polyethyleneimine, and poly (trimethyleneimine); polyamides having amino groups on side chains such as polylysine and polyarginine; and the like. In addition, a polyamine where a portion of the amino group is modified may be used. From the viewpoint of obtaining good gas barrier properties, polyethylenimine is more preferable. The addition amount of the polyamine can be set to equal to or more than 0 mol and equal to or less than 0.9 mol with respect to 1 mol of the carboxyl groups included in the above-described polycarboxylic acid.

From the viewpoint of excellent balance of gas barrier properties and handleability, the weight average molecular weight of the polyamine is preferably 50 to 2,000,000, more preferably 100 to 1,000,000, still more preferably 1,500 to 500,000, yet more preferably 1,500 to 100,000, even more preferably 1,500 to 50,000, yet more preferably 3,500 to 20,000, still even more preferably 5,000 to 15,000, and particularly preferably 7,000 to 12,000.

Here, in the first embodiment, it is possible to measure the molecular weight of the polyamine using a boiling point increasing method or a viscosity method.

(Method for Producing Gas Barrier Layer)

The gas barrier layer according to the first embodiment can be produced, for example, as follows.

First, a completely or partially neutralized solution of carboxy groups which form the polycarboxylic acid is prepared.

A volatile base is added to the polycarboxylic acid and the carboxy groups of the polycarboxylic acid are completely neutralized or partially neutralized. By neutralizing the carboxy groups of the polycarboxylic acid, in the subsequent step, gelation generated by a reaction between the carboxy group which forms the polycarboxylic acid, and zinc and the amino group which forms the polyamine when zinc and the polyamine are added is effectively prevented, and a uniform gas barrier coating material intermediate is obtained.

Next, a zinc salt compound and a carbonic acid-based ammonium salt are added to the intermediate and dissolved to form a zinc salt with the —COO— group which forms the polycarboxylic acid by the generated zinc ions. At this time, the —COO— group forming a salt with the zinc ions refers to both the carboxy group not neutralized with the base and the —COO— group neutralized with the base. In a case of the —COO— group neutralized with the base, the zinc ions derived from zinc are replaced and coordinated to form a zinc salt of the —COO— group. Then, after forming the zinc salt, the gas barrier coating material (mixture) can be obtained by adding phosphoric acid. At this time, a polyamine can be further added.

A gas barrier layer is formed by applying the gas barrier coating material (mixture), which is produced in this manner, onto an inorganic material layer described later and drying and curing the coating material. The method for applying the gas barrier coating material to the base material layer is not particularly limited, and a common method can be used. Examples thereof include methods for coating using various known coating machines such as Mayer bar coaters, air knife coaters, gravure coaters such as direct gravure coaters, gravure offset, arc gravure coaters, gravure reverse and jet nozzle method coaters, reverse roll coaters such as top feed reverse coaters, bottom feed reverse coaters, and nozzle feed reverse coaters, five roll coaters, lip coaters, bar coaters, bar reverse coaters, and die coaters.

The coating amount (wet thickness) of the gas barrier coating material (mixture) is preferably equal to or more than 0.05 μm and more preferably equal to or more than 1 μm. In addition, the coating amount is preferably 300 μm or less, more preferably 200 μm or less, and still more preferably 100 μm or less.

In addition, the average thickness of the gas barrier layer after drying and curing is preferably equal to or more than 0.05 μm and equal to or less than 10 μm, more preferably equal to or more than 0.08 μm and equal to or less than 5 μm, and still more preferably equal to or more than 0.1 μm and equal to or less than 1 μm. When the coating amount is equal to or less than the above upper limit value, it is possible to suppress curling of the obtained gas barrier laminate or gas barrier film. Further, when the coating amount is equal to or more than the above lower limit value, the barrier performance of the obtained gas barrier laminate or gas barrier film can be further improved.

Regarding the drying and heat treatment, the heat treatment may be performed after drying, or the drying and the heat treatment may be performed at the same time.

The method for performing the drying and the heat treatment is not particularly limited as long as the object of the present invention can be achieved, and any method capable of curing the gas barrier coating material and heating the cured gas barrier coating material may be used. Examples thereof include heating by convection heat transfer such as ovens or dryers, heating by conductive heat transfer such as heating rolls, heating by radiation heat transfer using electromagnetic waves such as infrared, far infrared, and near infrared heaters, and heating by internal heat generation such as microwaves. As an apparatus used for drying and heat treatment, an apparatus capable of performing both drying and heat treatments is preferable from the viewpoint of production efficiency. In particular, from the viewpoint of being usable for various purposes such as drying, heating, and annealing, it is preferable to use a hot air oven, and from the viewpoint of excellent thermal conductivity efficiency to the film, it is preferable to use a heating roll. Further, methods used for the drying and heat treatments may be appropriately combined. A hot air oven and a heating roll may be used in combination, for example, when the gas barrier coating material is dried in a hot air oven and then subjected to a heat treatment with a heating roll, the heat treatment step time becomes short, which is preferable from the viewpoint of production efficiency. In addition, it is preferable to perform the drying and heat treatment only with a hot air oven.

For example, it is desirable to perform the heat treatment at a heat treatment temperature of 80° C. to 250° C. for a heat treatment time of 1 second to 10 minutes, preferably at a heat treatment temperature of 120° C. to 240° C. for a heat treatment time of 1 second to 1 minute, and more preferably at a heat treatment temperature of 170° C. to 230° C. for a heat treatment time of 1 second to 30 seconds. Further, as described above, it is possible to perform the heat treatment in a short time by using a heating roll therewith. It is important to adjust the heat treatment temperature and the heat treatment time according to the wet thickness of the gas barrier coating material.

In the gas barrier coating material (mixture), the zinc salt of the —COO— group which forms polycarboxylic acid forms metal crosslinking and a water-resistant Zn phosphate bond (reflected in the mass peak of $^{64}ZnPO_4H^-$ obtained by the above-described TOF-SIMS analysis), and the coating material is dried and heat-treated to obtain a gas barrier layer having excellent gas barrier properties.

(Inorganic Material Layer)

Examples of the inorganic material forming the inorganic material layer 4 include metals, metal oxides, metal nitrides, metal fluorides, metal oxynitrides, and the like which are able to form a thin film having barrier properties.

Examples of inorganic materials forming the inorganic material layer 4 include one or two or more selected from periodic table 2A elements such as beryllium, magnesium, calcium, strontium, and barium, periodic table transition elements such as titanium, zirconium, ruthenium, hafnium, and tantalum; periodic table 2B elements such as zinc; periodic table 3A elements such as aluminum, gallium, indium, and thallium; periodic table 4A elements such as silicon, germanium, and tin; periodic table 6A elements such as selenium and tellurium, and the like, and oxides, nitrides, fluorides, oxynitrides, and the like thereof.

Note that, in the first embodiment, the group name of the periodic table is indicated by the old CAS formula.

Further, among the inorganic materials described above, one or two or more inorganic materials selected from the group consisting of silicon oxide, aluminum oxide, and aluminum is preferable, and aluminum oxide is more preferable due to being excellent in the balance of barrier properties, cost, and the like.

Note that, silicon oxide may contain silicon monoxide and silicon suboxide in addition to silicon dioxide.

The inorganic material layer is formed of the inorganic material described above. The inorganic material layer 4 may be formed of a single inorganic material layer or a plurality of inorganic material layers. In addition, in a case where the inorganic material layer 4 is formed of a plurality of inorganic material layers, the inorganic material layer may be formed of the same type of inorganic material layer or may be formed of different types of inorganic material layers.

The thickness of the inorganic material layer 4 is usually equal to or more than 1 nm and equal to or less than 1000 nm, and preferably equal to or more than 1 nm and equal to or less than 500 nm, from the viewpoint of balance of the barrier properties, adhesion, handleability, and the like.

In the first embodiment, it is possible to determine the thickness of the inorganic material layer from observation images taken by a transmission electron microscope or a scanning electron microscope.

The method of forming the inorganic material layer 4 is not particularly limited and it is possible to form the inorganic material layer 4 on one surface or both surfaces of the base material layer 2 using, for example, a vacuum deposition method, an ion plating method, a sputtering method, a chemical vapor deposition method, a physical vapor deposition method, a chemical vapor deposition method (CVD method), a plasma CVD method, a sol-gel method, or the like. Among the above, film formation under reduced pressure such as a sputtering method, an ion plating method, a chemical vapor deposition method (CVD), a physical vapor deposition method (PVD), a plasma CVD method, or the like is desirable. Due to this, it is expected quickly reacting the chemically active molecular species containing silicon such as silicon nitride or silicon oxynitride will make it possible to improve the smoothness of the surface of the inorganic material layer 4 and to reduce the number of pores.

In order to rapidly perform these bonding reactions, it is desirable that the inorganic atoms and compounds are chemically active molecular species or atomic species.

(Base Material Layer)

The base material layer 2 is not particularly limited as long as a solution of the gas barrier coating material can be applied thereto, and any material can be used. Examples thereof include organic materials such as a thermosetting resin, a thermoplastic resin, or paper, inorganic materials such as glass, pottery, ceramic, silicon oxide, silicon oxynitride, silicon nitride, and cement, and metals such as aluminum, aluminum oxide, iron, copper, and stainless steel, a base material layer with a multilayer structure which is formed of a combination of organic materials or a combination of organic materials and inorganic materials, and the like. Among these, for example, in a case of various film applications such as packaging material or panels, a plastic film using a thermosetting resin and a thermoplastic resin or an organic material such as paper is preferable.

As the thermosetting resin, a known thermosetting resin can be used. Examples of the thermosetting resin include known thermosetting resins such as epoxy resins, unsaturated polyester resins, phenolic resins, urea-melamine resins, polyurethane resins, silicone resins, and polyimides.

As the thermoplastic resin, a known thermoplastic resin can be used. Examples of thermoplastic resins include polyolefins (polyethylene, polypropylene, poly(4-methyl-1-pentene), poly(1-butene), and the like), polyesters (polyethylene terephthalate, polybutylene terephthalate, polyethylene naphthalate, and the like), polyamide (nylon-6, nylon-66, polymetaxylene adipamide, and the like), polyvinyl chloride, polyimide, ethylene vinyl acetate copolymer or saponified products thereof, polyvinyl alcohol, polyacrylonitrile, polycarbonate, polystyrene, ionomers, fluorine-based resins, or mixtures thereof.

Among these, from the viewpoint of good transparency, one or two or more resins selected from the group consisting of polypropylene, polyethylene terephthalate, polyethylene naphthalate, polyamide, polyimide, and polybutylene terephthalate are preferable, and from the viewpoint of excellent pinhole resistance, tearing resistance, heat resistance, and the like, one or two or more resins selected from the group consisting of polyamide, polyethylene terephthalate, polybutylene terephthalate are preferable.

In addition, the base material layer 2 formed of the thermoplastic resin may be a single layer or two or more layers, depending on the application of the gas barrier laminate 8.

In addition, the film formed by the above thermosetting resin and thermoplastic resin may be stretched in at least one direction, preferably in a biaxial direction, to form the base material layer.

From the viewpoint of excellent transparency, rigidity, and heat resistance, the base material layer 2 according to the first embodiment is preferably a biaxially stretched film formed of one or two or more thermoplastic resins selected from polypropylene, polyethylene terephthalate, polyethylene naphthalate, polyamide, polyimide, and polybutylene terephthalate, and more preferably a biaxially stretched film formed of one or two or more thermoplastic resins selected from polyamide, polyethylene terephthalate, and polybutylene terephthalate.

In addition, the surface of the base material layer 2 may be coated with polyvinylidene chloride, polyvinyl alcohol, an ethylene-vinyl alcohol copolymer, an acrylic resin, a urethane-based resin, or the like.

Further, the base material layer 2 may be subjected to a surface treatment in order to improve the adhesion with other layers. Specifically, a surface activation treatment such as a corona treatment, a flame treatment, a plasma treatment, or a primer coat treatment may be performed.

From the viewpoint of obtaining good film properties, the thickness of the base material layer 2 is preferably 1 to 1000 μm, more preferably 1 to 500 μm, and still more preferably 1 to 300 μm.

The shape of the base material layer 2 is not particularly limited and examples thereof include a sheet or film shape, a tray, a cup, a hollow body, or the like.

(Undercoat Layer)

In the gas barrier laminate 8, from the viewpoint of improving the adhesion between the base material layer 2 and the inorganic material layer 4, an undercoat layer 3 can be formed on the surface of the base material layer 2. The undercoat layer is preferably a layer formed of an epoxy (meth)acrylate-based compound or a urethane (meth)acrylate-based compound.

The undercoat layer 3 is preferably a layer obtained by curing at least one selected from an epoxy (meth)acrylate-based compound and a urethane (meth)acrylate-based compound.

Examples of the epoxy (meth)acrylate-based compound include compounds obtained by reacting epoxy compounds such as bisphenol A type epoxy compounds, bisphenol F type epoxy compounds, bisphenol S type epoxy compounds, phenol novolak type epoxy compounds, cresol novolak type epoxy compounds, and aliphatic epoxy compounds, with acrylic acid or methacrylic acid, and examples thereof include an acid-modified epoxy (meth)acrylate obtained by reacting the epoxy compound above with a carboxylic acid or an anhydride thereof. These epoxy(meth)acrylate-based compounds are coated on the surface of the base material layer together with a photopolymerization initiator and, if necessary, another photopolymerization initiator or a diluent formed of a thermally reactive monomer, after which an undercoat layer is formed by a crosslinking reaction through irradiation with ultraviolet light or the like.

Examples of the urethane (meth)acrylate-based compound include compounds obtained by acrylating an oligomer (also referred to below as a polyurethane-based oligomer) formed of a polyol compound and a polyisocyanate compound, and the like.

It is possible to obtain the polyurethane-based oligomer from a condensation product of a polyisocyanate compound and a polyol compound. Specific examples of the polyisocyanate compound include methylene-bis (p-phenylene diisocyanate), an adduct of hexamethylene diisocyanate hexanetriol, hexamethylene diisocyanate, tolylene diisocyanate, an adduct of tolylene diisocyanate trimethylolpropane, 1,5-naphthylene diisocyanate, thiopropyl diisocyanate, ethylbenzene-2,4-diisocyanate, 2,4-tolylene diisocyanate dimer, hydrogenated xylylene diisocyanate, tris (4-phenylisocyanate) thiophosphate, and the like, in addition, specific polyol compounds include polyether-based polyols such as polyoxytetramethylene glycol, polyester-based polyols such as polyadipate polyols and polycarbonate polyol, copolymers of acrylate esters and hydroxyethyl methacrylate, and the like. Examples of the monomer forming the acrylate include monomers such as methyl (meth)acrylate, ethyl (meth)acrylate, butyl (meth)acrylate, 2-ethylhexyl (meth)acrylate, methoxyethyl (meth)acrylate, butoxyethyl (meth)acrylate, phenyl (meth)acrylate, and the like.

These epoxy(meth)acrylate-based compounds and urethane (meth)acrylate-based compounds are used in combination, if necessary. In addition, examples of methods of polymerizing the above include various known methods, specifically, methods of irradiation with energy rays including ionizing radiation, heating, or the like.

In the case where the undercoat layer is formed by curing with ultraviolet rays, acetophenones, benzophenones, Michler's benzoyl benzoate, α-amyloxime ester, thioxanthones, or the like are preferably used as a photopolymerization initiator and, in addition, n-butylamine, triethylamine, tri n-butylphosphine, and the like are preferably mixed and used as a photosensitizer. In addition, in the first embodiment, an epoxy (meth)acrylate compound and a urethane (meth)acrylate compound may also be used in combination.

In addition, these epoxy(meth)acrylate-based compounds and urethane (meth)acrylate-based compounds are diluted with (meth)acrylic-based monomers. Examples of such (meth)acrylic-based monomers include methyl (meth)acrylate, ethyl (meth)acrylate, butyl (meth)acrylate, 2-ethylhexyl (meth)acrylate, methoxyethyl (meth)acrylate, butoxyethyl (meth)acrylate, phenyl (meth)acrylate, and, as multi-functional monomers, trimethylolpropane tri(meth)acrylate, hexanediol (meth)acrylate, tripropylene glycol di(meth) acrylate, diethylene glycol di(meth)acrylate, pentaerythritol tri(meth)acrylate, dipentaerythritol hexa(meth)acrylate, 1,6-hexanediol di(meth)acrylate, neopentyl glycol di(meth)acrylate, and the like.

Among the above, in a case where the urethane (meth) acrylate-based compound is used as the undercoat layer, the oxygen gas barrier properties of the obtained gas barrier laminate 8 are further improved.

The thickness of the undercoat layer of the first embodiment is usually in a range of 0.01 to 100 g/m$^2$, preferably 0.05 to 50 g/m$^2$, as the coating amount.

(Adhesive Layer)

In addition, an adhesive layer 6 may be provided on the gas barrier layer 5. The adhesive layer 6 is a layer including any known adhesive. Examples of the adhesive include laminated adhesives formed of an organic titanium-based resin, a polyethyleneimine-based resin, a urethane-based resin, an epoxy-based resin, an acrylic-based resin, a polyester-based resin, an oxazoline group containing resin, a modified silicone resin, an alkyl titanate, a polyester-based polybutadiene, and the like, or a one-component type or two-component type polyols and polyvalent isocyanates, aqueous urethane, ionomers, and the like. Alternatively, an aqueous adhesive mainly composed of an acrylic-based resin, a vinyl acetate-based resin, a urethane-based resin, a polyester resin, or the like may be used.

In addition, other additives such as a curing agent and a silane coupling agent may be added to the adhesive depending on the application of the gas barrier laminate 8. In a case where the gas barrier laminate is used for hot water treatment such as retorting, from the viewpoint of heat resistance and water resistance, a dry lamination adhesive represented by a polyurethane-based adhesive is preferable, and a solvent-based two-component curing type polyurethane-based adhesive is more preferable.

The gas barrier laminate 8 according to the first embodiment has excellent gas barrier performance after retorting and can be suitably used as packaging materials, food packaging materials for contents requiring particularly high gas barrier properties, and various packaging materials for medical applications, industrial applications, common miscellaneous goods applications, and the like.

In addition, the gas barrier laminate 8 of the first embodiment can be suitably used, for example, as a film for vacuum insulation; a sealing film for sealing electroluminescence devices, solar cells, or the like, for which high barrier performance is required.

Second Embodiment

FIG. 5 is a cross-sectional view schematically showing an example of a configuration of a gas barrier laminate according to a second embodiment.

A gas barrier laminate 100 includes a base material layer 101, a gas barrier layer 103 that is provided on at least one surface of the base material layer 101, and an inorganic material layer 102 that is provided between the base material layer 101 and the gas barrier layer 103.

In a case where the gas barrier layer 103 is subjected to time-of-flight secondary ion mass spectrometry (TOF-SIMS) analysis, when a mass peak intensity of $PO_2^-$ is denoted by $I(PO_2^-)$, a mass peak intensity of $PO_3^-$ is denoted by $I(PO_3^-)$, and a mass peak intensity of $C_3H_3O_2^-$ is denoted by $I(C_3H_3O_2^-)$, a value of $\{I(PO_2^-)+I(PO_3^-)\}/I(C_3H_3O_2^-)$ is 0.02 to 5, and preferably 0.05 to 3.

In addition, the gas barrier layer 103 includes one or two or more metal elements selected from the group consisting of Zn, Ca, Mg, Ba, and Al, and the composition ratio of the metal element in the gas barrier layer 103, which is obtained by subjecting the gas barrier layer 103 to X-ray photoelectron spectroscopy analysis, is 1 to 15 atomic % and preferably 1.5 to 12 atomic %.

The fact that the value of $\{I(PO_2^-)+I(PO_3^-)\}/I(C_3H_3O_2^-)$ is 0.02 to 5 and the fact that the composition ratio of the metal element in the gas barrier layer 103 is 1 to 15 atomic % have the following meaning.

The detection of $PO_2^-$ or $PO_3^-$ from the gas barrier layer 103 by the mass spectrometry analysis means that the gas barrier layer 103 includes a phosphorus compound, a typical example of which is phosphoric acid. In addition, it is considered that the value of $I(PO_2^-)+I(PO_3)$ is a value correlated with the amount (concentration) of the phosphorus compound in the gas barrier layer 103.

In addition, the detection of $C_3H_3O_2^-$ from the gas barrier layer 103 by the mass spectrometry analysis means that the gas barrier layer 103 includes a polycarboxylic acid of polyacrylic acid or a derivative/similar compound thereof (polyacrylic acid or the like). In addition, it is considered that the value of $I(C_3H_3O_2^-)$ is a value correlated with the amount (concentration) of the carboxyl group of the polycarboxylic acid included in the gas barrier layer 103.

According to the findings and studies of the present inventors, the phosphorus compound, a typical example of which is phosphoric acid, can interact with a polyvalent metal such as Zn, Ca, Mg, Ba, or Al to form a phosphate-polyvalent metal bond in the gas barrier layer 103. Although the details are unknown, since the phosphate-polyvalent metal bond is a bond that is not easily cleaved by hydration, it is considered that the bond has resistance to a retort treatment or the like, and good gas barrier properties can be obtained even after a retort treatment due to the presence of the phosphate-polyvalent metal bond.

The fact that the value of $\{I(PO_2)+I(PO_3^-)\}/I(C_3H_3O_2^-)$ is 0.02 to 5 means that a relatively sufficient amount of the phosphorus compound is included in the gas barrier layer 103 with respect to the polycarboxylic acid or the like.

In addition, the fact that the composition ratio of the metal element in the gas barrier layer 103 is 1 to 15 atomic % means that the gas barrier layer 103 includes an appropriate amount of a polyvalent metal that is crosslinked with phosphoric acid or the like.

That is, the fact that the value of $\{I(PO_2^-)+I(PO_3^-)\}/I(C_3H_3O_2^-)$ in the gas barrier layer 103 is 0.02 to 5 and the composition ratio of the above-described metal element in the gas barrier layer 103 is 1 to 15 atomic % corresponds to the fact that a sufficient amount of the phosphoric acid-polyvalent metal bonds (resistant to a retort treatment or the like) are present in the gas barrier layer 103.

Incidentally, according to the findings of the present inventors, it is considered that, in a case where the gas barrier layer 103 includes any one or more metal elements of Zn, Ca, Mg, Ba, and Al, a crosslinked structure such as —COO . . . M . . . OOC— that can be formed between the carboxy group in the polyacrylic acid or the like and the metal element is introduced into the gas barrier layer 103. It is considered that the barrier properties are further enhanced by the barrier layer 103 including such a crosslinked structure.

For the sake of caution, the "composition ratio of Zn, Ca, Mg, Ba, and Al in the gas barrier layer 103" represents a total ratio thereof in a case where the gas barrier layer 103 includes a plurality of types of metal elements.

The analysis of the gas barrier layer 103 by TOF-SIMS will be supplemented.

In order to analyze the inside of the gas barrier layer 103, it is preferable that sputter etching is performed on the surface layer of the gas barrier layer 103 with an Ar-gas cluster ion beam (Ar-GCIB) attached to the TOF-SIMS analyzing device before the analysis to expose the inside of the gas barrier layer 103. The use of the Ar-GCIB reduces the damage to the gas barrier layer 103 due to etching.

An example of specific conditions of the Ar-GCIB etching is shown.

GCIB output: 5 kV, 5 μA

GCIB treatment time: time point at which the spectrum pattern of TOF-SIMS no longer changes.

In addition, an example of specific conditions of the TOF-SIMS analysis will be shown.

Analyzing device: PHI NaNo TOF II manufactured by ULVAC-PHI, Inc.

Primary ion: $Bi3^{++}$

Primary ion source output: 30 kV, 0.5 μA

Analysis region: 300×300 μm (as a scanning region of the primary ion beam)

During the analysis, charge neutralization is performed by irradiation with low energy electron beams and low energy Ar ions attached to the device.

A method for analyzing the data obtained by TOF-SIMS will be described.

In order to perform detailed mass spectral analysis, it is preferable that for each of positive and negative secondary ions, a raw data sequence in which mass numbers $m_i$ and counts $c_i$ corresponding to the mass numbers $m_i$ are paired, and Total Ion Counts ($C_T$) are acquired by the analysis device. Here, i=0, 1, . . . , N. It is assumed that the raw data sequence is arranged in ascending order with respect to $m_i$. $C_T$ is the total counts of the secondary ions detected by the detector.

A range of the mass numbers around the mass spectral peak of interest is set to $i=N_1, N_1+1, \ldots, N_2$. The data $c_i$ of the counts in this range obtained by the analysis is approximated by $y_i$ as shown in the following equation. Specifically, a background level $b^0$ and the $c_i$ are approximated by curve fitting using K triangular functions $Y_j(m_i)$ $$y_i = b^0 + \sum_{j=1}^{K} Y_j(m_i) \quad \text{[Equation 4]}$$

In the above equation, $b^0$ is a constant. $Y_j(m_i)$ is a function (triangular function) having a peak value $Y^0_j$ in a case of a mass number $x^0_j$, as shown in FIG. 7, and is represented by the following equation.

$$Y_j(m_i) = \begin{cases} 0 & m_i \le x_j^0 - B_j^- \\ \frac{Y_j^0}{B_j^-}(m_i - x_j^0) + Y_j^0 & x_j^0 - B_j^- < m_i \le x_j^0 \\ -\frac{Y_j^0}{B_j^+}(m_i - x_j^0) + Y_j^0 & x_j^0 < m_i \le x_j^0 + B_j^+ \\ 0 & x_j^0 + B_j^+ < m_i \end{cases} \quad \text{[Equation 5]}$$

The half-value width of the triangular function $Y_j(m_i)$ is $(B^-_j+B^+_j)/2$.

$b^0$, $x^0_j$, $Y^0_j$, $B^-_j$, and $B^+_j$ are the fitting parameters. j is j=1, . . . , K.

For example, in a case where the background of the spectrum is not a constant value and changes linearly with respect to $m_i$, the background is approximated by combining $b^0$ and the triangular function $Y_j(m_i)$.

In a case where the mass spectral peak of interest is a single peak, the background is removed, and approximation is performed with one triangular function. In a case where the mass spectral peak of interest is close to other mass peaks, approximation is performed with a plurality of triangular functions including the other mass peaks.

When the approximated mass spectral peak of interest is set to a j=k-th peak among the K triangular functions, the peak intensity I is expressed as a numerical value obtained by normalizing the sum of $Y_k(m_i)$ from $i=N_1, \ldots, N_2$ with the Total Ion Counts ($C_T$), and is obtained from the following equation.

$$I = \frac{\sum_{i=n_1}^{n_2} Y_k(m_i)}{C_T} \quad \text{[Equation 6]}$$

When a tail portion is present in the mass spectral peak, it is difficult to define the range of the mass number to be counted. Therefore, in the above, in order to avoid this, the mass spectral peak is approximated by a triangular function. Due to this, the counts in the tail portion of the mass spectral peak are ignored. It is assumed that the central portion of the mass spectral peak is subjected to curve fitting to match the triangular function.

The mass number of the fragment of interest in the second embodiment is calculated and shown below. The atomic mass numbers of isotopes are based on https://physics.nist.gov/.

TABLE 3

| Isotope | Atomic mass | Number of atoms PO$_2$ | PO$_3$ | C$_3$H$_3$O$_2$ | CN |
|---|---|---|---|---|---|
| $^1$H | 1.007825 | | | 3 | |
| $^{12}$C | 12 | | | 3 | 1 |
| $^{14}$N | 14.003074 | | | | 1 |
| $^{16}$O | 15.994915 | 2 | 3 | 2 | |
| $^{31}$P | 30.973762 | 1 | 1 | | |
| Mass number | | 62.96359 | 78.95851 | 71.01331 | 26.00307 |

The calculation of the mass peak intensity of the fragment of interest in the second embodiment will be supplemented.

(Calculation of Mass Peak Intensity of $PO_2^-$)

Focusing on a mass number range of 62.5 to 63.3 in the negative secondary ion spectrum, the sum of the counts is calculated from the triangular function approximating the mass peak in the vicinity of 62.964 corresponding to $^{31}P^{16}O_2^-$ and the data of $m_i$, and a value normalized by $C_T$ is defined as the mass peak intensity $I(PO_2^-)$ of $PO_2^-$.

An example of curve fitting is shown in FIG. 8, and the calculation results of the parameters used in this case and the total counts are shown in the table below. The sum of the counts obtained from the triangular function approximating the mass peak shape of the target $PO_2^-$ and the data of $m_i$ is 436. At this time, the Total Ion Counts ($C_T$) of the negative secondary ions is 6838528, and thus the mass peak intensity $I(PO_2^-)$ of $PO_2^-$ is as follows.

$$I(PO_2^-)=436/6838528=5.48\times10^{-5}$$

TABLE 4

| J | $b^0$ | $Y_j(m_i)$ 0 | 1 (=target) |
|---|---|---|---|
| $b^0$ | 3 | | |
| $x^0$ | | 63.025 | 62.964 |
| $B^+$ | | 0.06 | 0.012 |
| $B^-$ | | 0.06 | 0.012 |
| $Y^0$ | | 12 | 28 |
| Sum | 1533 | 934 | 436 |

A supplementary description will be given with respect to FIG. 8 showing an example of curve fitting.

(i) In order to obtain an approximation curve $y_i$ that reproduces the measurement data $c_i$ in the vicinity of a target peak position, the "background $b^0$", the curve of "triangular function approximation of other components" and the curve of "target triangular function $Y_j(m_i)$" are required.

(ii) In the example of FIG. 8, in order to obtain the "approximation curve $y_i$" that reproduces the measurement data $c_i$ in the vicinity of a mass number (m/z) of 62.94 to 62.98, the "background $b^0$", the curve of the "target triangular function $Y_j(m_i)$" (j=1 in Table 2), and the curve of "triangular function approximations of other components" (j=0 in Table 2) are used.

(iii) The reason why the large peak in the vicinity of m/z of 63 to 63.05 is not approximated by the triangular function is that the large peak does not clearly overlap the target peak component.

(Calculation of Mass Peak Intensity of $PO_3^-$)

Focusing on a mass number range of 78.5 to 79.3 in the negative secondary ion spectrum, the sum of the counts is calculated from the triangular function approximating the mass peak in the vicinity of 78.959 corresponding to $^{31}P^{16}O_3^-$ and the data of $m_i$, and a value normalized by $C_T$ is defined as the mass peak intensity $I(PO_3^-$ of $PO_3^-$.

(Calculation of Mass Peak Intensity of $C_3H_3O_2^-$)

Focusing on a mass number range of 70.7 to 71.4 in the negative secondary ion spectrum, the sum of the counts is calculated from the triangular function $Y_k(m_i)$ approximating the mass peak in the vicinity of 71.013 corresponding to $^{12}C_3{}^1H_3{}^{16}O_2^-$ obtained by curve fitting and the data of $m_i$, and a value normalized by $C_T$ is defined as the mass peak intensity $I(C_3H_3O_2^-)$ of $C_3H_3O_2^-$.

(Calculation of Mass Peak Intensity of $CN^-$)

Focusing on a mass number range of 70.7 to 71.4 in the negative secondary ion spectrum, the sum of the counts is calculated from a triangular function $Y_k(m_i)$ approximating a mass peak in the vicinity of 26.003 corresponding to $^{12}C^{14}N^-$ obtained by curve fitting and the data of $m_i$, and a value normalized by $C_T$ is defined as a mass peak intensity $I(CN^-)$ of $CN^-$.

The analysis of the gas barrier layer 103 by X-ray photoelectron spectroscopy will be supplemented.

An example of specific conditions for the analysis will be described.

Analyzing device: AXIS-NOVA manufactured by KRATOS Analytical Limited

X-ray source: monochromatized Al-Kα

X-ray source output: 15 kV, 10 mA

Analysis region: 300×700 μm

Neutralizing electron gun used for charge correction during analysis

In order to analyze the inside of the gas barrier layer 103, it is desirable to perform sputter etching on the surface layer of the gas barrier layer before the analysis. However, in order to reduce damage to the gas barrier layer due to etching, etching with an Ar-gas cluster ion beam source is desirable.

The detected elements are specified by wide scanning, and the spectrum for each element is acquired by narrow scanning. Then, the background obtained by the Shirley method is removed from the obtained spectrum, and the atomic composition ratio (atomic %) of the detected element is calculated from the obtained peak area by using a relative sensitivity coefficient method.

In addition, the detection sensitivity of the atomic composition ratio in general XPS analysis is set to about 0.1 atomic %. For example, in a case where a trace amount of a phosphorus compound is added to the gas barrier layer, the XPS analysis may not be able to detect the content of P.

From another viewpoint, it is preferable that the gas barrier layer 103 includes a relatively large amount of carboxylate structures (and as a result, the amount of free carboxy groups is small). This means that the gas barrier layer 103 includes, for example, a certain amount of metal-carboxy group crosslinked structures. When the gas barrier layer 103 includes a relatively large amount of carboxylate structures, the gas barrier properties can be further enhanced.

Specifically, in the absorption spectrum of the gas barrier layer 103 obtained by infrared spectroscopic measurement according to a total reflection measurement method, when the total peak area in a range of an absorption band of equal to or more than 1493 $cm^{-1}$ and equal to or less than 1780 $cm^{-1}$ is denoted by A and the total peak area in a range of an absorption band of equal to or more than 1493 $cm^{-1}$ and equal to or less than 1598 $cm^{-1}$ is denoted by D, an area ratio D/A is preferably 0.5 or more, more preferably 0.58 or more, and still more preferably 0.6 or more. The upper limit value of D/A is, for example, 0.8 or less.

According to the past findings of infrared spectroscopy or the findings of the present inventors, the D/A can be used as an index of the amount of the carboxylate structure included in the gas barrier layer 103, since the absorption based on νC═O of the free carboxylic acid is in the vicinity of 1700 $cm^{-1}$ and the absorption based on ν(C═O) of the carboxylate is in the vicinity of 1540 to 1560 $cm^{-1}$. Incidentally, as described later, in a case where the polyamine is included in the gas barrier layer 103, the absorption based on ν(C═O) of the amide bond may be observed in the vicinity of 1630 to 1685 $cm^{-1}$.

Specifically, the infrared spectroscopic measurement by the total reflection measurement method can be performed as follows.

First, a sample for measurement of 1 cm×3 cm is cut out from the gas barrier layer 103.

Next, the infrared absorption spectrum of the surface of the gas barrier layer 103 is obtained by infrared total reflection measurement (ATR method).

From the obtained infrared absorption spectrum, the measurement point at 1493 $cm^{-1}$ and the measurement point at 1780 $cm^{-1}$ are connected with a straight line (baseline: N) and the difference spectrum between the obtained infrared absorption spectrum and N is obtained and set as a spectrum ($S_{BN}$). However, in a case where the thickness of the gas barrier layer 103 is approximately 0.5 μm or less, the measured infrared absorption spectrum includes the influence of the lower layer below the gas barrier layer.

In such a case, a base material formed of only the lower layer without the gas barrier layer is also prepared as a measurement sample, the ATR-IR spectrum of the base material surface is obtained in the same manner, and the difference spectrum from the baseline N is obtained and set as a spectrum ($S_{SN}$). In a case where a clear absorption peak is exhibited in a wavenumber range of 1493 $cm^{-1}$ to 1780 $cm^{-1}$, a difference spectrum analysis is performed according to the following equation to obtain a spectrum ($S_{BN}'$) excluding the influence of the base material.

$$\langle\text{Spectrum } (S_{BN}')\rangle=\langle\text{Spectrum } (S_{BN})\rangle-\alpha*\langle\text{Spectrum } (S_{SN})\rangle$$

Here, α is a coefficient to exclude the influence of the base material and is $0\leq\alpha<1$.

In the obtained difference spectrum ($S_{BN}'$), the area of the spectrum in a wavenumber range of 1493 $cm^{-1}$ to 1780 $cm^{-1}$ is set as a total peak area A, and the area of the spectrum in a wavenumber range of 1493 $cm^{-1}$ to 1598 $cm^{-1}$ is set as a total peak area D.

Here, as a specific example, a method for determining the coefficient α for excluding the influence of the base material formed of the base material layer, the inorganic layer, and the like in a case where the base material layer is a polyethylene terephthalate (PET) film will be supplemented.

Since PET has a large absorption peak in the vicinity of 1700 $cm^{-1}$, the PET affects the calculation of the peak area in the wavenumber range of 1493 $cm^{-1}$ to 1780 $cm^{-1}$. In order to eliminate this influence, a general difference spectral analysis method is used. For example, an absorption peak in the vicinity of 1340 $cm^{-1}$ is selected as a sharp absorption peak of PET, which is adjacent to a wavenumber range of 1493 $cm^{-1}$ to 1780 $cm^{-1}$ and does not overlap with the absorption peak of the gas barrier layer, and the absorption peak is set as a reference peak. In the spectrum ($S_{BN}'$) obtained by the above-described difference spectrum analysis, the coefficient α is adjusted such that the reference peak in the vicinity of 1340 $cm^{-1}$ is not present, and thus a spectrum ($S_{BN}'$) in which the influence of the absorption peak of the PET in the vicinity of 1700 $cm^{-1}$ is removed can be obtained.

In addition, the coefficient α can also be obtained as an area ratio of the infrared absorption spectra as follows.

For the infrared absorption spectrum measured from the surface of the gas barrier layer and the infrared absorption spectrum of the base material formed only of the lower layer without the gas barrier layer, the measurement point at 1325 $cm^{-1}$ and the measurement point at 1355 $cm^{-1}$ are connected by a straight line (baseline: M), and a difference spectrum between the obtained infrared absorption spectrum and the baseline M in a wavenumber range of 1325 $cm^{-1}$ to 1355 $cm^{-1}$ is obtained, and a spectrum ($S_{BM}$) and a spectrum ($S_{SM}$) are respectively obtained. When the peak areas of the spectrum ($S_{BM}$) and the spectrum ($S_{SM}$) in a range of equal to or more than 1325 $cm^{-1}$ and equal to or less than 1355 $cm^{-1}$ are respectively set as an area ($A_{BM}$) and an area ($A_{SM}$), a coefficient α is obtained from the following equation.

$$\alpha = A_{BM}/A_{SM}$$

It is possible to perform the measurement of the infrared absorption spectrum (infrared total reflection measurement: ATR method), for example, under the conditions of an incident angle of 45 degrees, room temperature, a resolution of 4 $cm^{-1}$, and a cumulative number of 100 times by mounting a PKM-GE-S (Germanium) crystal and using an IRT-5200 apparatus manufactured by JASCO Corporation.

FIG. 6 is a cross-sectional view schematically showing another configuration example of the gas barrier laminate.

The basic configuration of a gas barrier laminate 110 in FIG. 6 is the same as that of the gas barrier laminate 100 in FIG. 5, but is different in that the base material layer 101 and the inorganic material layer 102 are not in direct contact with each other, and an undercoat layer 104 provided between the base material layer 101 and the inorganic material layer 102 is further included.

In the gas barrier laminate 110, the same effect as the gas barrier laminate 100 can be obtained. In addition, in the gas barrier laminate 110, by providing the undercoat layer 104 between the base material layer 101 and the inorganic material layer 102, the adhesion between the base material layer 101 and the inorganic material layer 102 can be further improved.

The gas barrier laminate of the second embodiment can be produced by using an appropriate material in an appropriate amount and selecting an appropriate production method and production conditions. Although the details thereof will be described later, in terms of the formation of a crosslinked structure, it is preferable to appropriately set, for example, the production conditions (temperature and time of the heat treatment described later) when the gas barrier layer 103 is formed, in addition to the type and amount of materials.

Hereinafter, the layers which can be included in the gas barrier laminate will be specifically described.

(Gas Barrier Layer)

The gas barrier layer 103 is formed of, for example, a cured product of a mixture including a polycarboxylic acid such as polyacrylic acid, a polyamine compound, and a polyvalent metal compound. More specifically, the gas barrier layer 103 is a film (gas barrier film 10) formed of the above-described cured product.

More specifically, the gas barrier layer 103 can be obtained by applying the mixture (gas barrier coating material) before curing to a layer arranged immediately below the gas barrier layer 103 such as the inorganic material layer 102, and then drying and heat-treating the layer to cure the gas barrier coating material.

Hereinafter, components that can be included in the mixture (gas barrier coating material) before curing will be described. By appropriately selecting the type and amount of these components and providing the gas barrier layer 103, the gas barrier laminate of the second embodiment can be produced.

Polycarboxylic Acid

The polycarboxylic acid has two or more carboxy groups in the molecule. Specific examples thereof include homopolymers of α,β-unsaturated carboxylic acid such as (meth) acrylic acid, itaconic acid, fumaric acid, crotonic acid, cinnamic acid, 3-hexenoic acid, and 3-hexenedioic acid, or copolymers thereof. In addition, the polycarboxylic acid may be a copolymer of the α,β-unsaturated carboxylic acid described above and esters such as ethyl ester, olefins such as ethylene, or the like.

Among these, a homopolymer of acrylic acid, methacrylic acid, itaconic acid, fumaric acid, crotonic acid, and cinnamic acid or a copolymer thereof is preferable, one or two or more polymers selected from the group consisting of polyacrylic acid, polymethacrylic acid, and a copolymer of acrylic acid and methacrylic acid are more preferable, at least one polymer selected from polyacrylic acid and polymethacrylic acid is still more preferable, and at least one polymer selected from a homopolymer of acrylic acid or a homopolymer of methacrylic acid is even more preferable.

Here, in the second embodiment, polyacrylic acid includes both a homopolymer of acrylic acid and a copolymer of acrylic acid and another monomer. In a case of a copolymer of acrylic acid and another monomer, the polyacrylic acid usually includes constituent units which are derived from acrylic acid at 90% by mass or more, preferably 95% by mass or more, and more preferably 99% by mass or more in 100% by mass of the polymer.

In addition, in the second embodiment, polymethacrylic acid includes both a homopolymer of methacrylic acid and a copolymer of methacrylic acid and another monomer. In a case of a copolymer of methacrylic acid and another monomer, the polymethacrylic acid usually includes constituent units which are derived from methacrylic acid at 90% by mass or more, preferably 95% by mass or more, and more preferably 99% by mass or more in 100% by mass of the polymer.

The polycarboxylic acid is a polymer where carboxylic acid monomers are polymerized. From the viewpoint of excellent balance between gas barrier properties and handleability, the molecular weight of the polycarboxylic acid is preferably 500 to 2,500,000, more preferably 5,000 to 2,000,000, still more preferably 10,000 to 1,500,000, and even more preferably 100,000 to 1,200,000.

Here, in the second embodiment, the molecular weight of the polycarboxylic acid is the polyethylene oxide conversion weight average molecular weight and is measurable using gel permeation chromatography (GPC).

At least a part of the polycarboxylic acid may be neutralized by a volatile base. By neutralizing the polycarboxylic acid with a volatile base, it is possible to suppress gelation from occurring by neutralizing the polycarboxylic acid with the volatile base when mixing a polyvalent metal compound or a polyamine compound and polycarboxylic acid. Accordingly, in the polycarboxylic acid, from the viewpoint of prevention of gelation, a volatile base is preferably used for the partially neutralized product or completely neutralized product of the carboxy group. It is possible to obtain the neutralized product by partially or completely neutralizing the carboxy group of the polycarboxylic acid with a volatile base, that is, the carboxy group of the polycarboxylic acid is partially or completely made into carboxylate. Due to this, it is possible to prevent gelation when adding a polyamine compound and a polyvalent metal compound.

A partially neutralized product is prepared by adding a volatile base to an aqueous solution of polycarboxylic acid polymer and it is possible to set a desired neutralization degree by adjusting the ratio of the amounts of the polycarboxylic acid and the volatile base. In the second embodiment, from the viewpoint of sufficiently suppressing gelation caused by the neutralization reaction with the amino group of the polyamine compound, the neutralization degree of the polycarboxylic acid by the volatile base is preferably 70 to 300 equivalent %, more preferably 90 to 250 equivalent %, and still more preferably 100 to 200 equivalent %.

It is possible to use an arbitrary water-soluble base as a volatile base.

Examples of volatile bases include ammonia, morpholine, alkylamine, 2-dimethyl amino ethanol, N-methyl monopholine, ethylene diamine, and tertiary amines such as triethyl amine, an aqueous solution thereof or a mixture thereof. From the viewpoint of obtaining good gas barrier properties, an ammonia aqueous solution is preferable.

Polyamine Compound

The mixture before curing preferably contains a polyamine compound. The polyamine compound can react with the polycarboxylic acid to form a crosslinked structure (amide bond). Accordingly, the gas barrier properties can be further enhanced.

The polyamine compound is a compound having two or more amino groups in the main chain, side chain, or terminal, and is preferably a polymer. Specific examples thereof include aliphatic polyamines such as polyallylamine, polyvinylamine, polyethylenimine, and poly(trimethyleneimine); polyamides having amino groups on side chains such as polylysine and polyarginine; and the like. In addition, a polyamine where a portion of the amino group is modified may be used.

From the viewpoint of obtaining good gas barrier properties, the polyamine compound preferably includes polyethylenimine, and polyethyleneimine is more preferable.

From the viewpoint of excellent balance of gas barrier properties and handleability, the number average molecular weight of the polyamine compound is preferably 50 to 2,000,000, more preferably 100 to 1,000,000, still more preferably 1,500 to 500,000, yet more preferably 1,500 to 100,000, even more preferably 1,500 to 50,000, yet more preferably 3,500 to 20,000, yet still more preferably 5,000 to 15,000, and still even more preferably 7,000 to 12,000.

The molecular weight of the polyamine compound can be measured using a boiling point increasing method or a viscosity method.

From the viewpoint of further improving the gas barrier performance after the retort treatment, (number of moles of amino groups included in polyamine compound in the mixture)/(number of moles of —COO— groups included in polycarboxylic acid in the mixture) is preferably 0.20 or more, more preferably 0.25 or more, still more preferably 0.30 or more, even more preferably 0.35 or more, and still even more preferably 0.40 or more.

From the same viewpoint, (number of moles of amino groups included in the polyamine compound in the mixture)/(the number of moles of —COO— groups included in the polycarboxylic acid in the mixture) is preferably 0.90 or less, more preferably 0.85 or less, still more preferably 0.80 or less, even more preferably 0.75 or less, and still even more preferably 0.70 or less.

Details of the reason are not clear; however, it is considered that it is possible to the gas barrier layer 103 and a gas barrier laminate having excellent gas barrier performance after a retort treatment by forming a dense structure by amide crosslinking using amino groups which form a polyamine compound and metal crosslinking using polyvalent metals which form a salt of polycarboxylic acid and polyvalent metal in a well-balanced manner.

With regard to the polyamine compound, in a case where the gas barrier layer 103 is subjected to time-of-flight secondary ion mass spectrometry analysis, when a peak intensity of $CN^-$ is denoted by $I(CN^-)$ and a peak intensity of $C_3H_3O_2^-$ is denoted by $I(C_3H_3O_2^-)$, a value of $I(CN^-)/I(C_3H_3O_2^-)$ is 2 or less, preferably 1.8 or less, and more preferably 1.5 or less. The lower limit of the value of $I(CN^-)/I(C_3H_3O_2^-)$ is, for example, 0, preferably 0.2, and more preferably 0.4. The details of the time-of-flight secondary ion mass spectrometry analysis are as described above.

It is considered that $CN^-$ detected by the mass spectrometry analysis is derived from polyamine. Therefore, it is considered that the fact that the value of $I(CN^-)/I(C_3H_3O_2^-)$ is an appropriate numerical value corresponds to the above-described "forming a dense structure by amide crosslinking with amino groups which form a polyamine compound and metal crosslinking with polyvalent metals which form a salt of a polycarboxylic acid and a polyvalent metal".

Metal

As described above, the gas barrier layer 103 preferably includes one or two or more metal elements selected from the group consisting of Zn, Ca, Mg, Ba, and Al. Therefore, it is preferable that the mixture before curing includes a compound of these metals. Among these, in consideration of the application to the packaging of retort food, a Mg-containing compound and a Zn-containing compound are preferable, and a Zn-containing compound is more preferable.

Examples of the metal compound include an oxide, a hydroxide, a halide, a carbonate, a phosphate, a phosphite, a hypophosphite, a sulfate, and a sulfite of the above-described metal. From the viewpoint of water resistance, impurities, and the like, a metal oxide or a metal hydroxide is preferable.

As the metal compound that can be preferably used, one or two or more compounds selected from the group consisting of oxides such as magnesium oxide, calcium oxide, barium oxide, zinc oxide, and magnesium hydroxide, and hydroxides such as calcium hydroxide, barium hydroxide, and zinc hydroxide are preferable, at least one of zinc oxide and zinc hydroxide is more preferable, and zinc oxide is still more preferable.

In the second embodiment, from the viewpoint of further improving the gas barrier performance after the retort treatment, (number of moles of metal compound in the mixture)/(number of moles of —COO— groups included in the polycarboxylic acid in the mixture) is preferably 0.1 or more, more preferably 0.13 or more, still more preferably 0.15 or more, and even more preferably 0.18 or more.

From the same viewpoint, (number of moles of polyvalent metal compound in the mixture)/(number of moles of —COO— groups included in the polycarboxylic acid in the mixture) is preferably 0.80 or less, more preferably 0.70 or less, still more preferably 0.60 or less, even more preferably 0.55 or less, and still even more preferably 0.50 or less.

In the second embodiment, from the viewpoint of further improving the gas barrier performance after the retort treatment, (number of moles of metal compound in the mixture)/(number of moles of amino groups derived from the polyamine compound in the mixture) is preferably 0.25 or more, more preferably 0.35 or more, and still more preferably 0.40 or more.

From the same viewpoint, (number of moles of metal compound in the mixture)/(number of moles of amino groups derived from the polyamine compound in the mixture) is preferably 0.75 or less, more preferably 0.60 or less, and still more preferably 0.55 or less.

Phosphorus Compound or Salt Thereof

As described above, when the barrier layer 103 is subjected to mass spectrometry analysis, $PO_2^-$ and/or $PO_3^-$ is detected. In order to provide such a barrier layer 103, it is preferable that the mixture before curing includes a phosphorus compound or a salt thereof.

The phosphorus compound or the phosphorus compound in a salt thereof includes one or more —P—OH groups in the molecular structure. The phosphorus compound may be blended in the mixture as a salt.

From the viewpoint of further improving water vapor barrier properties after the retort treatment, the phosphorus compound preferably includes two or more —P—OH groups, and more preferably includes three or more —P—OH groups. In addition, from the viewpoint of productivity, the number of —P—OH groups in the phosphorus compound may be, for example, 10 or less.

Specific examples of the phosphorus compound include phosphoric acid, phosphorous acid, phosphonic acid, hypophosphorous acid, polyphosphoric acid, and derivatives thereof.

Specifically, the polyphosphoric acid has a structure in which two or more phosphoric acids are condensed in the molecular structure, and examples thereof include diphosphoric acid (pyrophosphoric acid), triphosphoric acid, and polyphosphoric acid with four or more condensed phosphoric acids.

Specific examples of the derivatives include esters of the above-described phosphorus compounds such as phosphorylated starch and phosphated crosslinked starch; halides such as chlorides; anhydrides such as tetraphosphorus decoxide; and compounds having a structure in which a hydrogen atom bonded to a phosphorus atom is substituted with an alkyl group, such as nitrilotris(methylenephosphonic acid) and N,N,N',N'-ethylenediaminetetrakis(methylenephosphonic acid).

From the viewpoint of further improving the balance between barrier properties and productivity, the phosphorus compound is one or two or more selected from the group consisting of phosphoric acid, phosphorous acid, hypophosphorous acid, polyphosphoric acid, phosphonic acid, and salts thereof, and more preferably at least one selected from the group consisting of phosphoric acid, phosphorous acid, phosphonic acid, and salts thereof.

In addition, specific examples of the salt of the phosphorus compound include salts of monovalent metals such as sodium and potassium, and ammonium salts. From the viewpoint of barrier properties, the salt of the phosphorus compound is preferably an ammonium salt.

In the second embodiment, from the viewpoint of improving the barrier properties, (number of moles of P atoms in the phosphorus compound or the phosphorus compound derived from the salt thereof in the mixture)/(number of moles of —COO— groups derived from the polycarboxylic acid in the mixture) is preferably 0.0005 or more, more preferably 0.001 or more, still more preferably 0.003 or more, and even more preferably 0.005 or more. In a phosphorus compound containing one P atom in the chemical formula, such as phosphoric acid, the number of moles of the P atom and the number of moles of the phosphorus compound have the same meaning.

In addition, from the viewpoint of barrier properties and productivity (stability of coating solution, uniformity/appearance of coating film), (number of moles of phosphorus compound or phosphorus compound derived from the salt thereof in the mixture)/(number of moles of —COO— groups derived from the polycarboxylic acid in the mixture) is preferably 0.3 or less, more preferably 0.1 or less, still more preferably 0.08 or less, and even more preferably 0.05 or less.

Other Components

The mixture before curing may include components other than the above-described components.

For example, the mixture preferably further includes a carbonic acid-based ammonium salt. The carbonic acid-based ammonium salt is added to bring the polyvalent metal compound into the form of a polyvalent metal ammonium carbonate complex to improve the solubility of the polyvalent metal compound and to prepare a uniform solution containing the polyvalent metal compound. When the mixture before curing includes a carbonic acid-based ammonium salt, the amount of the polyvalent metal compound dissolved can be increased, and as a result, the mixture in which the polyvalent metal compound is blended can be made more homogeneous.

Examples of the carbonic acid-based ammonium salt include ammonium carbonate, and ammonium hydrogencarbonate, and the like, and ammonium carbonate is preferable from the viewpoint that the component easily volatilizes and does not easily remain in the obtained gas barrier layer.

From the viewpoint of further improving the solubility of the polyvalent metal compound, (number of moles of carbonic acid-based ammonium salt in the mixture)/(number of moles of metal compound in the mixture) is preferably 0.05 or more, more preferably 0.10 or more, still more preferably 0.25 or more, even more preferably 0.50 or more, and particularly preferably 0.75 or more.

In addition, from the viewpoint of further improving the coatability as the gas barrier coating material, (number of moles of carbonic acid-based ammonium salt in the gas barrier coating material)/(number of moles of metal compound in the gas barrier coating material) is preferably 10.0 or less, more preferably 5.0 or less, still more preferably 2.0 or less, and even more preferably 1.5 or less.

In addition, the mixture before curing preferably further includes a surfactant from the viewpoint of suppressing the occurrence of cissing when the mixture is applied as a gas barrier coating material.

The addition amount of the surfactant is preferably 0.01% to 3% by mass, and more preferably 0.01% to 1% by mass, with respect to 100% by mass of the total solid content of the mixture.

Examples of the surfactant include an anionic surfactant, a non-ionic surfactant, a cationic surfactant, an amphoteric surfactant and the like, and, from the viewpoint of obtaining good coatability, non-ionic surfactant are preferable, and polyoxyethylene alkyl ethers are more preferable.

Examples of the non-ionic surfactants include polyoxyalkylene alkylaryl ethers, polyoxyalkylene alkyl ethers, polyoxyalkylene fatty acid esters, sorbitan fatty acid esters, silicone-based surfactants, acetylene alcohol-based surfactants, fluorine-containing surfactants, and the like.

Examples of the polyoxyalkylene alkyl aryl ethers include polyoxyethylene nonyl phenyl ether, polyoxyethylene octyl phenyl ether, polyoxyethylene dodecyl phenyl ether, and the like.

Examples of the polyoxyalkylene alkyl ethers include polyoxyethylene alkyl ethers such as polyoxyethylene oleyl ether and polyoxyethylene lauryl ether.

Examples of the polyoxyalkylene fatty acid esters include polyoxyethylene oleic acid esters, polyoxyethylene lauric acid esters, polyoxyethylene distearic acid esters, and the like.

Examples of sorbitan fatty acid esters include sorbitan laurate, sorbitan monostearate, sorbitan monooleate, sorbitan sesquioleate, polyoxyethylene monooleate, polyoxyethylene stearate, and the like.

Examples of silicone-based surfactants include dimethylpolysiloxane and the like.

Examples of acetylene alcohol-based surfactants include 2,4,7,9-tetramethyl-5-decyne-4,7-diol, 3,6-dimethyl-4-octyne-3,6-diol, 3,5-dimethyl-1-hexyn-3-ol, and the like.

Examples of fluorine-containing surfactants include fluorine alkyl ester and the like.

The mixture before curing may include additives other than the above-described components. For example, various additives such as lubricants, slip agents, anti-blocking agents, antistatic agents, anti-fogging agents, pigments, dyes, and inorganic or organic fillers may be included.

In addition, from the viewpoint of improving the coatability when the mixture is applied as a gas barrier coating material, the solid content concentration of the mixture before curing is preferably 0.5% to 15% by mass and more preferably 1% to 10% by mass.

Method for Producing Gas Barrier Layer

Specifically, the gas barrier layer 103 can be produced by applying the mixture (gas barrier coating material) before curing and curing the mixture.

The mixture can be obtained as follows.

First, a volatile base is appropriately added to the polycarboxylic acid to completely or partially neutralize the carboxy groups of the polycarboxylic acid. Further, a polyvalent metal salt compound and an appropriate carbonic acid-based ammonium salt are mixed with each other, and a metal salt is formed in all or some of the carboxy groups of the polycarboxylic acid neutralized with the volatile base and the carboxy groups of the polycarboxylic acid not neutralized with the volatile base.

Thereafter, a polyamine compound is further added, and finally a phosphorus compound or a salt thereof is added to obtain a mixture before curing. Therefore, a salt is formed between the phosphorus compound and the polyvalent metal compound or the amino group of the polyamine.

By mixing the polycarboxylic acid, the polyvalent metal salt compound, the phosphorus compound or a salt thereof, the appropriate carbonic acid-based ammonium salt, and the polyamine compound in such a procedure, the formation of agglomerates can be suppressed, and a more uniform mixture can be obtained. This makes it possible to more effectively advance the dehydration-condensation reaction between the —COO— group included in the polycarboxylic acid and the amino group included in the polyamine compound.

More specifically, the method is as follows. In the following, a case where a volatile base and a carbonic acid-based ammonium salt are blended in a mixture will be described as an example.

First, a completely or partially neutralized solution of carboxy groups which form the polycarboxylic acid is prepared.

A volatile base is added to the polycarboxylic acid and the carboxy groups of the polycarboxylic acid are completely neutralized or partially neutralized. By neutralizing the carboxy groups of the polycarboxylic acid, gelation which is caused by to the reaction of the carboxy groups which form the polycarboxylic acid, a polyvalent metal compound, and amino groups which form a polyamine compound when the polyvalent metal compound or the polyamine compound is added is effectively prevented, and a more uniform mixture can be obtained.

Subsequently, a polyvalent metal salt compound and a carbonic acid-based ammonium salt are added thereto and dissolved and a polyvalent metal salt with —COO— groups which form polycarboxylic acid is formed by the polyvalent metal ions which are produced. At this time, the —COO— groups which form a salt with the polyvalent metal ions refer to both carboxy groups which are not neutralized with the base and —COO— groups which are neutralized with a base described above. In a case of the —COO— groups which are neutralized with a base, polyvalent metal ions which are derived from the polyvalent metal compound described above are replaced and coordinated to form a polyvalent metal salt of a —COO— group.

Then, after the polyvalent metal salt is formed, a polyamine compound and a phosphorus compound or a salt thereof are further added to obtain a mixture. At this time, the polyvalent metal salt coordinated to the —COO— group is also coordinated to the —P—O— group in the phosphorus compound, and a —COO-polyvalent metal-O—P— structure is formed. In addition, an ionic bond is formed between the —$NH_2$ group in the polyamine and the —P—O— group in the phosphorus compound.

The mixture produced in this manner is applied onto the inorganic material layer 102 or an interlayer with the gas barrier layer 103 formed on the inorganic material layer 102 as a gas barrier coating material, and dried and cured to form the gas barrier layer 103. At this time, the polyvalent metal of the polyvalent metal salt of the —COO— groups which form the polycarboxylic acid forms metal crosslinking, amide crosslinking is formed by the amino group which forms the polyamine, and ionic crosslinking is formed between the —P—O— group in the phosphorus compound and the polyvalent metal or the amino group in the polyamine to obtain the gas barrier layer 103 having excellent gas barrier properties. A more detailed method for producing the gas barrier layer 103 will be described later.

From the viewpoint of improving the barrier properties, the thickness of the gas barrier layer 103 after drying and curing is preferably 0.01 μm or more, more preferably 0.05 μm or more, and still more preferably 0.1 μm or more.

In addition, from the viewpoint of reducing the thickness of the entire gas barrier laminate, the thickness of the gas barrier layer 103 after drying and curing is preferably 15 μm or less, more preferably 5 μm or less, and still more preferably 1 μm or less.

(Base Material Layer)

The base material layer 101 may be a single layer or a layer of two or more types. The shape of the base material layer 101 is not limited and examples thereof include a sheet or film shape, a tray, a cup, a hollow body, or the like.

The material of the base material layer 101 is not limited as long as the inorganic material layer 102 can be stably formed on the base material layer 101 and the solution of the gas barrier coating material can be applied to the upper part of the inorganic material layer 102, and any material can be used. Examples of the material of the base material layer 101 include a resin such as a thermosetting resin or a thermoplastic resin, or an organic material such as paper; an inorganic material such as glass, pottery, ceramics, silicon oxide, silicon nitride oxide, silicon nitride, cement, and metals such as aluminum, aluminum oxide, iron, copper, and stainless steel; and a base material layer having a multilayer structure formed of a combination of organic materials or a combination of an organic material and an inorganic material. Among these, for example, in a case of various film applications such as packaging materials and panels, a plastic film using at least one selected from the group consisting of a thermosetting resin and a thermoplastic resin, or an organic material such as paper is preferable.

As the thermosetting resin, a known thermosetting resin can be used. Examples of the thermosetting resin include known thermosetting resins such as epoxy resins, unsaturated polyester resins, phenolic resins, urea-melamine resins, polyurethane resins, silicone resins, and polyimides.

As the thermoplastic resin, a known thermoplastic resin can be used. Examples of thermoplastic resins include polyolefins (polyethylene, polypropylene, poly(4-methyl-1-pentene), poly(1-butene), and the like), polyesters (polyethylene terephthalate, polybutylene terephthalate, polyethylene naphthalate, and the like), polyamide (nylon-6, nylon-66, polymetaxylene adipamide, and the like), polyvinyl chloride, polyimide, ethylene vinyl acetate copolymer or saponified products thereof, polyvinyl alcohol, polyacrylonitrile, polycarbonate, polystyrene, ionomers, fluorine-based resins, or mixtures thereof.

Among these, from the viewpoint of improving transparency, one or two or more resins selected from the group consisting of polypropylene, polyethylene terephthalate (PET), polyethylene naphthalate, polyamide, polyimide, and polybutylene terephthalate are preferable.

In addition, from the viewpoint of excellent pinhole resistance, tearing resistance, heat resistance, and the like, one or two or more resins selected from the group consisting of polyamide, polyethylene terephthalate, and polybutylene terephthalate are preferable. From the same viewpoint, the base material layer 101 is preferably a layer including one or two or more resins selected from the group consisting of polyamide, polyethylene terephthalate, and polybutylene terephthalate, and more preferably a layer of one or two or more resins.

In addition, in a case where a hygroscopic material such as polyamide is used for the base material layer 101, in the gas barrier laminate, the base material layer 101 absorbs moisture and swells, and the gas barrier performance under high humidity, the gas barrier performance after a retort treatment, the gas barrier performance in a case of being filled with an acidic content, and the like are easily decreased. However, in the second embodiment, even in a case where a hygroscopic material is used as the base material layer 101, a decrease in the gas barrier performance of the gas barrier laminate under high humidity and the gas barrier performance after a retort treatment can be suitably suppressed.

In addition, the base material layer 101 may be obtained by stretching a film formed of a thermosetting resin or a thermoplastic resin in at least one direction, preferably in biaxial directions.

From the viewpoint of excellent transparency, rigidity, and heat resistance, the base material layer 101 is preferably a biaxially stretched film formed of one or two or more thermoplastic resins selected from the group consisting of polypropylene, polyethylene terephthalate, polyethylene naphthalate, polyamide, polyimide, and polybutylene terephthalate, and more preferably a biaxially stretched film formed of one or two or more thermoplastic resins selected from the group consisting of polyamide, polyethylene terephthalate, and polybutylene terephthalate.

In addition, the surface of the base material layer 101 may be coated with polyvinylidene chloride, polyvinyl alcohol, an ethylene-vinyl alcohol copolymer, an acrylic resin, a urethane-based resin, or the like.

Further, the base material layer 101 may be subjected to a surface treatment in order to improve adhesion to the gas barrier layer 103. Specifically, a surface activation treatment such as a corona treatment, a flame treatment, a plasma treatment, or a primer coating treatment may be performed on the surface of the base material layer 101 facing the gas barrier layer 103.

From the viewpoint of obtaining good film properties, the thickness of the base material layer 101 is preferably 1 μm or more, more preferably 5 μm or more, and still more preferably 10 μm or more, and is preferably 1000 μm or less, more preferably 500 μm or less, and still more preferably 300 μm or less.

(Undercoat Layer)

As described in FIG. 6, the undercoat layer 104 may be provided between the base material layer 101 and the inorganic material layer 102. By providing the undercoat layer 104, the adhesion can be further improved, and the barrier properties after a retort treatment can be further improved.

From the viewpoint of improving the adhesion between the base material layer 101 and the inorganic material layer 102, as the material of the undercoat layer 104, for example, one or two or more selected from the group consisting of polyurethane resin, polyester resin, oxazoline resin, and (meth)acrylic resin may be used.

Examples of the polyurethane resin include various polyurethane resins, polyurethane polyurea resins, and prepolymers thereof. Specific examples of such a urethane resin include a reactant of a diisocyanate component such as tolylene diisocyanate, xylene diisocyanate, diphenylmethane diisocyanate, hexamethylene diisocyanate, cyclohexane diisocyanate, isophorone diisocyanate, or dicyclohexyl diisocyanate, and a diol component such as ethylene glycol, propylene glycol, 1,4-butanediol, 1,6-hexanediol, neopentyl glycol, cyclohexanedimethanol, bisphenol, polyester diol, polyether diol, polycarbonate diol, or polyethylene glycol; a reactant of a urethane prepolymer having an isocyanate group at a terminal and an amino compound, an aminosulfonate, polyhydroxycarboxylic acid, or pyrosulfuric acid; and the like.

In addition, from the viewpoint of further improving the barrier properties after the retort treatment and the adhesion between the base material layer 101 and the inorganic material layer 102, it is also preferable that the undercoat layer 104 is formed of a polyurethane resin having an aromatic ring structure in the main chain. The polyurethane-based resin having an aromatic ring structure in the main chain can be obtained, for example, as a water-dispersible polyurethane resin by a reaction of a polyol, an organic polyisocyanate, and a chain extender. Therefore, an aromatic ring structure can be introduced into the main chain of the polyurethane-based resin.

As the polyurethane resin having an aromatic ring structure in the main chain, more specifically, those described in Japanese Unexamined Patent Publication No. 2018-171827 can be used.

In the polyurethane resin such as a water-dispersible polyurethane resin, a crosslinking agent may be used in combination for the purpose of improving heat resistance, water resistance, hydrolysis resistance, and the like. The crosslinking agent may be an external crosslinking agent which is a component different from the polyurethane resin, or may be an internal crosslinking agent that introduces a reactive site, which becomes a crosslinked structure, into the molecular structure of the polyurethane resin in advance.

As the crosslinking agent, a compound having an isocyanate group, an oxazoline group, a carbodiimide group, an epoxy group, a melamine resin, a silanol group, or the like can be suitably used, and a compound having a carbodiimide group is more suitable. In addition, in a case where a compound having a carbodiimide group is used as a crosslinking agent, the compound having a carbodiimide group is added in such an amount that the amount of the carbodiimide group is preferably 0.1 to 3.0 mol, more preferably 0.2 to 2.0 mol, and particularly preferably 0.3 to 1.0 mol with respect to 1.0 mol of the carboxyl groups in the polyurethane resin.

Examples of the polyester resin used in the undercoat layer 104 include various polyester resins and modified products thereof. Specific examples of such a polyester resin include reaction products of polycarboxylic acid components such as terephthalic acid, phthalic acid, isophthalic acid, trimellitic acid, pyromellitic acid, 2-sulfoisophthalic acid, 5-sulfoisophthalic acid, adipic acid, sebacic acid, succinic acid, and dodecanedioic acid with diol components such as ethylene glycol, propylene glycol, 1,4-butanediol, 1,6-hexanediol, neopentyl glycol, cyclohexane dimethanol, and bisphenol. Modified products such as acrylic resin, epoxy resin and the like are also included.

In a case where an oxazoline resin is used for the undercoat layer 104, the undercoat layer 104 is preferably formed of an oxazoline-based resin composition including an oxazoline group-containing aqueous polymer, an aqueous (meth)acrylic resin, and an aqueous polyester resin.

The oxazoline-based resin composition is formed of, for example, an oxazoline group-containing aqueous polymer having an oxazoline group content of 6.0 to 9.0 mmol/g, an aqueous (meth)acrylic resin having a carboxyl group content of 0.5 to 3.5 mmol/g, and an aqueous polyester resin having a carboxyl group content of 0.5 to 2.0 mmol/g.

In addition, the oxazoline-based resin composition contains, for example, 10% to 55% by mass of the oxazoline group-containing aqueous polymer, 10% to 80% by mass of the aqueous (meth)acrylic resin, and 10% to 80% by mass of the aqueous polyester resin (when the total amount of the oxazoline group-containing aqueous polymer, the aqueous (meth)acrylic resin, and aqueous polyester resin is 100% by mass).

In addition, in the oxazoline-based resin composition, for example, a ratio of the number of moles of oxazoline groups to the number of moles of carboxyl groups [represented by a ratio $(x/y)\times 100$ [mol %] of the number of moles of oxazoline groups (x mmol) to the number of moles of carboxyl groups (y mmol)] is 150 to 420 mol %.

As the oxazoline resin used in the undercoat layer 104, more specifically, those described in International Publication No. WO 2016/186074 can be used.

From the viewpoint of obtaining good adhesion, the thickness of the undercoat layer 104 is preferably 0.001 μm or more, more preferably 0.005 μm or more, still more preferably 0.01 μm or more, yet more preferably 0.05 μm or more, even more preferably 0.1 μm or more, and still even more preferably 0.2 μm or more.

In addition, from the viewpoint of cost saving, the thickness of the undercoat layer 104 is preferably 1.0 μm or less, more preferably 0.6 μm or less, still more preferably 0.5 μm or less, even more preferably 0.1 μm, and still even more preferably 0.05 μm or less.

(Inorganic Material Layer)

Examples of the inorganic material forming the inorganic material layer 102 include metals, metal oxides, metal nitrides, metal fluorides, metal oxynitrides, and the like which are able to form a thin film having barrier properties.

Examples of inorganic materials forming the inorganic material layer 102 include one type or two or more types selected from periodic table 2A elements such as beryllium, magnesium, calcium, strontium, and barium, periodic table transition elements such as titanium, zirconium, ruthenium, hafnium, and tantalum; periodic table 2B elements such as zinc; periodic table 3A elements such as aluminum, gallium, indium, and thallium; periodic table 4A elements such as silicon, germanium, and tin; periodic table 6A elements such as selenium and tellurium, and the like, and oxides, nitrides, fluorides, oxynitrides, and the like thereof (the group name of the periodic table is indicated by the old CAS formula).

Further, among the inorganic materials described above, one or two or more inorganic materials selected from the group consisting of silicon oxide, aluminum oxide, and aluminum is preferable, and aluminum oxide is more preferable due to being excellent in the balance of barrier properties, cost, and the like.

Note that, silicon oxide may contain silicon monoxide and silicon suboxide in addition to silicon dioxide.

The inorganic material layer 102 is formed of the inorganic material described above. The inorganic material layer 102 preferably includes an aluminum oxide layer formed of aluminum oxide due to being excellent in a balance of barrier properties, cost, and the like.

The inorganic material layer 102 may be formed of a single inorganic material layer or a plurality of inorganic material layers. In addition, in a case where the inorganic material layer 102 is formed of a plurality of inorganic material layers, the inorganic material layer may be formed of the same type of inorganic material layer or may be formed of different types of inorganic material layers.

The thickness of the inorganic material layer 102 is usually 1 nm or more and preferably 4 nm or more, and is usually 1000 nm or less and preferably 500 nm or less, from the viewpoint of balance between improvement of barrier properties and improvement of handleability.

Here, the thickness of the inorganic material layer 102 can be obtained from, for example, observation images taken by a transmission electron microscope or a scanning electron microscope.

The method of forming the inorganic material layer 102 is not limited and it is possible to form the inorganic material layer 102 on one surface or both surfaces of the base material layer 101 using, for example, a vacuum deposition method, an ion plating method, a sputtering method, a chemical vapor deposition method, a physical vapor deposition method, a chemical vapor deposition method (CVD method), a plasma CVD method, a sol-gel method, or the like. Among the above, film formation under reduced pressure such as a sputtering method, an ion plating method, a chemical vapor deposition method (CVD), a physical vapor deposition method (PVD), a plasma CVD method, or the like is desirable. Due to this, it is expected quickly reacting the chemically active molecular species containing silicon such as silicon nitride or silicon oxynitride will make it possible to improve the smoothness of the surface of the inorganic material layer 102 and to reduce the number of pores. In order to rapidly perform these bonding reactions, it is desirable that the inorganic atoms and compounds are chemically active molecular species or atomic species.

In addition, from the viewpoint of improving the balance between the barrier properties and the productivity of the gas barrier laminate, the inorganic material layer 102 is preferably a vapor deposition film.

From the viewpoint of improving the balance between the barrier properties and the productivity of the gas barrier laminate, the inorganic material layer 102 is a vapor deposition film provided on the base material layer 101 or, in a case where an interlayer is provided between the base material layer 101 and the inorganic material layer 102, on the interlayer, and is formed of one or two or more inorganic materials selected from the group consisting of silicon oxide, aluminum oxide, and aluminum.

(Sealant Layer)

From a practical viewpoint such as the production of retort food or the like, it is preferable that a sealant layer is provided over the surface of the gas barrier layer 103 opposite to the inorganic material layer 102.

The sealant layer is in contact with the gas barrier layer 103, or the gas barrier layer 103 and the sealant layer are bonded to each other by an adhesive layer. The adhesive layer will be described later.

Examples of the sealant layer include a layer formed of a resin composition including one or two or more polyolefins selected from a homopolymer or copolymer of an α-olefin such as ethylene, propylene, butene-1, hexene-1, 4-methyl-1-pentene, and octene-1, polyethylene such as high-density polyethylene, medium-density polyethylene, linear low-density polyethylene, and low-density polyethylene, homopolypropylene, a random copolymer of propylene and an α-olefin having 2 or 4 or more and 10 or less carbon atoms, and a low-crystalline or amorphous ethylene-propylene random copolymer, a layer formed of a resin composition including an ethylene-vinyl acetate copolymer (EVA), and a layer formed of a resin composition including EVA and a polyolefin.

Among these, from the viewpoint of heat sealability, it is preferable to include one or two or more thermoplastic resins selected from low-density polyethylene, linear low-density polyethylene, homopolypropylene, and a random copolymer of propylene and an α-olefin having 2 or 4 to 10 carbon atoms.

In addition, as the form of the thermoplastic resin, unstretched or stretched low-density polyethylene, linear low-density polyethylene (stretched LLDPE), random copolymer of propylene and an α-olefin having 2 or 4 or more and 10 or less carbon atoms, and the like are also preferable.

From the viewpoint of application to the production of retort food, the sealant layer preferably includes an unstretched polypropylene-based polymer. Examples of the polypropylene-based polymer include a propylene homopolymer and a random copolymer of propylene and an α-olefin having 2 or 4 or more and 10 or less carbon atoms.

The sealant layer may include components other than the thermoplastic resin. For example, additives such as an anti-fogging agent and an anti-blocking agent, and an adhesive resin such as a urethane-based resin, a urea-based resin, a melamine-based resin, an epoxy-based resin, and an alkyd-based resin may be included.

In addition, the sealant layer may be provided as an adhesive, and can be provided by drying and curing an adhesive including an adhesive resin such as an acrylic resin, a urethane-based resin, a urea-based resin, a melamine-based resin, an epoxy-based resin, or an alkyd-based resin.

The thickness of the sealant layer is preferably 10 to 100 μm, more preferably 15 to 80 μm, and still more preferably 20 to 60 μm. By setting the thickness to be in the above-described range, it is possible to obtain sufficient heat sealability and to improve the handleability of the film.

(Adhesive Layer)

The gas barrier laminate may further include an adhesive layer. Specifically, the gas barrier layer 103 and the above-described sealant layer may be bonded to each other by an adhesive layer.

The adhesive layer is a layer including any known adhesive. Examples of the adhesive include laminated adhesives formed of an organic titanium resin, a polyethylenimine resin, a urethane resin, an epoxy resin, an acrylic resin, a polyester resin, an oxazoline group containing resin, a modified silicone resin, an alkyl titanate, a polyester polybutadiene, and the like, or a one-component type or two-component type polyols and polyvalent isocyanates, aqueous urethane, ionomers, and the like. Alternatively, an aqueous adhesive mainly formed of an acrylic resin, a vinyl acetate resin, a urethane resin, a polyester resin, or the like may be used.

In addition, other additives such as a curing agent and a silane coupling agent may be added to the adhesive depending on the application of the gas barrier laminate. In a case where the gas barrier laminate is used for hot water treatment such as retorting, from the viewpoint of heat resistance and water resistance, a dry lamination adhesive represented by a polyurethane adhesive is preferable, and a solvent two-component curing type polyurethane-based adhesive is more preferable.

(Polyamide-Containing Layer)

A polyamide-containing layer (for example, a nylon layer) may be provided or may not be provided between the gas barrier layer 103 and the sealant layer. By providing the polyamide-containing layer, the strength of the film itself can be improved. For example, the package is not easily broken during falling.

The polyamide-containing layer can include, for example, one or more of nylon-6, nylon-66, polymetaxylene adipamide, and the like.

In a case where the polyamide-containing layer is provided, the thickness thereof is preferably 8 to 100 μm, more preferably 10 to 50 μm, and particularly preferably 13 to 30 μm.

(Method for Producing Gas Barrier Laminate)

In the second embodiment, a method for producing the gas barrier laminate 100 can include a step of preparing a base material layer 101, a step of forming an inorganic material layer 102 on the base material layer 101, and a step of forming a gas barrier layer 103 on an upper part of the base material layer 101 on which the inorganic material layer 102 is formed.

The method may further include a step of forming an undercoat layer 104 on the inorganic material layer 102 after the step of forming the inorganic material layer 102 and before the step of forming the gas barrier layer 103.

The step of forming the inorganic material layer 102 on the base material layer 101 is as described above as the method for forming the inorganic material layer 102.

The step of forming the gas barrier layer 103 includes, for example, a step of applying a mixture before curing as a gas barrier coating material onto the inorganic material layer 102 and then drying the mixture to obtain a coating layer, and a step of heating the coating layer and carrying out a dehydration condensation reaction between a carboxyl group included in a polycarboxylic acid and an amino group included in a polyamine compound to form the gas barrier layer 103 having an amide bond.

The method for applying the gas barrier coating material to the inorganic material layer 102 is not limited, and a known method can be used. Examples thereof include methods for coating using known coating machines such as Mayer bar coaters, air knife coaters, gravure coaters such as direct gravure coaters, gravure offset, arc gravure coaters, gravure reverse and jet nozzle method coaters, reverse roll coaters such as top feed reverse coaters, bottom feed reverse coaters, and nozzle feed reverse coaters, five roll coaters, lip coaters, bar coaters, bar reverse coaters, and die coaters.

From the viewpoint of further improving the barrier performance of the obtained gas barrier laminate, the coating amount (wet thickness) is preferably 0.05 μm and more preferably 1 μm or more.

In addition, from the viewpoint of suppressing curling of the obtained gas barrier laminate and the viewpoint of more effectively advancing the dehydration condensation reaction between the —COO— group included in the polycarboxylic acid and the amino group included in the polyamine compound, the wet thickness is preferably 300 μm or less, more preferably 200 μm or less, and still more preferably 100 μm or less.

Regarding the drying and heat treatment, the heat treatment may be performed after drying, or the drying and heat treatment may be performed at the same time.

The method for performing the drying and the heat treatment is not particularly limited as long as the effect of the present invention can be obtained, and may be a method in which the gas barrier coating material can be cured or a method in which the cured gas barrier coating material can be heated. Examples thereof include heating by convection heat transfer such as ovens or dryers, heating by conductive heat transfer such as heating rolls, heating by radiation heat transfer using electromagnetic waves such as infrared, far infrared, and near infrared heaters, and heating by internal heat generation such as microwaves. As an apparatus used for drying and heat treatment, an apparatus capable of performing both drying and heat treatments is preferable from the viewpoint of production efficiency. In particular, from the viewpoint of being usable for various applications such as drying, heating, annealing and the like, it is preferable to use a hot air oven, and from the viewpoint of excellent thermal conductivity efficiency to the film, it is preferable to use a heating roll. Further, methods used for the drying and heat treatments may be appropriately combined. Specifically, a hot air oven and a heating roll may be used in combination. For example, in a case where the gas barrier coating material is dried in a hot air oven and then subjected to a heat treatment with a heating roll, the heat treatment step is shortened, and thus this case is preferable from the viewpoint of production efficiency. In addition, it is preferable to perform the drying and heat treatment only with a hot air oven.

Regarding the heat treatment conditions, for example, the heat treatment temperature is 80° C. to 250° C. and the heat treatment time is 1 second to 10 minutes, preferably the heat treatment temperature is 120° C. to 240° C. and the heat treatment time is 1 second to 1 minute, more preferably the heat treatment temperature is 170° C. to 230° C. and the heat treatment time is 1 second to 30 seconds, and still more preferably the heat treatment temperature is 200° C. to 220° C. and the heat treatment time is 1 second to 10 seconds. Further, as described above, it is possible to perform the heat treatment in a short time by using a heating roll therewith.

Note that, from the viewpoint of effectively advancing the formation of a crosslinked structure (for example, amide bond formation between the —COO— group included in the polycarboxylic acid and the amino group included in the polyamine compound), it is important to adjust the heat treatment temperature and the heat treatment time according to the wet thickness of the gas barrier coating material. By selecting an appropriate heat treatment temperature and an appropriate heat treatment time, an appropriate crosslinked structure is formed.

By drying and heat-treating the gas barrier coating material, the carboxyl group of the polycarboxylic acid reacts with the polyamine or the polyvalent metal compound, and is covalently bonded and/or ionically crosslinked, so that the gas barrier layer 103 having good gas barrier properties even after the retort treatment is formed.

(Specific Examples of Layer Configuration)

In the second embodiment, specific examples of a laminate structure including the gas barrier laminate are shown below.

(Laminate structure example 1) base material layer 101 (PET base material)/inorganic material layer 102 (alumina vapor deposition layer)/gas barrier layer 103/adhesive layer/polyolefin layer (Laminate structure example 2) base material layer 101 (PET base material)/undercoat layer 104/inorganic material layer 102 (alumina vapor deposition layer)/gas barrier layer 103/adhesive layer/polyolefin layer (Laminate structure example 3) base material layer 101 (PET base material)/inorganic material layer 102 (alumina vapor deposition layer)/gas barrier layer 103/adhesive layer/polyamide layer/adhesive layer/polyolefin layer (Laminate structure example 4) base material layer 101 (PET base material)/undercoat layer 104/inorganic material layer 102 (alumina vapor deposition layer)/gas barrier layer 103/adhesive layer/polyamide layer/adhesive layer/polyolefin layer Here, by including a polyolefin layer formed of a polyolefin such as polyethylene, polypropylene, poly(4-methyl-1-pentene), or poly(1-butene) in the laminate structure, it is possible to further suppress a decrease in gas barrier performance under high humidity and gas barrier performance after a retort treatment while improving pinhole resistance, tearing resistance, heat resistance, and the like in the gas barrier laminate.

(Application)

The gas barrier laminate of the second embodiment has excellent gas barrier performance, and can be suitably used as, for example, various packaging materials such as a packaging material, in particular, a food packaging material for contents which require high gas barrier properties, for medical applications, industrial applications, common miscellaneous goods applications, and the like. The gas barrier laminate according to the second embodiment is particularly preferably applied to food packaging applications, and more preferably applied to the production of retort food.

In addition, the gas barrier laminate in the second embodiment can also be suitably used as a film for vacuum insulation; a sealing film for sealing electroluminescence devices, solar cells, or the like, for which high barrier performance is required.

(Packaging Bag Formed of Gas Barrier Laminate, Food Packaged with Gas Barrier Laminate)

A packaging bag can be formed of the above-described gas barrier laminate. This packaging bag is preferably used, for example, in the production of retort food. That is, it is possible to produce food (retort food) packaged with the gas barrier laminate.

In the gas barrier laminate which forms the packaging bag, the side of the base material layer is usually the outer surface side, and the side of the gas barrier layer is usually the inner surface side. In a case where there is a sealant layer, the side where the sealant layer is present is the inner surface side.

A common method in the field can be adopted as a method for producing retort food. A food that can be stored at a normal temperature for a long period of time can be produced by subjecting the food heat-sealed with a packaging bag to moist heat sterilization with pressurized hot water and steam at 100° C. or higher (for example, at 130° C. for about 30 minutes).

Third Embodiment

A gas barrier laminate according to a third embodiment is a gas barrier laminate including

- a base material layer,
- a gas barrier layer that is provided on at least one surface of the base material layer, and
- an inorganic material layer that is provided between the base material layer and the gas barrier layer,
- in which a composition ratio of Zn measured by X-ray photoelectron spectroscopy analysis of the gas barrier layer is 1 to 10 atomic %, and
- when a mass peak intensity of $^{64}ZnPO_4H$ is denoted by $I(^{64}ZnPO_4H)$ and a mass peak intensity of $C_3H_3O_2^-$ is denoted by $I(C_3H_3O_2^-)$, the mass peak intensities being measured by time-of-flight secondary ion mass spectrometry analysis of the gas barrier layer,
- a value of $I(^{64}ZnPO_4H^-)/I(C_3H_3O_2^-)$ is equal to or more than $7\times10^{-4}$ and equal to or less than $5\times10^{-2}$.

The fact that the composition ratio of Zn measured by X-ray photoelectron spectroscopy analysis is 1 to 10 atomic % means that Zn is contained in the gas barrier layer at a certain concentration.

In addition, the detection of $C_3H_3O_2^-$ from the gas barrier layer by mass spectrometry analysis means that the gas barrier layer includes polyacrylic acid or a derivative/similar compound thereof (polyacrylic acid or the like). In addition, it is considered that the value of $I(C_3H_3O_2^-)$ is a value correlated with the amount (concentration) of the carboxyl group of the polycarboxylic acid included in the gas barrier layer.

Since the gas barrier layer contains Zn at a certain concentration and a polycarboxylic acid having a carboxyl group is present in the gas barrier layer, it is considered that the polycarboxylic acid in the gas barrier layer forms a crosslinked body with Zn, and the gas barrier layer in which the Zn crosslinked body is formed carries the gas barrier properties of the gas barrier laminate together with the inorganic material layer that is provided between the base material layer and the gas barrier layer.

Further, the fact that $^{64}ZnPO_4H^-$ is detected from the gas barrier layer by mass spectrometry analysis means that a bond between a phosphorus compound represented by phosphoric acid and Zn is present in the gas barrier layer, and it is considered that the value of $I(^{64}ZnPO_4H^-)$ is a value correlated with the amount (concentration) of the bond between the phosphorus compound and Zn. From this, it is presumed that Zn is not only bonded to the carboxyl group of the polycarboxylic acid, but also some Zn's are chemically bonded to each other through a polyvalent phosphorus compound.

In addition, it is considered that the value of $I(^{64}ZnPO_4H^-)/I(C_3H_3O_2^-)$ is a value correlated with the amount (concentration) of the bonding of phosphoric acid and Zn to the carboxyl group of the polycarboxylic acid.

Incidentally, zinc phosphate is known as a water-insoluble compound, and the bond between the phosphorus compound and Zn is a bond that is difficult to be cleaved by water which is one of the factors of the decrease in barrier properties after the retort treatment. Therefore, it is considered that the presence of the bond between the phosphorus compound and Zn in the gas barrier layer suppresses a significant decrease in gas barrier properties caused by damage in the adjacent inorganic material layer due to excessive swelling and contraction of the gas barrier layer in a retort treatment or the like.

That is, the barrier performance after retorting can be satisfactorily maintained by setting the composition ratio of Zn to 1 to 10 atomic % and the value of $I(^{64}ZnPO_4H^-)/I(C_3H_3O_2^-)$ to equal to or more than $7\times10^{-4}$ and equal to or less than $5\times10^{-2}$.

FIG. 9 is a schematic cross-sectional view showing an example of a two-layer laminate structure barrier film including the gas barrier laminate according to the third embodiment. A two-layer laminate structure barrier film 1 includes a gas barrier laminate 8. The gas barrier laminate 8 includes a base material layer 2, a gas barrier layer 5 that is provided on at least one surface of the base material layer 2, and an inorganic material layer 4 that is provided between the base material layer 2 and the gas barrier layer 5. In addition, an undercoat layer (UC layer) 3 may be provided under the inorganic material layer 4, that is, on the base material layer 2. In the two-layer laminate structure barrier film 1, for example, the gas barrier laminate 8 can be bonded to an unstretched polypropylene film (CPP) 7 through an adhesive layer 6.

In addition, FIG. 10 shows a schematic cross-sectional view of an example of a three-layer laminate structure barrier film including the gas barrier laminate according to the third embodiment. In the three-layer laminate structure barrier film 10, for example, a nylon film 9 can be bonded onto a first adhesive layer 61 of the barrier laminate 8 in which the first adhesive layer 61 is provided, and the nylon film 9 and the unstretched polypropylene film 7 can be bonded to each other through a second adhesive layer 62.

The gas barrier layer 5 of the gas barrier laminate 8 according to the third embodiment is a layer in which at least zinc (Zn) is detected by X-ray photoelectron spectroscopy (XPS) analysis. In addition, by time-of-flight secondary ion mass spectrometry analysis (TOF-SIMS), a peak of $^{64}ZnPO_4H^-$ and a peak of $C_3H_3O_2^-$ are detected.

In the gas barrier layer of the gas barrier laminate according to the third embodiment, the peak of $^{64}ZnPO_4H^-$ having high water resistance is detected, and thus a gas barrier laminate having good barrier performance after retorting is obtained regardless of the laminate structure.

[XPS Analysis]

The composition of Zn contained in the gas barrier layer is 1 atomic % or more, preferably 2 atomic % or more, and more preferably 3 atomic % or more in the XPS analysis. In addition, the composition of Zn contained in the gas barrier layer is 10 atomic % or less, preferably 9.5 atomic % or less, and more preferably 9 atomic % or less. This corresponds to the peak intensity of Zn with respect to the peak intensity of carbon, that is, Zn/C is equal to or more than 0.01 and equal to or less than 0.2 (atomic/atomic %).

In this manner, in a case where Zn is present in a certain amount in the gas barrier layer, the barrier performance after retorting is improved.

An example of specific conditions of the XPS analysis applicable to the third embodiment is shown below.

Analyzing device: AXIS-NOVA manufactured by KRATOS Analytical Limited

X-ray source: monochromatized Al-Kα

X-ray source output: 15 kV, 10 mA

Analysis region: 300×700 μm

During analysis: neutralization gun for charge correction used

In the XPS analysis, a measurement sample of 1×1 cm cut out from the gas barrier layer can be used. In addition, in order to analyze the inside of the gas barrier layer, it is preferable to perform sputter etching on the surface of the gas barrier layer before the analysis. In order to reduce damage to the gas barrier layer, it is desirable to use an Ar-gas cluster ion beam (Ar-GCIB) source for the sputtering etching. Ar-gas cluster ion beam etching is known as a method capable of etching without breaking the chemical structure of a sample.

In the XPS analysis, the detected elements are specified by wide scanning, and spectra for each element are acquired by narrow scanning. The background is then estimated from the obtained spectrum by the Shirley method, and the background is removed from the spectrum. For each measured element, a spectrum in which the background is removed is acquired, and the atomic composition ratio (atomic %) of the detected element is calculated from the obtained peak area by using a relative sensitivity coefficient method.

In addition, the detection sensitivity of the atomic composition ratio in general XPS analysis is set to about 0.1 atomic %. For example, in a case where a trace amount of a phosphorus compound is added to the gas barrier layer, the XPS analysis may not be able to detect the content of P.

[TOF-SIMS Analysis]

Among fragments detected in the TOF-SIMS analysis of the gas barrier layer, when a peak intensity of $^{64}ZnPO_4H^-$ is denoted by $I(^{64}ZnPO_4H^-)$ and a peak intensity of a fragment of $C_3H_3O_2^-$ is denoted by $I(C_3H_3O_2^-)$, a value of $I(^{64}ZnPO_4H^-)/I(C_3H_3O_2^-)$ is $7\times10^{-4}$ or more, preferably $1\times10^{-3}$ or more, and more preferably $2\times10^{-3}$ or more, and is $5\times10^{-2}$ or less, preferably $3\times10^{-2}$ or less, and more preferably $2\times10^{-2}$ or less.

In this manner, in a case where the mass peak of $^{64}ZnPO_4H^-$, which is a fragment derived from a highly water-resistant bond, is detected and the value of $I(^{64}ZnPO_4H^-)/I(C_3H_3O_2^-)$ is in the above range, a gas barrier laminate having good barrier performance after retort is obtained regardless of the laminate structure. In addition, in a case where the value of $I(^{64}ZnPO_4H^-)/I(C_3H_3O_2^-)$ is excessively large, fine particles of zinc phosphate bonds grow in the gas barrier layer, which causes non-uniformity in the gas barrier layer and tends to deteriorate the gas barrier performance.

An example of specific conditions of the TOF-SIMS analysis applicable to the third embodiment is shown below.

In order to analyze the inside of the gas barrier layer, it is preferable to perform sputter etching on the surface layer of the gas barrier layer with an Ar-gas cluster ion beam (Ar-GCIB) attached to a TOF-SIMS analyzing device before the TOF-SIMS analysis. The use of the Ar-GCIB can reduce damage to the gas barrier layer.

An example of specific conditions of the Ar-GCIB applicable to the third embodiment is shown.

GCIB: 5 kV, 5 μA

GCIB treatment time: time point at which the spectrum pattern of TOF-SIMS no longer changes.

The TOF-SIMS analysis can be performed, for example, as follows.

Analyzing device: PHI nano-TOF II manufactured by ULVAC-PHI, Inc.

Primary ion: $Bi_3^{2+}$

Primary ion source output: 30 kV, 0.5 μA

Analysis region: 300×300 μm (scanning region of primary ion beam)

During the analysis, charge neutralization can be performed by irradiation with low energy electron beams and low energy Ar ions attached to the device. In addition, in the TOF-SIMS analysis, a measurement sample of 1×1 cm cut out from the gas barrier layer can be used as in the XPS analysis.

In this case, when a mass peak intensity of $PO_2^-$ observed by the TOF-SIMS analysis on the gas barrier layer is denoted by $I(PO_2^-)$ and a mass peak intensity of $PO_3^-$ is denoted by $I(PO_3^-)$, a value of $I(PO_2^-)+I(PO_3^-)/I(C_3H_3O_2^-)$ is preferably 0.02 or more, more preferably 0.07 or more, and still more preferably 0.1 or more.

In addition, the value of $I(PO_2^-)+I(PO_3^-)/I(C_3H_3O_2^-)$ is preferably 5 or less, more preferably 4 or less, and still more preferably 3 or less.

The detection of the mass peaks of $PO_2^-$ and $PO_3^-$ means that the gas barrier layer includes a phosphorus compound including one or more P—OH groups represented by phosphoric acid. In addition, it is considered that the value of $I(PO_2^-)+I(PO_3^-)/I(C_3H_3O_2^-)$ is a value correlated with the amount (concentration) of the phosphorus compound with respect to the carboxyl group of the polycarboxylic acid in the gas barrier layer.

In this case, the value of $I(PO_2^-)/I(PO_3^-)$, which is an intensity ratio between $I(PO_2^-)$ and $I(PO_3^-)$, is preferably 0.05 or more, more preferably 0.08 or more, and still more preferably 0.1. In addition, the value of $I(PO_2^-)/I(PO_3^-)$ is 1 or less, preferably 0.9 or less, and more preferably 0.8 or less.

In the TOF-SIMS analysis, the detection of the mass peaks of $PO_2^-$ and $PO_3^-$ means that a phosphorus compound such as phosphoric acid ($H_3PO_4$) or the like is contained, and $I(PO_2^-)/I(PO_3^-)$, which is a ratio thereof, is a value reflecting the type of the phosphorus compound including a P—OH group.

$I(^{64}ZnPO_4H^-)/I(C_3H_3O_2^-)$ reflecting the amount (concentration) of the zinc phosphate bond affects the type of the phosphorus compound. That is, the value of $I(PO_2^-)/I(PO_3^-)$ is also related. The fact that the value of $I(PO_2^-)/I(PO_3^-)$ is equal to or more than 0.05 and equal to or less than 1 means that the value of $I(^{64}ZnPO_4H^-)/I(C_3H_3O_2^-)$ is set in an appropriate range, and the barrier performance of the gas barrier laminate of the third embodiment after retorting can be satisfactorily maintained.

The analysis method of the data obtained by the TOF-SIMS analysis can be performed as follows.

In order to perform detailed spectrum analysis, in the third embodiment, for each of positive and negative secondary ions, a raw data sequence in which mass numbers $m_i$ and the corresponding counts $c_i$ are paired, and Total Ion Counts ($C_T$) are acquired by the analyzing device. Here, it is assumed that i=0, 1, 2, . . . , N, and the raw data sequence is arranged in ascending order with respect to $m_i$. Note that, $C_T$ is the total counts of secondary ions detected by a detector.

A range of mass numbers around the mass spectral peak of interest is set to i=$n_1$, $n_1$+1, . . . , $n_2$. The data $c_i$ of the counts in this range obtained by the analysis is approximated by $y_i$ as shown in the following equation. Specifically, a background level $b^0$ and the $c_i$ are approximated by curve fitting using K triangular functions $Y_j(m_i)$. Here, $b^0$ is a constant.

$$y_i = b^0 + \sum_{i=1}^{K} Y_j(m_i) \quad \text{[Equation 7]}$$

$Y_j(m_i)$ is a function having a peak value $Y^0_j$ at a mass number $x^0_j$ as shown in FIG. 11, and is represented by the following equation.

$$Y_j(m_i) = \begin{cases} 0 & m_i \le x_j^0 - B_j^- \\ \frac{Y_j^0}{B_j^-}(m_i - x_j^0) + Y_j^0 & x_j^0 - B_j^- < m_i \le x_j^0 \\ -\frac{Y_j^0}{B_j^+}(m_i - x_j^0) + Y_j^0 & x_j^0 < m_i \le x_j^0 + B_j^+ \\ 0 & x_j^0 + B_j^+ < m_i \end{cases} \quad \text{[Equation 8]}$$

Here, $b^0$, $x^0_j$, $Y^0_j$, $B^-_j$, and $B^+_j$ are fitting parameters. In addition, j is j=1, . . . , K. For example, in a case where the background of the spectrum is not a constant value and changes linearly with respect to $m_i$, the background is approximated by combining b° and the triangular function $Y_j(m_i)$. In a case where the mass spectral peak of interest is a single peak, the background is removed, and approximation is performed with one triangular function. In a case where the mass spectral peak of interest is close to other mass peaks, approximation is performed with a plurality of triangular functions including the other mass peaks. When the approximated mass spectral peak of interest is set to a j=k-th peak among the K triangular functions, the peak intensity I is expressed as a numerical value obtained by normalizing the sum of $Y_k(m_i)$ from i=$n_1$, . . . , n with the Total Ion Counts ($C_T$), and is obtained from the following equation.

$$I = \frac{\sum_{i=n_1}^{n_2} Y_k(m_i)}{C_T} \quad \text{[Equation 9]}$$

When a tail portion is present in the mass spectral peak, it is difficult to define the range of the mass number to be counted. In the third embodiment, in order to avoid this, the mass spectral peak is approximated by a triangular function. Therefore, the counts in the tail portion of the mass spectral peak are ignored. It is assumed that the central portion of the mass spectral peak is subjected to curve fitting to match the triangular function.

In addition, there is a case where other components (for example, mass peaks of other types of components having the same mass number) that overlap a target peak component is observed. In such a case, the target peak component is obtained by approximating the other components overlapping the target peak component with the triangular function.

The mass number of the fragment of interest in the third embodiment is calculated and shown below. The atomic mass numbers of isotopes are based on http://physics.nist.gov/.

TABLE 5

| Isotope | Atomic mass | Number of atoms $PO_2$ | $PO_3$ | $C_3H_3O_2$ | CN | $^{64}ZnPO_4H$ |
|---|---|---|---|---|---|---|
| $^1H$ | 1.007825 | | | 3 | | 1 |
| $^{12}C$ | 12 | | | 3 | 1 | |
| $^{14}N$ | 14.00307 | | | | 1 | |
| $^{16}O$ | 15.99492 | 2 | 3 | 2 | | 4 |
| $^{31}P$ | 30.97376 | 1 | 1 | | | 1 |
| $^{64}Zn$ | 63.92914 | | | | | 1 |
| Mass number | | 62.9636 | 78.9585 | 71.0133 | 26.0031 | 159.89039 |

[Calculation of Mass Peak Intensity of $^{64}ZnPO_4H^-$]

Five isotopes of Zn are known, and in the TOF-SIMS analysis, fragments related to $^{64}Zn$, $^{66}Zn$, and $^{68}Zn$ are mainly detected. In the third embodiment, $^{64}Zn$ having the highest abundance ratio is focused. In the fragment showing the bond between $^{64}Zn$ and the phosphorus compound containing P—OH, $^{64}ZnPO_4H^-$, $^{64}ZnP_2O_6H^-$, $^{64}ZnP_2O_7H^-$, $^{64}ZnP_3O_9H^-$, and the like are detected, but $^{64}ZnPO_4H^-$ having a relatively high mass peak intensity is focused.

Focusing on a range of a mass number of 159.5 to 160.3 in the negative secondary ion spectrum, the sum of the counts is calculated from the triangular function approximating the mass peak in the vicinity of 158.890 corresponding to $^{64}Zn^{31}P^{16}O_4{}^1H^-$ and the data of $m_i$, and a value normalized by $C_T$ is defined as the mass peak intensity $I(^{64}ZnPO_4H^-)$ of $^{64}ZnPO_4H^-$.

An example of curve fitting is shown in FIG. 12, and the calculation results of the parameters used in this case and the total counts are shown in Table 6. In the example shown in FIG. 12, the sum of the counts obtained from the triangular function approximating the mass peak of $^{64}ZnPO_4H^-$ as a target and the data of $m_i$ is 1514. Since the Total Ion Counts ($C_T$) of negative secondary ions at this time is 8571746, the peak intensity $I(^{64}ZnPO_4H^-)$ of $^{64}ZnPO_4H^-$ is $$I(^{64}ZnPO_4H^-)=1514/8571746=1.77\times10^{-4}.$$

TABLE 6

| j | $b^0$ | $Y_j(m_i)$ 0 | 1 | 2 (=target) |
|---|---|---|---|---|
| $b^0$ | 2 | | | |
| $x^0$ | | 159.934 | 159.934 | 159.885 |

TABLE 6-continued

| j | $b^0$ | $Y_j$ ($m_i$) | | |
|---|---|---|---|---|
| | | 0 | 1 | 2 (=target) |
| $B^+$ | | 0.11 | 0.035 | 0.03 |
| $B^-$ | | 0.11 | 0.035 | 0.03 |
| $Y^0$ | | 20 | 50 | 62 |
| sum | | 1791 | 1424 | 1514 |

A supplementary description will be given with respect to FIG. 12 showing an example of curve fitting.

(i) In order to obtain an approximation curve $y_i$ that reproduces the measurement data $c_i$ in the vicinity of a target peak position, the "background $b^0$", the curve of "triangular function approximation of other components" and the curve of "target triangular function $Y_j(m_i)$" are required.

(ii) In the example of FIG. 12, in order to obtain the "approximation curve $y_i$" that reproduces the measurement data $c_i$ at a mass number (m/z) of 159.7 to 160.2, the "background $b^0$", the curve of the "target triangular function $Y_j$(min)" (j=2 in Table 2), and two curves of "triangular function approximations of other components" (j=0, 1 in Table 6) are used.

[Calculation of Mass Peak Intensity of $C_3H_3O_2^-$]

Focusing on a mass number range of 70.7 to 71.4 in the negative secondary ion spectrum, the sum of the counts is calculated from the triangular function $Y_k(m_i)$ approximating the mass peak in the vicinity of 71.013 corresponding to $^{12}C_{31}H_3{}^{16}O_2^-$ obtained by curve fitting and the data of $m_i$, and a value normalized by $C_T$ is defined as the mass peak intensity $I(C_3H_3O_2^-)$ of $C_3H_3O_2^-$.

[Calculation of Mass Peak Intensity of $PO_2^-$]

Focusing on a mass number range of 62.5 to 63.3 in the negative secondary ion spectrum, the sum of the counts is calculated from the triangular function approximating the mass peak in the vicinity of 62.964 corresponding to $^{31}P^{16}O_2^-$ and the data of $m_i$, and a value normalized by $C_T$ is defined as the mass peak intensity $I(PO_2^-)$ of $PO_2^-$.

[Calculation of Mass Peak Intensity of $PO_3^-$]

Focusing on a mass number range of 78.5 to 79.3 in the negative secondary ion spectrum, the sum of the counts is calculated from the triangular function approximating the mass peak in the vicinity of 78.959 corresponding to $^{31}P^{16}O_3^-$ and the data of $m_i$, and a value normalized by $C_T$ is defined as the mass peak intensity $I(PO_3^-)$ of $PO_3^-$.

The gas barrier layer is preferably formed of a cured product of a mixture including a polycarboxylic acid, Zn, and a phosphorus compound including one or more P—OH groups represented by phosphoric acid ($H_3PO_4$) or a salt thereof.

When the gas barrier layer is formed of a cured product of the mixture including these components, the carboxyl group derived from the polycarboxylic acid forms metal ion crosslinking through Zn, and Zn also reacts with the phosphorus compound including the P—OH group to form a water-resistant bond. Although the detailed mechanism is unknown, it is considered that due to the presence of an appropriate amount of these metal ion crosslinking through Zn and the bond between Zn and the phosphorus compound uniformly in the gas barrier layer, a dense gas barrier layer is formed, and excessive swelling and contraction of the gas barrier layer is suppressed in a retort treatment or the like.

The composition ratio of Zn in the gas barrier layer according to the third embodiment, the value of $I(^{64}ZnPO_4H^-)/I(C_3H_3O_2^-)$, the value of $I(PO_2)+I(PO_3^-)/I(C_3H_3O_2^-)$, and the value of $I(PO_2^-)/I(PO_3^-)$ in the TOF-SIMS can be controlled by appropriately adjusting the production conditions of the gas barrier layer.

In the third embodiment, for example, the concentration of phosphoric acid with respect to the polycarboxylic acid is mentioned as one of the factors for controlling the composition ratio of Zn and the value of $I(^{64}ZnPO_4H^-)/I(C_3H_3O_2^-)$.

The polycarboxylic acid, zinc or a compound thereof, the phosphorus compound, and other components that can be added, which can be applied to the third embodiment, will be described in detail below.

(Polycarboxylic Acid)

The polycarboxylic acid has two or more carboxy groups in the molecule. Specific examples thereof include homopolymers of α,β-unsaturated carboxylic acid such as acrylic acid, methacrylic acid, itaconic acid, fumaric acid, crotonic acid, cinnamic acid, 3-hexenoic acid, and 3-hexenedioic acid, or copolymers thereof. In addition, the polycarboxylic acid may be a copolymer of the α,β-unsaturated carboxylic acid described above and esters such as ethyl ester, olefins such as ethylene, or the like.

Among these, a homopolymer of acrylic acid or methacrylic acid, or a copolymer thereof is preferable, one or two or more polymers selected from polyacrylic acid, polymethacrylic acid, and a copolymer of acrylic acid and methacrylic acid is more preferable, at least one polymer selected from polyacrylic acid and polymethacrylic acid is still more preferable, and at least one polymer selected from a homopolymer of acrylic acid or a homopolymer of methacrylic acid is particularly preferable.

Here, in the third embodiment, polyacrylic acid includes both a homopolymer of acrylic acid and a copolymer of acrylic acid and another monomer. In a case of a copolymer of acrylic acid and another monomer, the polyacrylic acid usually includes constituent units which are derived from acrylic acid at 90% by mass or more, preferably 95% by mass or more, and more preferably 99% by mass or more in 100% by mass of the polymer.

In addition, in the third embodiment, polymethacrylic acid includes both a homopolymer of methacrylic acid and a copolymer of methacrylic acid and another monomer. In a case of a copolymer of methacrylic acid and another monomer, the polymethacrylic acid usually includes constituent units which are derived from methacrylic acid at 90% by mass or more, preferably 95% by mass or more, and more preferably 99% by mass or more in 100% by mass of the polymer.

The polycarboxylic acid is a polymer obtained by polymerizing carboxylic acid monomers, and the molecular weight of the polycarboxylic acid is preferably 500 to 2,500,000, more preferably 5,000 to 2,000,000, still more preferably 10,000 to 1,500,000, and still even more preferably 100,000 to 1,200,000 from the viewpoint of excellent balance of gas barrier properties and handleability.

Here, the molecular weight of the polycarboxylic acid is the polyethylene oxide conversion weight average molecular weight and is measurable using gel permeation chromatography (GPC).

By neutralizing the polycarboxylic acid with a volatile base, gelation can be suppressed when zinc, which will be described later, is mixed with the polycarboxylic acid. Accordingly, in the polycarboxylic acid, from the viewpoint of prevention of gelation, a volatile base is preferably used for the partially neutralized product or completely neutralized product of the carboxy group. It is possible to obtain the neutralized product by partially or completely neutralizing the carboxy group of the polycarboxylic acid with a volatile base, (that is, the carboxy group of the polycarboxylic acid is partially or completely made into carboxylate). Due to this, gelation can be prevented when zinc is added.

A partially neutralized product is prepared by adding a volatile base to an aqueous solution of polycarboxylic acid polymer and it is possible to set a desired neutralization degree by adjusting the ratio of the amounts of the polycarboxylic acid and the volatile base. In the third embodiment, the neutralization degree of the polycarboxylic acid by the volatile base is preferably 30 to 100 equivalent % and more preferably 50 to 100 equivalent %.

It is possible to use an arbitrary water-soluble base as a volatile base.

Examples of volatile bases include ammonia, morpholine, alkylamine, 2-dimethyl amino ethanol, N-methyl monopholine, ethylene diamine, and tertiary amines such as triethyl amine, an aqueous solution thereof or a mixture thereof. From the viewpoint of obtaining good gas barrier properties, an ammonia aqueous solution is preferable.

It is preferable that the mixture constituting the gas barrier laminate according to the third embodiment further includes a carbonic acid-based ammonium salt. The carbonic acid-based ammonium salt is added to improve the solubility of zinc by bringing zinc, which will be described later, into a state of a zinc carbonate ammonium complex, and to prepare a uniform solution containing zinc.

Examples of the carbonic acid-based ammonium salt include ammonium carbonate and ammonium hydrogen carbonate. From the viewpoint of volatility and difficulty in remaining in the obtained gas barrier layer, ammonium carbonate is preferable.

(Zinc)

Zinc (Zn) can form a water-resistant Zn phosphate bond with a phosphorus compound, and a mass peak represented by $^{64}ZnPO_4H^-$ can be detected by TOF-SIMS analysis. In addition, in a case where the gas barrier layer contains polycarboxylic acid, a salt is formed with the polycarboxylic acid. Zn may be zinc or a zinc compound which can be added to the mixture forming the gas barrier layer, and for example, metallic zinc, zinc oxide (ZnO), a zinc compound, or the like can be used. The addition amount of zinc can be set to equal to or more than 0.1 mol and equal to or less than 0.5 mol with respect to 1 mol of the carboxyl groups of the above-described polycarboxylic acid.

(Phosphorus Compound)

As described above, when the gas barrier layer is subjected to mass spectrometry analysis, $PO_2^-$ and/or $PO_3^-$ is preferably detected. In order to provide such a gas barrier layer, it is preferable that the mixture before curing includes a phosphorus compound or a salt thereof.

The phosphorus compound or the phosphorus compound in a salt thereof includes one or more —P—OH groups in the molecular structure. The phosphorus compound may be blended in the mixture as a salt.

From the viewpoint of further improving water vapor barrier properties after the retort treatment, the phosphorus compound preferably includes two or more —P—OH groups, and more preferably includes three or more —P—OH groups. In addition, from the viewpoint of productivity, the number of —P—OH groups in the phosphorus compound may be, for example, 10 or less.

Specific examples of the phosphorus compound include phosphoric acid, phosphorous acid, phosphonic acid, hypophosphorous acid, polyphosphoric acid, and derivatives thereof.

Specifically, the polyphosphoric acid has a structure in which two or more phosphoric acids are condensed in the molecular structure, and examples thereof include diphosphoric acid (pyrophosphoric acid), triphosphoric acid, and polyphosphoric acid with four or more condensed phosphoric acids.

Specific examples of the derivatives include esters of the above-described phosphorus compounds such as phosphorylated starch and phosphated crosslinked starch; halides such as chlorides; anhydrides such as tetraphosphorus acid decoxide; and compounds having a structure in which a hydrogen atom bonded to a phosphorus atom is substituted with an alkyl group, such as nitrilotris(methylenephosphonic acid) and N,N,N',N'-ethylenediaminetetrakis(methylenephosphonic acid).

From the viewpoint of further improving the balance between barrier properties and productivity, the phosphorus compound is one or two or more selected from the group consisting of phosphoric acid, phosphorous acid, hypophosphorous acid, polyphosphoric acid, phosphonic acid, and salts thereof, and more preferably at least one selected from the group consisting of phosphoric acid, phosphorous acid, phosphonic acid, and salts thereof.

In addition, specific examples of the salt of the phosphorus compound include salts of monovalent metals such as sodium and potassium, and ammonium salts. From the viewpoint of barrier properties, the salt of the phosphorus compound is preferably an ammonium salt.

The concentration of P atoms of the phosphorus compound is typically $5\times10^{-4}$ mol or more, preferably $1\times10^{-3}$ mol or more, and more preferably $5\times10^{-3}$ mol or more with respect to 1 mol of the carboxyl groups in the above-described polycarboxylic acid in the compound, and is typically 0.3 mol or less, preferably 0.15 mol or less, and more preferably 0.1 mol or less. In a phosphorus compound containing one P atom in the chemical formula, such as phosphoric acid, the number of moles of the P atom and the number of moles of the phosphorus compound have the same meaning.

It is considered that, in a case of a phosphorus compound having such a concentration or a phosphorus compound derived from a salt thereof, excessive swelling and contraction of the gas barrier layer is suppressed in a retort treatment or the like by reliably forming a Zn bond with the phosphorus compound having water resistance, and the gas barrier properties of the gas barrier laminate after the retort treatment can be further improved. The presence of the Zn bond with the phosphorus compound is reflected in the mass peak of $^{64}ZnPO_4H^-$ obtained by the above-described TOF-SIMS analysis.

(Other Components)

The mixture constituting the gas barrier layer according to the third embodiment may or may not include, as another component, for example, a polyamine. In a case where the mixture includes a polyamine, the barrier properties of the obtained gas barrier laminate can be improved, the interlayer adhesion of the obtained gas barrier laminate can be improved, and the delamination resistance can be improved.

In addition, since the fragments detected in the TOF-SIMS analysis are independently detected, the values of $I(^{64}ZnPO_4H^-)/I(C_3H_3O_2^-)$, $(I(PO_2)+I(PO_3^-))/I(C_3H_3O_2^-)$, and $I(PO_2)/I(PO_3^-)$ obtained by analyzing the TOF-SIMS analysis results are not affected by the presence or absence of polyamine.

The polyamine is a polymer having two or more amino groups at a main chain, a side chain, or a terminal. Specific examples thereof include aliphatic polyamines such as polyallylamine, polyvinylamine, polyethyleneimine, and poly (trimethyleneimine); polyamides having amino groups on side chains such as polylysine and polyarginine; and the like. In addition, a polyamine where a portion of the amino group is modified may be used. The addition amount of the polyamine can be set to an amount such that the active hydrogen in the polyamine is equal to or more than 0 mol and equal to or less than 0.9 mol with respect to 1 mol of the carboxyl groups included in the above-described polycarboxylic acid.

From the viewpoint of excellent balance of gas barrier properties and handleability, the weight average molecular weight of the polyamine is preferably 50 to 2,000,000, more preferably 100 to 1,000,000, still more preferably 1,500 to 500,000, yet more preferably 1,500 to 100,000, even more preferably 1,500 to 50,000, yet still more preferably 3,500 to 20,000, still even more preferably 5,000 to 15,000, and particularly preferably 7,000 to 12,000.

Here, in the third embodiment, it is possible to measure the molecular weight of the polyamine using a boiling point increasing method or a viscosity method.

(Method for Producing Gas Barrier Layer)

The gas barrier layer according to the third embodiment can be produced, for example, as follows.

First, a completely or partially neutralized solution of carboxy groups which form the polycarboxylic acid is prepared.

A volatile base is added to the polycarboxylic acid and the carboxy groups of the polycarboxylic acid are completely neutralized or partially neutralized. By neutralizing the carboxy group of the polycarboxylic acid, in the subsequent step, gelation generated by a reaction between zinc and the carboxy group which forms the polycarboxylic acid when zinc is added is effectively prevented, and a uniform gas barrier coating material intermediate is obtained.

Next, a zinc salt compound and a carbonic acid-based ammonium salt are added to the intermediate and dissolved to form a zinc salt with the —COO— group which forms the polycarboxylic acid by the generated zinc ions. At this time, the —COO— group forming a salt with the zinc ions refers to both the carboxy group not neutralized with the base and the —COO— group neutralized with the base. In a case of the —COO— group neutralized with the base, the zinc ions derived from zinc are replaced and coordinated to form a zinc salt of the —COO— group. Then, after forming the zinc salt, the gas barrier coating material (mixture) can be obtained by adding phosphoric acid.

A gas barrier layer is formed by applying the gas barrier coating material (mixture), which is produced in this manner, onto an inorganic material layer described later and drying and curing the coating material. The method for applying the gas barrier coating material to the base material layer is not particularly limited, and a common method can be used. Examples thereof include methods for coating using various known coating machines such as Mayer bar coaters, air knife coaters, gravure coaters such as direct gravure coaters, gravure offset, arc gravure coaters, gravure reverse and jet nozzle method coaters, reverse roll coaters such as top feed reverse coaters, bottom feed reverse coaters, and nozzle feed reverse coaters, five roll coaters, lip coaters, bar coaters, bar reverse coaters, and die coaters.

The coating amount (wet thickness) of the gas barrier coating material (mixture) is preferably equal to or more than 0.05 μm and more preferably equal to or more than 1 μm. In addition, the coating amount is preferably 300 μm or less, more preferably 200 μm or less, and still more preferably 100 μm or less.

In addition, the average thickness of the gas barrier layer after drying and curing is preferably equal to or more than 0.05 μm and equal to or less than 10 μm, more preferably equal to or more than 0.08 μm and equal to or less than 5 μm, and still more preferably equal to or more than 0.1 μm and equal to or less than 1 μm. When the coating amount is equal to or less than the above upper limit value, it is possible to suppress curling of the obtained gas barrier laminate or gas barrier film. Further, when the coating amount is equal to or more than the above lower limit value, the barrier performance of the obtained gas barrier laminate or gas barrier film can be further improved.

Regarding the drying and heat treatment, the heat treatment may be performed after drying, or the drying and the heat treatment may be performed at the same time.

The method for performing the drying and the heat treatment is not particularly limited as long as the object of the present invention can be achieved, and any method capable of curing the gas barrier coating material and heating the cured gas barrier coating material may be used. Examples thereof include heating by convection heat transfer such as ovens or dryers, heating by conductive heat transfer such as heating rolls, heating by radiation heat transfer using electromagnetic waves such as infrared, far infrared, and near infrared heaters, and heating by internal heat generation such as microwaves. As an apparatus used for drying and heat treatment, an apparatus capable of performing both drying and heat treatments is preferable from the viewpoint of production efficiency. In particular, from the viewpoint of being usable for various purposes such as drying, heating, and annealing, it is preferable to use a hot air oven, and from the viewpoint of excellent thermal conductivity efficiency to the film, it is preferable to use a heating roll. Further, methods used for the drying and heat treatments may be appropriately combined. A hot air oven and a heating roll may be used in combination, for example, when the gas barrier coating material is dried in a hot air oven and then subjected to a heat treatment with a heating roll, the heat treatment step time becomes short, which is preferable from the viewpoint of production efficiency. In addition, it is preferable to perform the drying and heat treatment only with a hot air oven.

For example, it is desirable to perform the heat treatment at a heat treatment temperature of 80° C. to 250° C. for a heat treatment time of 1 second to 10 minutes, preferably at a heat treatment temperature of 120° C. to 240° C. for a heat treatment time of 1 second to 1 minute, and more preferably at a heat treatment temperature of 170° C. to 230° C. for a heat treatment time of 1 second to 30 seconds. Further, as described above, it is possible to perform the heat treatment in a short time by using a heating roll therewith. It is important to adjust the heat treatment temperature and the heat treatment time according to the wet thickness of the gas barrier coating material.

In the gas barrier coating material (mixture), the zinc salt of the —COO— group which forms polycarboxylic acid forms metal crosslinking and a water-resistant Zn phosphate bond (reflected in the mass peak of $^{64}ZnPO_4H^-$ obtained by the above-described TOF-SIMS analysis), and the coating material is dried and heat-treated to obtain a gas barrier layer having excellent gas barrier properties.

(Inorganic Material Layer)

Examples of the inorganic material forming the inorganic material layer 4 include metals, metal oxides, metal nitrides, metal fluorides, metal oxynitrides, and the like which are able to form a thin film having barrier properties.

Examples of inorganic materials forming the inorganic material layer 4 include one or two or more selected from periodic table 2A elements such as beryllium, magnesium, calcium, strontium, and barium, periodic table transition elements such as titanium, zirconium, ruthenium, hafnium, and tantalum; periodic table 2B elements such as zinc; periodic table 3A elements such as aluminum, gallium, indium, and thallium; periodic table 4A elements such as silicon, germanium, and tin; periodic table 6A elements such as selenium and tellurium, and the like, and oxides, nitrides, fluorides, oxynitrides, and the like thereof.

Note that, in the third embodiment, the group name of the periodic table is indicated by the old CAS formula.

Further, among the inorganic materials described above, one or two or more inorganic materials selected from the group consisting of silicon oxide, aluminum oxide, and aluminum is preferable, and aluminum oxide is more preferable due to being excellent in the balance of barrier properties, cost, and the like.

Note that, silicon oxide may contain silicon monoxide and silicon suboxide in addition to silicon dioxide.

The inorganic material layer is formed of the inorganic material described above. The inorganic material layer 4 may be formed of a single inorganic material layer or a plurality of inorganic material layers. In addition, in a case where the inorganic material layer 4 is formed of a plurality of inorganic material layers, the inorganic material layer may be formed of the same type of inorganic material layer or may be formed of different types of inorganic material layers.

The thickness of the inorganic material layer 4 is usually equal to or more than 1 nm and equal to or less than 1000 nm, and preferably equal to or more than 1 nm and equal to or less than 500 nm, from the viewpoint of balance of the barrier properties, adhesion, handleability, and the like.

In the third embodiment, it is possible to determine the thickness of the inorganic material layer from observation images taken by a transmission electron microscope or a scanning electron microscope.

The method of forming the inorganic material layer 4 is not particularly limited and it is possible to form the inorganic material layer 4 on one surface or both surfaces of the base material layer 2 using, for example, a vacuum deposition method, an ion plating method, a sputtering method, a chemical vapor deposition method, a physical vapor deposition method, a chemical vapor deposition method (CVD method), a plasma CVD method, a sol-gel method, or the like. Among the above, film formation under reduced pressure such as a sputtering method, an ion plating method, a chemical vapor deposition method (CVD), a physical vapor deposition method (PVD), a plasma CVD method, or the like is desirable. Due to this, it is expected quickly reacting the chemically active molecular species containing silicon such as silicon nitride or silicon oxynitride will make it possible to improve the smoothness of the surface of the inorganic material layer 4 and to reduce the number of pores.

In order to rapidly perform these bonding reactions, it is desirable that the inorganic atoms and compounds are chemically active molecular species or atomic species.

(Base Material Layer)

The base material layer 2 is not particularly limited as long as a solution of the gas barrier coating material can be applied, and any material can be used. Examples thereof include organic materials such as a thermosetting resin, a thermoplastic resin, or paper, inorganic materials such as glass, pottery, ceramic, silicon oxide, silicon oxynitride, silicon nitride, and cement, and metals such as aluminum, aluminum oxide, iron, copper, and stainless steel, a base material layer with a multilayer structure which is formed of a combination of organic materials or of organic materials and inorganic materials, and the like. Among these, for example, in a case of various film applications such as packaging material or panels, a plastic film using a thermosetting resin and a thermoplastic resin or an organic material such as paper is preferable.

As the thermosetting resin, a known thermosetting resin can be used. Examples of the thermosetting resin include known thermosetting resins such as epoxy resins, unsaturated polyester resins, phenolic resins, urea-melamine resins, polyurethane resins, silicone resins, and polyimides.

As the thermoplastic resin, a known thermoplastic resin can be used. Examples of thermoplastic resins include polyolefins (polyethylene, polypropylene, poly(4-methyl-1-pentene), poly(1-butene), and the like), polyesters (polyethylene terephthalate, polybutylene terephthalate, polyethylene naphthalate, and the like), polyamide (nylon-6, nylon-66, polymetaxylene adipamide, and the like), polyvinyl chloride, polyimide, ethylene vinyl acetate copolymer or saponified products thereof, polyvinyl alcohol, polyacrylonitrile, polycarbonate, polystyrene, ionomers, fluorine-based resins, or mixtures thereof.

Among these, from the viewpoint of good transparency, one or two or more resins selected from the group consisting of polypropylene, polyethylene terephthalate, polyethylene naphthalate, polyamide, polyimide, and polybutylene terephthalate are preferable, and from the viewpoint of excellent pinhole resistance, tearing resistance, heat resistance, and the like, one or two or more resins selected from the group consisting of polyamide, polyethylene terephthalate, polybutylene terephthalate are preferable.

In addition, the base material layer 2 formed of the thermoplastic resin may be a single layer or two or more layers, depending on the application of the gas barrier laminate 8.

In addition, the film formed by the above thermosetting resin and thermoplastic resin may be stretched in at least one direction, preferably in a biaxial direction, to form the base material layer.

From the viewpoint of excellent transparency, rigidity, and heat resistance, the base material layer 2 according to the third embodiment is preferably a biaxially stretched film formed of one or two or more thermoplastic resins selected from polypropylene, polyethylene terephthalate, polyethylene naphthalate, polyamide, polyimide, and polybutylene terephthalate, and more preferably a biaxially stretched film formed of one or two or more thermoplastic resins selected from polyamide, polyethylene terephthalate, and polybutylene terephthalate.

In addition, the surface of the base material layer 2 may be coated with polyvinylidene chloride, polyvinyl alcohol, an ethylene-vinyl alcohol copolymer, an acrylic resin, a urethane-based resin, or the like.

Further, the base material layer 2 may be subjected to a surface treatment in order to improve the adhesion with other layers. Specifically, a surface activation treatment such as a corona treatment, a flame treatment, a plasma treatment, or a primer coat treatment may be performed.

From the viewpoint of obtaining good film properties, the thickness of the base material layer 2 is preferably 1 to 1000 μm, more preferably 1 to 500 μm, and still more preferably 1 to 300 μm.

The shape of the base material layer 2 is not particularly limited and examples thereof include a sheet or film shape, a tray, a cup, a hollow body, or the like.

(Undercoat Layer)

In the gas barrier laminate 8, from the viewpoint of improving the adhesion between the base material layer 2 and the inorganic material layer 4, an undercoat layer 3 can be formed on the surface of the base material layer 2. The undercoat layer is preferably a layer formed of an epoxy (meth)acrylate-based compound or a urethane (meth)acrylate-based compound.

The undercoat layer 3 is preferably a layer obtained by curing at least one selected from an epoxy (meth)acrylate-based compound and a urethane (meth)acrylate-based compound.

Examples of the epoxy (meth)acrylate-based compound include compounds obtained by reacting epoxy compounds such as bisphenol A type epoxy compounds, bisphenol F type epoxy compounds, bisphenol S type epoxy compounds, phenol novolak type epoxy compounds, cresol novolak type epoxy compounds, and aliphatic epoxy compounds, with acrylic acid or methacrylic acid, and examples thereof include an acid-modified epoxy (meth)acrylate obtained by reacting the epoxy compound above with a carboxylic acid or an anhydride thereof. These epoxy(meth)acrylate-based compounds are coated on the surface of the base material layer together with a photopolymerization initiator and, if necessary, another photopolymerization initiator or a diluent formed of a thermally reactive monomer, after which an undercoat layer is formed by a crosslinking reaction through irradiation with ultraviolet light or the like.

Examples of the urethane (meth)acrylate-based compound include compounds obtained by acrylating an oligomer (also referred to below as a polyurethane-based oligomer) formed of a polyol compound and a polyisocyanate compound, and the like.

It is possible to obtain the polyurethane-based oligomer from a condensation product of a polyisocyanate compound and a polyol compound. Specific examples of the polyisocyanate compound include methylene bis (p-phenylene diisocyanate), an adduct of hexamethylene diisocyanate hexanetriol, hexamethylene diisocyanate, tolylene diisocyanate, an adduct of tolylene diisocyanate trimethylolpropane, 1,5-naphthylene diisocyanate, thiopropyl diisocyanate, ethylbenzene-2,4-diisocyanate, 2,4-tolylene diisocyanate dimer, hydrogenated xylylene diisocyanate, tris (4-phenylisocyanate) thiophosphate, and the like, in addition, specific polyol compounds include polyether-based polyols such as polyoxytetramethylene glycol, polyester-based polyols such as polyadipate polyols and polycarbonate polyol, copolymers of acrylate esters and hydroxyethyl methacrylate, and the like. Examples of the monomer forming the acrylate include monomers such as methyl (meth)acrylate, ethyl (meth)acrylate, butyl (meth)acrylate, 2-ethylhexyl (meth)acrylate, methoxyethyl (meth)acrylate, butoxyethyl (meth)acrylate, phenyl (meth)acrylate, and the like.

These epoxy(meth)acrylate-based compounds and urethane (meth)acrylate-based compounds are used in combination, if necessary. In addition, examples of methods of polymerizing the above include various known methods, specifically, methods of irradiation with energy rays including ionizing radiation, heating, or the like.

In the case where the undercoat layer is formed by curing with ultraviolet rays, acetophenones, benzophenones, Michler's benzoyl benzoate, α-amyloxime ester, thioxanthones, or the like are preferably used as a photopolymerization initiator and, in addition, n-butylamine, triethylamine, tri n-butylphosphine, and the like are preferably mixed and used as a photosensitizer. In addition, in the third embodiment, an epoxy (meth)acrylate compound and a urethane (meth)acrylate compound may also be used in combination.

In addition, these epoxy(meth)acrylate-based compounds and urethane (meth)acrylate-based compounds are diluted with (meth)acrylic-based monomers. Examples of such (meth)acrylic-based monomers include methyl (meth)acrylate, ethyl (meth)acrylate, butyl (meth)acrylate, 2-ethylhexyl (meth)acrylate, methoxyethyl (meth)acrylate, butoxyethyl (meth)acrylate, phenyl (meth)acrylate, and, as multi-functional monomers, trimethylolpropane tri(meth)acrylate, hexanediol (meth)acrylate, tripropylene glycol di(meth) acrylate, diethylene glycol di(meth)acrylate, pentaerythritol tri(meth)acrylate, dipentaerythritol hexa(meth)acrylate, 1,6-hexanediol di(meth)acrylate, neopentyl glycol di(meth)acrylate, and the like.

Among the above, in a case where the urethane (meth) acrylate-based compound is used as the undercoat layer, the oxygen gas barrier properties of the obtained gas barrier laminate 8 are further improved.

The thickness of the undercoat layer of the third embodiment is usually in a range of 0.01 to 100 $g/m^2$, preferably 0.05 to 50 $g/m^2$, as the coating amount.

(Adhesive Layer)

In addition, an adhesive layer 6 may be provided on the gas barrier layer 5. The adhesive layer 6 is a layer including any known adhesive. Examples of the adhesive include laminated adhesives formed of an organic titanium-based resin, a polyethyleneimine-based resin, a urethane-based resin, an epoxy-based resin, an acrylic-based resin, a polyester-based resin, an oxazoline group containing resin, a modified silicone resin, an alkyl titanate, a polyester-based polybutadiene, and the like, or a one-component type or two-component type polyols and polyvalent isocyanates, aqueous urethane, ionomers, and the like. Alternatively, an aqueous adhesive mainly composed of an acrylic-based resin, a vinyl acetate-based resin, a urethane-based resin, a polyester resin, or the like may be used.

In addition, other additives such as a curing agent and a silane coupling agent may be added to the adhesive depending on the application of the gas barrier laminate 8. In a case where the gas barrier laminate is used for hot water treatment such as retorting, from the viewpoint of heat resistance and water resistance, a dry lamination adhesive represented by a polyurethane-based adhesive is preferable, and a solvent-based two-component curing type polyurethane-based adhesive is more preferable.

The gas barrier laminate 8 according to the third embodiment has excellent gas barrier performance after retorting, regardless of the laminate structure. Therefore, the gas barrier laminate according to the third embodiment is preferably applied to packaging materials, particularly food packaging materials for contents which require high gas barrier properties. In addition, the gas barrier laminate can also be suitably used as various packaging materials for medical applications, industrial applications, common miscellaneous goods applications, and the like.

In addition, the gas barrier laminate 8 of the third embodiment can be suitably used, for example, as a film for vacuum insulation; a sealing film for sealing electroluminescence devices, solar cells, or the like, for which high barrier performance is required.

Fourth Embodiment

FIG. 13 is a cross-sectional view schematically showing an example of a configuration of a gas barrier laminate in a fourth embodiment. A gas barrier laminate 100 shown in FIG. 13 includes a base material layer 101, a gas barrier layer 103 that is provided on at least one surface of the base material layer 101, and an inorganic material layer 102 that is provided between the base material layer 101 and the gas barrier layer 103. The gas barrier layer 103 is formed of a cured product of a mixture including a polycarboxylic acid, a polyamine compound, a polyvalent metal compound, and a phosphorus compound including one or more —P—OH groups or a salt thereof.

The specific configuration of each layer will be described later.

In the gas barrier laminate 100, the base material layer 101, the inorganic material layer 102, and the gas barrier layer 103 are laminated in this order, and the gas barrier layer 103 is formed of the cured product of the mixture described above. Therefore, the gas barrier laminate 100 has an excellent balance between barrier properties and productivity, and exhibits preferable barrier properties in various layer structures.

More specifically, the gas barrier laminate 100 has excellent barrier performance such as oxygen barrier properties and water vapor barrier properties after a retort treatment. In addition, in the gas barrier laminate 100, since the gas barrier layer 103 is formed of the cured product of the mixture described above, the gas barrier laminate 100 having excellent barrier properties can be obtained, for example, even in a case where the curing time when the gas barrier layer 103 is obtained, specifically, the heat treatment time is short.

In addition, since the gas barrier layer 103 is formed of the cured product of the mixture including a polycarboxylic acid, a polyamine compound, a polyvalent metal compound, and a phosphorus compound including one or more —P—OH groups or a salt thereof, for example, the gas barrier laminate 100 having excellent barrier properties and water resistance can also be obtained.

FIG. 14 is a cross-sectional view schematically showing another configuration example of the gas barrier laminate. The basic configuration of the gas barrier laminate 110 shown in FIG. 14 is the same as that of the above-described gas barrier laminate 100 with reference to FIG. 13, but is different in that an undercoat layer 104 provided between the base material layer 101 and the inorganic material layer 102 is further included.

In the gas barrier laminate 110, the same effect as the gas barrier laminate 100 can be obtained. In addition, in the gas barrier laminate 110, by providing the undercoat layer 104 between the base material layer 101 and the inorganic material layer 102, the adhesion between the base material layer 101 and the inorganic material layer 102 can be further improved.

Hereinafter, the configuration of the layers included in the gas barrier laminate will be described in more detail. First, the gas barrier layer 103 will be described.

(Gas Barrier Layer)

The gas barrier layer 103 is formed of a cured product of a mixture including a polycarboxylic acid, a polyamine compound, and a polyvalent metal compound. More specifically, the gas barrier layer 103 is a film (gas barrier film 10) formed of the above-described cured product.

More specifically, the gas barrier layer 103 is obtained by applying a mixture before curing, that is, a gas barrier coating material, to a layer arranged immediately below the gas barrier layer 103 such as the inorganic material layer 102, and then drying and heat-treating the gas barrier coating material to cure the gas barrier coating material.

In the infrared absorption spectrum of the gas barrier layer 103, when a maximum peak height of an absorbance in a range of equal to or more than 1300 $cm^{-1}$ and equal to or less than 1490 $cm^{-1}$ is denoted by α, and a maximum peak height of an absorbance in a range of equal to or more than 1690 $cm^{-1}$ and equal to or less than 1780 $cm^{-1}$ is denoted by γ, a ratio of free carboxy groups with respect to a $NH_3$ complex, which is represented by γ/α, is preferably 0.00 or more, more preferably 0.01 or more, and still more preferably 0.02 or more, from the viewpoint of the liquid stability of the gas barrier coating material before application.

In addition, from the viewpoint of improving the barrier properties of the gas barrier layer 103 obtained after the coating, the γ/α is preferably 1.00 or less, more preferably 0.80 or less, still more preferably 0.60 or less, yet more preferably 0.40 or less, even more preferably 0.20 or less, and still even more preferably 0.10 or less.

In addition, in the infrared absorption spectrum of the gas barrier layer 103, when a total peak area in a range of an absorption band of equal to or more than 1493 $cm^{-1}$ and equal to or less than 1780 $cm^{-1}$ is denoted by A, a total peak area in a range of an absorption band of equal to or more than 1598 $cm^{-1}$ and equal to or less than 1690 $cm^{-1}$ is denoted by B, a total peak area in a range of an absorption band of equal to or more than 1690 $cm^{-1}$ and equal to or less than 1780 $cm^{-1}$ is denoted by C, and a total peak area in a range of an absorption band of equal to or more than 1493 $cm^{-1}$ and equal to or less than 1598 $cm^{-1}$ is denoted by D, preferable area ratio examples are shown below.

In the infrared absorption spectrum of the gas barrier layer 103, the area ratio of the amide bond represented by B/A is preferably 0.200 or more, more preferably 0.220 or more, and still more preferably 0.250 or more, from the viewpoint of further improving the gas barrier performance after the retort treatment.

In addition, from the viewpoint of further improving the balance between barrier properties and productivity, the area ratio of the amide bond represented by B/A is preferably 0.370 or less, more preferably 0.350 or less, and still more preferably 0.300 or less.

In the infrared absorption spectrum of the gas barrier layer 103, the area ratio of the carboxylic acid represented by C/A is preferably 0.150 or less, more preferably 0.100 or less, still more preferably 0.080 or less, and even more preferably 0.060 or less, from the viewpoint of further improving the gas barrier performance after the retort treatment.

In addition, although the lower limit of the area ratio of the carboxylic acid represented by C/A is not limited, the lower limit is, for example, 0.000 or more, and may be, for example, 0.0001 or more.

In the infrared absorption spectrum of the gas barrier layer 103, the area ratio of the carboxylate represented by D/A is preferably 0.580 or more and more preferably 0.600 or more from the viewpoint of further improving the balance between barrier properties and productivity.

In addition, from the viewpoint of further improving the gas barrier performance after the retort treatment, the D/A is preferably 0.800 or less, more preferably 0.780 or less, still more preferably 0.760 or less, and even more preferably 0.740 or less.

Further, from the viewpoint of making the balance between the productivity and the barrier properties of the gas barrier laminate more preferable, it is also preferable that the area ratio of the amide bond represented by B/A is equal to or more than 0.200 and equal to or less than 0.370, the area ratio of the carboxylic acid represented by C/A is 0.150 or less, and the area ratio of the carboxylate represented by D/A is equal to or more than 0.580 and equal to or less than 0.800.

In the infrared absorption spectrum of the gas barrier layer 103, an area ratio of the carboxylate represented by D/A to the area ratio of the amide bond represented by B/A is preferably 1.2 or more, more preferably 1.5 or more, and still more preferably 2.0 or more, from the viewpoint of improving the barrier properties.

In addition, from the viewpoint of improving the barrier properties after retorting, the area ratio of the carboxylate represented by D/A to the area ratio of the amide bond represented by B/A is preferably 4.0 or less, more preferably 3.5 or less, and still more preferably 3.0 or less.

Here, in the gas barrier layer 103, absorption based on νC═O of the unreacted carboxylic acid in the infrared absorption spectrum is observed in the vicinity of 1700 $cm^{-1}$, absorption based on νC═O of the amide bond as a crosslinked structure is observed in the vicinity of 1630 to 1685 $cm^{-1}$, absorption based on νC═O of the carboxylate is observed in the vicinity of 1540 to 1560 $cm^{-1}$, and absorption based on δN—H of the ammonia forming the complex is observed in the vicinity of 1300 to 1490 $cm^{-1}$.

It is considered that the maximum peak height α of the absorbance in the range of equal to or more than 1300 $cm^{-1}$ and equal to or less than 1490 $cm^{-1}$ in the infrared absorption spectrum represents an index of the amount of ammonia present that forms the complex, and the maximum peak height γ in the range of equal to or more than 1690 $cm^{-1}$ and equal to or less than 1780 $cm^{-1}$ represents an index of the amount of free, that is, unreacted carboxylic acid present.

In the fourth embodiment, the maximum peak heights α and γ can be specifically measured by the following procedure. That is, a measurement sample of 1 cm×3 cm is cut out from the gas barrier layer 103. Next, the infrared absorption spectrum of the surface of the gas barrier layer 103 is obtained by infrared total reflection measurement (ATR method). In the obtained infrared absorption spectrum, a line connecting an absorbance at 900 $cm^{-1}$ and an absorbance at 1900 $cm^{-1}$ with a straight line is set as a baseline, and a maximum peak height in a range of each absorbance is obtained.

In addition, it is considered that the total peak area A in the range of the absorption band of equal to or more than 1493 $cm^{-1}$ and equal to or less than 1780 $cm^{-1}$ in the infrared absorption spectrum represents an index of the total amount of the carboxylic acid, the amide bond, and the carboxylate, and the total peak area B in the range of the absorption band of equal to or more than 1598 $cm^{-1}$ and equal to or less than 1690 $cm^{-1}$ represents an index of the amount of the amide bond present. Further, it is considered that the total peak area C in the range of the absorption band of equal to or more than 1690 $cm^{-1}$ and equal to or less than 1780 $cm^{-1}$ represents an index of the amount of the unreacted carboxylic acid present and the total peak area D in the range of the absorption band of equal to or more than 1493 $cm^{-1}$ and equal to or less than 1598 $cm^{-1}$ represents an index of the amount of carboxylate present.

In the fourth embodiment, the total peak areas A to D can be specifically measured by the following procedure.

First, a sample for measurement of 1 cm×3 cm is cut out from the gas barrier layer 103. Next, the infrared absorption spectrum of the surface of the gas barrier layer 103 is obtained by infrared total reflection measurement (ATR method). From the obtained infrared absorption spectrum, the total peak areas A to D described above are calculated by the following procedures (1) to (4).

(1) The absorbances at 1780 $cm^{-1}$ and at 1493 $cm^{-1}$ are connected by a straight line (N), and the area surrounded by the absorption spectrum in the range of an absorption band of equal to or more than 1493 $cm^{-1}$ and equal to or less than 1780 $cm^{-1}$ and N is set as a total peak area A.

(2) A straight line (O) is drawn down orthogonally from an absorbance (Q) at 1690 $cm^{-1}$, an intersection point of N and O is set as P, a straight line (S) is drawn down orthogonally from an absorbance (R) at 1598 $cm^{-1}$, an intersection point of N and S is set as T, and the area which is surrounded by the absorption spectrum in the range of an absorption band of equal to or more than 1598 $cm^{-1}$ and equal to or less than 1690 $cm^{-1}$, the straight line S, the point T, the straight line N, the point P, the straight line O, the absorbance Q, and the absorbance R is set as a total peak area B.

(3) The area which is surrounded by the absorption spectrum in the range of an absorption band of equal to or more than 1690 $cm^{-1}$ and equal to or less than 1780 $cm^{-1}$, the absorbance Q, the straight line O, the point P, and the straight line N is set as a total peak area C.

(4) The area which is surrounded by the absorption spectrum in the range of an absorption band of equal to or more than 1493 $cm^{-1}$ and equal to or less than 1598 $cm^{-1}$, the absorbance R, the straight line S, the point T, and the straight line N is set as a total peak area D.

Next, the area ratios B/A, C/A, and D/A are obtained from the areas obtained by the above method.

In the fourth embodiment, it is possible to perform the measurement of the infrared absorption spectrum (infrared total reflection measurement: ATR method), for example, under the conditions of an incident angle of 45 degrees, room temperature, a resolution of 4 $cm^{-1}$, and a cumulative number of 100 times by mounting a PKM-GE-S (Germanium) crystal and using an IRT-5200 apparatus manufactured by JASCO Corporation.

The maximum peak heights α and γ of the gas barrier layer 103, the area ratio of the amide bond represented by B/A, the area ratio of the carboxylic acid represented by C/A, and the area ratio of the carboxylate represented by D/A can be controlled by appropriately adjusting the production conditions of the gas barrier layer 103. Specifically, the blending ratios of the polycarboxylic acid, the polyamine compound, the polyvalent metal compound, and the phosphorus compound, the method for preparing the mixture before curing, and the method, temperature, and time of the heat treatment of the mixture are exemplified as factors for controlling the maximum peak heights α and γ of the gas barrier layer 103, the area ratio of the amide bond represented by B/A, the area ratio of the carboxylic acid represented by C/A, and the area ratio of the carboxylate represented by D/A.

Next, components included in the mixture (gas barrier coating material) before curing will be described.

(Polycarboxylic Acid)

The polycarboxylic acid has two or more carboxy groups in the molecule. Specific examples thereof include homopolymers of α,β-unsaturated carboxylic acid such as (meth) acrylic acid, itaconic acid, fumaric acid, crotonic acid, cinnamic acid, 3-hexenoic acid, and 3-hexenedioic acid, or copolymers thereof. In addition, the polycarboxylic acid may be a copolymer of the α,β-unsaturated carboxylic acid described above and esters such as ethyl ester, olefins such as ethylene, or the like.

Among these, a homopolymer of acrylic acid, methacrylic acid, itaconic acid, fumaric acid, crotonic acid, and cinnamic acid or a copolymer thereof is preferable, one or two or more polymers selected from the group consisting of polyacrylic acid, polymethacrylic acid, and a copolymer of acrylic acid and methacrylic acid are more preferable, at least one polymer selected from polyacrylic acid and polymethacrylic acid is still more preferable, and at least one polymer selected from a homopolymer of acrylic acid or a homopolymer of methacrylic acid is even more preferable.

Here, in the fourth embodiment, polyacrylic acid includes both a homopolymer of acrylic acid and a copolymer of acrylic acid and another monomer. In a case of a copolymer of acrylic acid and another monomer, the polyacrylic acid usually includes constituent units which are derived from acrylic acid at 90% by mass or more, preferably 95% by mass or more, and more preferably 99% by mass or more in 100% by mass of the polymer.

In addition, in the fourth embodiment, polymethacrylic acid includes both a homopolymer of methacrylic acid and a copolymer of methacrylic acid and another monomer. In a case of a copolymer of methacrylic acid and another monomer, the polymethacrylic acid usually includes constituent units which are derived from methacrylic acid at 90% by mass or more, preferably 95% by mass or more, and more preferably 99% by mass or more in 100% by mass of the polymer.

The polycarboxylic acid is a polymer where carboxylic acid monomers are polymerized. From the viewpoint of excellent balance between gas barrier properties and handleability, the molecular weight of the polycarboxylic acid is preferably 500 to 2,500,000, more preferably 5,000 to 2,000,000, still more preferably 10,000 to 1,500,000, and even more preferably 100,000 to 1,200,000.

Here, in the fourth embodiment, the molecular weight of the polycarboxylic acid is the polyethylene oxide conversion weight average molecular weight and is measurable using gel permeation chromatography (GPC).

At least a part of the polycarboxylic acid may be neutralized by a volatile base. By neutralizing the polycarboxylic acid with a volatile base, it is possible to suppress gelation from occurring by neutralizing the polycarboxylic acid with the volatile base when mixing a polyvalent metal compound or a polyamine compound and polycarboxylic acid. Accordingly, in the polycarboxylic acid, from the viewpoint of prevention of gelation, a volatile base is preferably used for the partially neutralized product or completely neutralized product of the carboxy group. It is possible to obtain the neutralized product by partially or completely neutralizing the carboxy group of the polycarboxylic acid with a volatile base, that is, the carboxy group of the polycarboxylic acid is partially or completely made into carboxylate. Due to this, it is possible to prevent gelation when adding a polyamine compound and a polyvalent metal compound.

A partially neutralized product can be prepared by adding a volatile base to an aqueous solution of polycarboxylic acid polymer but it is possible to set a desired neutralization degree by adjusting the ratio of the amounts of the polycarboxylic acid and the volatile base. In the fourth embodiment, from the viewpoint of sufficiently suppressing gelation caused by the neutralization reaction with the amino group of the polyamine compound, the neutralization degree of the polycarboxylic acid by the volatile base is preferably 70 to 300 equivalent %, more preferably 90 to 250 equivalent %, and still more preferably 100 to 200 equivalent %.

It is possible to use an arbitrary water-soluble base as a volatile base.

Examples of volatile bases include ammonia, morpholine, alkylamine, 2-dimethyl amino ethanol, N-methyl monopholine, ethylene diamine, and tertiary amines such as triethyl amine, an aqueous solution thereof or a mixture thereof. From the viewpoint of obtaining good gas barrier properties, an ammonia aqueous solution is preferable.

(Polyamine Compound)

The mixture before curing includes a polyamine compound. By including the polyamine compound, the barrier properties of the obtained gas barrier material can be improved.

The polyamine compound is a compound having two or more amino groups in the main chain, side chain, or terminal, and is preferably a polymer. Specific examples thereof include aliphatic polyamines such as polyallylamine, polyvinylamine, polyethylenimine, and poly(trimethyleneimine); polyamides having amino groups on side chains such as polylysine and polyarginine; and the like. In addition, a polyamine where a portion of the amino group is modified may be used.

From the viewpoint of obtaining good gas barrier properties, the polyamine compound preferably includes polyethylenimine, and polyethyleneimine is more preferable.

From the viewpoint of excellent balance of gas barrier properties and handleability, the number average molecular weight of the polyamine compound is preferably 50 to 2,000,000, more preferably 100 to 1,000,000, still more preferably 1,500 to 500,000, yet more preferably 1,500 to 100,000, even more preferably 1,500 to 50,000, yet more preferably 3,500 to 20,000, still more preferably 5,000 to 15,000, and still even more preferably 7,000 to 12,000.

Here, in the fourth embodiment, it is possible to measure the molecular weight of the polyamine compound using a boiling point increasing method or a viscosity method.

From the viewpoint of further improving the gas barrier performance after the retort treatment, (number of moles of amino groups included in polyamine compound in the mixture)/(number of moles of —COO— groups included in polycarboxylic acid in the mixture) is preferably 0.20 or more, more preferably 0.25 or more, still more preferably 0.30 or more, even more preferably 0.35 or more, and still even more preferably 0.40 or more.

From the same viewpoint, (number of moles of amino groups included in the polyamine compound in the mixture)/(the number of moles of —COO— groups included in the polycarboxylic acid in the mixture) is preferably 0.90 or less, more preferably 0.85 or less, still more preferably 0.80 or less, even more preferably 0.75 or less, and still even more preferably 0.70 or less.

Details of the reason are not clear; however, it is considered that it is possible to the gas barrier layer 103 and a gas barrier laminate having excellent gas barrier performance after a retort treatment by forming a dense structure by amide crosslinking using amino groups which form a polyamine compound and metal crosslinking using polyvalent metals which form a salt of polycarboxylic acid and polyvalent metal in a well-balanced manner.

(Polyvalent Metal Compound)

Specifically, a polyvalent metal compound is a metal and a metal compound which belongs to Group 2 to 13 in the periodic table and, in more detail, a divalent or higher valency metal such as magnesium (Mg), calcium (Ca), strontium (Sr), barium (Ba), iron (Fe), cobalt (Co), nickel (Ni), copper (Cu), zinc (Zn), and aluminum (Al), and oxides, hydroxides, halogenides, carbonates, phosphates, phosphites, hypophosphites, sulfates, or sulfites of these metals, or the like. From the point of view of water resistance, impurities, and the like, a metal oxide or a metal hydroxide is preferable.

From the viewpoint of further improving the gas barrier performance after the retort treatment, the divalent or higher valent metal in the polyvalent metal compound is preferably one or two or more metals selected from the group consisting of Zn, Ca, Mg, Ba, and Al, and more preferably Zn.

From the same viewpoint, the polyvalent metal compound is preferably a compound of one or two or more divalent or higher valent metals selected from the group consisting of Zn, Ca, Mg, Ba, and Al, and more preferably a compound of Zn.

From the same viewpoint, the polyvalent metal compound is preferably one or two or more compounds selected from the group consisting of oxides such as magnesium oxide, calcium oxide, barium oxide, zinc oxide, and magnesium hydroxide, and hydroxides such as calcium hydroxide, barium hydroxide, and zinc hydroxide, more preferably at least one of zinc oxide or zinc hydroxide, and still more preferably zinc oxide.

In the fourth embodiment, from the viewpoint of further improving the gas barrier performance after the retort treatment, (number of moles of polyvalent metal compound in the mixture)/(number of moles of —COO— groups included in the polycarboxylic acid in the mixture) is preferably 0.10 or more, more preferably 0.13 or more, still more preferably 0.15 or more, and even more preferably 0.18 or more.

From the same viewpoint, (number of moles of polyvalent metal compound in the mixture)/(number of moles of —COO— groups included in the polycarboxylic acid in the mixture) is preferably 0.80 or less, more preferably 0.70 or less, still more preferably 0.60 or less, even more preferably 0.55 or less, and still even more preferably 0.50 or less.

In the fourth embodiment, from the viewpoint of further improving the gas barrier performance after the retort treatment, (number of moles of polyvalent metal compound in the mixture)/(number of moles of amino groups derived from the polyamine compound in the mixture) is preferably 0.25 or more, more preferably 0.35 or more, and still more preferably 0.40 or more.

From the same viewpoint, (number of moles of polyvalent metal compound in the mixture)/(number of moles of amino groups derived from the polyamine compound in the mixture) is preferably 0.65 or less, more preferably 0.60 or less, and still more preferably 0.55 or less.

(Phosphorus Compound or Salt Thereof)

The phosphorus compound or the phosphorus compound in a salt thereof includes one or more —P—OH groups in the molecular structure. The phosphorus compound may be blended in the mixture as a salt.

From the viewpoint of further improving water vapor barrier properties after the retort treatment, the phosphorus compound preferably includes two or more —P—OH groups, and more preferably includes three or more —P—OH groups. In addition, from the viewpoint of improving the liquid stability of the gas barrier coating material, the number of —P—OH groups in the phosphorus compound may be, for example, 2 or less.

Specific examples of the phosphorus compound include phosphoric acid, phosphorous acid, phosphonic acid, hypophosphorous acid, polyphosphoric acid, and derivatives thereof.

Specifically, the polyphosphoric acid has a structure in which two or more phosphoric acids are condensed in the molecular structure, and examples thereof include diphosphoric acid (pyrophosphoric acid), triphosphoric acid, and polyphosphoric acid with four or more condensed phosphoric acids.

Specific examples of the derivatives include esters of the above-described phosphorus compounds such as phosphorylated starch and phosphated crosslinked starch;

halides such as chlorides;

anhydrides such as tetraphosphorus decoxide;

and compounds having a structure in which a hydrogen atom bonded to a phosphorus atom is substituted with an alkyl group, such as nitrilotris(methylenephosphonic acid) and N,N,N',N'-ethylenediaminetetrakis(methylenephosphonic acid).

From the viewpoint of further improving the balance between barrier properties and productivity, the phosphorus compound is one or two or more selected from the group consisting of phosphoric acid, phosphorous acid, hypophosphorous acid, polyphosphoric acid, phosphonic acid, and salts thereof, and more preferably at least one selected from the group consisting of phosphoric acid and phosphorous acid.

In addition, specific examples of the salt of the phosphorus compound include salts of monovalent metals such as sodium and potassium, and ammonium salts. From the viewpoint of improving barrier properties, the salt of the phosphorus compound is preferably an ammonium salt.

In the fourth embodiment, from the viewpoint of improving the barrier properties, (number of moles of P atoms derived from the phosphorus compound or the salt thereof in the mixture)/(number of moles of —COO— groups derived from the polycarboxylic acid in the mixture) may be, for example, 0.0001 or more, preferably 0.001 or more, more preferably 0.003 or more, and still more preferably 0.005 or more. In a phosphorus compound containing one P atom in the chemical formula, such as phosphoric acid, the number of moles of the P atom and the number of moles of the phosphorus compound have the same meaning.

In addition, from the viewpoint of improving the liquid stability of the barrier coating material (mixture), (number of moles of P atoms derived from the phosphorus compound or the salt thereof in the mixture)/(molar number of —COO— groups derived from the polycarboxylic acid in the mixture) is preferably 0.3 or less, more preferably 0.1 or less, still more preferably 0.08 or less, and even more preferably 0.005 or less.

The mixture before curing may include components other than the above-described components.

For example, it is preferable that the mixture further includes a carbonic acid-based ammonium salt. The carbonic acid-based ammonium salt is added to bring the polyvalent metal compound into the form of a polyvalent metal ammonium carbonate complex to improve the solubility of the polyvalent metal compound and to prepare a uniform solution containing the polyvalent metal compound. When the mixture before curing includes a carbonic acid-based ammonium salt, the amount of the polyvalent metal compound dissolved can be increased, and as a result, the mixture in which the polyvalent metal compound is blended can be made more homogeneous.

Examples of the carbonic acid-based ammonium salt include ammonium carbonate, and ammonium hydrogencarbonate, and the like, and ammonium carbonate is preferable from the viewpoint that the component easily volatilizes and does not easily remain in the obtained gas barrier layer.

From the viewpoint of further improving the solubility of the polyvalent metal compound, (number of moles of carbonic acid-based ammonium salt in the mixture)/(number of moles of polyvalent metal compound in the mixture) is preferably 0.05 or more, more preferably 0.10 or more, still more preferably 0.25 or more, even more preferably 0.50 or more, and still even more preferably 0.75 or more.

In addition, from the viewpoint of further improving the coatability as the gas barrier coating material, (number of moles of carbonic acid-based ammonium salt in the gas barrier coating material)/(number of moles of polyvalent metal compound in the gas barrier coating material) is preferably 10.0 or less, more preferably 5.0 or less, still more preferably 2.0 or less, and even more preferably 1.5 or less.

In addition, the mixture before curing preferably further includes a surfactant from the viewpoint of suppressing the occurrence of cissing when the mixture is applied as a gas barrier coating material.

The addition amount of the surfactant is preferably 0.01% to 3% by mass, and more preferably 0.01% to 1% by mass, with respect to 100% by mass of the total solid content of the mixture.

Examples of the surfactant include an anionic surfactant, a nonionic surfactant, a cationic surfactant, and an amphoteric surfactant. From the viewpoint of obtaining good coatability, nonionic surfactants are preferable, polyoxyalkylene alkyl ethers are more preferable, and polyoxyethylene alkyl ethers are still more preferable.

Examples of the non-ionic surfactants include polyoxyalkylene alkylaryl ethers, polyoxyalkylene alkyl ethers, polyoxyalkylene fatty acid esters, sorbitan fatty acid esters, silicone-based surfactants, acetylene alcohol-based surfactants, fluorine-containing surfactants, and the like.

Examples of the polyoxyalkylene alkyl aryl ethers include polyoxyethylene nonyl phenyl ether, polyoxyethylene octyl phenyl ether, polyoxyethylene dodecyl phenyl ether, and the like.

Examples of the polyoxyalkylene alkyl ethers include polyoxyethylene alkyl ethers such as polyoxyethylene oleyl ether and polyoxyethylene lauryl ether.

Examples of the polyoxyalkylene fatty acid esters include polyoxyethylene oleic acid esters, polyoxyethylene lauric acid esters, polyoxyethylene distearic acid esters, and the like.

Examples of sorbitan fatty acid esters include sorbitan laurate, sorbitan monostearate, sorbitan monooleate, sorbitan sesquioleate, polyoxyethylene monooleate, polyoxyethylene stearate, and the like.

Examples of silicone-based surfactants include dimethylpolysiloxane and the like.

Examples of acetylene alcohol-based surfactants include 2,4,7,9-tetramethyl-5-decyne-4,7-diol, 3,6-dimethyl-4-octyne-3,6-diol, 3,5-dimethyl-1-hexyn-3-ol, and the like.

Examples of fluorine-containing surfactants include fluorine alkyl ester and the like.

The mixture before curing may include additives other than the above-described components. For example, various additives such as lubricants, slip agents, anti-blocking agents, antistatic agents, anti-fogging agents, pigments, dyes, and inorganic or organic fillers may be added.

In addition, from the viewpoint of improving the coatability when the mixture is applied as a gas barrier coating material, the solid content concentration of the mixture before curing is preferably 0.5% to 15% by mass and more preferably 1% to 10% by mass.

(Method for Producing Gas Barrier Layer)

Specifically, the gas barrier layer 103 can be produced by applying the mixture (gas barrier coating material) before curing and curing the mixture.

The mixture can be obtained as follows.

First, a volatile base is appropriately added to the polycarboxylic acid to completely or partially neutralize the carboxy groups of the polycarboxylic acid. Further, a polyvalent metal salt compound and an appropriate carbonic acid-based ammonium salt are mixed with each other, and a metal salt is formed in all or some of the carboxy groups of the polycarboxylic acid neutralized with the volatile base and the carboxy groups of the polycarboxylic acid not neutralized with the volatile base.

Thereafter, a polyamine compound is further added, and finally a phosphorus compound or a salt thereof is added to obtain a mixture before curing. Therefore, a salt is formed between the phosphorus compound and the polyvalent metal compound or the amino group of the polyamine.

By mixing the polycarboxylic acid, the polyvalent metal salt compound, the phosphorus compound or a salt thereof, the appropriate carbonic acid-based ammonium salt, and the polyamine compound in such a procedure, the formation of agglomerates can be suppressed, and a more uniform mixture can be obtained. This makes it possible to more effectively advance the dehydration-condensation reaction between the —COO— group included in the polycarboxylic acid and the amino group included in the polyamine compound.

More specifically, the method is as follows. In the following, a case where a volatile base and a carbonic acid-based ammonium salt are blended in a mixture will be described as an example.

First, a completely or partially neutralized solution of carboxy groups which form the polycarboxylic acid is prepared.

A volatile base is added to the polycarboxylic acid and the carboxy groups of the polycarboxylic acid are completely neutralized or partially neutralized. By neutralizing the carboxy groups of the polycarboxylic acid, gelation which is caused by to the reaction of the carboxy groups which form the polycarboxylic acid, a polyvalent metal compound, and amino groups which form a polyamine compound when the polyvalent metal compound or the polyamine compound is added is effectively prevented, and a more uniform mixture can be obtained.

Subsequently, a polyvalent metal salt compound and a carbonic acid-based ammonium salt are added thereto and dissolved and a polyvalent metal salt with —COO— groups which form polycarboxylic acid is formed by the polyvalent metal ions which are produced. At this time, the —COO— groups which form a salt with the polyvalent metal ions refer to both carboxy groups which are not neutralized with the base and —COO— groups which are neutralized with a base described above. In a case of the —COO— groups which are neutralized with a base, polyvalent metal ions which are derived from the polyvalent metal compound described above are replaced and coordinated to form a polyvalent metal salt of a —COO— group.

Then, after the polyvalent metal salt is formed, a polyamine compound and a phosphorus compound or a salt thereof are further added to obtain a mixture. At this time, the polyvalent metal salt coordinated to the —COO— group is also coordinated to the —P—O— group in the phosphorus compound, and a —COO-polyvalent metal-O—P— structure is formed. In addition, an ionic bond is formed between the —$NH_2$ group in the polyamine and the —P—O— group in the phosphorus compound.

The mixture produced in this manner is applied onto the inorganic material layer 102 or an interlayer with the gas barrier layer 103 formed on the inorganic material layer 102 as a gas barrier coating material, and dried and cured to form the gas barrier layer 103. At this time, the polyvalent metal of the polyvalent metal salt of the —COO— groups which form the polycarboxylic acid forms metal crosslinking, amide crosslinking is formed by the amino group which forms the polyamine, and ionic crosslinking is formed between the —P—O— group in the phosphorus compound and the polyvalent metal or the amino group in the polyamine to obtain the gas barrier layer 103 having excellent gas barrier properties. A more detailed method for producing the gas barrier layer 103 will be described later.

From the viewpoint of improving the barrier properties, the thickness of the gas barrier layer 103 after drying and curing is preferably 0.01 μm or more, more preferably 0.05 μm or more, and still more preferably 0.1 μm or more.

In addition, from the viewpoint of reducing the thickness of the entire gas barrier laminate, the thickness of the gas barrier layer 103 after drying and curing is preferably 15 μm or less, more preferably 5 μm or less, and still more preferably 1 μm or less.

(Base Material Layer)

The base material layer 101 may be a single layer or a layer of two or more types. The shape of the base material layer 101 is not limited and examples thereof include a sheet or film shape, a tray, a cup, a hollow body, or the like.

The material of the base material layer 101 is not limited as long as the inorganic material layer 102 can be stably formed on the base material layer 101 and the solution of the gas barrier coating material can be applied to the upper part of the inorganic material layer 102, and any material can be used. Examples of the material of the base material layer 101 include a resin such as a thermosetting resin or a thermoplastic resin, or an organic material such as paper; an inorganic material such as glass, pottery, ceramics, silicon oxide, silicon nitride oxide, silicon nitride, cement, and metals such as aluminum, aluminum oxide, iron, copper, and stainless steel; and a base material layer having a multilayer structure formed of a combination of organic materials or a combination of an organic material and an inorganic material. Among these, for example, in a case of various film applications such as packaging materials and panels, a plastic film using at least one selected from the group consisting of a thermosetting resin and a thermoplastic resin, or an organic material such as paper is preferable.

As the thermosetting resin, a known thermosetting resin can be used. Examples of the thermosetting resin include known thermosetting resins such as epoxy resins, unsaturated polyester resins, phenolic resins, urea-melamine resins, polyurethane resins, silicone resins, and polyimides.

As the thermoplastic resin, a known thermoplastic resin can be used. Examples of thermoplastic resins include polyolefins (polyethylene, polypropylene, poly(4-methyl-1-pentene), poly(1-butene), and the like), polyesters (polyethylene terephthalate, polybutylene terephthalate, polyethylene naphthalate, and the like), polyamide (nylon-6, nylon-66, polymetaxylene adipamide, and the like), polyvinyl chloride, polyimide, ethylene vinyl acetate copolymer or saponified products thereof, polyvinyl alcohol, polyacrylonitrile, polycarbonate, polystyrene, ionomers, fluorine-based resins, or mixtures thereof.

Among these, from the viewpoint of improving transparency, one or two or more resins selected from the group consisting of polypropylene, polyethylene terephthalate (PET), polyethylene naphthalate, polyamide, polyimide, and polybutylene terephthalate are preferable.

In addition, from the viewpoint of excellent pinhole resistance, tearing resistance, heat resistance, and the like, one or two or more resins selected from the group consisting of polyamide, polyethylene terephthalate, and polybutylene terephthalate are preferable. From the same viewpoint, the base material layer 101 is preferably a layer including one or two or more resins selected from the group consisting of polyamide, polyethylene terephthalate, and polybutylene terephthalate, and more preferably a layer of one or two or more resins.

In addition, in a case where a hygroscopic material such as polyamide is used for the base material layer 101, in the gas barrier laminate, the base material layer 101 absorbs moisture and swells, and the gas barrier performance under high humidity, the gas barrier performance after a retort treatment, the gas barrier performance in a case of being filled with an acidic content, and the like are easily decreased. However, in the fourth embodiment, even in a case where a hygroscopic material is used as the base material layer 101, a decrease in the gas barrier performance of the gas barrier laminate under high humidity and the gas barrier performance after a retort treatment can be suitably suppressed.

In addition, the base material layer 101 may be obtained by stretching a film formed of a thermosetting resin or a thermoplastic resin in at least one direction, preferably in biaxial directions.

From the viewpoint of excellent transparency, rigidity, and heat resistance, the base material layer 101 is preferably a biaxially stretched film formed of one or two or more thermoplastic resins selected from the group consisting of polypropylene, polyethylene terephthalate, polyethylene naphthalate, polyamide, polyimide, and polybutylene terephthalate, and more preferably a biaxially stretched film formed of one or two or more thermoplastic resins selected from the group consisting of polyamide, polyethylene terephthalate, and polybutylene terephthalate.

In addition, the surface of the base material layer 101 may be coated with polyvinylidene chloride, polyvinyl alcohol, an ethylene-vinyl alcohol copolymer, an acrylic resin, a urethane-based resin, or the like.

Further, the base material layer 101 may be subjected to a surface treatment in order to improve adhesion to the gas barrier layer 103. Specifically, a surface activation treatment such as a corona treatment, a flame treatment, a plasma treatment, or a primer coating treatment may be performed on the surface of the base material layer 101 facing the gas barrier layer 103.

From the viewpoint of obtaining good film properties, the thickness of the base material layer 101 is preferably 1 μm or more, more preferably 5 μm or more, and still more preferably 10 μm or more, and is preferably 1000 μm or less, more preferably 500 μm or less, and still more preferably 300 μm or less.

(Inorganic Material Layer)

Examples of the inorganic material forming the inorganic material layer 102 include metals, metal oxides, metal nitrides, metal fluorides, metal oxynitrides, and the like which are able to form a thin film having barrier properties.

Examples of inorganic materials forming the inorganic material layer 102 include one or two or more selected from periodic table 2A elements such as beryllium, magnesium, calcium, strontium, and barium, periodic table transition elements such as titanium, zirconium, ruthenium, hafnium, and tantalum; periodic table 2B elements such as zinc; periodic table 3A elements such as aluminum, gallium, indium, and thallium; periodic table 4A elements such as silicon, germanium, and tin; periodic table 6A elements such as selenium and tellurium, and the like, and oxides, nitrides, fluorides, oxynitrides, and the like thereof.

In the fourth embodiment, the group name of the periodic table for the inorganic material layer 102 is shown by the old CAS formula.

Further, among the inorganic materials described above, one or two or more inorganic materials selected from the group consisting of silicon oxide, aluminum oxide, and aluminum is preferable, and aluminum oxide is more preferable due to being excellent in the balance of barrier properties, cost, and the like.

Note that, silicon oxide may contain silicon monoxide and silicon suboxide in addition to silicon dioxide.

The inorganic material layer 102 is formed of the inorganic material described above. The inorganic material layer 102 preferably includes an aluminum oxide layer formed of aluminum oxide due to being excellent in a balance of barrier properties, cost, and the like.

The inorganic material layer 102 may be formed of a single inorganic material layer or a plurality of inorganic material layers. In addition, in a case where the inorganic material layer 102 is formed of a plurality of inorganic material layers, the inorganic material layer may be formed of the same type of inorganic material layer or may be formed of different types of inorganic material layers.

The thickness of the inorganic material layer 102 is usually 1 nm or more and preferably 4 nm or more, and is usually 1000 nm or less and preferably 500 nm or less, from the viewpoint of balance between improvement of barrier properties and improvement of handleability.

Here, the thickness of the inorganic material layer 102 can be obtained from, for example, observation images taken by a transmission electron microscope or a scanning electron microscope.

The method of forming the inorganic material layer 102 is not limited and it is possible to form the inorganic material layer 102 on one surface or both surfaces of the base material layer 101 using, for example, a vacuum deposition method, an ion plating method, a sputtering method, a chemical vapor deposition method, a physical vapor deposition method, a chemical vapor deposition method (CVD method), a plasma CVD method, a sol-gel method, or the like. Among the above, film formation under reduced pressure such as a sputtering method, an ion plating method, a chemical vapor deposition method (CVD), a physical vapor deposition method (PVD), a plasma CVD method, or the like is desirable. Due to this, it is expected quickly reacting the chemically active molecular species containing silicon such as silicon nitride or silicon oxynitride will make it possible to improve the smoothness of the surface of the inorganic material layer 102 and to reduce the number of pores. In order to rapidly perform these bonding reactions, it is desirable that the inorganic atoms and compounds are chemically active molecular species or atomic species.

In addition, from the viewpoint of improving the balance between the barrier properties and the productivity of the gas barrier laminate, the inorganic material layer 102 is preferably a vapor deposition film.

From the viewpoint of improving the balance between the barrier properties and the productivity of the gas barrier laminate, the inorganic material layer 102 is a vapor deposition film provided on the base material layer 101 or, in a case where an interlayer is provided between the base material layer 101 and the inorganic material layer 102, on the interlayer, and is formed of one or two or more inorganic materials selected from the group consisting of silicon oxide, aluminum oxide, and aluminum.

(Undercoat Layer)

The undercoat layer 104 may be provided between the base material layer 101 and the inorganic material layer 102 (FIG. 14). The adhesion thereof can be further improved by providing the undercoat layer 104, and the barrier properties after the retort treatment can be further improved.

From the viewpoint of improving the adhesion between the base material layer 101 and the inorganic material layer 102, as the material of the undercoat layer 104, for example, one or two or more selected from the group consisting of polyurethane resin, polyester resin, oxazoline resin, and (meth)acrylic resin may be used.

Examples of the polyurethane resin include various polyurethane resins, polyurethane polyurea resins, and prepolymers thereof. Specific examples of such a urethane resin include a reactant of a diisocyanate component such as tolylene diisocyanate, xylene diisocyanate, diphenylmethane diisocyanate, hexamethylene diisocyanate, cyclohexane diisocyanate, isophorone diisocyanate, or dicyclohexyl diisocyanate, and a diol component such as ethylene glycol, propylene glycol, 1,4-butanediol, 1,6-hexanediol, neopentyl glycol, cyclohexanedimethanol, bisphenol, polyester diol, polyether diol, polycarbonate diol, or polyethylene glycol; a reactant of a urethane prepolymer having an isocyanate group at a terminal and an amino compound, an aminosulfonate, polyhydroxycarboxylic acid, or pyrosulfuric acid; and the like.

In addition, from the viewpoint of further improving the barrier properties after the retort treatment and the adhesion between the base material layer 101 and the inorganic material layer 102, it is also preferable that the undercoat layer 104 is formed of a polyurethane resin having an aromatic ring structure in the main chain. The polyurethane-based resin having an aromatic ring structure in the main chain can be obtained, for example, as a water-dispersible polyurethane resin by a reaction of a polyol, an organic polyisocyanate, and a chain extender. Therefore, an aromatic ring structure can be introduced into the main chain of the polyurethane-based resin.

As the polyurethane resin having an aromatic ring structure in the main chain, more specifically, those described in Japanese Unexamined Patent Publication No. 2018-171827 can be used.

In addition, from the viewpoint of improving heat resistance, water resistance, hydrolysis resistance, and the like, a crosslinking agent may be used in combination with the above-described water-dispersible polyurethane resin. The crosslinking agent may be an external crosslinking agent added as a third component to the water-dispersible polyurethane resin, or may be an internal crosslinking agent that introduces a reactive site, which becomes a crosslinked structure, into the molecular structure of the water-dispersible polyurethane resin in advance.

As the crosslinking agent, a compound having an isocyanate group, an oxazoline group, a carbodiimide group, an epoxy group, a melamine resin, a silanol group, or the like can be suitably used, and a compound having a carbodiimide group is more suitable. In addition, in a case where a compound having a carbodiimide group is used as a crosslinking agent, the compound having a carbodiimide group is added in such an amount that the amount of the carbodiimide group is preferably 0.1 to 3.0 mol, more preferably 0.2 to 2.0 mol, and still more preferably 0.3 to 1.0 mol with respect to 1.0 mol of the carboxy group in the polyurethane resin.

Examples of the polyester resin used in the undercoat layer 104 include various polyester resins and modified products thereof. Specific examples of such a polyester resin include reaction products of polycarboxylic acid components such as terephthalic acid, phthalic acid, isophthalic acid, trimellitic acid, pyromellitic acid, 2-sulfoisophthalic acid, 5-sulfoisophthalic acid, adipic acid, sebacic acid, succinic acid, and dodecanedioic acid with diol components such as ethylene glycol, propylene glycol, 1,4-butanediol, 1,6-hexanediol, neopentyl glycol, cyclohexane dimethanol, and bisphenol. Modified products such as acrylic resin, epoxy resin and the like are also included.

In a case where an oxazoline resin is used for the undercoat layer 104, the undercoat layer 104 is preferably formed of an oxazoline-based resin composition including an oxazoline group-containing aqueous polymer, an aqueous (meth)acrylic resin, and an aqueous polyester resin.

The oxazoline-based resin composition is formed of, for example, an oxazoline group-containing aqueous polymer having an oxazoline group content of 6.0 to 9.0 mmol/g, an aqueous (meth)acrylic resin having a carboxy group content of 0.5 to 3.5 mmol/g, and an aqueous polyester resin having a carboxy group content of 0.5 to 2.0 mmol/g.

In addition, the oxazoline-based resin composition contains, for example, 10% to 55% by mass of the oxazoline group-containing aqueous polymer, 10% to 80% by mass of the aqueous (meth)acrylic resin, and 10% to 80% by mass of the aqueous polyester resin (when the total amount of the oxazoline group-containing aqueous polymer, the aqueous (meth)acrylic resin, and aqueous polyester resin is 100% by mass).

In addition, in the oxazoline-based resin composition, for example, a ratio of the number of moles of oxazoline groups to the number of moles of carboxy groups [represented by a ratio (x/y)×100 [mol %] of the number of moles of oxazoline groups (x mmol) to the number of moles of carboxy groups (y mmol)] is 150 to 420 mol %.

As the oxazoline resin used in the undercoat layer 104, more specifically, those described in International Publication No. WO 2016/186074 can be used.

From the viewpoint of obtaining good adhesion, the thickness of the undercoat layer 104 is preferably 0.001 μm or more, more preferably 0.005 μm or more, still more preferably 0.01 μm or more, yet more preferably 0.05 μm or more, even more preferably 0.1 μm or more, and still even more preferably 0.2 μm or more.

In addition, from the viewpoint of cost saving, the thickness of the undercoat layer 104 is preferably 1.0 μm or less, more preferably 0.6 μm or less, and still more preferably 0.5 μm or less, and may be, for example, 0.1 μm or less or, for example, 0.05 μm or less.

(Adhesive Layer)

The gas barrier laminate may further include an adhesive layer. The undercoat layer 104 is removed from the adhesive layer.

The adhesive layer is provided, for example, between the gas barrier layer 103 and an upper layer of the gas barrier layer 103. In addition, in a case where the upper layer is formed of a plurality of layers, the adhesive layer may be provided between the plurality of layers. Here, the upper layer of the gas barrier layer 103 refers to a layer laminated on a surface of the gas barrier layer 103 opposite to the surface facing the inorganic material layer 102.

The adhesive layer is a layer including any known adhesive. Examples of the adhesive include laminated adhesives formed of an organic titanium resin, a polyethylenimine resin, a urethane resin, an epoxy resin, an acrylic resin, a polyester resin, an oxazoline group containing resin, a modified silicone resin, an alkyl titanate, a polyester polybutadiene, and the like, or a one-component type or two-component type polyols and polyvalent isocyanates, aqueous urethane, ionomers, and the like. Alternatively, an aqueous adhesive mainly formed of an acrylic resin, a vinyl acetate resin, a urethane resin, a polyester resin, or the like may be used.

In addition, other additives such as a curing agent and a silane coupling agent may be added to the adhesive depending on the application of the gas barrier laminate 100. In a case where the gas barrier laminate is used for hot water treatment such as retorting, from the viewpoint of heat resistance and water resistance, a dry lamination adhesive represented by a polyurethane adhesive is preferable, and a solvent two-component curing type polyurethane-based adhesive is more preferable.

(Method for Producing Gas Barrier Laminate)

In the fourth embodiment, for example, a method for producing the gas barrier laminate 100 includes a step of preparing a base material layer 101, a step of forming an inorganic material layer 102 on the base material layer 101, and a step of forming a gas barrier layer 103 on an upper part of the base material layer 101 on which the inorganic material layer 102 is formed. In addition, the method may further include a step of forming the undercoat layer 104 on the inorganic material layer 102 after the step of forming the inorganic material layer 102 and before the step of forming the gas barrier layer 103.

In the step of forming the inorganic material layer 102 on the base material layer 101, for example, the above-described method for forming the inorganic material layer 102 can be used.

The step of forming the gas barrier layer 103 includes, for example, a step of applying a mixture before curing as a gas barrier coating material onto the inorganic material layer 102 and then drying the mixture to obtain a coating layer, and a step of heating the coating layer and carrying out a dehydration condensation reaction between a carboxy group included in a polycarboxylic acid and an amino group included in a polyamine compound to form the gas barrier layer 103 having an amide bond.

The method for applying the gas barrier coating material to the inorganic material layer 102 is not limited, and a common method can be used. Examples thereof include methods for coating using known coating machines such as Mayer bar coaters, air knife coaters, gravure coaters such as direct gravure coaters, gravure offset, arc gravure coaters, gravure reverse and jet nozzle method coaters, reverse roll coaters such as top feed reverse coaters, bottom feed reverse coaters, and nozzle feed reverse coaters, five roll coaters, lip coaters, bar coaters, bar reverse coaters, and die coaters.

From the viewpoint of further improving the barrier performance of the obtained gas barrier laminate, the coating amount (wet thickness) is preferably 0.05 μm and more preferably 1 μm or more.

In addition, from the viewpoint of suppressing curling of the obtained gas barrier laminate and the viewpoint of more effectively advancing the dehydration condensation reaction between the —COO— group included in the polycarboxylic acid and the amino group included in the polyamine compound, the wet thickness is preferably 300 μm or less, more preferably 200 μm or less, and still more preferably 100 μm or less.

Regarding the drying and heat treatment, the heat treatment may be carried out after drying, or the drying and heat treatment may be carried out at the same time.

The method for performing the drying and the heat treatment is not particularly limited as long as the effect of the present invention can be obtained, and may be a method in which the gas barrier coating material can be cured or a method in which the cured gas barrier coating material can be heated. Examples thereof include heating by convection heat transfer such as ovens or dryers, heating by conductive heat transfer such as heating rolls, heating by radiation heat transfer using electromagnetic waves such as infrared, far infrared, and near infrared heaters, and heating by internal heat generation such as microwaves. As an apparatus used for drying and heat treatment, an apparatus capable of performing both drying and heat treatments is preferable from the viewpoint of production efficiency. In particular, from the viewpoint of being usable for various applications such as drying, heating, annealing and the like, it is preferable to use a hot air oven, and from the viewpoint of excellent thermal conductivity efficiency to the film, it is preferable to use a heating roll. Further, methods used for the drying and heat treatments may be appropriately combined. Specifically, a hot air oven and a heating roll may be used in combination. For example, in a case where the gas barrier coating material is dried in a hot air oven and then subjected to a heat treatment with a heating roll, the heat treatment step is shortened, and thus this case is preferable from the viewpoint of production efficiency. In addition, it is preferable to perform the drying and heat treatment only with a hot air oven.

Regarding the heat treatment conditions, for example, the heat treatment temperature is 80° C. to 250° C. and the heat treatment time is 1 second to 10 minutes, preferably the heat treatment temperature is 120° C. to 240° C. and the heat treatment time is 1 second to 1 minute, more preferably the heat treatment temperature is 170° C. to 230° C. and the heat treatment time is 1 second to 30 seconds, and still more preferably the heat treatment temperature is 200° C. to 220° C. and the heat treatment time is 1 second to 10 seconds. Further, as described above, it is possible to perform the heat treatment in a short time by using a heating roll therewith.

Note that, from the viewpoint of effectively advancing the dehydration-condensation reaction between the —COO— group included in the polycarboxylic acid and the amino group included in the polyamine compound, it is important to adjust the heat treatment temperature and the heat treatment time according to the wet thickness of the gas barrier coating material. By selecting an appropriate heat treatment temperature and an appropriate heat treatment time, an appropriate crosslinked structure is formed.

By drying and heat-treating the gas barrier coating material, the carboxy group of the polycarboxylic acid reacts with the polyamine or the polyvalent metal compound, and is covalently bonded and ionically crosslinked, so that the gas barrier layer 103 having good gas barrier properties even after the retort treatment is formed.

In the fourth embodiment, the gas barrier laminate has excellent gas barrier performance, and can be suitably used as, for example, various packaging materials such as a packaging material, in particular, a food packaging material for contents which require high gas barrier properties, for medical applications, industrial applications, common miscellaneous goods applications, and the like.

In addition, the gas barrier laminate in the fourth embodiment can also be suitably used as, for example, a film for vacuum insulation; a sealing film for sealing electroluminescence devices, solar cells, or the like, for which high barrier performance is required.

In the fourth embodiment, specific examples of a laminate structure including the gas barrier laminate are shown below.

(Laminate structure example 1) base material layer 101 (PET base material)/inorganic material layer 102 (alumina vapor deposition layer)/gas barrier layer 103/adhesive layer/polyolefin layer (Laminate structure example 2) base material layer 101 (PET base material)/undercoat layer 104/inorganic material layer 102 (alumina vapor deposition layer)/gas barrier layer 103/adhesive layer/polyolefin layer (Laminate structure example 3) base material layer 101 (PET base material)/inorganic material layer 102 (alumina vapor deposition layer)/gas barrier layer 103/adhesive layer/polyamide layer/adhesive layer/polyolefin layer (Laminate structure example 4) base material layer 101 (PET base material)/undercoat layer 104/inorganic material layer 102 (alumina vapor deposition layer)/gas barrier layer 103/adhesive layer/polyamide layer/adhesive layer/polyolefin layer Here, by including a polyolefin layer formed of a polyolefin such as polyethylene, polypropylene, poly(4-methyl-1-pentene), or poly(1-butene) in the laminate structure, it is possible to further suppress a decrease in gas barrier performance under high humidity and gas barrier performance after a retort treatment while improving pinhole resistance, tearing resistance, heat resistance, and the like in the gas barrier laminate.

Fifth Embodiment

FIG. 15 is a cross-sectional view schematically showing an example of a configuration of a gas barrier laminate in a fifth embodiment. A gas barrier laminate 100 shown in FIG. 15 includes a base material layer 101, a gas barrier layer 103 that is provided on at least one surface of the base material layer 101, and an inorganic material layer 102 that is provided between the base material layer 101 and the gas barrier layer 103. The gas barrier layer 103 is formed of a cured product of a mixture including a polycarboxylic acid, a polyamine compound, and a polyvalent metal compound.

The specific configuration of each layer will be described later.

In the gas barrier laminate 100, the base material layer 101, the inorganic material layer 102, and the gas barrier layer 103 are laminated in this order, and the gas barrier layer 103 is formed of the cured product of the mixture described above. Therefore, the gas barrier laminate 100 has an excellent balance between barrier properties and productivity.

More specifically, the gas barrier laminate 100 has excellent barrier performance such as oxygen barrier properties and water vapor barrier properties after a retort treatment. In addition, in the gas barrier laminate 100, since the gas barrier layer 103 is formed of the cured product of the mixture described above, the gas barrier laminate 100 having excellent barrier properties can be obtained, for example, even in a case where the curing time when the gas barrier layer 103 is obtained, specifically, the heat treatment time is short.

FIG. 16 is a cross-sectional view schematically showing another configuration example of the gas barrier laminate. The basic configuration of the gas barrier laminate 110 shown in FIG. 16 is the same as that of the above-described gas barrier laminate 100 with reference to FIG. 15, but is different in that an undercoat layer 104 provided between the base material layer 101 and the inorganic material layer 102 is further included.

In the gas barrier laminate 110, the same effect as the gas barrier laminate 100 can be obtained. In addition, in the gas barrier laminate 110, by providing the undercoat layer 104 between the base material layer 101 and the inorganic material layer 102, the adhesion between the base material layer 101 and the inorganic material layer 102 can be further improved.

Hereinafter, the configuration of the layers included in the gas barrier laminate will be described in more detail. First, the gas barrier layer 103 will be described.

(Gas Barrier Layer)

The gas barrier layer 103 is formed of a cured product of a mixture including a polycarboxylic acid, a polyamine compound, and a polyvalent metal compound. More specifically, the gas barrier layer 103 is a film (gas barrier film 10) formed of the above-described cured product.

More specifically, the gas barrier layer 103 is obtained by applying a mixture before curing, that is, a gas barrier coating material, to a layer arranged immediately below the gas barrier layer 103 such as the inorganic material layer 102, and then drying and heat-treating the gas barrier coating material to cure the gas barrier coating material.

In the infrared absorption spectrum of the gas barrier layer 103, when a maximum peak height of an absorbance in a range of equal to or more than 1300 $cm^{-1}$ and equal to or less than 1490 $cm^{-1}$ is denoted by $\alpha$, and a maximum peak height of an absorbance in a range of equal to or more than 1690 $cm^{-1}$ and equal to or less than 1780 $cm^{-1}$ is denoted by $\gamma$, a ratio of free carboxy groups with respect to a $NH_3$ complex, which is represented by $\gamma/\alpha$, is preferably 0.00 or more, more preferably 0.01 or more, and still more preferably 0.02 or more, from the viewpoint of the liquid stability of the gas barrier coating material before application.

In addition, from the viewpoint of improving the barrier properties of the gas barrier layer 103 obtained after the coating, the $\gamma/\alpha$ is preferably 1.00 or less, more preferably 0.80 or less, still more preferably 0.60 or less, yet more preferably 0.40 or less, even more preferably 0.20 or less, and still even more preferably 0.10 or less.

In addition, in the infrared absorption spectrum of the gas barrier layer 103, when a total peak area in a range of an absorption band of equal to or more than 1493 $cm^{-1}$ and equal to or less than 1780 $cm^{-1}$ is denoted by A, a total peak area in a range of an absorption band of equal to or more than 1598 $cm^{-1}$ and equal to or less than 1690 $cm^{-1}$ is denoted by B, a total peak area in a range of an absorption band of equal to or more than 1690 $cm^{-1}$ and equal to or less than 1780 $cm^{-1}$ is denoted by C, and a total peak area in a range of an absorption band of equal to or more than 1493 $cm^{-1}$ and equal to or less than 1598 $cm^{-1}$ is denoted by D, preferable area ratio examples are shown below.

In the infrared absorption spectrum of the gas barrier layer 103, from the viewpoint of further improving the gas barrier performance after the retort treatment, the area ratio of the amide bond represented by B/A is preferably 0.200 or more, more preferably 0.250 or more, still more preferably 0.270 or more, even more preferably 0.290 or more, and still even more preferably 0.310 or more.

In addition, from the viewpoint of further improving the balance between barrier properties and productivity, the area ratio of the amide bond represented by B/A is preferably 0.370 or less, more preferably 0.360 or less, and still more preferably 0.350 or less.

In the infrared absorption spectrum of the gas barrier layer 103, the area ratio of the carboxylic acid represented by C/A is preferably 0.150 or less, more preferably 0.100 or less, still more preferably 0.080 or less, and even more preferably 0.060 or less, from the viewpoint of further improving the gas barrier performance after the retort treatment.

In addition, although the lower limit of the area ratio of the carboxylic acid represented by C/A is not limited, the lower limit is, for example, 0.000 or more, and may be, for example, 0.0001 or more.

In the infrared absorption spectrum of the gas barrier layer 103, the area ratio of the carboxylate represented by D/A is preferably 0.580 or more and more preferably 0.600 or more from the viewpoint of further improving the balance between barrier properties and productivity.

In addition, from the viewpoint of further improving the gas barrier performance after the retort treatment, the D/A is preferably 0.800 or less, more preferably 0.720 or less, still more preferably 0.700 or less, and even more preferably 0.680 or less.

Further, from the viewpoint of making the balance between the productivity and the barrier properties of the gas barrier laminate more preferable, it is also preferable that the area ratio of the amide bond represented by B/A is equal to or more than 0.200 and equal to or less than 0.370, the area ratio of the carboxylic acid represented by C/A is 0.150 or less, and the area ratio of the carboxylate represented by D/A is equal to or more than 0.580 and equal to or less than 0.800.

In the infrared absorption spectrum of the gas barrier layer 103, the area ratio of the carboxylate represented by D/A to the area ratio of the amide bond represented by B/A is preferably 1.2 or more, more preferably 1.6 or more, and still more preferably 1.8 or more, from the viewpoint of improving the barrier properties.

In addition, from the viewpoint of improving the barrier properties after retorting, the area ratio of the carboxylate represented by D/A to the area ratio of the amide bond represented by B/A is preferably 4.0 or less, more preferably 3.5 or less, still more preferably 3.0 or less, and even more preferably 2.5 or less.

Here, in the gas barrier layer 103, absorption based on νC═O of the unreacted carboxylic acid in the infrared absorption spectrum is observed in the vicinity of 1700 $cm^{-1}$, absorption based on νC═O of the amide bond as a crosslinked structure is observed in the vicinity of 1630 to 1685 $cm^{-1}$, absorption based on νC═O of the carboxylate is observed in the vicinity of 1540 to 1560 $cm^{-1}$, and absorption based on δN—H of the ammonia forming the complex is observed in the vicinity of 1300 to 1490 $cm^{-1}$.

It is considered that the maximum peak height $\alpha$ of the absorbance in the range of equal to or more than 1300 $cm^{-1}$ and equal to or less than 1490 $cm^{-1}$ in the infrared absorption spectrum represents an index of the amount of ammonia present that forms the complex, and the maximum peak height $\gamma$ in the range of equal to or more than 1690 $cm^{-1}$ and equal to or less than 1780 $cm^{-1}$ represents an index of the amount of free, that is, unreacted carboxylic acid present.

In the fifth embodiment, the maximum peak heights $\alpha$ and $\gamma$ can be specifically measured by the following procedure. That is, a measurement sample of 1 cm×3 cm is cut out from the gas barrier layer 103. Next, the infrared absorption spectrum of the surface of the gas barrier layer 103 is obtained by infrared total reflection measurement (ATR method). In the obtained infrared absorption spectrum, a line connecting an absorbance at 900 $cm^{-1}$ and an absorbance at 1900 $cm^{-1}$ with a straight line is set as a baseline, and a maximum peak height in a range of each absorbance is obtained.

In addition, it is considered that the total peak area A in the range of the absorption band of equal to or more than 1493 $cm^{-1}$ and equal to or less than 1780 $cm^{-1}$ in the infrared absorption spectrum represents an index of the total amount of the carboxylic acid, the amide bond, and the carboxylate, and the total peak area B in the range of the absorption band of equal to or more than 1598 $cm^{-1}$ and equal to or less than 1690 $cm^{-1}$ represents an index of the amount of the amide bond present.

Further, it is considered that the total peak area C in the range of the absorption band of equal to or more than 1690 $cm^{-1}$ and equal to or less than 1780 $cm^{-1}$ represents an index of the amount of the unreacted carboxylic acid present and the total peak area D in the range of the absorption band of equal to or more than 1493 $cm^{-1}$ and equal to or less than 1598 $cm^{-1}$ represents an index of the amount of carboxylate present.

In the fifth embodiment, the total peak areas A to D can be specifically measured by the following procedure.

First, a sample for measurement of 1 cm×3 cm is cut out from the gas barrier layer 103. Next, the infrared absorption spectrum of the surface of the gas barrier layer 103 is obtained by infrared total reflection measurement (ATR method). From the obtained infrared absorption spectrum, the total peak areas A to D described above are calculated by the following procedures (1) to (4).

(1) The absorbances at 1780 $cm^{-1}$ and at 1493 $cm^{-1}$ are connected by a straight line (N), and the area surrounded by the absorption spectrum in the range of an absorption band of equal to or more than 1493 $cm^{-1}$ and equal to or less than 1780 $cm^{-1}$ and N is set as a total peak area A.

(2) A straight line (O) is drawn down orthogonally from an absorbance (Q) at 1690 $cm^{-1}$, an intersection point of N and O is set as P, a straight line (S) is drawn down orthogonally from an absorbance (R) at 1598 $cm^{-1}$, an intersection point of N and S is set as T, and the area which is surrounded by the absorption spectrum in the range of an absorption band of equal to or more than 1598 $cm^{-1}$ and equal to or less than 1690 $cm^{-1}$, the straight line S, the point T, the straight line N, the point P, the straight line O, the absorbance Q, and the absorbance R is set as a total peak area B.

(3) The area which is surrounded by the absorption spectrum in the range of an absorption band of equal to or more than 1690 $cm^{-1}$ and equal to or less than 1780 $cm^{-1}$, the absorbance Q, the straight line O, the point P, and the straight line N is set as a total peak area C.

(4) The area which is surrounded by the absorption spectrum in the range of an absorption band of equal to or more than 1493 $cm^{-1}$ and equal to or less than 1598 $cm^{-1}$, the absorbance R, the straight line S, the point T, and the straight line N is set as a total peak area D.

Next, the area ratios B/A, C/A, and D/A are obtained from the areas obtained by the above method.

In the fifth embodiment, it is possible to perform the measurement of the infrared absorption spectrum (infrared total reflection measurement: ATR method), for example, under the conditions of an incident angle of 45 degrees, room temperature, a resolution of 4 $cm^{-1}$, and a cumulative number of 100 times by mounting a PKM-GE-S (Germanium) crystal and using an IRT-5200 apparatus manufactured by JASCO Corporation.

The maximum peak heights α and γ of the gas barrier layer 103, the area ratio of the amide bond represented by B/A, the area ratio of the carboxylic acid represented by C/A, and the area ratio of the carboxylate represented by D/A can be controlled by appropriately adjusting the production conditions of the gas barrier layer 103. Specifically, the blending ratios of the polycarboxylic acid, the polyamine compound, and the polyvalent metal compound, the method for preparing the mixture before curing, and the method, temperature, and time of the heat treatment of the mixture are exemplified as factors for controlling the maximum peak heights α and γ of the gas barrier layer 103, the area ratio of the amide bond represented by B/A, the area ratio of the carboxylic acid represented by C/A, and the area ratio of the carboxylate represented by D/A.

Next, components included in the mixture (gas barrier coating material) before curing will be described.

(Polycarboxylic Acid)

The polycarboxylic acid has two or more carboxy groups in the molecule. Specific examples thereof include homopolymers of α,β-unsaturated carboxylic acid such as (meth) acrylic acid, itaconic acid, fumaric acid, crotonic acid, cinnamic acid, 3-hexenoic acid, and 3-hexenedioic acid, or copolymers thereof. In addition, the polycarboxylic acid may be a copolymer of the α,β-unsaturated carboxylic acid described above and esters such as ethyl ester, olefins such as ethylene, or the like.

Among these, a homopolymer of acrylic acid, methacrylic acid, itaconic acid, fumaric acid, crotonic acid, and cinnamic acid or a copolymer thereof is preferable, one or two or more polymers selected from the group consisting of polyacrylic acid, polymethacrylic acid, and a copolymer of acrylic acid and methacrylic acid are more preferable, at least one polymer selected from polyacrylic acid and polymethacrylic acid is still more preferable, and at least one polymer selected from a homopolymer of acrylic acid or a homopolymer of methacrylic acid is even more preferable.

Here, in the fifth embodiment, polyacrylic acid includes both a homopolymer of acrylic acid and a copolymer of acrylic acid and another monomer. In a case of a copolymer of acrylic acid and another monomer, the polyacrylic acid usually includes constituent units which are derived from acrylic acid at 90% by mass or more, preferably 95% by mass or more, and more preferably 99% by mass or more in 100% by mass of the polymer.

In addition, in the fifth embodiment, polymethacrylic acid includes both a homopolymer of methacrylic acid and a copolymer of methacrylic acid and another monomer. In a case of a copolymer of methacrylic acid and another monomer, the polymethacrylic acid usually includes constituent units which are derived from methacrylic acid at 90% by mass or more, preferably 95% by mass or more, and more preferably 99% by mass or more in 100% by mass of the polymer.

The polycarboxylic acid is a polymer where carboxylic acid monomers are polymerized. From the viewpoint of excellent balance between gas barrier properties and handleability, the molecular weight of the polycarboxylic acid is preferably 500 to 2,500,000, more preferably 5,000 to 2,000,000, still more preferably 10,000 to 1,500,000, and even more preferably 100,000 to 1,200,000.

Here, in the fifth embodiment, the molecular weight of the polycarboxylic acid is the polyethylene oxide conversion weight average molecular weight and is measurable using gel permeation chromatography (GPC).

At least a part of the polycarboxylic acid may be neutralized by a volatile base. By neutralizing the polycarboxylic acid with a volatile base, it is possible to suppress gelation from occurring by neutralizing the polycarboxylic acid with the volatile base when mixing a polyvalent metal compound or a polyamine compound and polycarboxylic acid. Accordingly, in the polycarboxylic acid, from the viewpoint of prevention of gelation, a volatile base is preferably used for the partially neutralized product or completely neutralized product of the carboxy group. It is possible to obtain the neutralized product by partially or completely neutralizing the carboxy group of the polycarboxylic acid with a volatile base, that is, the carboxy group of the polycarboxylic acid is partially or completely made into carboxylate. Due to this, it is possible to prevent gelation when adding a polyamine compound and a polyvalent metal compound.

A partially neutralized product can be prepared by adding a volatile base to an aqueous solution of polycarboxylic acid polymer but it is possible to set a desired neutralization degree by adjusting the ratio of the amounts of the polycarboxylic acid and the volatile base. In the fifth embodiment, from the viewpoint of sufficiently suppressing gelation caused by the neutralization reaction with the amino group of the polyamine compound, the neutralization degree of the polycarboxylic acid by the volatile base is preferably 70 to 300 equivalent %, more preferably 90 to 250 equivalent %, and still more preferably 100 to 200 equivalent %.

It is possible to use an arbitrary water-soluble base as a volatile base.

Examples of volatile bases include ammonia, morpholine, alkylamine, 2-dimethyl amino ethanol, N-methyl monopholine, ethylene diamine, and tertiary amines such as triethyl amine, an aqueous solution thereof or a mixture thereof. From the viewpoint of obtaining good gas barrier properties, an ammonia aqueous solution is preferable.

(Polyamine Compound)

The mixture before curing includes a polyamine compound. By including the polyamine compound, the barrier properties of the obtained gas barrier material can be improved.

The polyamine compound is a compound having two or more amino groups in the main chain, side chain, or terminal, and is preferably a polymer. Specific examples thereof include aliphatic polyamines such as polyallylamine, polyvinylamine, polyethylenimine, and poly(trimethyleneimine); polyamides having amino groups on side chains such as polylysine and polyarginine; and the like. In addition, a polyamine where a portion of the amino group is modified may be used.

From the viewpoint of obtaining good gas barrier properties, the polyamine compound preferably includes polyethylenimine, and polyethyleneimine is more preferable.

From the viewpoint of excellent balance of gas barrier properties and handleability, the number average molecular weight of the polyamine compound is preferably 50 to 2,000,000, more preferably 100 to 1,000,000, still more preferably 1,500 to 500,000, yet more preferably 1,500 to 100,000, even more preferably 1,500 to 50,000, yet more preferably 3,500 to 20,000, yet still more preferably 5,000 to 15,000, and still even more preferably 7,000 to 12,000.

Here, in the fifth embodiment, it is possible to measure the molecular weight of the polyamine compound using a boiling point increasing method or a viscosity method.

From the viewpoint of further improving the gas barrier performance after the retort treatment, (number of moles of amino groups included in polyamine compound in the mixture)/(number of moles of —COO— groups included in polycarboxylic acid in the mixture) is preferably 0.20 or more, more preferably 0.25 or more, still more preferably 0.30 or more, even more preferably 0.35 or more, and still even more preferably 0.40 or more.

From the same viewpoint, (number of moles of amino groups included in the polyamine compound in the mixture)/(number of moles of —COO— groups included in the polycarboxylic acid in the mixture) is preferably 0.90 or less, more preferably 0.85 or less, still more preferably 0.80 or less, even more preferably 0.75 or less, and still even more preferably 0.70 or less.

Details of the reason are not clear; however, it is considered that it is possible to the gas barrier layer 103 and a gas barrier laminate having excellent gas barrier performance after a retort treatment by forming a dense structure by amide crosslinking using amino groups which form a polyamine compound and metal crosslinking using polyvalent metals which form a salt of polycarboxylic acid and polyvalent metal in a well-balanced manner.

(Polyvalent Metal Compound)

Specifically, a polyvalent metal compound is a metal and a metal compound which belongs to Group 2 to 13 in the periodic table and, in more detail, a divalent or higher valency metal such as magnesium (Mg), calcium (Ca), strontium (Sr), barium (Ba), iron (Fe), cobalt (Co), nickel (Ni), copper (Cu), zinc (Zn), and aluminum (Al), and oxides, hydroxides, halogenides, carbonates, phosphates, phosphites, hypophosphites, sulfates, or sulfites of these metals, or the like. From the point of view of water resistance, impurities, and the like, a metal oxide or a metal hydroxide is preferable.

From the viewpoint of further improving the gas barrier performance after the retort treatment, the divalent or higher valent metal in the polyvalent metal compound is preferably one or two or more metals selected from the group consisting of Zn, Ca, Mg, Ba, and Al, and more preferably Zn.

From the same viewpoint, the polyvalent metal compound is preferably a compound of one or two or more divalent or higher valent metals selected from the group consisting of Zn, Ca, Mg, Ba, and Al, and more preferably a compound of Zn.

From the same viewpoint, the polyvalent metal compound is preferably one or two or more compounds selected from the group consisting of oxides such as magnesium oxide, calcium oxide, barium oxide, zinc oxide, and magnesium hydroxide, and hydroxides such as calcium hydroxide, barium hydroxide, and zinc hydroxide, more preferably at least one of zinc oxide or zinc hydroxide, and still more preferably zinc oxide.

In the fifth embodiment, from the viewpoint of further improving the gas barrier performance after the retort treatment, (number of moles of polyvalent metal compound in the mixture)/(number of moles of —COO— groups included in the polycarboxylic acid in the mixture) is preferably 0.10 or more, more preferably 0.13 or more, still more preferably 0.15 or more, yet more preferably 0.18 or more, even more preferably 0.20 or more, yet still more preferably 0.25 or more, and still even more preferably 0.28 or more.

From the same viewpoint, (number of moles of polyvalent metal compound in the mixture)/(number of moles of —COO— groups included in the polycarboxylic acid in the mixture) is preferably 0.80 or less, more preferably 0.70 or less, still more preferably 0.60 or less, even more preferably 0.55 or less, and still even more preferably 0.50 or less.

In the fifth embodiment, from the viewpoint of further improving the gas barrier performance after the retort treatment, (number of moles of polyvalent metal compound in the mixture)/(number of moles of amino groups derived from polyamine compound in the mixture) is preferably 0.25 or more, more preferably 0.35 or more, and still more preferably 0.40 or more.

From the same viewpoint, (number of moles of polyvalent metal compound in the mixture)/(number of moles of amino groups derived from polyamine compound in the mixture) is preferably 0.75 or less, more preferably 0.65 or less, still more preferably 0.60 or less, and even more preferably 0.55 or less.

The mixture before curing may include components other than the above-described components.

For example, it is preferable that the mixture further includes a carbonic acid-based ammonium salt. The carbonic acid-based ammonium salt is added to bring the polyvalent metal compound into the form of a polyvalent metal ammonium carbonate complex to improve the solubility of the polyvalent metal compound and to prepare a uniform solution containing the polyvalent metal compound. When the mixture before curing includes a carbonic acid-based ammonium salt, the amount of the polyvalent metal compound dissolved can be increased, and as a result, the mixture in which the polyvalent metal compound is blended can be made more homogeneous.

Examples of the carbonic acid-based ammonium salt include ammonium carbonate, and ammonium hydrogencarbonate, and the like, and ammonium carbonate is preferable from the viewpoint that the component easily volatilizes and does not easily remain in the obtained gas barrier layer.

From the viewpoint of further improving the solubility of the polyvalent metal compound, (number of moles of carbonic acid-based ammonium salt in the mixture)/(number of moles of polyvalent metal compound in the mixture) is preferably 0.05 or more, more preferably 0.10 or more, still more preferably 0.25 or more, even more preferably 0.50 or more, and still even more preferably 0.75 or more.

In addition, from the viewpoint of further improving the coatability as the gas barrier coating material, (number of moles of carbonic acid-based ammonium salt in the gas barrier coating material)/(number of moles of polyvalent metal compound in the gas barrier coating material) is preferably 10.0 or less, more preferably 5.0 or less, still more preferably 2.0 or less, and even more preferably 1.5 or less.

In addition, the mixture before curing preferably further includes a surfactant from the viewpoint of suppressing the occurrence of cissing when the mixture is applied as a gas barrier coating material.

The addition amount of the surfactant is preferably 0.01% to 3% by mass, and more preferably 0.01% to 1% by mass, with respect to 100% by mass of the total solid content of the mixture.

Examples of the surfactant include an anionic surfactant, a nonionic surfactant, a cationic surfactant, and an amphoteric surfactant. From the viewpoint of obtaining good coatability, nonionic surfactants are preferable, polyoxyalkylene alkyl ethers are more preferable, and polyoxyethylene alkyl ethers are still more preferable.

Examples of the non-ionic surfactants include polyoxyalkylene alkylaryl ethers, polyoxyalkylene alkyl ethers, polyoxyalkylene fatty acid esters, sorbitan fatty acid esters, silicone-based surfactants, acetylene alcohol-based surfactants, fluorine-containing surfactants, and the like.

Examples of the polyoxyalkylene alkyl aryl ethers include polyoxyethylene nonyl phenyl ether, polyoxyethylene octyl phenyl ether, polyoxyethylene dodecyl phenyl ether, and the like.

Examples of the polyoxyalkylene alkyl ethers include polyoxyethylene alkyl ethers such as polyoxyethylene oleyl ether and polyoxyethylene lauryl ether.

Examples of the polyoxyalkylene fatty acid esters include polyoxyethylene oleic acid esters, polyoxyethylene lauric acid esters, polyoxyethylene distearic acid esters, and the like.

Examples of sorbitan fatty acid esters include sorbitan laurate, sorbitan monostearate, sorbitan monooleate, sorbitan sesquioleate, polyoxyethylene monooleate, polyoxyethylene stearate, and the like.

Examples of silicone-based surfactants include dimethylpolysiloxane and the like.

Examples of acetylene alcohol-based surfactants include 2,4,7,9-tetramethyl-5-decyne-4,7-diol, 3,6-dimethyl-4-octyne-3,6-diol, 3,5-dimethyl-1-hexyn-3-ol, and the like.

Examples of fluorine-containing surfactants include fluorine alkyl ester and the like.

The mixture before curing may include additives other than the above-described components. For example, various additives such as lubricants, slip agents, anti-blocking agents, antistatic agents, anti-fogging agents, pigments, dyes, and inorganic or organic fillers may be added.

In addition, from the viewpoint of improving the coatability when the mixture is applied as a gas barrier coating material, the solid content concentration of the mixture before curing is preferably 0.5% to 15% by mass and more preferably 1% to 10% by mass.

(Method for Producing Gas Barrier Layer)

Specifically, the gas barrier layer 103 can be produced by applying the mixture (gas barrier coating material) before curing and curing the mixture.

The mixture can be obtained as follows.

First, a volatile base is appropriately added to the polycarboxylic acid to completely or partially neutralize the carboxy groups of the polycarboxylic acid. Further, a polyvalent metal salt compound and an appropriate carbonic acid-based ammonium salt are mixed with each other, and a metal salt is formed in all or some of the carboxy groups of the polycarboxylic acid neutralized with the volatile base and the carboxy groups of the polycarboxylic acid not neutralized with the volatile base.

Thereafter, a mixture before curing can be obtained by further adding a polyamine compound. By mixing the polycarboxylic acid, the polyvalent metal salt compound, the appropriate carbonic acid-based ammonium salt, and the polyamine compound in such a procedure, the formation of agglomerates can be suppressed and a more uniform mixture can be obtained. This makes it possible to more effectively advance the dehydration-condensation reaction between the —COO— group included in the polycarboxylic acid and the amino group included in the polyamine compound.

More specifically, the method is as follows. In the following, a case where a volatile base and a carbonic acid-based ammonium salt are blended in a mixture will be described as an example.

First, a completely or partially neutralized solution of carboxy groups which form the polycarboxylic acid is prepared.

A volatile base is added to the polycarboxylic acid and the carboxy groups of the polycarboxylic acid are completely neutralized or partially neutralized. By neutralizing the carboxy groups of the polycarboxylic acid, gelation which is caused by to the reaction of the carboxy groups which form the polycarboxylic acid, a polyvalent metal compound, and amino groups which form a polyamine compound when the polyvalent metal compound or the polyamine compound is added is effectively prevented, and a more uniform mixture can be obtained.

Subsequently, a polyvalent metal salt compound and a carbonic acid-based ammonium salt are added thereto and dissolved and a polyvalent metal salt with —COO— groups which form polycarboxylic acid is formed by the polyvalent metal ions which are produced. At this time, the —COO— groups which form a salt with the polyvalent metal ions refer to both carboxy groups which are not neutralized with the base and —COO— groups which are neutralized with a base described above. In a case of the —COO— groups which are neutralized with a base, polyvalent metal ions which are derived from the polyvalent metal compound described above are replaced and coordinated to form a polyvalent metal salt of a —COO— group. Then, after the polyvalent metal salt is formed, a polyamine compound is further added, and thus a mixture can be obtained.

The mixture produced in this manner is applied onto the inorganic material layer 102 or an interlayer with the gas barrier layer 103 formed on the inorganic material layer 102 as a gas barrier coating material, and dried and cured to form the gas barrier layer 103. At this time, the polyvalent metal of the polyvalent metal salt of the —COO— groups forming the polycarboxylic acid forms metal crosslinking, and amide crosslinking is formed by amino groups which form the polyamine to obtain the gas barrier layer 103 which has excellent gas barrier properties. A more detailed method for producing the gas barrier layer 103 will be described later.

From the viewpoint of improving the barrier properties, the thickness of the gas barrier layer 103 after drying and curing is preferably 0.01 μm or more, more preferably 0.05 μm or more, and still more preferably 0.1 μm or more.

In addition, from the viewpoint of reducing the thickness of the entire gas barrier laminate, the thickness of the gas barrier layer 103 after drying and curing is preferably 15 μm or less, more preferably 5 μm or less, and still more preferably 1 μm or less.

(Base Material Layer)

The base material layer 101 may be a single layer or a layer of two or more types. The shape of the base material layer 101 is not limited and examples thereof include a sheet or film shape, a tray, a cup, a hollow body, or the like.

The material of the base material layer 101 is not limited as long as the inorganic material layer 102 can be stably formed on the base material layer 101 and the solution of the gas barrier coating material can be applied to the upper part of the inorganic material layer 102, and any material can be used. Examples of the material of the base material layer 101 include a resin such as a thermosetting resin or a thermoplastic resin, or an organic material such as paper; an inorganic material such as glass, pottery, ceramics, silicon oxide, silicon nitride oxide, silicon nitride, cement, and metals such as aluminum, aluminum oxide, iron, copper, and stainless steel; and a base material layer having a multilayer structure formed of a combination of organic materials or a combination of an organic material and an inorganic material. Among these, for example, in a case of various film applications such as packaging materials and panels, a plastic film using at least one selected from the group consisting of a thermosetting resin and a thermoplastic resin, or an organic material such as paper is preferable.

As the thermosetting resin, a known thermosetting resin can be used. Examples of the thermosetting resin include known thermosetting resins such as epoxy resins, unsaturated polyester resins, phenolic resins, urea-melamine resins, polyurethane resins, silicone resins, and polyimides.

As the thermoplastic resin, a known thermoplastic resin can be used. Examples of thermoplastic resins include polyolefins (polyethylene, polypropylene, poly(4-methyl-1-pentene), poly(1-butene), and the like), polyesters (polyethylene terephthalate, polybutylene terephthalate, polyethylene naphthalate, and the like), polyamide (nylon-6, nylon-66, polymetaxylene adipamide, and the like), polyvinyl chloride, polyimide, ethylene vinyl acetate copolymer or saponified products thereof, polyvinyl alcohol, polyacrylonitrile, polycarbonate, polystyrene, ionomers, fluorine-based resins, or mixtures thereof.

Among these, from the viewpoint of improving transparency, one or two or more resins selected from the group consisting of polypropylene, polyethylene terephthalate (PET), polyethylene naphthalate, polyamide, polyimide, and polybutylene terephthalate are preferable.

In addition, from the viewpoint of excellent pinhole resistance, tearing resistance, heat resistance, and the like, one or two or more resins selected from the group consisting of polyamide, polyethylene terephthalate, and polybutylene terephthalate are preferable. From the same viewpoint, the base material layer 101 is preferably a layer including one or two or more resins selected from the group consisting of polyamide, polyethylene terephthalate, and polybutylene terephthalate, and more preferably a layer of one or two or more resins.

In addition, in a case where a hygroscopic material such as polyamide is used for the base material layer 101, in the gas barrier laminate, the base material layer 101 absorbs moisture and swells, and the gas barrier performance under high humidity, the gas barrier performance after a retort treatment, the gas barrier performance in a case of being filled with an acidic content, and the like are easily decreased. However, in the fifth embodiment, even in a case where a hygroscopic material is used as the base material layer 101, a decrease in the gas barrier performance of the gas barrier laminate under high humidity and the gas barrier performance after a retort treatment can be suitably suppressed.

In addition, the base material layer 101 may be obtained by stretching a film formed of a thermosetting resin or a thermoplastic resin in at least one direction, preferably in biaxial directions.

From the viewpoint of excellent transparency, rigidity, and heat resistance, the base material layer 101 is preferably a biaxially stretched film formed of one or two or more thermoplastic resins selected from the group consisting of polypropylene, polyethylene terephthalate, polyethylene naphthalate, polyamide, polyimide, and polybutylene terephthalate, and more preferably a biaxially stretched film formed of one or two or more thermoplastic resins selected from the group consisting of polyamide, polyethylene terephthalate, and polybutylene terephthalate.

In addition, the surface of the base material layer 101 may be coated with polyvinylidene chloride, polyvinyl alcohol, an ethylene-vinyl alcohol copolymer, an acrylic resin, a urethane-based resin, or the like.

Further, the base material layer 101 may be subjected to a surface treatment in order to improve adhesion to the gas barrier layer 103. Specifically, a surface activation treatment such as a corona treatment, a flame treatment, a plasma treatment, or a primer coating treatment may be performed on the surface of the base material layer 101 facing the gas barrier layer 103.

From the viewpoint of obtaining good film properties, the thickness of the base material layer 101 is preferably 1 μm or more, more preferably 5 μm or more, and still more preferably 10 μm or more, and is preferably 1000 μm or less, more preferably 500 μm or less, and still more preferably 300 μm or less.

(Inorganic Material Layer)

Examples of the inorganic material forming the inorganic material layer 102 include metals, metal oxides, metal nitrides, metal fluorides, metal oxynitrides, and the like which are able to form a thin film having barrier properties.

Examples of inorganic materials forming the inorganic material layer 102 include one or two or more selected from periodic table 2A elements such as beryllium, magnesium, calcium, strontium, and barium, periodic table transition elements such as titanium, zirconium, ruthenium, hafnium, and tantalum; periodic table 2B elements such as zinc; periodic table 3A elements such as aluminum, gallium, indium, and thallium; periodic table 4A elements such as silicon, germanium, and tin; periodic table 6A elements such as selenium and tellurium, and the like, and oxides, nitrides, fluorides, oxynitrides, and the like thereof.

In the fifth embodiment, the group name of the periodic table for the inorganic material layer 102 is shown by the old CAS formula.

Further, among the inorganic materials described above, one or two or more inorganic materials selected from the group consisting of silicon oxide, aluminum oxide, and aluminum is preferable, and aluminum oxide is more preferable due to being excellent in the balance of barrier properties, cost, and the like.

Note that, silicon oxide may contain silicon monoxide and silicon suboxide in addition to silicon dioxide.

The inorganic material layer 102 is formed of the inorganic material described above. The inorganic material layer 102 preferably includes an aluminum oxide layer formed of aluminum oxide due to being excellent in the balance of barrier properties, cost, and the like.

The inorganic material layer 102 may be formed of a single inorganic material layer or a plurality of inorganic material layers. In addition, in a case where the inorganic material layer 102 is formed of a plurality of inorganic material layers, the inorganic material layer may be formed of the same type of inorganic material layer or may be formed of different types of inorganic material layers.

The thickness of the inorganic material layer 102 is usually 1 nm or more and preferably 4 nm or more, and is usually 1000 nm or less and preferably 500 nm or less, from the viewpoint of balance between improvement of barrier properties and improvement of handleability.

Here, the thickness of the inorganic material layer 102 can be obtained from, for example, observation images taken by a transmission electron microscope or a scanning electron microscope.

The method of forming the inorganic material layer 102 is not limited and it is possible to form the inorganic material layer 102 on one surface or both surfaces of the base material layer 101 using, for example, a vacuum deposition method, an ion plating method, a sputtering method, a chemical vapor deposition method, a physical vapor deposition method, a chemical vapor deposition method (CVD method), a plasma CVD method, a sol-gel method, or the like. Among the above, film formation under reduced pressure such as a sputtering method, an ion plating method, a chemical vapor deposition method (CVD), a physical vapor deposition method (PVD), a plasma CVD method, or the like is desirable. Due to this, it is expected quickly reacting the chemically active molecular species containing silicon such as silicon nitride or silicon oxynitride will make it possible to improve the smoothness of the surface of the inorganic material layer 102 and to reduce the number of pores. In order to rapidly perform these bonding reactions, it is desirable that the inorganic atoms and compounds are chemically active molecular species or atomic species.

In addition, from the viewpoint of improving the balance between the barrier properties and the productivity of the gas barrier laminate, the inorganic material layer 102 is preferably a vapor deposition film.

From the viewpoint of improving the balance between the barrier properties and the productivity of the gas barrier laminate, the inorganic material layer 102 is a vapor deposition film provided on the base material layer 101 or, in a case where an interlayer is provided between the base material layer 101 and the inorganic material layer 102, on the interlayer, and is formed of one or two or more inorganic materials selected from the group consisting of silicon oxide, aluminum oxide, and aluminum.

(Undercoat Layer)

The undercoat layer 104 may be provided between the base material layer 101 and the inorganic material layer 102 (FIG. 16), and the adhesion thereof can be further improved by providing the undercoat layer 104, and the barrier properties after the retort treatment can be further improved.

From the viewpoint of improving the adhesion between the base material layer 101 and the inorganic material layer 102, as the material of the undercoat layer 104, for example, one or two or more selected from the group consisting of polyurethane resin, polyester resin, oxazoline resin, and (meth)acrylic resin may be used.

Examples of the polyurethane resin include various polyurethane resins, polyurethane polyurea resins, and prepolymers thereof. Specific examples of such a urethane resin include a reactant of a diisocyanate component such as tolylene diisocyanate, xylene diisocyanate, diphenylmethane diisocyanate, hexamethylene diisocyanate, cyclohexane diisocyanate, isophorone diisocyanate, or dicyclohexyl diisocyanate, and a diol component such as ethylene glycol, propylene glycol, 1,4-butanediol, 1,6-hexanediol, neopentyl glycol, cyclohexanedimethanol, bisphenol, polyester diol, polyether diol, polycarbonate diol, or polyethylene glycol; a reactant of a urethane prepolymer having an isocyanate group at a terminal and an amino compound, an aminosulfonate, polyhydroxycarboxylic acid, or pyrosulfuric acid; and the like.

In addition, from the viewpoint of further improving the barrier properties after the retort treatment and the adhesion between the base material layer 101 and the inorganic material layer 102, it is also preferable that the undercoat layer 104 is formed of a polyurethane resin having an aromatic ring structure in the main chain. The polyurethane-based resin having an aromatic ring structure in the main chain can be obtained, for example, as a water-dispersible polyurethane resin by a reaction of a polyol, an organic polyisocyanate, and a chain extender. Therefore, an aromatic ring structure can be introduced into the main chain of the polyurethane-based resin.

As the polyurethane resin having an aromatic ring structure in the main chain, more specifically, those described in Japanese Unexamined Patent Publication No. 2018-171827 can be used.

In addition, from the viewpoint of improving heat resistance, water resistance, hydrolysis resistance, and the like, a crosslinking agent may be used in combination with the above-described water-dispersible polyurethane resin. The crosslinking agent may be an external crosslinking agent added as a third component to the water-dispersible polyurethane resin, or may be an internal crosslinking agent that introduces a reactive site, which becomes a crosslinked structure, into the molecular structure of the water-dispersible polyurethane resin in advance.

As the crosslinking agent, a compound having an isocyanate group, an oxazoline group, a carbodiimide group, an epoxy group, a melamine resin, a silanol group, or the like can be suitably used, and a compound having a carbodiimide group is more suitable. In addition, in a case where a compound having a carbodiimide group is used as a cross-linking agent, the compound having a carbodiimide group is added in such an amount that the amount of the carbodiimide group is preferably 0.1 to 3.0 mol, more preferably 0.2 to 2.0 mol, and still more preferably 0.3 to 1.0 mol with respect to 1.0 mol of the carboxy group in the polyurethane resin.

Examples of the polyester resin used in the undercoat layer 104 include various polyester resins and modified products thereof. Specific examples of such a polyester resin include reaction products of polycarboxylic acid components such as terephthalic acid, phthalic acid, isophthalic acid, trimellitic acid, pyromellitic acid, 2-sulfoisophthalic acid, 5-sulfoisophthalic acid, adipic acid, sebacic acid, succinic acid, and dodecanedioic acid with diol components such as ethylene glycol, propylene glycol, 1,4-butanediol, 1,6-hexanediol, neopentyl glycol, cyclohexane dimethanol, and bisphenol. Modified products such as acrylic resin, epoxy resin and the like are also included.

In a case where an oxazoline resin is used for the undercoat layer 104, the undercoat layer 104 is preferably formed of an oxazoline-based resin composition including an oxazoline group-containing aqueous polymer, an aqueous (meth)acrylic resin, and an aqueous polyester resin.

The oxazoline-based resin composition is formed of, for example, an oxazoline group-containing aqueous polymer having an oxazoline group content of 6.0 to 9.0 mmol/g, an aqueous (meth)acrylic resin having a carboxy group content of 0.5 to 3.5 mmol/g, and an aqueous polyester resin having a carboxy group content of 0.5 to 2.0 mmol/g.

In addition, the oxazoline-based resin composition contains, for example, 10% to 55% by mass of the oxazoline group-containing aqueous polymer, 10% to 80% by mass of the aqueous (meth)acrylic resin, and 10% to 80% by mass of the aqueous polyester resin (when the total amount of the oxazoline group-containing aqueous polymer, the aqueous (meth)acrylic resin, and aqueous polyester resin is 100% by mass).

In addition, in the oxazoline-based resin composition, for example, a ratio of the number of moles of oxazoline groups to the number of moles of carboxy groups [represented by a ratio $(x/y)\times100$ [mol %] of the number of moles of oxazoline groups (x mmol) to the number of moles of carboxy groups (y mmol)] is 150 to 420 mol %.

As the oxazoline resin used in the undercoat layer 104, more specifically, those described in International Publication No. WO 2016/186074 can be used.

From the viewpoint of obtaining good adhesion, the thickness of the undercoat layer 104 is preferably 0.001 μm or more, more preferably 0.005 μm or more, still more preferably 0.01 μm or more, yet more preferably 0.05 μm or more, even more preferably 0.1 μm or more, and still even more preferably 0.2 μm or more.

In addition, from the viewpoint of cost saving, the thickness of the undercoat layer 104 is preferably 1.0 μm or less, more preferably 0.6 μm or less, and still more preferably 0.5 μm or less, and may be, for example, 0.1 μm or less or, for example, 0.05 μm or less.

(Adhesive Layer)

The gas barrier laminate may further include an adhesive layer. The undercoat layer 104 is removed from the adhesive layer.

The adhesive layer is provided, for example, between the gas barrier layer 103 and an upper layer of the gas barrier layer 103. In addition, in a case where the upper layer is formed of a plurality of layers, the adhesive layer may be provided between the plurality of layers. Here, the upper layer of the gas barrier layer 103 refers to a layer laminated on a surface of the gas barrier layer 103 opposite to the surface facing the inorganic material layer 102.

The adhesive layer is a layer including any known adhesive. Examples of the adhesive include laminated adhesives formed of an organic titanium resin, a polyethylenimine resin, a urethane resin, an epoxy resin, an acrylic resin, a polyester resin, an oxazoline group containing resin, a modified silicone resin, an alkyl titanate, a polyester polybutadiene, and the like, or a one-component type or two-component type polyols and polyvalent isocyanates, aqueous urethane, ionomers, and the like. Alternatively, an aqueous adhesive mainly formed of an acrylic resin, a vinyl acetate resin, a urethane resin, a polyester resin, or the like may be used.

In addition, other additives such as a curing agent and a silane coupling agent may be added to the adhesive depending on the application of the gas barrier laminate 100. In a case where the gas barrier laminate is used for hot water treatment such as retorting, from the viewpoint of heat resistance and water resistance, a dry lamination adhesive represented by a polyurethane adhesive is preferable, and a solvent two-component curing type polyurethane-based adhesive is more preferable.

(Method for Producing Gas Barrier Laminate)

In the fifth embodiment, for example, a method for producing the gas barrier laminate 100 includes a step of preparing a base material layer 101, a step of forming an inorganic material layer 102 on the base material layer 101, and a step of forming a gas barrier layer 103 on an upper part of the base material layer 101 on which the inorganic material layer 102 is formed. In addition, the method may further include a step of forming the undercoat layer 104 on the inorganic material layer 102 after the step of forming the inorganic material layer 102 and before the step of forming the gas barrier layer 103.

In the step of forming the inorganic material layer 102 on the base material layer 101, for example, the above-described method for forming the inorganic material layer 102 can be used.

The step of forming the gas barrier layer 103 includes, for example, a step of applying a mixture before curing as a gas barrier coating material onto the inorganic material layer 102 and then drying the mixture to obtain a coating layer, and a step of heating the coating layer and carrying out a dehydration condensation reaction between a carboxy group included in a polycarboxylic acid and an amino group included in a polyamine compound to form the gas barrier layer 103 having an amide bond.

The method for applying the gas barrier coating material to the inorganic material layer 102 is not limited, and a common method can be used. Examples thereof include methods for coating using known coating machines such as Mayer bar coaters, air knife coaters, gravure coaters such as direct gravure coaters, gravure offset, arc gravure coaters, gravure reverse and jet nozzle method coaters, reverse roll coaters such as top feed reverse coaters, bottom feed reverse coaters, and nozzle feed reverse coaters, five roll coaters, lip coaters, bar coaters, bar reverse coaters, and die coaters.

From the viewpoint of further improving the barrier performance of the obtained gas barrier laminate, the coating amount (wet thickness) is preferably 0.05 μm and more preferably 1 μm or more.

In addition, from the viewpoint of suppressing curling of the obtained gas barrier laminate and the viewpoint of more effectively advancing the dehydration condensation reaction between the —COO— group included in the polycarboxylic acid and the amino group included in the polyamine compound, the wet thickness is preferably 300 μm or less, more preferably 200 μm or less, and still more preferably 100 μm or less.

Regarding the drying and heat treatment, the heat treatment may be carried out after drying, or the drying and heat treatment may be carried out at the same time.

The method for performing the drying and the heat treatment is not particularly limited as long as the effect of the present invention can be obtained, and may be a method in which the gas barrier coating material can be cured or a method in which the cured gas barrier coating material can be heated. Examples thereof include heating by convection heat transfer such as ovens or dryers, heating by conductive heat transfer such as heating rolls, heating by radiation heat transfer using electromagnetic waves such as infrared, far infrared, and near infrared heaters, and heating by internal heat generation such as microwaves. As an apparatus used for drying and heat treatment, an apparatus capable of performing both drying and heat treatments is preferable from the viewpoint of production efficiency. In particular, from the viewpoint of being usable for various applications such as drying, heating, annealing and the like, it is preferable to use a hot air oven, and from the viewpoint of excellent thermal conductivity efficiency to the film, it is preferable to use a heating roll. Further, methods used for the drying and heat treatments may be appropriately combined. Specifically, a hot air oven and a heating roll may be used in combination. For example, in a case where the gas barrier coating material is dried in a hot air oven and then subjected to a heat treatment with a heating roll, the heat treatment step is shortened, and thus this case is preferable from the viewpoint of production efficiency. In addition, it is preferable to perform the drying and heat treatment only with a hot air oven.

Regarding the heat treatment conditions, for example, the heat treatment temperature is 80° C. to 250° C. and the heat treatment time is 1 second to 1 minute, preferably the heat treatment temperature is 120° C. to 240° C. and the heat treatment time is 1 second to 31 minute, more preferably the heat treatment temperature is 170° C. to 230° C. and the heat treatment time is 1 second to 30 seconds, and still more preferably the heat treatment temperature is 200° C. to 220° C. and the heat treatment time is 1 second to 10 seconds. Further, as described above, it is possible to perform the heat treatment in a short time by using a heating roll therewith.

Note that, from the viewpoint of effectively advancing the dehydration-condensation reaction between the —COO— group included in the polycarboxylic acid and the amino group included in the polyamine compound, it is important to adjust the heat treatment temperature and the heat treatment time according to the wet thickness of the gas barrier coating material.

By drying and heat-treating the gas barrier coating material, the carboxy group of the polycarboxylic acid reacts with the polyamine or the polyvalent metal compound, and is covalently bonded and ionically crosslinked, so that the gas barrier layer 103 having good gas barrier properties even after the retort treatment is formed.

In the fifth embodiment, the gas barrier laminate has excellent gas barrier performance, and can be suitably used as, for example, various packaging materials such as a packaging material, in particular, a food packaging material for contents which require high gas barrier properties, for medical applications, industrial applications, common miscellaneous goods applications, and the like.

In addition, the gas barrier laminate in the fifth embodiment can also be suitably used as, for example, a film for vacuum insulation; a sealing film for sealing electroluminescence devices, solar cells, or the like, for which high barrier performance is required.

In the fifth embodiment, specific examples of a laminate structure including the gas barrier laminate are shown below.

(Laminate structure example 1) base material layer 101 (PET base material)/inorganic material layer 102 (alumina vapor deposition layer)/gas barrier layer 103/adhesive layer/polyolefin layer (Laminate structure example 2) base material layer 101 (PET base material)/undercoat layer 104/inorganic material layer 102 (alumina vapor deposition layer)/gas barrier layer 103/adhesive layer/polyolefin layer (Laminate structure example 3) base material layer 101 (PET base material)/inorganic material layer 102 (alumina vapor deposition layer)/gas barrier layer 103/adhesive layer/polyamide layer/adhesive layer/polyolefin layer (Laminate structure example 4) base material layer 101 (PET base material)/undercoat layer 104/inorganic material layer 102 (alumina vapor deposition layer)/gas barrier layer 103/adhesive layer/polyamide layer/adhesive layer/polyolefin layer Here, by including a polyolefin layer formed of a polyolefin such as polyethylene, polypropylene, poly(4-methyl-1-pentene), or poly(1-butene) in the laminate structure, it is possible to further suppress a decrease in gas barrier performance under high humidity and gas barrier performance after a retort treatment while improving pinhole resistance, tearing resistance, heat resistance, and the like in the gas barrier laminate.

Although the first to fifth embodiments of the present invention have been described with reference to the drawings, these are examples of the first to fifth inventions, and various configurations other than those described above can also be adopted.

EXAMPLES

Hereinafter, the first to fifth embodiments will be described in detail with reference to Examples and Comparative Examples. It should be noted that all of the first to fifth embodiments are not limited to the descriptions of these examples.

Examples of First Embodiment

Example 1

(1) Preparation of Gas Barrier Coating Material

An aqueous solution of polyacrylic acid (PPA) (trade name: AC-10H, manufactured by Toagosei Co., Ltd., weight average molecular weight: 800,000) was diluted with purified water to prepare an aqueous solution having a PPA concentration of 10%, a 10% ammonia solution was added thereto so that the amount of ammonia was 1.5 mol with respect to 1 mol of carboxyl groups, and thus an ammonium polyacrylate aqueous solution having a PPA concentration of 7.38% was obtained.

Next, zinc oxide (ZnO: manufactured by Kanto Chemical Co., Inc.) and ammonium carbonate (manufactured by Kanto Chemical Co., Inc.) were added to the obtained ammonium polyacrylate aqueous solution, and the mixture was stirred and mixed. Here, the addition amount of zinc oxide was set to an amount such that the molar ratio of (zinc oxide)/(carboxyl groups of PPA) was 0.3. In addition, the amount of ammonium carbonate was set to an amount such that the molar ratio of ammonium carbonate to the carboxyl groups in PPA was 0.3. In this manner, a mixed solution (A) was prepared.

Next, purified water was added to polyethylenimine (PEI: manufactured by Nippon Shokubai Co., Ltd., trade name: SP-200, number average molecular weight: 10,000) to obtain a polyethyleneimine aqueous solution having a PEI concentration of 10%.

Next, the polyethylenimine aqueous solution was mixed with the mixed solution (A) at a ratio such that the molar ratio of (nitrogen of PEI)/(carboxyl group of PAA) was 0.55, and thus a mixed solution (B) was prepared.

Further, purified water was added to the mixed solution (B) so that the solid content concentration of PPA+ZnO+PEI was 2%, and the mixture was stirred until a uniform solution was obtained. Further, an ammonium hydrogen phosphate aqueous solution having a solid content concentration of 2% was added and stirred so that the amount of ammonium hydrogen phosphate ($(NH_4)_2HPO_4$: manufactured by Kanto Chemical Co., Inc.) was $1\times10^{-3}$ mol with respect to 1 mol of carboxyl groups in PPA, and then an activator aqueous solution having a solid content concentration of 1% was mixed so that the amount of the activator (trade name: Emulgen 120, manufactured by Kao Corporation) was 0.3% by mass with respect to the solid contents of PPA+ZnO+PEI to adjust a gas barrier coating material.

(2) Preparation of Gas Barrier Laminate

As the inorganic material layer, a transparent vapor deposition film (model number: TL-PET-H, manufactured by Mitsui Chemicals Tohcello, Inc.) in which aluminum oxide was vapor-deposited on a 12 μm PET film of the base material layer was prepared. This film was attached to a glass plate, and the gas barrier coating material was applied with an applicator so that the film thickness after drying was 0.2 μm. Then, the glass plate was dried in a hot air dryer at 120° C. for 5 minutes. Both ends of the dried film were fixed to bring the film into a hollow state, and then the film was heat-treated in a hot air dryer under the conditions of 150° C. for 1 minute. As described above, a gas barrier layer was formed on the transparent vapor deposition film to prepare a gas barrier laminate.

The preparation conditions for the gas barrier layer are shown in Table 7.

(3) Analysis of Gas Barrier Layer

In addition, the gas barrier layer of the gas barrier laminate obtained in (2) above was subjected to XPS analysis and TOF-SIMS analysis.

XPS Analysis Conditions

Analyzing device: AXIS-NOVA manufactured by KRATOS Analytical Limited

X-ray source: monochromatized Al-Kα

X-ray source output: 15 kV, 10 mA

Analysis region: 300×700 μm

During analysis: neutralization gun for charge correction used

Sample size: 1×1 cm

The results of the XPS analysis are shown in Table 8.

TOF-SIMS Analysis Conditions

Pre-measurement treatment: surface etching with Ar-GCIB

GCIB: 5 kV, 5 μA

GCIB treatment time: time point at which the spectrum pattern of TOF-SIMS no longer changes.

Analyzing device: PHI nano-TOF II manufactured by ULVAC-PHI, Inc.

Primary ion: $Bi_3^{2+}$

Primary ion source output: 30 kV, 0.5 μA

Analysis region: 300×300 μm (scanning region of primary ion beam)

During the analysis, charge neutralization was performed by irradiation with low energy electron beams and low energy Ar ions attached to the device. The results of analyzing the data obtained by the TOF-SIMS analysis based on the above-described method are shown in Table 9. The relative mass peak intensity normalized by the intensity of $C_3H_3O_2^-$ is a value obtained by dividing the mass peak intensity of each fragment by the intensity ($I(C_3H_3O_2^-)$) of $C_3H_3O_2^-$.

(4) Preparation of Gas Barrier Laminate with Two-Layer Laminate Structure

An adhesive was applied to a corona discharge-treated surface of an unstretched polypropylene film (trade name: RXC-22, manufactured by Mitsui Chemicals Tohcello, Inc.) having a thickness of 70 μm, and the surface was laminated on the gas barrier surface of the gas barrier laminate obtained in (2) above to prepare a gas barrier laminate having a two-layer laminate structure. As the adhesive, a mixture obtained by blending 9 parts by mass of TAKELAC A525S, trade name, manufactured by Mitsui Chemicals, Inc., and 1 part by mass of an isocyanate-based curing agent (TAKENATE A50, trade name, manufactured by Mitsui Chemicals, Inc.), and 7.5 parts by mass of ethyl acetate was used.

(5) Evaluation of Water Vapor Permeability of Two-Layer Laminate Structure

The gas barrier laminate obtained in the above (4) was folded back so that the unstretched polypropylene film became the inner surface and two sides were heat-sealed to form a bag shape. Then, 70 cc of water was added thereto as a content, the other side was heat-sealed to prepare a bag. This bag was subjected to a retort treatment at 130° C. for 30 minutes in a high temperature and high pressure retort sterilization device. After the retort treatment, water as the content was drained, and a film after the retort treatment (water filling) was obtained by removing the sealing portion.

The retort-treated film obtained by the above method was overlapped so that the unstretched polypropylene film became the inner surface, the gas barrier laminate film was folded back, and two sides were heat-sealed to form a bag shape. Calcium chloride was put into the bag as a content, and the other side was heat-sealed to prepare a bag having a surface area of 0.01 $m^2$. The bag was left to stand under the conditions of 40° C. and 90% RH for 300 hours, and the water vapor permeability [g/(m$^2$·day)] was measured based on a change in weight before and after standing.

The evaluation results of gas barrier properties after the retort treatment are shown in Table 10.

Example 2

A gas barrier layer was prepared in the same manner as in Example 1, except that the concentration of ammonium hydrogen phosphate was set to 0.01 mol with respect to 1 mol of the carboxyl groups of the polyacrylic acid. The preparation conditions are also shown in Table 3. In addition, the obtained gas barrier layer was subjected to XPS analysis and TOF-SIMS analysis. The results of the XPS analysis and the TOF-SIMS analysis are shown in Tables 8 and 9. In addition, the evaluation results of the gas barrier properties after the retort treatment are shown in Table 10.

Example 3

A gas barrier laminate was prepared in the same manner as in Example 1, except that the concentration of ammonium hydrogen phosphate was set to 0.1 mol with respect to 1 mol of the carboxyl groups of the polyacrylic acid. The preparation conditions are also shown in Table 3. In addition, the obtained gas barrier layer was subjected to XPS analysis and TOF-SIMS analysis. The results of the XPS analysis and the TOF-SIMS analysis are shown in Tables 8 and 9. In addition, the evaluation results of the gas barrier properties after the retort treatment are shown in Table 10.

Example 4

A gas barrier laminate was prepared in the same manner as in Example 1, except that the concentration of ammonium hydrogen phosphate was set to 0.2 mol with respect to 1 mol of the carboxyl groups of the polyacrylic acid. The preparation conditions are also shown in Table 3. In addition, the obtained gas barrier layer was subjected to XPS analysis and TOF-SIMS analysis. The results of the XPS analysis and the TOF-SIMS analysis are shown in Tables 8 and 9. In addition, the evaluation results of the gas barrier properties after the retort treatment are shown in Table 10.

Example 5

A gas barrier laminate was prepared in the same manner as in Example 1, except that a phosphonic acid hydrogen ammonium salt ($(NH_4)_2HPO_3$) aqueous solution having a solid content concentration of 2% obtained by neutralizing phosphonic acid (also known as phosphorous acid) ($H_3PO_3$, manufactured by Kanto Chemical Co., Inc.) with an ammonia solution was prepared instead of the ammonium hydrogen phosphate ($(NH_4)_2HPO_4$) aqueous solution having a solid content concentration of 2% in Example 1, and the concentration of the phosphonic acid hydrogen ammonium salt was set to 0.01 mol with respect to 1 mol of the carboxyl groups of the polyacrylic acid. The preparation conditions are also shown in Table 3. In addition, the gas barrier layer of the obtained gas barrier laminate was subjected to XPS analysis and TOF-SIMS analysis. The results of the XPS analysis and the TOF-SIMS analysis are shown in Tables 8 and 9. In addition, the evaluation results of the gas barrier properties after the retort treatment are shown in Table 10.

Comparative Example 1

A gas barrier laminate was prepared in the same manner as in Example 1, except that the concentration of ammonium hydrogen phosphate was set to 0.0001 mol with respect to 1 mol of the carboxyl groups of the polyacrylic acid. The preparation conditions are also shown in Table 3. In addition, the gas barrier layer of the obtained gas barrier laminate was subjected to XPS analysis and TOF-SIMS analysis. The results of the XPS analysis and the TOF-SIMS analysis are shown in Tables 8 and 9. In addition, the evaluation results of the gas barrier properties after the retort treatment are shown in Table 10.

TABLE 7

| | Base material layer + Inorganic material layer | Gas barrier layer | | | | Drying | | Heat treatment | | |
|---|---|---|---|---|---|---|---|---|---|---|
| | | | | Phosphorus compound/PPA | | | | | | |
| | | PEI/PPA | ZnO/PPA | Type | Addition amount | Temperature (° C.) | Time (min) | Temperature (° C.) | Time (min) | Thickness µm |
| Example 1 | TL-PET | 0.55 | 0.3 | Phosphoric acid | 0.001 | 120 | 5 | 150 | 1 | 0.2 |
| Example 2 | TL-PET | 0.55 | 0.3 | Phosphoric acid | 0.01 | 120 | 5 | 150 | 1 | 0.2 |
| Example 3 | TL-PET | 0.55 | 0.3 | Phosphoric acid | 0.1 | 120 | 5 | 150 | 1 | 0.2 |
| Example 4 | TL-PET | 0.55 | 0.3 | Phosphoric acid | 0.2 | 120 | 5 | 150 | 1 | 0.2 |
| Example 5 | TL-PET | 0.55 | 0.3 | Phosphonic acid | 0.01 | 120 | 5 | 150 | 1 | 0.2 |
| Comparative Example 1 | TL-PET | 0.55 | 0.3 | Phosphoric acid | $1 \times 10^{-4}$ | 120 | 5 | 150 | 1 | 0.2 |

TABLE 8

| | XPS measurement result (atomic %) | | | | |
|---|---|---|---|---|---|
| | C | O | N | Zn | P |
| Example 1 | 64.1 | 24.4 | 7.7 | 3.8 | 0 |
| Example 2 | 63.7 | 24.8 | 7.7 | 3.7 | 0.1 |
| Example 3 | 60.5 | 27.7 | 7.3 | 3.5 | 1.0 |
| Example 4 | 57.4 | 30.5 | 6.9 | 3.4 | 1.8 |
| Example 5 | 63.8 | 24.7 | 7.7 | 3.7 | 0.1 |
| Comparative Example 1 | 64.2 | 24.3 | 7.6 | 3.9 | 0 |

TABLE 9

| | Total Ion Counts | | | | | | |
|---|---|---|---|---|---|---|---|
| | Positive secondary ion | Negative secondary ion | Mass peak intensity | | | | |
| | | | $CN^-$ | $C_3H_3O_2^-$ | $PO_2^-$ | $PO_3^-$ | $^{64}ZnPO_4H^-$ |
| Example 1 | 6491689 | 7747805 | 0.044 | 0.034 | 0.00046 | 0.0022 | $3.8 \times 10^{-5}$ |
| Example 2 | 6898339 | 8571746 | 0.042 | 0.033 | 0.0044 | 0.019 | $1.8 \times 10^{-4}$ |
| Example 3 | 7741692 | 8556996 | 0.038 | 0.038 | 0.0063 | 0.030 | $4.9 \times 10^{-4}$ |
| Example 4 | 8510871 | 9036240 | 0.031 | 0.039 | 0.0078 | 0.037 | $8.9 \times 10^{-4}$ |
| Example 5 | 6661788 | 8178350 | 0.042 | 0.032 | 0.0097 | 0.020 | $6.9 \times 10^{-5}$ |
| Comparative Example 1 | 6838528 | 7950414 | 0.047 | 0.038 | 0.00054 | 0.0037 | $2.1 \times 10^{-5}$ |

| | Relative mass peak intensity normalized by intensity of $C_3H_3O_2^-$ | | | | | | |
|---|---|---|---|---|---|---|---|
| | $CN^-$ | $C_3H_3O_2^-$ | $PO_2^-$ | $PO_3^-$ | $PO_2^- + PO_3^-$ | $PO_2^-/PO_3^-$ | $^{64}ZnPO_4H^-$ |
| Example 1 | 1.3 | 1.0 | 0.013 | 0.065 | 0.078 | 0.21 | $1.1 \times 10^{-3}$ |
| Example 2 | 1.3 | 1.0 | 0.13 | 0.56 | 0.69 | 0.23 | $5.3 \times 10^{-3}$ |
| Example 3 | 0.99 | 1.0 | 0.17 | 0.80 | 0.96 | 0.21 | $1.3 \times 10^{-2}$ |
| Example 4 | 0.81 | 1.0 | 0.20 | 0.95 | 1.1 | 0.21 | $2.3 \times 10^{-2}$ |
| Example 5 | 1.3 | 1.0 | 0.30 | 0.63 | 0.93 | 0.47 | $2.1 \times 10^{-3}$ |
| Comparative Example 1 | 1.2 | 1.0 | 0.014 | 0.097 | 0.11 | 0.15 | $5.4 \times 10^{-4}$ |

TABLE 10

| | Two-layer laminate structure Water vapor permeability after retorting [g/(m$^2$ · day)] |
|---|---|
| Example 1 | 2.1 |
| Example 2 | 0.60 |
| Example 3 | 0.70 |
| Example 4 | 1.3 |
| Example 5 | 1.6 |
| Comparative Example 1 | 5.1 |

In the comparative example in which the mass peak intensity of $^{64}ZnPO_4H^-$, which is a fragment indicating the presence of a phosphate-zinc bond, which is a highly water-resistant bond, in the TOF-SIMS analysis is low, the water vapor barrier properties of the retort-treated two-layer laminate structure are low. On the other hand, in the gas barrier laminate according to the first embodiment, a gas barrier laminate exhibiting high gas barrier properties after the retort treatment can be obtained.

Additional Examples of First Embodiment: Two-Layer Laminate Structure

In Examples 1 to 5 and Comparative Example, the water vapor permeability of the two-layer laminate structure was evaluated. In addition to these, the oxygen permeability of the two-layer laminate structure and the preparation and evaluation (oxygen permeability and water vapor permeability) of the gas barrier laminate of the three-layer laminate structure were also performed as follows.

Example 1'

(1) Preparation of Gas Barrier Coating Material

First, a gas barrier coating material was prepared in the same manner as in Example 1.

(2) Preparation of Gas Barrier Laminate

The above gas barrier coating material was used as a gas barrier coating material, and a retort-treated film having a two-layer laminate structure was obtained in the same manner as in Example 1.

(3) Evaluation of Oxygen Permeability of Two-Layer Laminate Structure

The oxygen permeability [mL/(m$^2$·day·MPa)] of the obtained retort-treated film having a two-layer laminate structure was measured under the conditions of 20° C. and 90% RH in accordance with JIS K 7126, using OX-TRAN 2/1, manufactured by MOCON Inc.

(4) Preparation of Gas Barrier Laminate with Three-Layer Laminate Structure

First, an adhesive was applied to a corona discharge-treated surface of an unstretched polypropylene film (trade name: RXC-22, manufactured by Mitsui Chemicals Tohcello, Inc.) having a thickness of 60 μm, and a nylon film (trade name: EMBLEM ONBC, manufactured by Unitika Ltd.) having a thickness of 15 μm was laminated to prepare a laminate.

An adhesive was applied to the nylon film surface of the laminate, and the gas barrier surface of the gas barrier laminate obtained in the above (2) of Example 1' was laminated to prepare a gas barrier laminate having a three-layer laminate structure. The adhesive used is the same as that in the above (4) of Example 1. The obtained gas barrier laminate was folded back so that the unstretched polypropylene film became the inner surface, two sides were heat-sealed to form a bag shape. Then, 70 cc of water was added thereto as a content, and the other side was heat-sealed to prepare a bag. This bag was subjected to a retort treatment at 130° C. for 30 minutes in a high temperature and high pressure retort sterilization device. After the retort treatment, water as the content was drained, and a film after the retort treatment (water filling) was obtained by removing the sealing portion.

(5) Evaluation of Gas Barrier Properties of Three-Layer Laminate Structure

The water vapor permeability of the gas barrier laminate having a three-layer laminate structure obtained in Example 1' was evaluated by the same method as the water vapor permeability of Example 1. In addition, the oxygen permeability was evaluated by the same method as in (1) of Example 1'. The evaluation results of the gas barrier properties after the retort treatment are shown in Table 11.

Example 2'

A gas barrier laminate was prepared in the same manner as in Example 1', except that the gas barrier coating material prepared in Example 2 was used as a gas barrier coating material. Then, the gas barrier properties after the retort treatment (the oxygen permeability of the two-layer laminate structure, the oxygen permeability and the water vapor permeability of the three-layer laminate structure) were evaluated in the same manner as in Example 1'. The evaluation results of the gas barrier properties after the retort treatment are shown in Table 11.

Example 3'

A gas barrier laminate was prepared in the same manner as in Example 1', except that the gas barrier coating material prepared in Example 3 was used as a gas barrier coating material. Then, the gas barrier properties after the retort treatment (oxygen permeability of the two-layer laminate structure) were evaluated in the same manner as in Example 1'. The evaluation results of the gas barrier properties after the retort treatment are shown in Table 11.

Example 4'

A gas barrier laminate was prepared in the same manner as in Example 1', except that the gas barrier coating material prepared in Example 5 was used as a gas barrier coating material. Then, the gas barrier properties after the retort treatment (the oxygen permeability of the two-layer laminate structure, the oxygen permeability and the water vapor permeability of the three-layer laminate structure) were evaluated in the same manner as in Example 1'. The evaluation results of the gas barrier properties after the retort treatment are shown in Table 11.

Comparative Example'

A gas barrier laminate was prepared in the same manner as in Example 1', except that the gas barrier coating material prepared in Comparative Example was used as a gas barrier coating material. Then, the gas barrier properties after the retort treatment (the oxygen permeability of the two-layer laminate structure, the oxygen permeability and the water vapor permeability of the three-layer laminate structure) were evaluated in the same manner as in Example 1'. The evaluation results of the gas barrier properties after the retort treatment are shown in Table 11.

TABLE 11

| | Two-layer laminate structure Oxygen vapor permeability after retorting [ml/($m^2$ · day · MPa)] | Three-layer laminate structure Oxygen permeability after retorting [ml/($m^2$ · day · MPa)] | Water vapor permeability after retorting [g/($m^2$ · day)] |
|---|---|---|---|
| Example 1' | 0.80 | 0.80 | 1.1 |
| Example 2' | 0.80 | 0.70 | 1.3 |
| Example 3' | 2.5 | — | — |
| Example 4' | 0.90 | 1.0 | 1.5 |
| Comparative Example 1 | 3.6 | 0.90 | 1.9 |

As shown in Table 11, it was also possible to confirm high gas barrier properties in Examples 1' to 4'.

Examples of Second Embodiment

Example 1

(1) Preparation of Gas Barrier Coating Material

An aqueous solution of polyacrylic acid (PAA) (manufactured by Toagosei Co., Ltd., trade name: AC-10H, weight average molecular weight: 800,000) was diluted with purified water to prepare an aqueous solution having a PAA concentration of 10%. A 10% ammonia solution was added to this aqueous solution. The amount of ammonia was set to 1.5 mol of ammonia with respect to 1 mol of the carboxyl groups of PAA. In this manner, an ammonium polyacrylate aqueous solution having a PAA concentration of 7.38% was obtained.

Next, zinc oxide (ZnO: manufactured by Kanto Chemical Co., Inc.) and ammonium carbonate (manufactured by Kanto Chemical Co., Inc.) were added to the obtained ammonium polyacrylate aqueous solution, and the mixture was stirred and mixed. Here, the addition amount of zinc oxide was set to an amount such that the molar ratio of (zinc oxide)/(carboxyl groups of PAA) was 0.3. In addition, the amount of ammonium carbonate was set to an amount such that the molar ratio of ammonium carbonate to the carboxyl groups of PAA was 0.3. In this manner, a mixed solution (A) was prepared.

Next, purified water was added to polyethylenimine (PEI: trade name: SP-200, manufactured by Nippon Shokubai Co., Ltd., number average molecular weight: 10,000) to obtain a polyethyleneimine aqueous solution having a PEI concentration of 10%.

Next, the mixed solution (A) and the polyethyleneimine aqueous solution were mixed at a ratio such that the molar ratio of (nitrogen of PEI)/(carboxyl group of PAA) was 0.55, and thus a mixed solution (B) was prepared.

Further, purified water was added to the mixed solution (B) so that the solid content concentration of PAA+ZnO+PEI was 2%, and the mixture was stirred until a uniform solution was obtained.

Further, an ammonium hydrogen phosphate aqueous solution having a solid content concentration of 2% was added and stirred so that the amount of ammonium hydrogen phosphate ($(NH_4)_2HPO_4$, manufactured by Kanto Chemical Co., Inc.) was $1\times10^{-3}$ mol with respect to 1 mol of the carboxyl groups in PAA.

Thereafter, an activator aqueous solution having a solid content concentration of 1% was mixed so that the amount of the activator (trade name: EMULGEN 120, manufactured by Kao Corporation) was 0.3% by mass with respect to the solid contents of PAA+ZnO+PEI.

In this manner, a gas barrier coating material was prepared.

(2) Preparation of Gas Barrier Laminate

A transparent vapor deposition film (model number: TL-PET-H, manufactured by Mitsui Chemicals Tohcello, Inc.) in which aluminum oxide was vapor-deposited on a 12 μm PET film of the base material layer as an inorganic material layer was attached to the glass plate. The gas barrier coating material was applied onto the vapor deposition surface of the transparent vapor deposition film with an applicator so that the film thickness after drying was 0.2 μm. After the application, the entire glass plate was dried in a hot air dryer at 120° C. for 5 minutes.

Both ends of the dried film were fixed to bring the film into a hollow state, and then the film was heat-treated with a hot air dryer under the conditions of 150° C. for 1 minute to form a gas barrier layer on the transparent vapor deposition film. In this manner, a gas barrier laminate was prepared.

The preparation conditions for the gas barrier layer are shown in Table 12.

(3) Analysis of Gas Barrier Layer

The gas barrier layer of the gas barrier laminate obtained in (2) above was subjected to ATR-IR analysis, XPS analysis, and TOF-SIMS analysis.

(3-1) ATR-IR Analysis

As described above, a spectrum excluding the influence of the base material (PET) was obtained. Then, the peak area ratio D/A was obtained based on the spectrum. The results are shown in Table 13.

(3-2) XPS Analysis

The analysis was performed using a sample obtained by cutting the gas barrier laminate into a size of 1×1 cm. Specific analysis conditions were as described above. The results are shown in Table 13.

(3-3) TOF-SIMS Analysis

First, as a pretreatment, the inside of the gas barrier layer was exposed by Ar-GCIB etching. Specific conditions for the Ar-GCIB etching were as described above.

Then, TOF-SIMS analysis was performed. The specific conditions were as described above.

The results of analyzing the data obtained by the TOF-SIMS analysis based on the method described above are shown in Table 14. In Table 14, the relative mass peak intensity normalized by the intensity of $C_3H_3O_2^-$ is a value obtained by dividing the mass peak intensity of each fragment by the intensity of $C_3H_3O_2^-$:$I(C_3H_3O_2^-)$.

(4) Preparation of Gas Barrier Laminate with Two-Layer Laminate Structure

An adhesive was applied to a corona discharge-treated surface of an unstretched polypropylene film (trade name: RXC-22, manufactured by Mitsui Chemicals Tohcello, Inc.) having a thickness of 70 μm, and the gas barrier surface of the gas barrier laminate obtained in (2) above was laminated to prepare a gas barrier laminate having a two-layer laminate structure. As the adhesive, a mixture obtained by blending 9 parts by mass of TAKELAC A525S), trade name, manufactured by Mitsui Chemicals, Inc., 1 part by mass of an isocyanate-based curing agent (trade name: TAKENATE A50, manufactured by Mitsui Chemicals, Inc.), and 7.5 parts by mass of ethyl acetate was used.

(5) Evaluation of Gas Barrier Properties after Retort Treatment

The gas barrier laminate obtained in the above (4) was folded back so that the unstretched polypropylene film became the inner surface, and two sides were heat-sealed to form a bag shape. Then, 70 cc of water was added thereto as a content, and the other side was heat-sealed to prepare a bag. The bag was subjected to a retort treatment at 130° C. for 30 minutes using a high temperature and high pressure retort sterilization device. After the retort treatment, water as the content was drained, and a film after the retort treatment (water filling) was obtained by removing the sealing portion.

The retort-treated film obtained by the above method was overlapped so that the unstretched polypropylene film became the inner surface, the gas barrier laminate film was folded back, and two sides were heat sealed to form a bag shape. Then, calcium chloride was added as the content, and the other side was heat sealed to prepare a bag having a surface area of 0.01 $m^2$. This bag was left to stand for 300 hours under conditions of 40° C. and 90% RH. The water vapor permeability [g/($m^2$·day)] was measured based on a change in weight before and after the standing.

The evaluation results of the gas barrier properties after the retort treatment are shown in Table 15.

Example 2

A gas barrier coating material was prepared and then a gas barrier laminate was prepared in the same manner as in Example 1, except that the concentration of ammonium hydrogen phosphate was set to 0.01 mol with respect to 1 mol of the carboxyl groups of the polyacrylic acid. The preparation conditions are shown in Table 12.

As in Example 1, the results of the analysis performed on the gas barrier layer of the obtained gas barrier laminate are shown in Tables 13 and 14. In addition, the evaluation results of the gas barrier properties after the retort treatment are shown in Table 15.

Example 3

A gas barrier coating material was prepared and then a gas barrier laminate was prepared in the same manner as in Example 1, except that the concentration of ammonium hydrogen phosphate was set to 0.1 mol with respect to 1 mol of the carboxyl groups of the polyacrylic acid. The preparation conditions are shown in Table 12.

As in Example 1, the results of the analysis performed on the gas barrier layer of the obtained gas barrier laminate are shown in Tables 13 and 14. In addition, the evaluation results of the gas barrier properties after the retort treatment are shown in Table 15.

Example 4

A gas barrier coating material was prepared and then a gas barrier laminate was prepared in the same manner as in Example 1, except that the concentration of ammonium hydrogen phosphate was set to 0.2 mol with respect to 1 mol of the carboxyl groups of the polyacrylic acid. The preparation conditions are shown in Table 12.

As in Example 1, the results of the analysis performed on the gas barrier layer of the obtained gas barrier laminate are shown in Tables 13 and 14. In addition, the evaluation results of the gas barrier properties after the retort treatment are shown in Table 15.

Example 5

A gas barrier coating material was prepared and then a gas barrier laminate was prepared in the same manner as in Example 1, except that a phosphonic acid hydrogen ammonium salt ($(NH_4)_2HPO_3$) aqueous solution having a solid content concentration of 2% obtained by neutralizing phosphonic acid (also known as phosphorous acid) ($H_3PO_3$, manufactured by Kanto Chemical Co., Inc.) with an ammonia solution was prepared instead of the ammonium hydrogen phosphate ($(NH_4)_2HPO_4$) aqueous solution having a solid content concentration of 2% in Example 1, and the concentration of the phosphonic acid hydrogen ammonium salt was set to 0.01 mol with respect to 1 mol of the carboxyl groups of the polyacrylic acid. The preparation conditions are shown in Table 12.

As in Example 1, the results of the analysis performed on the gas barrier layer of the obtained gas barrier laminate are shown in Tables 13 and 14. In addition, the evaluation results of the gas barrier properties after the retort treatment are shown in Table 15.

Example 6

A gas barrier coating material was prepared and then a gas barrier laminate was prepared in the same manner as in Example 1, except that an ammonium phosphinate salt ($(NH_4)H_2PO_2$) aqueous solution having a solid content concentration of 2% obtained by neutralizing phosphinic acid (also known as hypophosphorous acid) ($H_3PO_2$, manufactured by Kanto Chemical Co., Inc.) with an ammonia solution was used instead of the ammonium hydrogen phosphate ($(NH_4)_2HPO_4$) aqueous solution having a solid content concentration of 2% in Example 1, and the concentration of the ammonium phosphinate salt was set to 0.01 mol with respect to 1 mol of the carboxyl groups of the polyacrylic acid. The preparation conditions are shown in Table 12.

As in Example 1, the results of the analysis performed on the gas barrier layer of the obtained gas barrier laminate are shown in Tables 13 and 14. In addition, the evaluation results of the gas barrier properties after the retort treatment are shown in Table 6.

Comparative Example 1

A gas barrier coating material was prepared and then a gas barrier laminate was prepared in the same manner as in Example 1, except that the concentration of ammonium hydrogen phosphate was set to 0.0001 mol with respect to 1 mol of the carboxyl groups of the polyacrylic acid. The preparation conditions are shown in Table 3.

As in Example 1, the results of the analysis performed on the gas barrier layer of the obtained gas barrier laminate are shown in Tables 4 and 5. In addition, the evaluation results of the gas barrier properties after the retort treatment are shown in Table 15.

Example 7

(1) Preparation of Gas Barrier Coating Material

First, an ammonium polyacrylate aqueous solution having a concentration of 7.29% by mass was obtained by adding ammonia of a 10% ammonia solution (manufactured by Wako Pure Chemical Industries, Ltd.) so as to be 150 equivalent % with respect to the carboxyl groups of the polyacrylic acid (trade name: AC-10H, manufactured by Toagosei Co., Ltd., weight average molecular weight: 800,000), and further adding purified water thereto.

Next, zinc oxide (manufactured by Kanto Chemical Co., Inc.) and ammonium carbonate were added to the obtained ammonium polyacrylate aqueous solution, and the materials were mixed and stirred to prepare a mixed solution (A). Here, the addition amount of zinc oxide was set to an amount such that (number of moles of zinc oxide in gas barrier coating material)/(number of moles of —COO— groups included in polyacrylic acid in gas barrier coating material) was 0.225. In addition, the amount of ammonium carbonate was set to an amount such that (number of moles of carbonic acid-based ammonium salt in the gas barrier coating material)/(number of moles of zinc oxide in the gas barrier coating material) is 1.0.

Next, a 10% solution of a polyethylenimine aqueous solution was obtained by adding purified water to polyethylenimine (trade name: SP-200, manufactured by Nippon Shokubai Co., Ltd., number average molecular weight: 10,000).

In addition, purified water was added to diammonium hydrogen phosphate ($(NH_4)_2HPO_4$, manufactured by Kanto Chemical Co., Inc.) to prepare a 10% aqueous solution.

Next, the mixed solution (A), the polyethylenimine aqueous solution, and the diammonium hydrogen phosphate solution were mixed at a ratio such that (number of moles of amino group contained in polyethyleneimine in the gas barrier coating material)/(number of moles of —COO— groups included in the polyacrylic acid in the gas barrier coating material) was 0.55 and (number of moles of $(NH_4)_2HPO_4$)/(number of moles of —COO— groups included in the polyacrylic acid) was 0.01, and thus a mixed solution (B) was prepared.

Further, purified water was added to the mixed solution (B) so that the solid content concentration of the mixed solution (B) was 1.5%, and the mixture was stirred until a uniform solution was obtained. Then, an active agent (trade name: EMULGEN 120, manufactured by Kao Corporation) was added and mixed so that the content thereof was 0.3% by mass with respect to the solid content of the mixed solution (B). In this manner, a gas barrier coating material was prepared.

(2) Preparation of Gas Barrier Laminate

An undercoat layer (UC) was formed on a corona-treated surface of a biaxially stretched polyethylene terephthalate film (PET12, manufactured by Unitika Ltd.) having a thickness of 12 μm by the following method.

The biaxially stretched polyethylene terephthalate film (PET12, manufactured by Unitika Ltd.) having a thickness of 12 μm was used as a base material, and one surface of the base material was coated with a resin composition having the following composition using a Mayer bar and dried. Therefore, an undercoat (UC) layer having a thickness of 0.20 μm after drying was formed.

(Composition)

Main agent: polyurethane resin aqueous dispersion liquid (trade name: TAKELAC WS-4033, manufactured by Mitsui Chemicals, Inc., aromatic polyester type polyurethane resin)

Crosslinking agent: compound having a carbodiimide group (trade name: CARBODILITE SV-02, manufactured by Nisshinbo Chemical Inc.)

Blending ratio: The crosslinking agent was blended into the main agent so that the amount of the carbodiimide group in the crosslinking agent was 0.4 mol with respect to 1.0 mol of the carboxyl groups in the polyurethane resin in the main agent.

Next, an alumina vapor deposition layer was formed on the undercoat layer by the following method.

Aluminum was heated and evaporated on the UC layer by a high frequency induction heating method, and while introducing oxygen, the aluminum was vapor-deposited to form an aluminum oxide film having a thickness of 7 nm. Due to this, an aluminum oxide vapor deposition PET film was obtained. The water vapor permeability of the aluminum oxide vapor deposition PET film was 1.5 g/(m$^2$·24 h).

Then, the gas barrier coating material prepared in (1) above was applied onto the vapor deposition layer using a Mayer bar so that the coating amount after drying was 0.2 μm, and a heat treatment was performed using a hot air dryer under conditions of a temperature of 130° C. and a time of 6.5 seconds. The preparation conditions are shown in Table 12.

(3) Analysis of Gas Barrier Layer

The gas barrier layer of the gas barrier laminate obtained in (2) above was subjected to the same analysis as in (3) of Example 1. The results of the analysis are shown in Tables 13 and 14.

(4) Preparation of Gas Barrier Laminate with Two-Layer Laminate Structure

A gas barrier laminate having a two-layer laminate structure was prepared in the same manner as in (4) of Example 1 using the gas barrier layer of the gas barrier laminate obtained in (2) above.

(5) Evaluation of Gas Barrier Properties after Retort Treatment

The gas barrier properties of the gas barrier laminate obtained in (4) above after the retort treatment were evaluated in the same manner as in (6) of Example 1. The results are shown in Table 15.

Example 8

A gas barrier coating material was prepared and then a gas barrier laminate was prepared in the same manner as in Example 7, except that the concentration of the diammonium hydrogen phosphate was set to 0.03 mol with respect to 1 mol of the carboxyl groups of the polyacrylic acid. The preparation conditions are shown in Table 12.

As in Example 7, the results of the analysis performed on the gas barrier layer of the obtained gas barrier laminate are shown in Tables 13 and 14. In addition, the evaluation results of the gas barrier properties after the retort treatment are shown in Table 15.

TABLE 12

| | Base material layer + Inorganic material layer | Gas barrier layer | | | | | | | | |
|---|---|---|---|---|---|---|---|---|---|---|
| | | | | Phosphorus compound/PPA | | Drying | | Heat treatment | | |
| | | PEI/PPA | ZnO/PPA | Type | Addition amount | Temperature (° C.) | Time (min) | Temperature (° C.) | Time (sec) | Thickness μm |
| Example 1 | TL-PET-H | 0.55 | 0.3 | Phosphoric acid | 0.001 | 120 | 5 | 150 | 60 | 0.2 |
| Example 2 | TL-PET-H | 0.55 | 0.3 | Phosphoric acid | 0.01 | 120 | 5 | 150 | 60 | 0.2 |
| Example 3 | TL-PET-H | 0.55 | 0.3 | Phosphoric acid | 0.1 | 120 | 5 | 150 | 60 | 0.2 |
| Example 4 | TL-PET-H | 0.55 | 0.3 | Phosphoric acid | 0.2 | 120 | 5 | 150 | 60 | 0.2 |
| Example 5 | TL-PET-H | 0.55 | 0.3 | Phosphonic acid (phosphorous acid) | 0.01 | 120 | 5 | 150 | 60 | 0.2 |
| Example 6 | TL-PET-H | 0.55 | 0.3 | Phosphinic acid (hypophosphorous acid) | 0.01 | 120 | 5 | 150 | 60 | 0.2 |
| Comparative Example 1 | TL-PET-H | 0.55 | 0.3 | Phosphoric acid | $1 \times 10^{-4}$ | 120 | 5 | 150 | 60 | 0.2 |
| Example 7 | UC-PET + aluminum oxide | 0.55 | 0.225 | Phosphoric acid | 0.01 | — | — | 130 | 6.5 | 0.2 |
| Example 8 | UC-PET + aluminum oxide | 0.55 | 0.225 | Phosphoric acid | 0.03 | — | — | 130 | 6.5 | 0.2 |

TABLE 13

| | XPS measurement result (atomic %) | | | | | ATR-IR analysis result Peak area ratio |
|---|---|---|---|---|---|---|
| | C | O | N | Zn | P | D/A |
| Example 1 | 64.1 | 24.4 | 7.7 | 3.8 | 0.0 | 0.67 |
| Example 2 | 63.7 | 24.8 | 7.7 | 3.7 | 0.1 | 0.67 |
| Example 3 | 60.5 | 27.7 | 7.3 | 3.5 | 1.0 | 0.63 |
| Example 4 | 57.4 | 30.5 | 6.9 | 3.4 | 1.8 | 0.61 |
| Example 5 | 63.8 | 24.7 | 7.7 | 3.7 | 0.1 | 0.69 |
| Example 6 | 63.9 | 24.6 | 7.6 | 3.8 | 0.1 | 0.69 |
| Comparative Example 1 | 64.2 | 24.3 | 7.6 | 3.9 | 0.0 | 0.67 |
| Example 7 | 64.9 | 24.1 | 8.1 | 2.8 | 0.1 | 0.75 |
| Example 8 | 64.8 | 24.0 | 8.0 | 2.9 | 0.3 | 0.76 |

TABLE 14

| | Total Ion Counts | | | | | | Relative mass peak intensity normalized by intensity of $C_3H_3O_2^-$ | | | | |
|---|---|---|---|---|---|---|---|---|---|---|---|
| | Positive secondary ion | Negative secondary ion | Mass peak intensity | | | | | | | | |
| | | | $CN^-$ | $C_3H_3O_2^-$ | $PO_2^-$ | $PO_3^-$ | $CN^-$ | $C_3H_3O_2^-$ | $PO_2^-$ | $PO_3^-$ | $PO_2^-$ + $PO_3^-$ |
| Example 1 | 6491689 | 7747805 | 0.0439 | 0.0341 | 0.0005 | 0.0022 | 1.29 | 1.00 | 0.01 | 0.06 | 0.08 |
| Example 2 | 6898339 | 8571746 | 0.0420 | 0.0335 | 0.0044 | 0.0186 | 1.25 | 1.00 | 0.13 | 0.56 | 0.69 |
| Example 3 | 7741692 | 8556996 | 0.0376 | 0.0380 | 0.0063 | 0.0302 | 0.99 | 1.00 | 0.17 | 0.80 | 0.96 |
| Example 4 | 8510871 | 9036240 | 0.0311 | 0.0386 | 0.0078 | 0.0366 | 0.81 | 1.00 | 0.20 | 0.95 | 1.15 |
| Example 5 | 6661788 | 8178350 | 0.0415 | 0.0323 | 0.0097 | 0.0204 | 1.28 | 1.00 | 0.30 | 0.63 | 0.93 |
| Example 6 | 7099614 | 9634023 | 0.0413 | 0.0346 | 0.0148 | 0.0121 | 1.19 | 1.00 | 0.43 | 0.35 | 0.78 |
| Comparative Example 1 | 6838528 | 7950414 | 0.0467 | 0.0379 | 0.0001 | 0.0004 | 1.23 | 1.00 | 0.00 | 0.01 | 0.01 |
| Example 7 | 5786522 | 8046471 | 0.0389 | 0.0351 | 0.0041 | 0.0187 | 1.11 | 1.00 | 0.12 | 0.53 | 0.65 |
| Example 8 | 5129453 | 7745046 | 0.0367 | 0.0318 | 0.0090 | 0.0392 | 1.16 | 1.00 | 0.28 | 1.24 | 1.52 |

TABLE 15

| | Gas barrier laminate Two-layer laminate structure Water vapor permeability after retorting [g/($m^2$ · day)] |
|---|---|
| Example 1 | 2.1 |
| Example 2 | 0.6 |
| Example 3 | 0.7 |
| Example 4 | 1.3 |
| Example 5 | 1.6 |
| Example 6 | 3.9 |
| Comparative Example 1 | 5.1 |
| Example 7 | 1.6 |
| Example 8 | 1.8 |

From the information shown in each table, the gas barrier laminates (Examples 1 to 8) including the gas barrier layer in which the value of $\{I(PO_2^-)+I(PO_3^-)\}/I(C_3H_3O_2^-)$ (the intensity of $PO_2^-+PO_3^-$ normalized by the intensity of $C_3H_3O_2^-$) was large to some extent and the composition ratio of the metal element (Zn) was 1 to 15 atomic %, exhibited a relatively low water vapor permeability even after the retort treatment.

Additional Examples of Second Embodiment: Preparation and Evaluation of Gas Barrier Laminate with Three-Layer Laminate Structure In Examples 1 to 8, a gas barrier laminate having a two-layer laminate structure was prepared and evaluated.

In addition to these, a gas barrier laminate having a three-layer laminate structure was also prepared and evaluated as follows.

Example 2'

(1) Preparation of Gas Barrier Coating Material

A gas barrier coating material was first prepared in the same manner as in Example 2.

(2) Preparation of Gas Barrier Laminate

A gas barrier laminate was prepared in the same manner as in (2) of Example 1, except that the above gas barrier coating material was used as a gas barrier coating material.

(3) Preparation of Gas Barrier Laminate Having Three-Layer Laminate Structure

First, a laminate obtained by applying an adhesive onto a corona discharge-treated surface of an unstretched polypropylene film (trade name: RXC-22, manufactured by Mitsui Chemicals Tohcello, Inc.) having a thickness of 60 μm, and laminating a nylon film (trade name: Emblem ONBC, manufactured by Unitika Ltd.) having a thickness of 15 μm was prepared.

An adhesive was applied onto the nylon film surface of the laminate, and the gas barrier surface of the gas barrier laminate obtained in (2) above was laminated to prepare a gas barrier laminate having a three-layer laminate structure. The adhesive used is the same as that in (4) of Example 1.

(4) Evaluation of Gas Barrier Properties after Retort Treatment

The gas barrier laminate obtained in (3) was folded back so that the unstretched polypropylene film became the inner surface, and two sides were heat-sealed to form a bag shape. Then, 70 cc of water was added thereto as a content, and the other side was heat-sealed to prepare a bag. The bag was subjected to a retort treatment at 130° C. for 30 minutes using a high temperature and high pressure retort sterilization device. After the retort treatment, water as the content was drained, and a film after the retort treatment (water filling) was obtained by removing the sealing portion.

The oxygen permeability [mL/($m^2$·day·MPa)] of the retort-treated film obtained by the above-described method was measured under conditions of 20° C. and 90% RH in accordance with JIS K 7126 using OX-TRAN 2/21 manufactured by MOCON, Inc.

In addition, the retort-treated film obtained by the above method was overlapped so that the unstretched polypropylene film became the inner surface, the gas barrier laminate film was folded back, and two sides were heat-sealed to form a bag shape. Then, calcium chloride was added as the content, and the other side was heat sealed to prepare a bag having a surface area of 0.01 $m^2$. This bag was left to stand for 300 hours under conditions of 40° C. and 90% RH. The water vapor permeability [g/($m^2$·day)] was measured based on a change in weight before and after the standing.

The evaluation results of the gas barrier properties after the retort treatment are shown in Table 16.

Example 5'

A gas barrier laminate was prepared in the same manner as in Example 2', except that the gas barrier coating material prepared in Example 5 was used as a gas barrier coating material. Then, the gas barrier properties after the retort treatment were evaluated in the same manner as in Example 2'. The evaluation results are shown in Table 16.

Example 6'

A gas barrier laminate was prepared in the same manner as in Example 2', except that the gas barrier coating material prepared in Example 6 was used as a gas barrier coating material. Then, the gas barrier properties after the retort treatment were evaluated in the same manner as in Example 2'. The evaluation results are shown in Table 16.

TABLE 16

| | Gas barrier laminate Three-layer laminate structure | |
|---|---|---|
| | Oxygen permeability after retorting [ml/($m^2$ · day · MPa)] | Water vapor permeability after retorting [g/($m^2$ · day)] |
| Example 2' | 0.7 | 1.3 |
| Example 5' | 1.0 | 1.5 |
| Example 6' | 0.8 | 1.5 |

As shown in Table 16, even in a case where the layer configuration was different from the layer configurations of Examples 1 to 8, the gas barrier properties after retorting were good.

Examples of Third Embodiment

Example 1

(1) Preparation of Gas Barrier Coating Material

A polyacrylic acid (PPA) aqueous solution (trade name: AC-10H, manufactured by Toagosei Co., Ltd., weight average molecular weight: 800,000) was diluted with purified water to prepare an aqueous solution having a PPA concentration of 10%. To this aqueous solution, a 10% ammonia solution was added so that the amount of ammonia was 1.5 mol with respect to 1 mol of the carboxyl groups in PPA, and thus an ammonium polyacrylate aqueous solution having a PPA concentration of 7.38% was obtained.

Next, zinc oxide (ZnO) (manufactured by Kanto Chemical Co., Inc.) and ammonium carbonate (manufactured by Kanto Chemical Co., Inc.) were added to the obtained ammonium polyacrylate aqueous solution, and the mixture was stirred and mixed to obtain a mixed solution. Here, the addition amount of zinc oxide was set to an amount such that the molar ratio of (zinc oxide)/(carboxyl group of polyacrylic acid) was 0.3. In addition, the amount of ammonium carbonate was set to an amount such that the molar ratio of ammonium carbonate to the carboxyl groups of the polyacrylic acid was 0.3.

Further, purified water was added to the mixed solution so that the solid content concentration of PPA+ZnO was 2%, and the mixture was stirred until a uniform solution was obtained. Further, an ammonium hydrogen phosphate aqueous solution having a solid component concentration of 2% was added and stirred so that the amount of ammonium hydrogen phosphate ($(NH_4)_2HPO_4$) (manufactured by Kanto Chemical Co., Inc.) was 0.01 mol with respect to 1 mol of the carboxyl groups in PPA. Further, then, an activator aqueous solution having a solid content concentration of 1% was mixed so that the amount of the activator (trade name: EMULGEN 120, manufactured by Kao Corporation) was 0.3% by mass with respect to the solid contents of PPA+ZnO, and thus a gas barrier coating material was prepared.

(2) Preparation of Gas Barrier Laminate

As the inorganic material layer, a transparent vapor deposition film (model number: TL-PET-H, manufactured by Mitsui Chemicals Tohcello, Inc.) in which aluminum oxide was vapor-deposited on a 12 μm PET film of the base material layer was prepared. This film was attached to a glass plate with the inorganic vapor deposition layer facing upward, and the gas barrier coating material was applied with an applicator so that the film thickness after drying was 0.2 μm. Then, the glass plate was dried in a hot air dryer at 120° C. for 5 minutes. Both ends of the dried film were fixed to bring the film into a hollow state, and then the film was heat-treated in a hot air dryer under the conditions of 150° C. for 1 minute. As described above, a gas barrier layer was formed on the transparent vapor deposition film to prepare a gas barrier laminate.

The preparation conditions are collectively shown in Table 17.

(3) Analysis of Gas Barrier Layer

In addition, the gas barrier layer of the gas barrier laminate obtained in (2) above was subjected to XPS analysis and TOF-SIMS analysis.

XPS Analysis Conditions

- Analyzing device: AXIS-NOVA manufactured by KRATOS Analytical Limited
- X-ray source: monochromatized Al-Kα
- X-ray source output: 15 kV, 10 mA
- Analysis region: 300×700 μm
- During analysis: neutralization gun for charge correction used
- Sample size: 1×1 cm The results of the XPS analysis are shown in Table 18.

TOF-SIMS Analysis Conditions

Pre-measurement treatment: surface etching with Ar-GCIB

- GCIB: 5 kV, 5 μA
- GCIB treatment time: time point at which the spectrum pattern of TOF-SIMS no longer changes.
- Analyzing device: PHI nano-TOF II manufactured by ULVAC-PHI, Inc.
- Primary ion: $Bi_3^{2+}$
- Primary ion source output: 30 kV, 0.5 μA
- Analysis region: 300×300 μm (scanning region of primary ion beam)

During the analysis, charge neutralization was performed by irradiation with low energy electron beams and low energy Ar ions attached to the device.

The results of analyzing the data obtained by the TOF-SIMS analysis based on the above-described method are shown in Table 19. In Table 19, the relative mass peak intensity normalized by the intensity of $C_3H_3O_2^-$ is a value obtained by dividing the mass peak intensity of each fragment by the intensity $I(C_3H_3O_2^-)$ of $C_3H_3O_2^-$.

(4) Preparation of Gas Barrier Laminate with Two-Layer Laminate Structure

An adhesive was applied to a corona discharge-treated surface of an unstretched polypropylene film (trade name: RXC-22, manufactured by Mitsui Chemicals Tohcello, Inc.) having a thickness of 70 μm, and the gas barrier surface of the gas barrier laminate obtained in the above (2) was laminated to prepare a gas barrier laminate having a two-layer laminate structure. As the adhesive, a mixture obtained by blending 9 parts by mass of TAKELAC A5252S, trade name, manufactured by Mitsui Chemicals, Inc., 1 part by mass of an isocyanate-based curing agent (TAKENATE A50, trade name, manufactured by Mitsui Chemicals, Inc.), and 7.5 parts by mass of ethyl acetate was used.

(5) Preparation of Gas Barrier Laminate Having Three-Layer Laminate Structure

First, an adhesive was applied to a corona discharge-treated surface of an unstretched polypropylene film (trade name: RXC-22, manufactured by Mitsui Chemicals Tohcello, Inc.) having a thickness of 60 μm, and a nylon film (trade name: EMBLEM ONBC, manufactured by Unitika Ltd.) having a thickness of 15 μm was laminated to prepare a laminate.

An adhesive was applied onto the nylon film surface of the laminate, and the gas barrier surface of the gas barrier laminate obtained in (2) above was laminated to prepare a gas barrier laminate having a three-layer laminate structure. The adhesive used is the same as that in (4) above.

(6) Evaluation of Gas Barrier Properties after Retort Treatment

The gas barrier laminate obtained in (4) and (5) was folded back so that the unstretched polypropylene film became the inner surface, and two sides were heat-sealed to form a bag shape. Then, 70 cc of water was added thereto as a content, and the other side was heat-sealed to prepare a bag. This bag was treated with a high temperature and high pressure retort sterilization device at 130° C. for 30 minutes. After the retort treatment, water as the content was drained, and a film after the retort treatment (water filling) was obtained by removing the sealing portion.

The oxygen permeability [mL/($m^2$·day·MPa)] of the retort-treated film obtained by the above-described method was measured under conditions of 20° C. and 90% RH in accordance with JIS K 7126 using OX-TRAN 2/21 manufactured by MOCON, Inc.

In addition, the retort-treated film obtained by the above method was overlapped so that the unstretched polypropylene film became the inner surface, the gas barrier laminate film was folded back, and two sides were heat-sealed to form a bag shape. Then, calcium chloride was added as the content, and the other side was heat sealed to prepare a bag having a surface area of 0.01 $m^2$. Then, the mixture was left to stand under the conditions of 40° C. and 90% RH for 300 hours. The water vapor permeability [g/($m^2$·day)] was measured based on a change in weight before and after the standing.

The evaluation results of the gas barrier properties after the retort treatment are shown in Table 20.

Example 2

A gas barrier laminate was prepared in the same manner as in Example 1, except that the amount of ammonium hydrogen phosphate ($(NH_4)_2HPO_4$) was set to 0.03 mol with respect to 1 mol of the carboxyl groups of the polyacrylic acid. The preparation conditions are shown in Table 17. In addition, the gas barrier layer of the obtained gas barrier laminate was subjected to XPS analysis and TOF-SIMS analysis. The results of the XPS analysis and the TOF-SIMS analysis are shown in Tables 18 and 19. In addition, the evaluation results of the gas barrier properties after the retort treatment are shown in Table 20.

Example 3

A gas barrier laminate was prepared in the same manner as in Example 1, except that the amount of ammonium hydrogen phosphate ($(NH_4)_2HPO_4$) was set to 0.05 mol with respect to 1 mol of the carboxyl groups of the polyacrylic acid. The preparation conditions are shown in Table 17. In addition, the gas barrier layer of the obtained gas barrier laminate was subjected to XPS analysis and TOF-SIMS analysis. The results of the XPS analysis and the TOF-SIMS analysis are shown in Tables 18 and 19. In addition, the evaluation results of the gas barrier properties after the retort treatment are shown in Table 20.

COMPARATIVE EXAMPLE

A gas barrier laminate was prepared in the same manner as in Example 1, except that ammonium phosphate was not added. The preparation conditions are shown in table 17. In addition, the gas barrier layer of the obtained gas barrier laminate was subjected to XPS analysis and TOF-SIMS analysis. The results of the XPS analysis and the TOF-SIMS analysis are shown in Tables 18 and 19. In addition, the evaluation results of the gas barrier properties after the retort treatment are shown in Table 20. However, after the retort treatment, partial delamination occurred in the gas barrier laminate.

TABLE 17

| | Base material layer + Inorganic material layer | Gas barrier layer | | | | | | | |
|---|---|---|---|---|---|---|---|---|---|
| | | | Phosphorus compound/PPA | | Drying | | Heat treatment | | |
| | | ZnO/PPA | Type | Addition amount | Temperature (° C.) | Time (min) | Temperature (° C.) | Time (min) | Thickness μm |
| Example 1 | TL-PET-H | 0.3 | Phosphoric acid | 0.01 | 120 | 5 | 150 | 1 | 0.2 |
| Example 2 | TL-PET-H | 0.3 | Phosphoric acid | 0.03 | 120 | 5 | 150 | 1 | 0.2 |
| Example 3 | TL-PET-H | 0.3 | Phosphoric acid | 0.05 | 120 | 5 | 150 | 1 | 0.2 |
| Comparative Example | TL-PET-H | 0.3 | — | — | 120 | 5 | 150 | 1 | 0.2 |

TABLE 18

| | XPS measurement result (atomic %) | | | |
|---|---|---|---|---|
| | C | O | Zn | P |
| Example 1 | 62.0 | 32.9 | 5.0 | 0.1 |
| Example 2 | 61.2 | 33.5 | 4.9 | 0.4 |

TABLE 18-continued

| | XPS measurement result (atomic %) | | | |
|---|---|---|---|---|
| | C | O | Zn | P |
| Example 3 | 60.2 | 34.3 | 4.8 | 0.7 |
| Comparative Example | 62.4 | 32.5 | 5.1 | 0 |

TABLE 19

| | Total Ion Counts | | | | | | | | | | | |
|---|---|---|---|---|---|---|---|---|---|---|---|---|
| | Positive secondary ion | Negative secondary ion | Mass peak intensity | | | | Relative mass peak intensity normalized by intensity of $C_3H_3O_2^-$ | | | | | |
| | | | $C_3H_3O_2^-$ | $PO_2^-$ | $PO_3^-$ | $^{64}ZnPO_4H^-$ | $C_3H_3O_2^-$ | $PO_2^-$ | $PO_3^-$ | $PO_2^-$ + $PO_3^-$ | $PO_2^-/PO_3^-$ | $^{64}ZnPO_4H^-$ |
| Example 1 | 6049843 | 7508849 | $3.3 \times 10^{-2}$ | $4.5 \times 10^{-3}$ | $1.8 \times 10^{-2}$ | $1.8 \times 10^{-4}$ | 1.0 | $1.4 \times 10^{-1}$ | $5.5 \times 10^{-1}$ | $6.9 \times 10^{-1}$ | $2.5 \times 10^{-1}$ | $5.5 \times 10^{-3}$ |
| Example 2 | 6201607 | 7428275 | $3.5 \times 10^{-2}$ | $1.2 \times 10^{-2}$ | $5.2 \times 10^{-2}$ | $4.2 \times 10^{-4}$ | 1.0 | $3.5 \times 10^{-1}$ | 1.5 | 1.8 | $2.3 \times 10^{-1}$ | $1.2 \times 10^{-2}$ |
| Example 3 | 6049843 | 7585995 | $3.4 \times 10^{-2}$ | $1.5 \times 10^{-2}$ | $6.2 \times 10^{-2}$ | $7.9 \times 10^{-4}$ | 1.0 | $4.4 \times 10^{-1}$ | 1.8 | 2.2 | $2.4 \times 10^{-1}$ | $2.4 \times 10^{-2}$ |
| Comparative Example | 5922165 | 6845306 | $3.8 \times 10^{-2}$ | 0 | 0 | 0 | 1.0 | 0 | 0 | 0 | — | 0 |

TABLE 20

| | Gas barrier laminate | | | |
|---|---|---|---|---|
| | Two-layer laminate structure | | Three-layer laminate structure | |
| | Oxygen permeability after retorting [mL/(m² · day · MPa) | Water vapor permeability after retorting [g/(m² · day)] | Oxygen permeability after retorting [mL/(m² · day · MPa)] | Water vapor permeability after retorting [g/(m² · day)]] |
| Example 1 | 2.2 | 1.4 | 1.8 | 3.3 |
| Example 2 | 1.6 | 0.7 | 1.9 | 2.4 |
| Example 3 | 1.7 | 1.7 | 3.4 | 2.9 |
| Comparative Example | 133.9 | 5.1 | 72.1 | 5.7 |

As described above, the gas barrier properties of the gas barrier laminate after the retort treatment of Comparative Example in which the phosphorus compound was not contained and the mass peak of the $^{64}ZnPO_4H^-$ fragment was not detected were lower than those of Examples 1 to 3. In addition, partial delamination occurred.

Examples of Fourth Embodiment

Example 1

(1) Preparation of Gas Barrier Coating Material

An ammonium polyacrylate aqueous solution having a concentration of 7.29% by mass was obtained by adding ammonia of a 10% ammonia solution (manufactured by Wako Pure Chemical Industries, Ltd.) so as to be 150 equivalent % with respect to the carboxy groups of the polyacrylic acid (trade name: AC-10H, manufactured by Toagosei Co., Ltd., weight average molecular weight: 800,000), and further adding purified water thereto.

Next, zinc oxide (manufactured by Kanto Chemical Co., Inc.) and ammonium carbonate were added to the obtained ammonium polyacrylate aqueous solution, and the materials were mixed and stirred to prepare a mixed solution (A). Here, the addition amount of zinc oxide was set to an amount such that (number of moles of zinc oxide in the gas barrier coating material)/(number of moles of —COO— groups included in the polyacrylic acid in the gas barrier coating material) became the value shown in the column of ZnO/PAA in Table 1. In addition, the amount of ammonium carbonate was set to an amount such that (number of moles of carbonic acid-based ammonium salt in the gas barrier coating material)/(number of moles of zinc oxide in the gas barrier coating material) is 1.0.

Next, a 10% solution of a polyethylenimine aqueous solution was obtained by adding purified water to polyethylenimine (trade name: SP-200, manufactured by Nippon Shokubai Co., Ltd., number average molecular weight: 10,000).

In addition, purified water was added to diammonium hydrogen phosphate ($(NH_4)_2HPO_4$, manufactured by Kanto Chemical Co., Inc.) to prepare a 10% aqueous solution.

Next, the mixed solution (A), the polyethyleneimine aqueous solution, and the diammonium hydrogen phosphate solution were mixed at a ratio such that (number of moles of amino groups included in the polyethyleneimine in the gas barrier coating material)/(number of moles of —COO— groups included in the polyacrylic acid in the gas barrier coating material) was the value shown in the column of PEI/PPA in Table 1, and (number of moles of $((NH_4)_2HPO_4)$/(number of moles of —COO— groups included in the polyacrylic acid) was the value indicating the addition amount in the column of Acid compound/PAA in Table 1, and thus a mixed solution (B) was prepared.

Further, purified water was added such that the solid content concentration of the mixed solution (B) was 1.5% and stirred until the solution became uniform, an activator (trade name: EMULGEN 120, manufactured by Kao Corporation) was then mixed therein so as to be 0.3% by mass with respect to the solid content of the mixed solution (B), and thus a gas barrier coating material was prepared.

(2) Preparation of Gas Barrier Laminate

A biaxially stretched polyethylene terephthalate film (PET12, manufactured by Unitika Ltd.) having a thickness of 12 μm was used as a base material, and a resin composition having the following composition was applied onto one surface (corona-treated surface) of the base material with a Mayer bar and dried to form an undercoat (UC) layer having a thickness of 0.20 μm after drying.

(Composition)

- Main agent: polyurethane resin aqueous dispersion liquid (trade name: TAKELAC WS-4033, manufactured by Mitsui Chemicals, Inc., aromatic polyester type polyurethane resin)
- Crosslinking agent: compound having a carbodiimide group (trade name: CARBODILITE SV-02, manufactured by Nisshinbo Chemical Inc.)
- Blending ratio: The crosslinking agent was blended into the main agent so that the amount of the carbodiimide group in the crosslinking agent was 0.4 mol with respect to 1.0 mol of the carboxy groups in the polyurethane resin in the main agent.

Next, an alumina vapor deposition layer was formed on the undercoat layer by the following method.

Aluminum was heated and evaporated on the UC layer by a high frequency induction heating method, and while introducing oxygen, the aluminum was vapor-deposited to form an aluminum oxide film having a thickness of 7 nm. Due to this, an aluminum oxide vapor deposition PET film was obtained. The water vapor permeability of the aluminum oxide vapor deposition PET film was 1.5 g/(m$^2$·24 h).

Then, the gas barrier coating material obtained in the procedure (1) was applied onto the vapor deposition layer using a Mayer bar so that the coating amount after drying was 0.2 μm, and a heat treatment was performed using a hot air dryer under conditions shown in the column of Heat treatment in Table 1 to obtain a gas barrier laminate. The preparation conditions are listed in Table 21.

(3) Analysis of Gas Barrier Layer

In addition, the gas barrier layer of the gas barrier laminate obtained in the above procedure (2) was subjected to the infrared absorption spectrum analysis by an ATR method shown below.

Measurement of the infrared absorption spectrum (infrared total reflection measurement: ATR method) was carried out under conditions of an incident angle of 45 degrees, room temperature, a resolution of 4 cm$^{-1}$, and a cumulative number of 100 times by mounting a PKM-GE-S (Germanium) crystal and using an IRT-5200 apparatus manufactured by JASCO Corporation. The obtained absorption spectrum was analyzed by the method described above to obtain the maximum peaks α and γ, and the total peak areas A to D were calculated. Then, the area ratios B/A, C/A, and D/A were obtained from the total peak areas A to D.

The results of the infrared absorption spectrum analysis by the ATR method are shown in Table 22.

(4) Preparation of Two-Layer Laminate Structure

An adhesive was applied to a corona discharge-treated surface of an unstretched polypropylene film (trade name: RXC-22, manufactured by Mitsui Chemicals Tohcello, Inc.) having a thickness of 70 μm, and the gas barrier surface (a surface on the gas barrier layer side, the same applies hereinafter) of the gas barrier laminate obtained in the above procedure (2) was laminated to prepare a laminate structure having a two-layer laminate structure. As the adhesive, a mixture obtained by blending 9 parts by mass of TAKELAC A525S), trade name, manufactured by Mitsui Chemicals, Inc., 1 part by mass of an isocyanate-based curing agent (TAKENATE A50, trade name, manufactured by Mitsui Chemicals, Inc.), and 7.5 parts by mass of ethyl acetate was used.

(5) Preparation of Three-Layer Laminate Structure

First, a laminate obtained by applying an adhesive onto a corona discharge-treated surface of an unstretched polypropylene film (trade name: RXC-22, manufactured by Mitsui Chemicals Tohcello, Inc.) having a thickness of 60 μm, and laminating a nylon film (trade name: (Emblem ONBC, manufactured by Unitika Ltd.) having a thickness of 15 μm was prepared.

An adhesive was applied onto the nylon film surface of the laminate, and the gas barrier surface of the gas barrier laminate obtained in the above procedure (2) was laminated to prepare a laminate structure having a three-layer laminate structure. The adhesive used is the same as in the above procedure (4).

(6) Evaluation of Gas Barrier Properties after Retort Treatment

The laminate structures obtained in the procedure (4) and the procedure (5) were folded back such that the unstretched polypropylene film became the inner surface, two sides were heat-sealed to form a bag shape, 70 mL of water was put in as a content, the other side was heat-sealed to prepare a bag, and the bag was subjected to a retort treatment at 130° C. for 30 minutes in a high temperature and high pressure retort sterilization device. After the retort treatment, water as the content was drained, and a film after the retort treatment (water filling) was obtained by removing the sealing portion.

The oxygen permeability [ml/(m$^2$·day·MPa)] of the retort-treated film obtained by the above-described method was measured under conditions of 20° C. and 90% RH in accordance with JIS K 7126 using OX-TRAN 2/21 manufactured by MOCON, Inc.

In addition, the film after the retort treatment obtained by the above-described method was overlapped so that the unstretched polypropylene film became the inner surface, the laminate structure was folded back, and two sides were heat-sealed to form a bag shape. Then, calcium chloride was put in as a content, the other side was heat-sealed to prepare a bag such that the surface area was 0.01 m$^2$. The bag was left to stand under the conditions of 40° C. and 90% RH for 300 hours, and the water vapor permeability [g/(m$^2$·day)] was measured based on the change in weight before and after the standing.

The evaluation results of the gas barrier properties after the retort treatment are shown in Table 23.

Examples 2 to 8

For each example, each gas barrier laminate and each laminate structure were obtained in accordance with Example 1, except that the blending of the raw materials and the preparation conditions respectively were changed to the numerical values shown in Table 21.

The results of the analysis performed on the gas barrier layer of the obtained gas barrier laminate in accordance with Example 1 are shown in Table 22. In addition, the evaluation results of the gas barrier properties after the retort treatment are shown in Table 23.

Comparative Example 1

A gas barrier laminate and a three-layer laminate structure were obtained in accordance with Example 1, except that zinc oxide and ammonium carbonate were not used, and the diammonium hydrogen phosphate solution was not used.

The results of the analysis performed on the gas barrier layer of the obtained gas barrier laminate in accordance with Example 1 are shown in Table 22. In addition, the evaluation results of the gas barrier properties after the retort treatment are shown in Table 23.

Example 9

(1) Preparation of Gas Barrier Coating Material

An aqueous solution of polyacrylic acid (PAA) (trade name: AC-10H, manufactured by Toagosei Co., Ltd., weight average molecular weight: 800,000) was diluted with purified water to prepare an aqueous solution having a PAA concentration of 10%, a 10% ammonia solution was added thereto so that the concentration of ammonia was 1.5 mol with respect to the carboxy group, and thus an ammonium polyacrylate aqueous solution having a PAA concentration of 7.38% was obtained.

Next, zinc oxide (ZnO: manufactured by Kanto Chemical Co., Inc.) and ammonium carbonate (manufactured by Kanto Chemical Co., Inc.) were added to the obtained ammonium polyacrylate aqueous solution, and the mixture was stirred and mixed. Here, the addition amount of zinc oxide was set to an amount such that the molar ratio of (zinc oxide)/(carboxy group of PAA) was 0.3. In addition, the amount of ammonium carbonate was set to an amount such that the molar ratio of carbonate to the carboxy groups of PAA was 0.3. In this manner, a mixed solution (A) was prepared.

Next, purified water was added to polyethyleneimine (PEI: trade name: SP-200, manufactured by Nippon Shokubai Co., Ltd., number average molecular weight: 10,000) to obtain a polyethyleneimine aqueous solution having a PEI concentration of 10%.

Next, the mixed solution (A) and the polyethyleneimine aqueous solution were mixed at a ratio such that the molar ratio of (nitrogen of PEI)/(carboxy group of PAA) was 0.55, and thus a mixed solution (B) was prepared.

Further, purified water was added to the mixed solution (B) so that the solid content concentration of PAA+ZnO+PEI was 2%, and the mixture was stirred until a uniform solution was obtained. Further, a diammonium hydrogen phosphate aqueous solution having a solid content concentration of 2% was added and stirred so that the amount of diammonium hydrogen phosphate ($(NH_4)_2HPO_4$, manufactured by Kanto Chemical Co., Inc.) was $1\times10^{-3}$ mol with respect to 1 mol of carboxy groups in PPA, an activator aqueous solution having a solid content concentration of 1% was then mixed so that the amount of the activator (trade name: Emulgen 120, manufactured by Kao Corporation) was 0.3% by mass with respect to the solid contents of PPA+ZnO+PEI, and thus a gas barrier coating material was prepared.

(2) Preparation of Gas Barrier Laminate

A transparent vapor deposition film (model number: TL-PET-H, manufactured by Mitsui Chemicals Tohcello, Inc.) in which aluminum oxide was vapor-deposited as an inorganic material layer on a 12 μm PET film of a base material layer was attached to a glass plate, the gas barrier coating material obtained in the above procedure (1) was applied with an applicator so that the film thickness after drying was 0.2 μm, and the entire glass plate was dried with a hot air dryer at 120° C. for 5 minutes. Both ends of the dried film were fixed to bring the film into a hollow state, and then the film was heat-treated with a hot air dryer under the conditions of 150° C. for 1 minute to form a gas barrier layer on the transparent vapor deposition film, thereby preparing a gas barrier laminate.

The preparation conditions for the gas barrier layer are shown in Table 21.

(3) Analysis of Gas Barrier Layer

The gas barrier layer of the gas barrier laminate obtained in the procedure (2) was subjected to the same analysis as in the procedure (3) of Example 1. The results of the analysis are shown in Table 22.

(4) Preparation of Gas Barrier Laminate with Two-Layer Laminate Structure

A two-layer laminate structure was prepared in the same manner as in the above procedure (4) of Example 1 using the gas barrier layer of the gas barrier laminate obtained in the above procedure (2).

(5) Preparation of Gas Barrier Laminate Having Three-Layer Laminate Structure

A three-layer laminate structure was prepared in the same manner as in the procedure (5) of Example 1 using the gas barrier layer of the gas barrier laminate obtained in the above procedure (2).

(6) Evaluation of Gas Barrier Properties after Retort Treatment

The gas barrier properties after the retort treatment were evaluated for the laminate structures obtained in the above procedure (4) and the above procedure (5) in the same manner as in the above procedure (6) of Example 1. The results are shown in Table 23.

Example 10

A gas barrier laminate and each laminate structure were prepared in accordance with Example 9, except that the concentration of the diammonium hydrogen phosphate was set to 0.01 mol with respect to 1 mol of the carboxy groups of the polyacrylic acid. The preparation conditions are also shown in Table 21.

The results of the analysis performed on the gas barrier layer of the obtained gas barrier laminate in accordance with Example 9 are shown in Table 22. In addition, the evaluation results of the gas barrier properties after the retort treatment are shown in Table 23.

Example 11

A gas barrier laminate and each laminate structure were prepared in accordance with Example 9, except that the concentration of the diammonium hydrogen phosphate was set to 0.03 mol with respect to 1 mol of the carboxy groups of the polyacrylic acid. The preparation conditions are also shown in Table 21.

The results of the analysis performed on the gas barrier layer of the obtained gas barrier laminate in accordance with Example 9 are also shown in Table 22. In addition, the evaluation results of the gas barrier properties after the retort treatment are shown in Table 23.

TABLE 21

| Gas barrier laminate | Base material layer + Inorganic material layer | Gas barrier layer PEI/PPA | ZnO/PPA | ZnO/PEI | Acid compound/PPA Type | Addition amount | Drying Temperature (° C.) | Time (min) | Heat treatment Temperature (° C.) | Time (sec) | Thickness µm |
|---|---|---|---|---|---|---|---|---|---|---|---|
| Example 1 | UC-PET + aluminum oxide | 0.55 | 0.2 | 0.36 | Phosphoric acid | 0.03 | — | — | 210 | 6.5 | 0.2 |
| Example 2 | UC-PET + aluminum oxide | 0.55 | 0.2 | 0.36 | Phosphoric acid | 0.03 | — | — | 130 | 6.5 | 0.2 |
| Example 3 | UC-PET + aluminum oxide | 0.55 | 0.225 | 0.41 | Phosphoric acid | 0.03 | — | — | 130 | 6.5 | 0.2 |
| Example 4 | UC-PET + aluminum oxide | 0.55 | 0.175 | 0.32 | Phosphoric acid | 0.03 | — | — | 130 | 6.5 | 0.2 |
| Example 5 | UC-PET + aluminum oxide | 0.55 | 0.25 | 0.45 | Phosphoric acid | 0.01 | — | — | 130 | 6.5 | 0.2 |
| Example 6 | UC-PET + aluminum oxide | 0.55 | 0.225 | 0.41 | Phosphoric acid | 0.01 | — | — | 130 | 6.5 | 0.2 |
| Example 7 | UC-PET + aluminum oxide | 0.55 | 0.225 | 0.41 | Phosphoric acid | 0.03 | — | — | 140 | 6.5 | 0.2 |
| Example 8 | UC-PET + aluminum oxide | 0.55 | 0.225 | 0.41 | Phosphoric acid | 0.03 | — | — | 150 | 6.5 | 0.2 |
| Comparative Example 1 | UC-PET + aluminum oxide | 0.55 | 0 | 0.00 | — | 0 | — | — | 210 | 6.5 | 0.2 |
| Example 9 | TL-PET-H | 0.55 | 0.3 | 0.55 | Phosphoric acid | 0.001 | 120 | 5 | 150 | 60 | 0.2 |
| Example 10 | TL-PET-H | 0.55 | 0.3 | 0.55 | Phosphoric acid | 0.01 | 120 | 5 | 150 | 60 | 0.2 |
| Example 11 | TL-PET-H | 0.55 | 0.3 | 0.55 | Phosphoric acid | 0.03 | 120 | 5 | 150 | 60 | 0.2 |

TABLE 22

| Gas barrier laminate | Infrared absorption spectrum analysis result by ATR method: IR peak area ratio C/A | B/A | D/A | IR peak height α | γ | γ/α |
|---|---|---|---|---|---|---|
| Example 1 | 0.07 | 0.32 | 0.62 | 0.045 | 0.014 | 0.32 |
| Example 2 | 0.00 | 0.26 | 0.74 | 0.070 | 0.001 | 0.01 |
| Example 3 | 0.00 | 0.24 | 0.76 | 0.060 | 0.000 | 0.00 |
| Example 4 | 0.00 | 0.24 | 0.76 | 0.045 | 0.000 | 0.00 |
| Example 5 | 0.01 | 0.24 | 0.75 | 0.086 | 0.005 | 0.06 |
| Example 6 | 0.01 | 0.24 | 0.75 | 0.072 | 0.007 | 0.10 |
| Example 7 | 0.00 | 0.24 | 0.76 | 0.068 | 0.003 | 0.04 |

TABLE 22-continued

| Gas barrier laminate | Infrared absorption spectrum analysis result by ATR method: IR peak area ratio C/A | B/A | D/A | IR peak height α | γ | γ/α |
|---|---|---|---|---|---|---|
| Example 8 | 0.01 | 0.27 | 0.72 | 0.065 | 0.002 | 0.03 |
| Comparative Example 1 | 0.35 | 0.31 | 0.34 | 0.023 | 0.024 | 1.07 |
| Example 9 | 0.00 | 0.33 | 0.67 | 0.128 | 0.030 | 0.23 |
| Example 10 | 0.00 | 0.33 | 0.67 | 0.136 | 0.032 | 0.23 |
| Example 11 | 0.06 | 0.32 | 0.62 | 0.175 | 0.056 | 0.32 |

TABLE 23

| | Gas barrier laminate: Two-layer laminate structure: Oxygen permeability after retorting [ml/(m$^2$ · day · MPa)] | Two-layer laminate structure: Water vapor permeability after retorting [g/(m$^2$ · day)] | Three-layer laminate structure: Oxygen permeability after retorting [ml/(m$^2$ · day · MPa)] | Three-layer laminate structure: Water vapor permeability after retorting [g/(m$^2$ · day)] |
|---|---|---|---|---|
| Example 1 | 0.3 | 0.8 | 0.9 | 0.8 |
| Example 2 | 1.8 | 2 | 0.8 | 1.7 |
| Example 3 | 1 | 1.8 | 1.1 | 1.5 |
| Example 4 | 2.7 | 2 | 1.6 | 1.5 |
| Example 5 | 1.6 | 1.5 | 0.7 | 1.4 |
| Example 6 | 1.7 | 1.6 | 0.8 | 1.2 |
| Example 7 | 1.8 | 1.9 | 1.2 | 1.4 |
| Example 8 | 1.7 | 1.8 | 0.9 | 1.4 |
| Comparative Example 1 | — | — | 42 | 5.7 |
| Example 9 | 0.8 | 2.1 | 0.8 | 1.1 |
| Example 10 | 0.8 | 0.6 | 0.7 | 1.3 |
| Example 11 | 0.8 | 1.7 | 0.9 | 1.8 |

From Tables 21 to 23, in each Example, in a case of using both the two-layer laminate and the three-layer laminate, a laminate having excellent barrier properties after a retort treatment could be obtained with good productivity.

Examples of Fifth Embodiment

Example 1

(1) Preparation of Gas Barrier Coating Material

An ammonium polyacrylate aqueous solution having a concentration of 7.29% by mass was obtained by adding ammonia of a 10% ammonia solution (manufactured by Wako Pure Chemical Industries, Ltd.) so as to be 150 equivalent % with respect to the carboxy groups of the polyacrylic acid (trade name: AC-10H, manufactured by Toagosei Co., Ltd., weight average molecular weight: 800, 000), and further adding purified water thereto.

Next, zinc oxide (manufactured by Kanto Chemical Co., Inc.) and ammonium carbonate were added to the obtained ammonium polyacrylate aqueous solution, and the materials were mixed and stirred to prepare a mixed solution (A). Here, the addition amount of zinc oxide was set to an amount such that (number of moles of zinc oxide in the gas barrier coating material)/(number of moles of —COO— groups included in the polyacrylic acid in the gas barrier coating material) became the value shown Table 1. In addition, the amount of ammonium carbonate was set to an amount such that (number of moles of carbonic acid-based ammonium salt in the gas barrier coating material)/(number of moles of zinc oxide in the gas barrier coating material) is 1.0.

Next, a 10% solution of a polyethylenimine aqueous solution was obtained by adding purified water to polyethylenimine (trade name: SP-200, manufactured by Nippon Shokubai Co., Ltd., number average molecular weight: 10,000).

Next, the mixed solution (A) and the polyethylenimine aqueous solution were mixed at a ratio such that (number of moles of amino groups included in the polyethyleneimine in the gas barrier coating material)/(number of moles of —COO— groups included in the polyacrylic acid in the gas barrier coating material) was the value shown in Table 1, and thus a mixed solution (B) was prepared.

Further, purified water was added such that the solid content concentration of the mixed solution (B) was 1.5% and stirred until the solution became uniform, an activator (trade name: EMULGEN 120, manufactured by Kao Corporation) was then mixed therein so as to be 0.3% by mass with respect to the solid content of the mixed solution (B), and thus a gas barrier coating material was prepared.

(2) Preparation of Gas Barrier Laminate Film

A biaxially stretched polyethylene terephthalate film (PET 12 manufactured by Unitika Ltd.) having a thickness of 12 μm was set as a base material and an aluminum oxide film having a thickness of 7 nm was formed by heating and evaporating aluminum using a high frequency induction heating method on the corona-treated surface thereof, and performing vapor deposition while introducing oxygen. Due to this, an aluminum oxide vapor deposition PET film was obtained. The water vapor permeability of the aluminum oxide vapor deposition PET film was 1.5 g/($m^2$·24 h).

Next, the gas barrier coating material was applied to the vapor deposition layer with a Mayer bar so that the coating amount after drying was 0.3 μm, and a heat treatment was performed using a hot air dryer at 130° C. for about 6.5 seconds to obtain a gas barrier laminate film.

The obtained gas barrier laminate film was evaluated as follows. The results are shown in Table 24.

Example 2

A gas barrier laminate film was obtained in accordance with Example 1, except that (number of moles of zinc oxide in the gas barrier coating material)/(number of moles of —COO— groups included in the polyacrylic acid in the gas barrier coating material) and (number of moles of amino groups included in the polyethyleneimine in the gas barrier coating material)/(number of moles of —COO— groups included in the polyacrylic acid in the gas barrier coating material) were respectively changed to the values shown in Table 1, and the drying temperature in the hot air dryer was set to the temperature shown in Table 1.

The obtained gas barrier laminate film was evaluated as follows. The results are shown in Table 24.

Comparative Example 1

A gas barrier laminate film was obtained in accordance with Example 1, except that zinc oxide and ammonium carbonate were not used.

The obtained gas barrier laminate film was evaluated as follows. The results are shown in Table 24.

Example 3

(1) Preparation of Gas Barrier Coating Material

A gas barrier laminate film was obtained in accordance with Example 1, except that (number of moles of zinc oxide in the gas barrier coating material)/(number of moles of —COO— groups included in the polyacrylic acid in the gas barrier coating material) and (number of moles of amino groups included in the polyethyleneimine in the gas barrier coating material)/(under of moles of —COO— groups included in the polyacrylic acid in the gas barrier coating material) were respectively changed to the values shown in Table 1.

(2) Preparation of Gas Barrier Laminate Film

A biaxially stretched polyethylene terephthalate film (manufactured by Unitika Ltd., PET12) having a thickness of 12 μm was used as a base material, and a resin composition having the following composition was applied to one surface of the base material with a Mayer bar and dried to form an undercoat (UC) layer having a thickness of 0.20 μm after drying.

(Composition)

Main agent: polyurethane resin aqueous dispersion liquid (trade name: TAKELAC WS-4033, manufactured by Mitsui Chemicals, Inc., aromatic polyester type polyurethane resin)

Crosslinking agent: compound having a carbodiimide group (trade name: CARBODILITE SV-02, manufactured by Nisshinbo Chemical Inc.)

Blending ratio: The crosslinking agent was blended into the main agent so that the amount of the carbodiimide group in the crosslinking agent was 0.4 mol with respect to 1.0 mol of the carboxy groups in the polyurethane resin in the main agent.

Next, aluminum was heated and evaporated on the UC layer by a high frequency induction heating method, and while introducing oxygen, the aluminum was vapor-deposited to form an aluminum oxide film having a thickness of 7 nm. Due to this, an aluminum oxide vapor deposition PET film was obtained. The water vapor permeability of the aluminum oxide vapor deposition PET film was 1.5 g/($m^2$·24 h).

Then, the gas barrier coating material was applied onto the vapor deposition layer with a Mayer bar so that the coating amount after drying was 0.3 μm, and a heat treatment was performed using a hot air dryer at 210° C. for about 6.5 seconds to obtain a gas barrier laminate film.

The obtained gas barrier laminate film was evaluated as follows. The results are shown in Table 24.

Examples 4 to 11

A gas barrier laminate film was obtained in accordance with Example 3, except that (number of moles of zinc oxide in the gas barrier coating material)/(number of moles of —COO— groups included in the polyacrylic acid in the gas barrier coating material) and (number of moles of amino groups included in the polyethyleneimine in the gas barrier coating material)/(number of moles of —COO— groups included in the polyacrylic acid in the gas barrier coating material) were respectively changed to the values shown in Table 1, and the drying temperature in the hot air dryer was set to the temperature shown in Table 1.

The obtained gas barrier laminate films were evaluated as follows, and the results are shown in Table 24.

Comparative Example 2

A gas barrier laminate film was obtained in accordance with Example 3, except that zinc oxide and ammonium carbonate were not used.

The obtained gas barrier laminate film was evaluated as follows. The results are shown in Table 24.

(Evaluation Method)

(1) An ester-based adhesive (9 parts by mass a polyurethane-based adhesive (trade name: TAKELAC A 525S, manufactured by Mitsui Chemicals, Inc.), 1 part by mass of an isocyanate-based curing agent (trade name: TAKENATE A50, manufactured by Mitsui Chemicals, Inc.), and 7.5 parts by mass of ethyl acetate) were applied to both surfaces of a nylon film (trade name: EMBLEM ONBC, manufactured by Unitika Ltd.) having a thickness of 15 μm. Next, the barrier surface of each of the gas barrier laminate films (the surface to which the gas barrier coating material was applied) obtained in the Examples and Comparative Examples, and an unstretched polypropylene film (trade name: RXC-22, manufactured by Mitsui Chemicals, Tohcello Inc.) having a thickness of 60 μm were attached to each of both surfaces of the nylon film, to which the adhesive was applied, to obtain a film before a retort treatment.

(2) Retort Treatment (Water Filling)

The film before a retort treatment obtained in (1) above was folded back such that the unstretched polypropylene film became the inner surface and two sides were heat sealed to form a bag shape. Then, 70 mL of water was added thereto as a content and the other side was heat sealed to prepare a bag. This bag was subjected to a retort treatment under conditions of a temperature of 130° C. and a time of 30 minutes in a high temperature and high pressure retort sterilizer. After the retort treatment, the water content was drained to obtain a film after the retort treatment (water filling).

(3) Oxygen Permeability [mL/($m^2$·day·MPa)]

The oxygen permeability of the film before the retort treatment and the film after the retort treatment (water filling) obtained by the above-described method was measured under conditions of a temperature of 20° C. and a humidity of 90% RH in accordance with JIS K 7126 using OX-TRAN 2/21 manufactured by MOCON Inc.

A case where the oxygen permeability before or after retorting was 6.0 mL/($m^2$·day·MPa) or less was determined as pass.

(4) Water Vapor Permeability [g/($m^2$·day)]

The film before retort treatment and the film after retort treatment (water filling) obtained by the above-described method were overlapped so that the unstretched polypropylene film became the inner surface, the gas barrier laminate film was folded back, and three sides were heat-sealed to form a bag shape. Then, calcium chloride was put in as a content, the other side was heat-sealed to prepare a bag having a surface area of 0.01 $m^2$. The bag was left to stand at 40° C. and 90% RH for 300 hours, and the water vapor permeability was measured by the difference in weight.

A case where the water vapor permeability before or after retorting was 5.5 g/($m^2$·day) or less was determined as pass.

(5) Maximum Peak of IR and Area Ratio

The gas barrier layer of the gas barrier laminate film obtained in each example was subjected to infrared absorption spectral analysis by the ATR method.

That is, measurement of the infrared absorption spectrum (infrared total reflection measurement: ATR method) was carried out under conditions of an incident angle of 45 degrees, room temperature, a resolution of 4 $cm^{-1}$, and a cumulative number of 100 times by mounting a PKM-GE-S (Germanium) crystal and using an IRT-5200 apparatus manufactured by JASCO Corporation. The obtained absorption spectrum was analyzed by the method described above to obtain the maximum peaks α and γ, and the total peak areas A to D were calculated. Then, the area ratios B/A, C/A, and D/A were obtained from the total peak areas A to D.

TABLE 24

| | Base material layer/Undercoat layer/Inorganic material layer | Gas barrier layer: Processing temperature | Coat formulation: (Number of moles of amino groups included in polyamine/Number of moles of —COO— groups included in polycarboxylic acid) | Coat formulation: (Number of moles of zinc oxide/Number of moles of —COO— groups included in polycarboxylic acid) | Coat formulation: (Number of moles of zinc oxide/Number of moles of amino groups derived from polyamine compound) | Coat film IR area ratio [-]: (C/A) (carbonic acid) | Coat film IR area ratio [-]: (B/A) (amide) | Coat film IR area ratio [-]: (D/A) (carbonate) |
|---|---|---|---|---|---|---|---|---|
| Example 1 | PET/-/alumina deposition | 130° C. | 0.55 | 0.300 | 0.55 | 0.00 | 0.29 | 0.71 |
| Comparative Example 1 | PET/-/alumina deposition | 130° C. | 0.55 | 0.000 | 0.00 | 0.00 | 0.29 | 0.71 |
| Example 3 | PET/UC/alumina deposition | 210° C. | 0.55 | 0.300 | 0.55 | 0.00 | 0.32 | 0.68 |
| Example 4 | PET/UC/alumina deposition | 210° C. | 0.55 | 0.200 | 0.36 | 0.09 | 0.32 | 0.59 |
| Example 5 | PET/UC/alumina deposition | 210° C. | 0.55 | 0.400 | 0.73 | 0.00 | 0.32 | 0.68 |
| Example 6 | PET/UC/alumina deposition | 210° C. | 0.45 | 0.300 | 0.67 | 0.01 | 0.32 | 0.67 |
| Example 7 | PET/UC/alumina deposition | 210° C. | 0.65 | 0.300 | 0.46 | 0.00 | 0.33 | 0.66 |
| Comparative Example 2 | PET/UC/alumina deposition | 210° C. | 0.55 | 0.000 | 0.00 | 0.35 | 0.31 | 0.34 |
| Example 2 | PET/-/alumina deposition | 130° C. | 0.55 | 0.200 | 0.36 | 0.01 | 0.28 | 0.71 |
| Example 8 | PET/UC/alumina deposition | 150° C. | 0.55 | 0.200 | 0.36 | 0.00 | 0.29 | 0.71 |
| Example 9 | PET/UC/alumina deposition | 210° C. | 0.55 | 0.200 | 0.36 | 0.04 | 0.33 | 0.63 |
| Example 10 | PET/UC/alumina deposition | 210° C. | 0.55 | 0.225 | 0.41 | 0.01 | 0.33 | 0.66 |
| Example 11 | PET/UC/alumina deposition | 210° C. | 0.55 | 0.175 | 0.32 | 0.09 | 0.31 | 0.60 |

| | Gas barrier layer: Carbonate/Amide | Coat film IR peak height [-]: α ($NH_3$ complex) | Coat film IR peak height [-]: γ (free carboxyl group) | γ/α | Evaluation of Gas Barrier Properties, Before retort treatment: Oxygen permeability [mL/m²/d/MPa] | Before retort treatment: Water vapor permeability g/m²/d | After 130° C. 30 min retort treatment: Oxygen permeability [mL/m²/d/MPa] | After 130° C. 30 min retort treatment: Water vapor permeability g/m²/d |
|---|---|---|---|---|---|---|---|---|
| Example 1 | 2.43 | 0.07 | 0.00 | 0.05 | 6.0 | 1.0 | 0.7 | 1.9 |
| Comparative Example 1 | 2.43 | 0.07 | 0.00 | 0.05 | 15 | 1.5 | 30 | 4.0 |
| Example 3 | 2.13 | 0.06 | 0.00 | 0.02 | 0.5 | 0.4 | 0.6 | 2.4 |
| Example 4 | 1.81 | 0.04 | 0.01 | 0.31 | 0.6 | 0.4 | 1.2 | 1.8 |
| Example 5 | 2.08 | 0.05 | 0.00 | 0.00 | 0.6 | 0.4 | 1.6 | 5.0 |
| Example 6 | 2.10 | 0.06 | 0.00 | 0.04 | 0.6 | 0.4 | 1.0 | 3.4 |
| Example 7 | 1.99 | 0.05 | 0.00 | 0.03 | 0.7 | 0.4 | 1.7 | 2.7 |
| Comparative Example 2 | 1.09 | 0.02 | 0.02 | 1.07 | — | — | 42 | 5.7 |
| Example 2 | 2.52 | 0.05 | 0.00 | 0.03 | 4.5 | 0.9 | 1.2 | 1.9 |
| Example 8 | 2.45 | 0.06 | 0.00 | 0.08 | 2.0 | 0.6 | 0.9 | 2.2 |
| Example 9 | 1.92 | 0.06 | 0.01 | 0.20 | 1.0 | 0.4 | 0.6 | 1.3 |
| Example 10 | 1.97 | 0.05 | 0.01 | 0.19 | 0.9 | 0.4 | 0.7 | 1.5 |
| Example 11 | 1.91 | 0.05 | 0.02 | 0.39 | 0.8 | 0.4 | 0.9 | 2.2 |

REFERENCE SIGNS LIST

Description of Reference Signs Used in FIGS. 1 to 4 for Describing First Embodiment

1 two-layer laminate structure barrier film
2 base material layer
3 undercoat layer (UC layer)
4 inorganic material layer
5 gas barrier layer (OC layer)
6 adhesive layer
7 unstretched polypropylene film (CPP)
8 barrier laminate
9 nylon film
10 three-layer laminate structure barrier film
61 first adhesive layer
62 second adhesive layer Description of Reference Signs Used in FIGS. 5 to 8 for Describing Second Embodiment

10 gas barrier film
100 gas barrier laminate
101 base material layer
102 inorganic material layer
103 gas barrier layer
104 undercoat layer Description of Reference Signs Used in FIGS. 9 to 12 for Describing Third Embodiment

1 two-layer laminate structure barrier film
2 base material layer
3 undercoat layer (UC layer)
4 inorganic material layer
5 gas barrier layer (OC layer)
6 adhesive layer
7 unstretched polypropylene film (CPP)
8 barrier laminate
9 nylon film
10 three-layer laminate structure barrier film
61 first adhesive layer
62 second adhesive layer Description of Reference Signs Used in FIGS. 13 and 14 for Describing Fourth Embodiment

10 gas barrier film
100 gas barrier laminate
101 base material layer
102 inorganic material layer
103 gas barrier layer
104 undercoat layer
110 gas barrier laminate Description of Reference Signs Used in FIGS. 15 and 16 for Describing Fifth Embodiment

10 gas barrier film
100 gas barrier laminate
101 base material layer
102 inorganic material layer
103 gas barrier layer
104 undercoat layer
110 gas barrier laminate

The invention claimed is:

1. A gas barrier laminate comprising:
a base material layer;
a gas barrier layer that is provided over at least one surface of the base material layer; and
an inorganic material layer that is provided between the base material layer and the gas barrier layer,
wherein a composition ratio of Zn measured by X-ray photoelectron spectroscopy analysis of the gas barrier layer is 1 to 10 atomic %,
when a mass peak intensity of $^{64}ZnPO_4H^-$ is denoted by $I(^{64}ZnPO_4H^-)$, and a mass peak intensity of $C_3H_3O_2^-$ is denoted by $I(C_3H_3O_2^-)$, the mass peak intensities being measured by time-of-flight secondary ion mass spectrometry analysis of the gas barrier layer,
a value of $I(^{64}ZnPO_4H^-)/I(C_3H_3O_2^-)$ is equal to or more than $6\times10^{-4}$ and equal to or less than $5\times10^{-2}$,
a composition ratio of N measured by X-ray photoelectron spectroscopy analysis of the gas barrier layer is more than 0 atomic % and equal to or less than 12 atomic %, and
when a mass peak intensity of CN-measured by time-of-flight secondary ion mass spectrometry analysis of the gas barrier layer is denoted by $I(CN^-)$,
a value of $I(CN^-)/I(C_3H_3O_2^-)$ is more than 0 and equal to or less than 2.

2. The gas barrier laminate according to claim 1,
wherein when a mass peak intensity of $PO_2^-$ is denoted by $I(PO_2^-)$, and a mass peak intensity of $PO_3^-$ is denoted by $I(PO_3^-)$, the mass peak intensities being measured by the time-of-flight secondary ion mass spectrometry analysis of the gas barrier layer,
a value of $(I(PO_2^-)+I(PO_3^-))/(C_3H_3O_2^-)$ is equal to or more than 0.02 and equal to or less than 5.

3. The gas barrier laminate according to claim 1,
wherein a value of $I(PO_2^-)/I(PO_3^-)$, which is an intensity ratio between the $I(PO_2^-)$ and the $I(PO_3^-)$, is equal to or more than 0.05 and equal to or less than 1.

4. The gas barrier laminate according to claim 1,
wherein the gas barrier layer is formed of a cured product of a mixture including at least a polycarboxylic acid, Zn, and a phosphorus compound including one or more —P—OH groups or a salt thereof.

5. The gas barrier laminate according to claim 4,
wherein a concentration of P atoms of the phosphorus compound or the salt thereof in the mixture is equal to or more than $5\times10^{-4}$ mol to equal to or less than 0.3 mol with respect to 1 mol of the polycarboxylic acid.

6. The gas barrier laminate according to claim 4,
wherein the mixture further includes a polyamine.

7. The gas barrier laminate according to claim 6,
wherein the polyamine is polyethylenimine.

8. The gas barrier laminate according to claim 4,
wherein the polycarboxylic acid includes one or two or more polymers selected from the group consisting of polyacrylic acid, polymethacrylic acid, and a copolymer of acrylic acid and methacrylic acid.

9. The gas barrier laminate according to claim 1,
wherein a thickness of the gas barrier layer is equal to or more than 0.05 μm and equal to or less than 10 μm.

* * * * *